US012606225B2

(12) United States Patent
Rauschenberger

(10) Patent No.: US 12,606,225 B2
(45) Date of Patent: Apr. 21, 2026

(54) TRANSPORT CART AND METHOD FOR TRANSFORMING A TRANSPORT CART

(71) Applicant: Modus One GmbH, Tamm (DE)

(72) Inventor: Joerg Rauschenberger, Asperg (DE)

(73) Assignee: MODUS ONE GMBH, Tamm (DE)

( * ) Notice: Subject to any disclaimer, the term of this patent is extended or adjusted under 35 U.S.C. 154(b) by 566 days.

(21) Appl. No.: 18/020,777

(22) PCT Filed: Mar. 9, 2021

(86) PCT No.: PCT/EP2021/055904
§ 371 (c)(1),
(2) Date: Feb. 10, 2023

(87) PCT Pub. No.: WO2022/033726
PCT Pub. Date: Feb. 17, 2022

(65) Prior Publication Data
US 2023/0303141 A1 Sep. 28, 2023

(30) Foreign Application Priority Data

Aug. 12, 2020 (WO) ................. PCT/EP2020/072684

(51) Int. Cl.
B62B 3/02 (2006.01)
B62B 5/06 (2006.01)
(52) U.S. Cl.
CPC ............... B62B 3/022 (2013.01); B62B 5/06 (2013.01); B62B 2205/003 (2013.01); B62B 2205/04 (2013.01)
(58) Field of Classification Search
CPC ..... B62B 3/022; B62B 5/06; B62B 2205/003; B62B 2205/04; B62B 2202/12;
(Continued)

(56) References Cited

U.S. PATENT DOCUMENTS 5,863,055 A * 1/1999 Kasravi ................... B62B 3/027
280/654
6,733,026 B1 5/2004 Robberson
(Continued)

FOREIGN PATENT DOCUMENTS

CN 105365866 A * 3/2016 ............. B62B 3/100
DE 19707744 C1 * 10/1998 ............... B62B 3/02
(Continued)

OTHER PUBLICATIONS

Translated EP-2230149-A1 (Year: 2025).*
(Continued)

*Primary Examiner* — James A Shriver, II
*Assistant Examiner* — Ian Bryce Shelton
(74) *Attorney, Agent, or Firm* — Reising Ethington P.C.

(57) ABSTRACT

A transport cart having a base assembly, having two opposing side assemblies arranged on the base assembly, having a respective wheel arranged on a respective one of the side assemblies, and having at least one receptacle arranged between the side assemblies for a respective transport box. The transport cart is transferable between a packing mode and a first operating mode or between the first operating mode and a second operating mode. A method for transferring such a transport cart between the first operating mode and the second operating mode, a method for transferring such a transport cart between the packing mode and the first operating mode, and a method for transforming such a transport cart are also disclosed.

22 Claims, 84 Drawing Sheets

(58) Field of Classification Search
CPC ..... B62B 5/065; B62B 5/067; B62B 2205/06;
B62B 2206/06; B62B 3/02
See application file for complete search history.

(56) References Cited

U.S. PATENT DOCUMENTS

| | | | | |
|---|---|---|---|---|
| 8,979,115 | B1 * | 3/2015 | Baron | B62B 3/106 |
| | | | | 280/DIG. 4 |
| 9,688,298 | B1 * | 6/2017 | Su | B62B 1/12 |
| 9,834,243 | B1 * | 12/2017 | Zhang | B62B 7/086 |
| 10,005,481 | B1 * | 6/2018 | Lopez | B62B 1/008 |
| 10,118,633 | B2 * | 11/2018 | Gibson | B62B 1/12 |
| 10,407,088 | B1 * | 9/2019 | Le | B62B 5/065 |
| 11,840,269 | B2 * | 12/2023 | Brunner | B62B 1/002 |
| 2009/0308706 | A1 * | 12/2009 | Mao | B62B 5/085 |
| | | | | 190/18 A |
| 2010/0253025 | A1 * | 10/2010 | Smith | B62B 1/12 |
| | | | | 280/47.27 |
| 2012/0242063 | A1 * | 9/2012 | Bruckner | B62B 3/04 |
| | | | | 280/651 |
| 2015/0137487 | A1 * | 5/2015 | Su | B62B 3/02 |
| | | | | 280/655 |
| 2016/0207555 | A1 * | 7/2016 | Gibson | B62B 3/022 |
| 2018/0065655 | A1 * | 3/2018 | Leys | B62B 7/064 |
| 2020/0189637 | A1 * | 6/2020 | Karlsson | B62B 5/0495 |
| 2020/0223460 | A1 * | 7/2020 | Jian | B62B 1/12 |
| 2020/0369306 | A1 * | 11/2020 | West, Jr. | B62B 1/002 |
| 2021/0053600 | A1 * | 2/2021 | Wang | B62B 5/0023 |
| 2021/0300447 | A1 * | 9/2021 | Brunner | B62B 1/002 |

FOREIGN PATENT DOCUMENTS

| | | | | | |
|---|---|---|---|---|---|
| DE | 102016217867 | A1 * | 3/2018 | | B62B 1/008 |
| DE | 102016217867 | B4 * | 4/2019 | | B62B 1/008 |
| EP | 0749885 | A1 * | 12/1996 | | B62B 1/12 |
| EP | 2230149 | A1 * | 9/2010 | | B62B 1/002 |
| EP | 3216674 | A1 * | 9/2017 | | B62B 7/086 |
| JP | 2007030856 | A * | 2/2007 | | B62B 3/027 |
| WO | WO-2018051267 | A1 * | 3/2018 | | B62B 5/0003 |
| WO | WO2018127409 | A1 | 7/2018 | | |

OTHER PUBLICATIONS

English Translation of the International Preliminary Report on Patentability issued for PCT/EP2021/055904 on Feb. 7, 2023.
International Search Report and Written Opinion issued for PCT/EP2020/072684 on Feb. 9, 2021.
English Translation of the International Preliminary Report on Patentability issued for PCT/EP2020/072684 on Mar. 15, 2022.
International Search Report and Written Opinion issued for PCT/EP2021/055904 on Oct. 12, 2021.
Partial Search report issued for PCT/EP2021/055904 on Jun. 16, 2021.

* cited by examiner

Fig. 20

VIEW A

VIEW A

(B)

(C)

(A)

VIEW A

VIEW A (B)

START

TRANSFERRING BETWEEN THE
PACKING MODE AND THE FIRST
OPERATION MODE          422

TRANSFERRING BETWEEN THE
FIRST OPERATION MODE AND THE
SECOND OPERATION MODE          424

END

1

TRANSPORT CART AND METHOD FOR TRANSFORMING A TRANSPORT CART

CROSS-REFERENCE TO RELATED APPLICATIONS

This application claims the priority of International patent application PCT/EP2020/072684 filed Aug. 12, 2020, the entire contents of which are herein incorporated by reference.

FIELD

The present application relates to transport carts having a base assembly, having two opposing side assemblies disposed on the base assembly, having a wheel disposed on each of the side assemblies, and having at least one receptacle disposed between the side assemblies for a respective transport box. Further, the present application relates to a method for transferring such a transport cart between a packing mode and a first operating mode. Further, the present application relates to a method of transferring such a transport cart between a first mode of operation and a second mode of operation.

BACKGROUND

The publication DE 197 07 744 C1 shows a foldable transport cart with a substantially cubic container, the opposing first and opposing second side walls of which, in the unfolded state, extend between the floor and a frame having handle elements and closing off the container at the top, the first side walls being mounted on the frame and connected to the floor in an articulated manner and the second side walls being supportable on the floor and each accommodating at least one wheel, the second side walls are supportable on the floor and each receive at least one wheel which is movable between a driving position projecting beyond the wall surface and a rest position lying within the wall surface, wherein the first side walls respectively mounted on the frame and on the floor are constructed to be foldable in such a way that the frame and the floor can be laid substantially one on top of the other when the second side walls are swung in horizontally, and wherein a rod for handling is arranged on the frame and is movable between a handling position projecting beyond the container and a depositing position lying close to the container or within the container.

Furthermore, the printed document WO 2018/127409 A1 shows a handcart, in particular for transporting goods, with first vertical struts at a first cart end and second vertical struts at a second cart end, wherein the first vertical struts are connected to the second vertical struts by diagonal struts, wherein upper ends of the diagonal struts are rotatably connected to the vertical struts, and wherein lower ends of the diagonal struts are rotatably and vertically displaceably connected to the vertical struts, wherein at least one container is also attached to the upper half of the first vertical struts, and wherein at least one further container is vertically displaceable along the second vertical struts via a guide and is connected via pivot joints to those diagonal struts whose lower ends are connected to the second vertical struts.

Compared to the known prior art, it is a task of the present application to provide a transport cart that is easier to handle. In particular, it is a task of the present application to provide a transport cart that can be transformed between different operating modes as easily as possible.

2

SUMMARY

According to a first aspect of the application, a transport cart is proposed comprising a base assembly, two opposing side assemblies arranged on the base assembly, a wheel arranged on each of the side assemblies, and at least one receptacle arranged between the side assemblies for a respective transport box, the transport cart comprising an actuating device configured to transfer the transport cart between a first operating mode and a second operating mode, wherein the actuating device comprises an actuating element, wherein the actuating device is designed to transfer the transport cart from the first operating mode to the second operating mode during a first actuation in which the actuating element is moved in a first direction of movement, and to transfer the transport cart from the second operating mode to the first operating mode during a second actuation in which the actuating element is also moved in the first direction of movement.

According to a second aspect of the application, a transport cart is proposed having a base assembly, having two opposing side assemblies disposed on the base assembly, having a wheel disposed on each of the side assemblies, and having at least one receptacle disposed between each of the side assemblies for a transport box, the transport cart having an actuating device which is designed to transfer the transport cart between a first operating mode and a second operating mode, the at least one receptacle being arranged in a transport position in the first operating mode and in a loading position in the second operating mode, the actuating device being designed to move the at least one receptacle between the transport position and the loading position.

According to a third aspect of the application, there is proposed a transport cart having a base assembly, two opposing side assemblies disposed on the base assembly, and a wheel disposed on each of the side assemblies, the transport cart being transformable between a packing mode in which each wheel is disposed in a folded position and each side assembly is disposed in a folded position, and a first mode of operation in which each wheel is disposed in an unfolded position and each side assembly is disposed in an unfolded position, such that movement of each side assembly between the folded position and the unfolded position is coupled to movement of the corresponding wheel between the folded position and the unfolded position, such that when each side assembly is moved between the folded position and the unfolded position, the corresponding wheel is moved between the folded position and the unfolded position. In this regard, optionally further at least one receptacle for a respective transport box disposed between the side assemblies may be provided.

In accordance with a fourth aspect of the application, a transport cart is proposed having a base assembly, having two opposing side assemblies disposed on the base assembly, having a wheel disposed on each of the side assemblies, and having at least one receptacle disposed between the side assemblies for a respective transport box.

According to a fifth aspect of the application, a method of transferring a transport cart between a first mode of operation and a second mode of operation, the transport cart comprising a base assembly, two opposing side assemblies disposed on the base assembly, a wheel disposed on each of the side assemblies, and at least one receptacle for a transport box disposed between each of the side assemblies, the method comprising the steps of:

transferring the transport cart from the first operating mode to the second operating mode by means of a first actuation in which an actuating member of an actuating device of the transport cart is moved in a first moving direction; and transferring the transport cart from the second operating mode to the first operating mode by means of a second actuation in which an actuating element of an actuating device of the transport cart is moved in the first movement direction.

According to a sixth aspect of the application, a method of transferring a transport cart between a packing mode and a first mode of operation, the transport cart comprising a base assembly, two opposing side assemblies disposed on the base assembly, and a wheel disposed on each of the side assemblies, the method comprising the steps of:

transferring the transport cart from the packing mode, in which each wheel is arranged in a folded position and each side assembly is arranged in a folded position, to a first operating mode, in which each wheel is arranged in an unfolded position and each side assembly is arranged in an unfolded position, by moving the side assemblies from the folded to the unfolded position, the movement of each side assembly between the folded and unfolded positions being coupled to a movement of the corresponding wheel between the folded position and unfolded position;

transferring the transport cart from the first operating mode to the packing mode by means of moving the side assemblies from the unfolded position to the folded position.

In accordance with a seventh aspect of the application, a method of transforming a transport cart, the transport cart comprising a base assembly, two opposing side assemblies disposed on the base assembly, a wheel disposed on each of the side assemblies, and at least one receptacle for a transport box disposed between each of the side assemblies, the method comprising the steps of:

transferring a transport cart between a packing mode and a first operating mode according to the method according to the sixth aspect; and transferring a transport cart between the first mode of operation and a second mode of operation according to the method according to the fifth aspect.

Also in the method according to the sixth aspect, optionally further at least one receptacle arranged between the side assemblies may be provided for a respective transport box. The transport cart is particularly suitable as a shopping cart and as a transport cart in warehouses due to its various operating modes.

In the packing mode, the transport cart is folded compactly, in particular to save space, and therefore takes up little room. The packing mode is therefore particularly suitable for transporting or storing the transport cart, for example in the trunk of a car. In particular, in the packing mode, the two side assemblies are folded closed. In other words, the two side assemblies arranged on opposite sides of the base assembly are folded towards each other in the packing mode so that the side assemblies are arranged in alignment with each other and abut the base assembly. In doing so, the side assemblies extend toward each other along the base assembly. Further, each wheel is preferably folded into the corresponding side assembly. For this purpose, each side assembly can have a corresponding opening through which the corresponding wheel can be folded in or folded out. In the folded position, each wheel is preferably fully disposed in the corresponding side assembly. In the unfolded position, each wheel is preferably completely or at least partially unfolded from the corresponding side assembly.

In the first and in the second operating mode, the side assemblies are unfolded in particular. In other words, the two side assemblies are arranged parallel to each other in the first and in the second operating mode. Thereby, the side assemblies extend away from the base assembly, preferably perpendicular to the base assembly. Further, each wheel is preferably unfolded from the corresponding side assembly so that the transport cart can be pulled or pushed over the wheels on the ground. The wheels are thus arrangeable on the ground or oriented towards the ground in the first and second modes of operation. The wheels are thus arranged on an underside of the transport cart in the first and second operating modes. The side of the transport cart opposite the bottom side is thus referred to as the top side of the transport cart. The terms "high" and "low" or "top" and "bottom" or "above" and "below" or "vertical" and "horizontal" are thus to be understood in relation to the wheels or to the side of the transport cart on which the wheels are arranged in the first and second operating modes.

In the first operating mode, which can also be referred to as operating mode or trailing mode, the transport cart can be pulled easily. The first operating mode is thus particularly suitable for pulling the transport cart. In particular, in the first operating mode, the receptacle for the transport box is arranged in a transport position. The transport position may also be referred to as a low position, in which the receptacle is arranged close to the unfolded wheels. A transport box arranged in the receptacle is thus arranged low, so that the total weight of the transport box and its contents are arranged closer to an axis of rotation of the wheels. This makes it easier to transport the transport box.

In the second operating mode, which can also be referred to as further operating mode or pushing mode, the transport cart can simply be pushed or loaded. The second operating mode is thus particularly suitable for pushing or loading the transport cart. In particular, in the first operating mode, the receptacle for the transport box is arranged in a loading position. The loading position may also be referred to as the high position, in which the receptacle is arranged further away from the wheels than in the low position. A transport box arranged in the receptacle is thus also arranged higher. The loading position is thus particularly suitable for loading the transport box, since a user does not have to bend down as much or at all to load the transport box.

To transfer the transport cart from the packing mode to the first operating mode, the two side assemblies are unfolded. In other words, the side assemblies are transferred from a folded position to an unfolded position. Since the movement of the side assembly between the folded and unfolded positions is coupled to the movement of the wheels between the folded and unfolded positions, the wheels are automatically unfolded as the side assembly is unfolded. In other words, the wheels are also transferred from the folded position to the unfolded position.

Accordingly, to transfer the transport cart from the first operating mode to the packing mode, the side assemblies are folded closed. In other words, the side assemblies are transferred from an unfolded position to a folded position. In the process, the wheels are automatically folded in as well. In other words, the wheels are thereby transferred from the unfolded position to the folded position.

To transfer the transport cart from the first operating mode to the second operating mode, the actuating element is moved in the first direction of movement. The actuating element is preferably designed mechanically, for example as a rotatable coupling body, as a lever, as a turntable, or the like. Alternatively, an electric, hydraulic or pneumatic drive device can also be provided as the actuating element. To transfer the transport cart from the second operating mode to the first operating mode, the actuating element is also moved in the first direction of movement. The actuating element can, for example, execute a pumping movement, in particular an alternating movement in the first direction of movement and against the first direction of movement, wherein only the movement in the first direction of movement contributes to transferring the transport cart. This is particularly advantageous in the case of manual actuation. In the case of actuation by means of a drive device, the drive device only has to be suitable for executing a movement in one direction of movement, in particular the first direction of movement, which considerably simplifies the requirements for a drive device.

Aspects of the present application each provide a transport cart that is easy to handle. In particular, it is made possible in a simple manner for the transport cart to be transformable between different operating modes, for example between the packing mode and the first operating mode and between the first operating mode and the second operating mode.

In a first refinement of aspects of the application, the transport cart includes an actuating device configured to transition the transport cart between a first mode of operation and a second mode of operation.

As previously described, the transport cart may be transitioned between the first mode of operation and the second mode of operation by actuation of the actuating device.

In another refinement of aspects of the application, the actuating device comprises an actuating element, wherein the actuating device is configured to transfer the transport cart from the first mode of operation to the second mode of operation upon a first actuation in which the actuating element is moved in a first direction of movement, and to transfer the transport cart from the second mode of operation to the first mode of operation upon a second actuation in which the actuating element is also moved in the first direction of movement.

As also described before, only one movement of the actuating element in the first direction of movement is used to transfer from the first operating mode to the second operating mode. This simplifies the design and handling of the actuating element.

In another refinement of aspects of the application, the first actuation and/or the second actuation each has one or more actuation movements, wherein each actuation movement moves the actuation member in the first direction of movement.

In particular, each actuation movement is directed in the first direction of movement. In this way, one or more movements of the actuating element can transfer the transport cart between the first and second operating modes. For example, therefore, to perform the first and/or the second actuation, the actuating element may be alternately moved in and against the first direction of movement. In other words, a pumping or rocking motion is performed during the first and/or second actuation.

In another refinement of aspects of the application, the at least one receptacle is arranged in a transport position in the first mode of operation and in a loading position in the second mode of operation, wherein the actuating device is configured to move the at least one receptacle between the transport position and the loading position.

As described above, the transport position is particularly suitable for transporting a transport box as well as for pulling the transport cart, whereas the loading position is particularly suitable for loading a transport box as well as for pushing the transport cart.

In another refinement of aspects of the application, each receptacle comprises a respective receptacle member on each side assembly, each receptacle member being disposed on the respective side assembly via a first arm, each first arm being pivotally mounted on the respective side assembly about an axis such that the receptacle is pivotable between the transport position and the loading position.

Each pick-up element can be pivoted about the corresponding axis. In particular, a rotational movement of each first arm about the corresponding axis is coupled to the actuating device. In other words, the actuating device is configured to pivot each first arm about the corresponding axis during the first actuation as well as during the second actuation to transfer the pickup between the transport position and the loading position. In this way, the transport cart can be transferred in a simple manner between the first operating mode, which is particularly suitable for pulling the transport cart or for transporting a transport box, and the second operating mode, which is particularly suitable for pushing the transport cart or for loading a transport box.

In another refinement of aspects of the application, the transport cart further comprises a support wheel on each side assembly.

The support wheels are provided in particular to make it easier to push the transport cart. During pushing, the support wheels prevent the transport cart from tilting about a rotation axis of the wheels, in particular due to the weight of a transport box. Due to the higher arrangement of the transport box in the loading position, a greater torque acts on the axis of rotation of the wheels, so that the transport cart can tip more easily. Preferably, the support wheels thus prevent the transport cart from tipping over in the second operating mode in which the receptacle is arranged in the loading position. The support wheels are thus particularly advantageous in the loading position, in which a user of the transport cart preferably loads a transport box arranged in the receptacle of the transport cart and the user usually does not hold the transport cart while loading.

In another refinement of aspects of the application, each support wheel is disposed in a folded position in the first mode of operation and in an unfolded position in the second mode of operation, wherein the actuator is configured to move the at least each support wheel between the folded position and the unfolded position.

In this way, the first operating mode is particularly suitable for pulling the transport cart, whereas the second operating mode is particularly suitable for pushing or loading the transport cart. As previously described, support wheels prevent the transport cart from tilting around a rotation axis of the wheels, which is particularly useful when pushing and loading the transport cart. On the other hand, the support wheels are not essential when pulling the transport cart, so the support wheels are folded in the first mode of operation to save space.

In another refinement of aspects of the application, each support wheel is disposed on the corresponding side assembly via a second arm, each second arm being pivotally mounted on the corresponding side assembly about an axis such that the corresponding support wheel is pivotable between the folded position and the unfolded position.

The actuating device is thereby configured to pivot each second arm about the respective axis to pivot each support wheel between the folded position and the unfolded position. In this way, the transport cart can be transferred in a simple manner between the first operating mode, which is particularly suitable for pulling the transport cart or for transporting a transport box, and the second operating mode, which is particularly suitable for pushing the transport cart or for loading a transport box.

In a further refinement of aspects of the application, a movement, in particular pivoting movement, of the support wheels between the folded position and the unfolded position is coupled to a movement, in particular pivoting movement, of the at least one receptacle between the transport position and the loading position.

During the first and second actuation, the support wheels and the holder are moved together by the actuating device. In other words, during the first actuation, both the support wheels are transferred from the folded to the unfolded position and the holder is transferred from the transport position to the loading position. In the second actuation, both the support wheels are transferred from the unfolded to the folded position and the holder is transferred from the loading position to the transport position.

In a further refinement of aspects of the application, the movement, in particular pivoting movement, of each support wheel is coupled via a toggle lever to the movement, in particular pivoting movement, of the at least one receptacle or to the actuating device, wherein each toggle lever is arranged, in particular stretched, in the unfolded position of the corresponding support wheel, in particular in the second operating mode, in such a way that the respective support wheel is blocked or locked or held in the unfolded position. In particular, each toggle lever is arranged bent in the folded position of the corresponding support wheel, in particular in the first operating mode.

In principle, a toggle lever is designed in such a way that it can be transferred from a bent state to an extended state by means of an extension or rotation, whereas the toggle lever can be transferred from an extended state to a bent state only by means of a rotation. Accordingly, the toggle lever remains in the stretched state when a pushing force acts in the direction of the extension direction of the toggle lever. Accordingly, each toggle lever holds the respective support wheel in the unfolded position when the toggle lever is extended. The toggle levers thus ensure that a support wheel cannot be folded in by an applied torque about its bearing axis on the corresponding side assembly. The support wheel can thus only be folded in by actuating the actuating device.

In particular, it can be provided that each toggle lever is coupled to the pivoting movement of the support wheel via a further lever, so that a stretching or buckling movement of each toggle lever, in particular a change in the angle of each toggle lever, is transmitted to a pivoting movement of each support wheel. Accordingly, it results that a pivoting movement of each support wheel leads to a stretching or buckling of the corresponding toggle lever, whereby the toggle lever cannot be buckled by a pivoting movement of the support wheel when the toggle lever is stretched.

In a further refinement of aspects of the application, each toggle is arranged to be stretched when the corresponding support wheel is transferred from the folded to the unfolded position and to be bent when the corresponding support wheel is transferred from the unfolded to the folded position.

As previously described, this provides a simple way of ensuring that the support wheel can be folded in only by actuating the actuating device.

In another refinement of aspects of the application, the transport cart further comprises a handle disposed on the base assembly, the handle being pivotally mounted on the base assembly about a pivot axis.

In this way, for example, the orientation of the handle can be adjusted in the first and second operating modes.

In a further refinement of aspects of the application, the handle is couplable to the actuating member such that a pivoting motion of the handle is transferred to a motion of the actuating member parallel to the first direction of movement.

In this way, a pivoting movement of the handle in a pivoting direction is transmitted to a movement of the actuating element in the first direction of movement, whereas a pivoting movement of the handle against the pivoting direction is not transmitted to the actuating element. The first pivoting direction is preferably directed downward or downward from an initial position of the handle. Thus, if the handle is pivoted in the pivoting direction to generate an actuating movement, and can thereafter be returned to its initial position without transmitting any movement. In other words, this allows in a simple way the user to perform the first or second actuation by a pivoting movement, in particular a pumping or rocking movement.

In another refinement of aspects of the application, the handle is pivotally mounted to the base assembly via a coupling mechanism, the coupling mechanism being operable to a locking state in which the handle is not pivotable relative to the base assembly, the coupling mechanism being operable to a coupling state in which the handle is pivotable relative to the base assembly and the handle is coupled to the actuating member such that pivotal movement of the handle is transmissible to the actuating member.

In the coupling state, the handle can be used to perform the first or second actuation, as previously described. In the locking state, the handle is non-pivotally connected, particularly rigidly connected, to the base assembly. In the locking state, the handle can be used to either push or pull the transport cart. In other words, in the coupling state, the handle is provided to perform the first or second actuation, and in the locking state, the handle is provided to allow pushing or pulling of the transport cart via the handle.

In a further refinement of aspects of the application, the coupling mechanism is capable of being placed in a free-rotation state in which the handle is pivotable relative to the base assembly and the handle is decoupled from the actuating member so that the pivotal movement of the handle is not transferable to the actuating member.

In the free rotation state, the orientation of the handle relative to the base assembly can be changed. In particular, a desired orientation of the handle relative to the base assembly can be set in the free-rotation state. By transferring the state of the coupling mechanism from the free rotation state to the locking state, the desired orientation of the handle can be locked. In this way, a user can set the desired orientation of the handle with respect to the base assembly that is particularly suitable for pushing or pulling the transport cart in the locking state.

In a further refinement of aspects of the application, the transport cart comprises a first actuating member configured to selectively move the coupling mechanism to the locking state or the coupling state, in particular wherein the actuating member is selectively movable to a locking position in which the coupling mechanism is disposed in the locking state or to a coupling position in which the coupling mechanism is disposed in the coupling state.

In this way, a user can easily transition the coupling mechanism between states.

In a further refinement of aspects of the application, the first actuating element is configured to further transfer the coupling mechanism to the free rotation state, in particular wherein the actuating element is movable to a free rotation position in which the coupling mechanism is disposed in the free rotation state.

In this way, a user can selectively place the coupling mechanism in the locking state, the coupling state, or the free-rotation state.

In a further refinement of aspects of the application, the actuating device comprises a motion conversion means configured to transfer or convert a motion of the actuation member in the first direction of movement to an oscillating motion parallel to a second direction of movement by which the transport cart is transferable between the first mode of operation and the second mode of operation.

To transfer the transport cart between the first operating mode and the second operating mode, two movements acting in opposite directions are basically required. For this purpose, the motion conversion device converts the motion of the actuating element running in the first direction of movement into an oscillating motion parallel to the second direction of movement. Preferably, the transport cart is transferred from the first operating mode to the second operating mode by a movement in the second direction of movement and from the second operating mode to the first operating mode by a movement against the second direction of movement.

In a further refinement of aspects of the application, the motion conversion device is coupled to the actuating element via a first motion transmission element and is coupled to the support and preferably also to each support wheel via a second motion transmission element.

The first and second motion transmission elements can be designed, for example, as a cable pull or a push rod. Alternatively, the first and second motion transmission elements can also be designed, for example, as a hydraulic motion transmission element or pneumatic motion transmission element.

In a further refinement of aspects of the application, the motion conversion means is configured to transfer a motion of the first motion transmitting member in the first direction of movement to an oscillating motion of the second motion transmitting member parallel to a second direction of movement, in particular wherein the motion conversion means is adapted not to transfer a motion of the first motion transmitting member opposite to the first direction of movement to the second motion transmitting member.

The first motion transmission element is thus coupled to the motion conversion device in such a way that only a motion in the first direction of movement is transmitted. For this purpose, the first motion transmission element is preferably coupled to the motion conversion device via a free-wheeling device that transmits only the motion in the first direction of movement. The freewheeling device can be designed, for example, as a pawl freewheel, barrel freewheel, roller freewheel, toothed disk freewheel, or the sprag freewheel.

In another refinement of aspects of the application, when the transport cart is transferred from the first mode of operation to the second mode of operation, the second motion transfer member is moved in the second direction of movement, and when the transport cart is transferred from the second mode of operation to the first mode of operation, the second motion transfer member is moved in opposition to the second direction of movement.

In this way, during the first actuation, a movement of the first motion transmission element in the first direction of movement is transferred to a movement of the second motion transmission element in the second direction of movement. Accordingly, during the second actuation, a movement of the first motion transmission element in the first direction of movement is transmitted to a movement of the second motion transmission element against the second direction of movement.

In a further refinement of aspects of the application, the second motion transfer member is coupled to the receptacle and/or the support wheel, in particular such that movement of the motion transfer member parallel to the second direction of movement transfers the support wheel between the folded position and the unfolded position and/or transfers the receptacle between the transport position and the loading position.

When the motion transmission element moves in the second direction of movement, the support wheel is transferred from the folded position to the unfolded position or the holder is transferred from the transport position to the loading position. When the motion transmission element moves in the opposite direction to the second direction of movement, the support wheel is transferred from the unfolded position to the folded position, or the holder is transferred from the loading position to the transport position.

In another refinement of aspects of the application, the motion conversion device further comprises a disc and a lever, the disc being coupled to the first motion transmitting member such that only a motion of the first motion transmitting member in the first direction of movement is transmitted to a rotational motion of the disc, the lever being coupled to the second motion transmitting member, the disc being coupled to the lever such that a rotational motion of the disc is converted to an oscillating motion of the lever.

By means of the coupling between the disc and the lever, a continuous, in particular linear, movement of the first motion transmission element can be converted into an oscillating movement of the second motion transmission element.

In particular, the disc may be rotatably mounted on the base assembly about an axis of rotation and coupled to the first motion transmitting member such that when the first motion transmitting member moves in the first direction of movement, the disc is coupled to the first motion transmitting member, and when the first motion transmitting member moves in a direction opposite to the first direction of movement, the disc is decoupled from the first motion transmitting member so that motion is transmitted to the disc only when the first motion transmitting member moves in the first direction of movement. For this purpose, a free-wheeling mechanism can be provided, for example, which allows the disk and the motion transmission element to couple with each other only in the first direction of movement.

In particular, a first end of the lever may be rotatably supported at a suspension point on the base assembly, with a second end of the lever coupled to the second motion transmitting member such that when the lever is deflected about the suspension point, the second motion transmitting member is moved parallel to the second direction of movement.

In another refinement of aspects of the application, the disc has on one side surface a closed link guide extending about the axis of rotation, a roller being rotatably mounted on the lever between the two ends, the roller abutting the link guide of the disc and being configured to roll along the link guide upon rotation of the disc about the axis of rotation.

In particular, the link guide can have a varying radial profile so that the distance of the roller from the axis of rotation changes as the roller rolls along the link guide. This causes the lever to deflect. Since the splitter guide is closed, a periodic oscillating pendulum motion is transmitted to the lever by a rotational movement of the pulley. The oscillating pendulum motion of the lever in turn causes an oscillating motion of the second motion transmission element in the second direction of movement.

In a further refinement of aspects of the application, the transport cart is further transferable or transformable between a packing mode and the first mode of operation.

As described above, the packing mode is particularly suitable for transporting or storing the transport cart. For this purpose, the transport cart is preferably folded compactly and therefore requires little space. The first operating mode is particularly suitable for operating, especially pulling, the transport cart. For this purpose, the side assemblies are preferably unfolded and the wheels are unfolded from the side assemblies so that the transport cart can be moved, for example, via the wheels.

In another refinement of aspects of the application, the side assemblies are each pivotally mounted to the base assembly between a folded closed position and an unfolded position, in particular wherein the transport cart is disposed in the packing mode when both side assemblies are disposed in the folded closed position and is disposed in the first mode of operation when both side assemblies are disposed in the unfolded position.

As previously described, the transport cart is folded in the packing mode to save space and unfolded in the first operating mode for operation, such as transporting a transport box.

In another refinement of aspects of the application, the side assemblies are arranged folded closed, particularly in alignment with each other, in the folded closed position and unfolded, particularly parallel to each other, in the unfolded position.

In other words, in the packing mode, the side assemblies abut the base assembly and extend toward each other along the base assembly. In the first mode of operation, the side assemblies extend away from the base assembly, preferably perpendicular to the base assembly.

In another refinement of aspects of the application, each wheel is disposed in a folded position in the packing mode and in an unfolded position in the first mode of operation.

In this way, each wheel is arranged in a space-saving manner in the packing mode and in such a way in the first operating mode that the transport cart can be moved over the wheels, in particular pushed or pulled.

In another refinement of aspects of the application, each wheel is disposed on the corresponding side assembly via a third arm, each third arm being pivotally mounted on the corresponding side assembly about an axis such that each wheel is pivotable about the corresponding axis between the folded position and the unfolded position.

In this way, the third arm is pivoted about the axis when the transport cart is transferred between the packing mode and the first operating mode.

In a further refinement of aspects of the application, a movement, in particular pivoting movement, of each side assembly between the folded closed position and the unfolded position is coupled to a movement, in particular pivoting movement, of the corresponding wheel between the folded closed position and the unfolded position, such that when the side assembly is pivoted between the folded closed position and the unfolded position, the corresponding wheel is pivoted about the axis.

In this way, the wheels and side assemblies are transferable together between the packing mode and the first mode of operation.

In another refinement of aspects of the application, each wheel is unfolded when the corresponding side assembly is pivoted from the folded position to the unfolded position and correspondingly folded when the corresponding side assembly is pivoted from the unfolded position to the folded position.

In this manner, a user can unfold or fold the side assemblies to transfer the transport cart between the packing mode and the first mode of operation, with the wheels unfolding or folding accordingly.

In another refinement of aspects of the application, the transport cart further comprises a support on each side assembly.

By means of the supports, the transport cart can be supported in the first operating position so that the transport cart can be placed on the supports and the wheels on the ground without a user holding the transport cart, for example by the handle. In particular, the support may be a lifting element. The lifting element can then support the transport cart on the ground with its free end. In particular, the lever element can then support the transport cart directly on the ground with its free end. In particular, the lifting element may not have a wheel, that is, it is formed without a wheel at its free end.

In another refinement of aspects of the application, each support is disposed in a folded position in the packing mode and in an unfolded position in the first mode of operation, particularly wherein each support is pivotally mounted to the corresponding side assembly about an axis between the folded position and the unfolded position.

In this way, the supports can be folded in to save space in the packing mode and unfolded in the first operating mode for operation of the transport cart.

In a further refinement of aspects of the application, the movement, particularly pivotal movement, of each side assembly between the folded closed position and the unfolded position is coupled with a movement, particularly pivotal movement, of the corresponding support between the folded and unfolded positions.

Preferably, when the side assembly is pivoted between the folded position and the unfolded position, the corresponding support is pivoted about the axis. In other words, the supports and the side assemblies can be moved or folded together so that when the transport cart is transferred between the packing mode and the first mode of operation, the supports and the side assemblies are folded together.

In another refinement of aspects of the application, each support is unfolded when the corresponding side assembly is pivoted from the folded position to the unfolded position and correspondingly folded when the corresponding side assembly is pivoted from the unfolded position to the folded position.

In this manner, a user can unfold or fold the side assemblies to transfer the transport cart between the packing mode and the first mode of operation, with the supports unfolding or folding accordingly.

In another refinement of aspects of the application, the pivoting motion of each side assembly is coupled to both the pivoting motion of the corresponding wheel and the pivoting motion of the corresponding support.

In other words, each side assembly is folded together with the corresponding wheel and support. In this manner, a user can unfold or fold the side assemblies to transfer the cart between the packing mode and the first mode of operation, with both the wheels and the supports unfolding or folding accordingly.

In a further refinement of aspects of the application, the movement, in particular pivoting movement, of each support and/or wheel is coupled via a toggle lever to the movement, in particular pivoting movement, of the corresponding side assembly, wherein each toggle lever is arranged, in particular stretched, in the unfolded position of the corresponding wheel or support, in particular in the first operating mode, such that the respective wheel or support is locked or held in the unfolded position. In particular, each toggle lever is arranged bent in the folded position of the respective wheel or the respective support, in particular in the packing mode.

In this way, the toggle lever remains in the extended state when a thrust force acts in the direction of the extension direction of the toggle lever. Accordingly, each toggle lever holds the respective wheel or support in the unfolded position when the toggle lever is extended. The toggle levers thus ensure that a wheel or support cannot be folded in by an applied torque about its bearing axis on the corresponding side assembly. The wheel or support can thus only be folded in by a folding or pivoting movement of the corresponding side assembly.

In particular, it can be provided that each toggle lever is coupled to the pivoting movement of the wheel or support via a further lever, so that a stretching or buckling movement of each toggle lever, in particular a change in the angle of each toggle lever, is transmitted to a pivoting movement of each wheel or support. Accordingly, it results that a pivoting movement of each wheel or support leads to a stretching or buckling of the corresponding toggle lever, whereby the toggle lever cannot be buckled by a pivoting movement of the wheel or support when the toggle lever is stretched.

In a further refinement of aspects of the application, each toggle is arranged to be stretched when the wheel or support is transferred from the folded to the unfolded position and correspondingly to be bent when the wheel or support is transferred from the unfolded to the folded position.

As described above, this provides a simple way of ensuring that each wheel or support can be folded, in particular folded in or out, only by a folding or pivoting movement of the corresponding side assembly.

In another refinement of aspects of the application, the transport cart further comprises a locking device configured to lock each side assembly in the folded closed position and in the unfolded position.

In this way, the side assemblies can be locked or held in the folded position in the packing mode and in the unfolded position in the first or second operating mode. The locking device thus secures the side assemblies against unintentional pivoting.

In a further refinement of aspects of the application, the transport cart further comprises at least a second actuating element by means of which the locking of the side assemblies effected by the locking device can be released.

When the second actuating element is actuated, the locking of the side assemblies is released so that the side assemblies can be transferred between the closed and the open position.

In a further refinement of aspects of the application, the transport cart comprises a second actuating element for each side assembly, by means of which the locking of the respective side assembly effected by the locking device can be released.

In this way, the locking of the side assemblies can be released independently.

In another refinement of aspects of the application, each second actuating element is disposed on the corresponding side assembly.

In this manner, a user can actuate one actuating element while pivoting the corresponding side assembly. In particular, a user can actuate both actuating elements simultaneously while pivoting the side assemblies to transfer the transport cart between the packing mode and the first operating mode. In this way, the transport cart can be transferred between the packing mode and the first operating mode particularly easily.

It is understood that the features mentioned above and those to be explained below can be used not only in the combination indicated in each case, but also in other combinations or on their own, without leaving the scope of the present invention.

DRAWINGS

Embodiments of the application are shown in the drawing and are explained in more detail in the following description. It shows:

Figure 20:
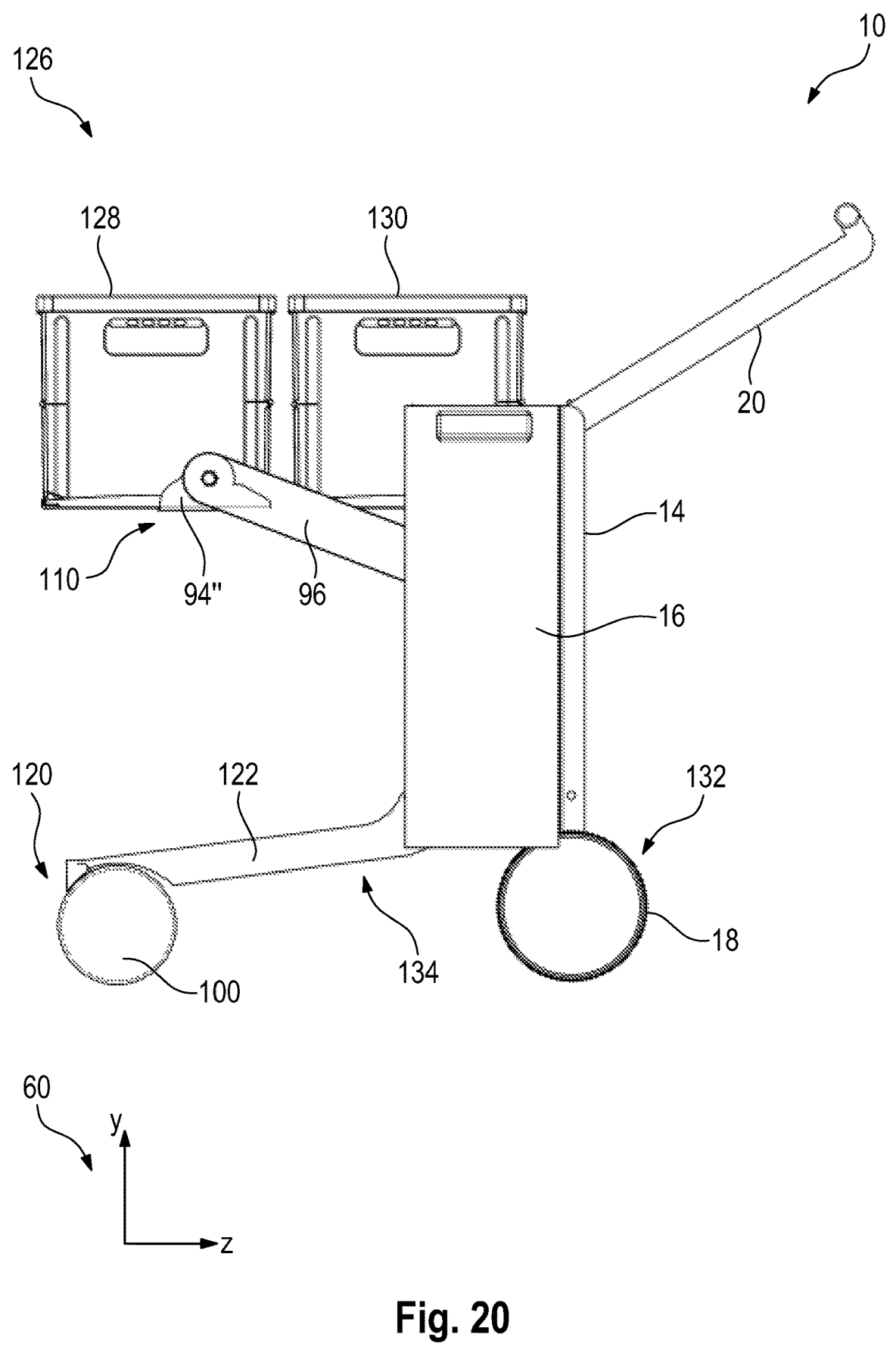

FIG. 20 is a side view of the transport cart from FIG. 19;

FIGS. 41A and 41B are two sectional views of the coupling mechanism from FIG. 39 in a coupling position;

DETAILED DESCRIPTION

Figure 1:
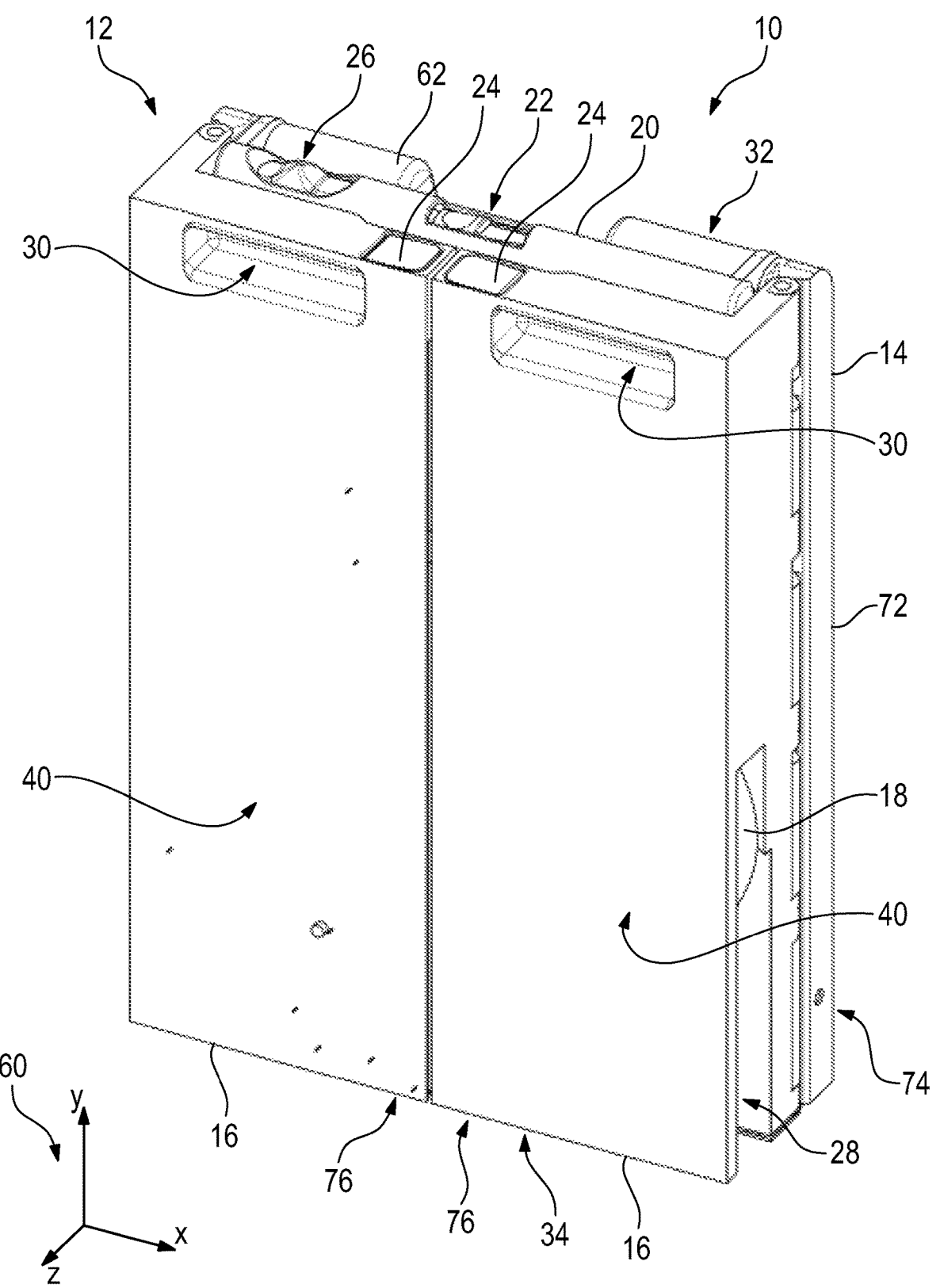
FIG. 1 is an isometric view of a front side of an embodiment of a transport cart in a packing mode.
Figure 2:
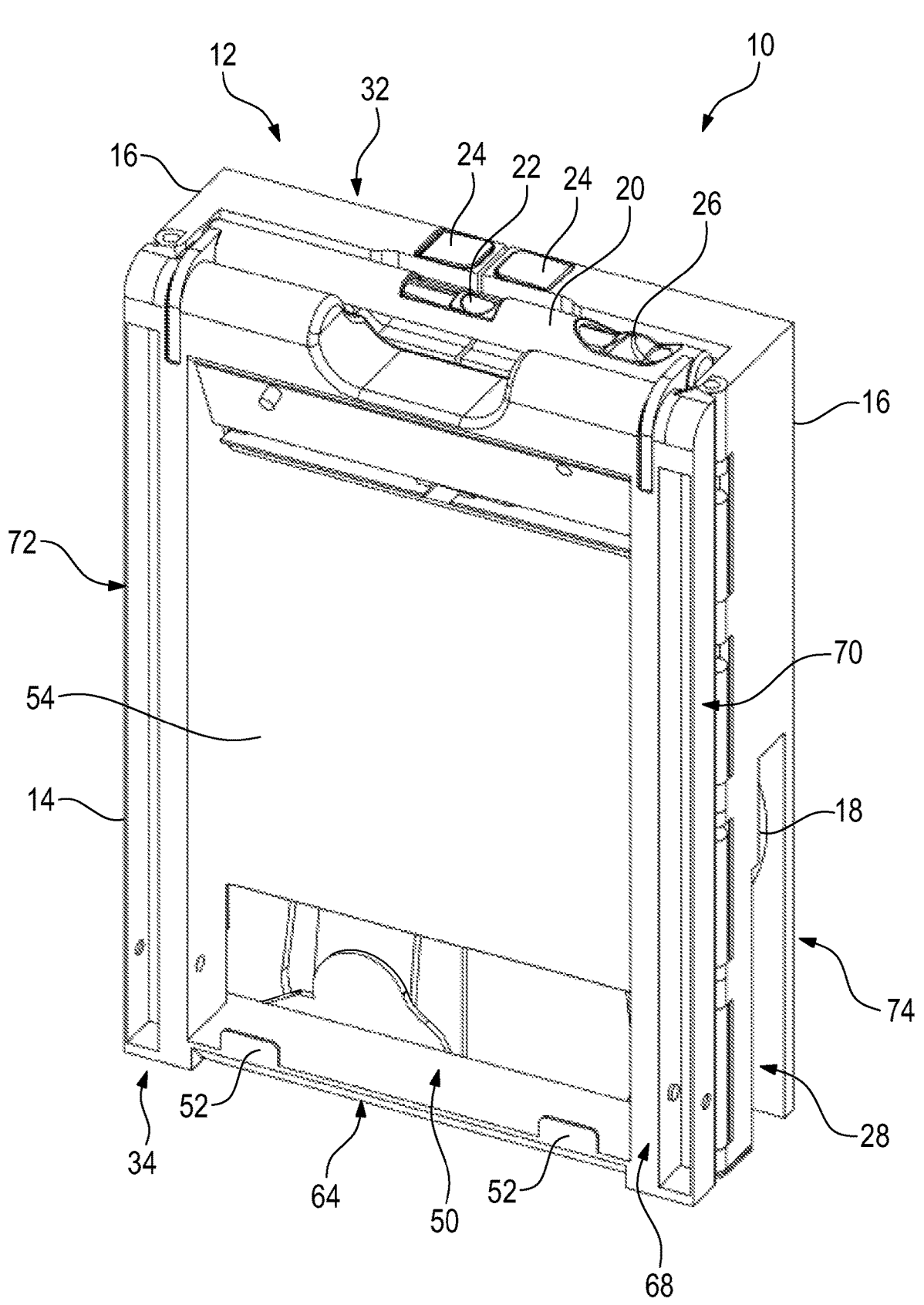
FIG. 2 is an isometric view of a rear side of the transport cart of FIG. 1.
Figure 3:
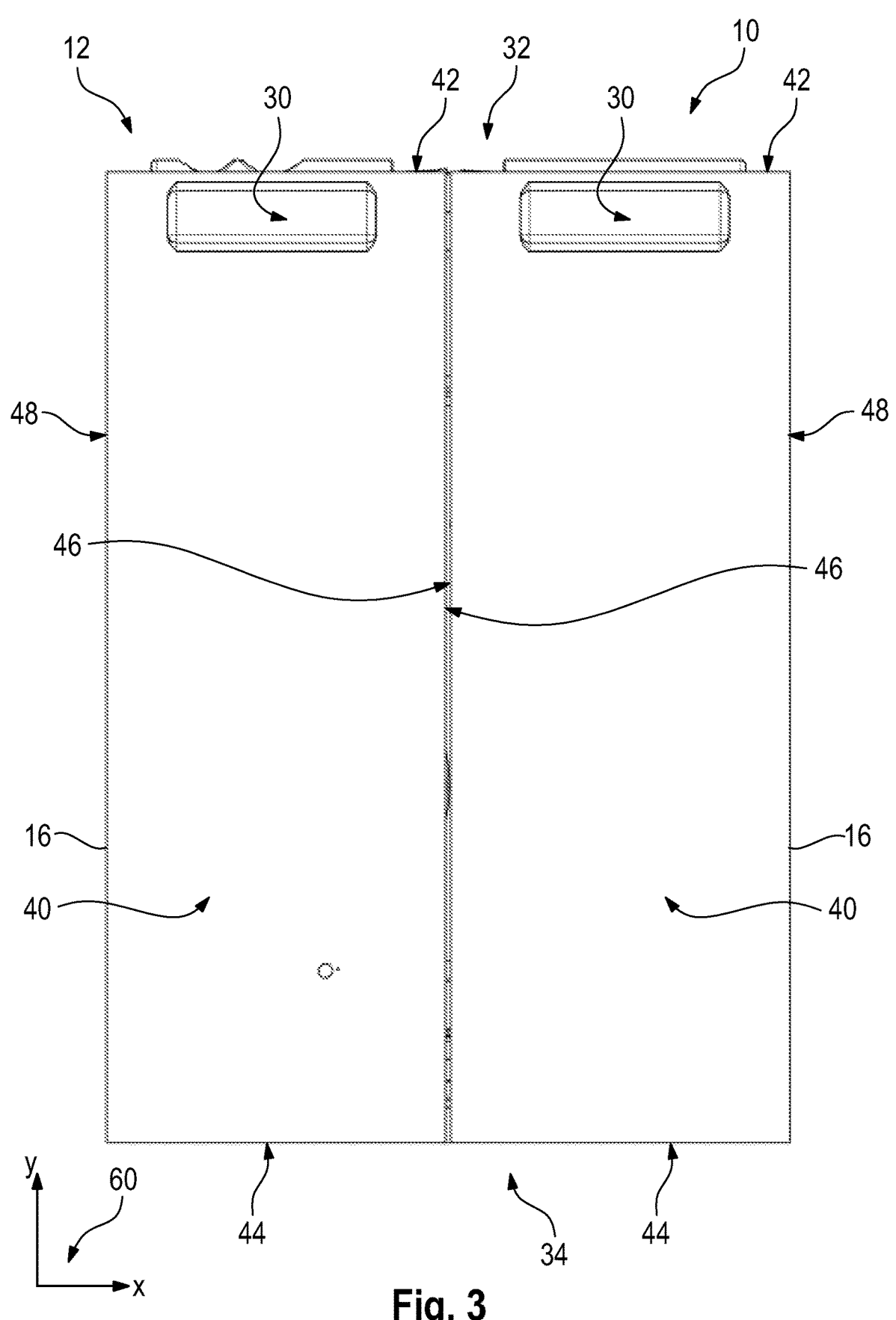
FIG. 3 is a top view of the front of the transport cart from FIG. 1.
Figure 4:
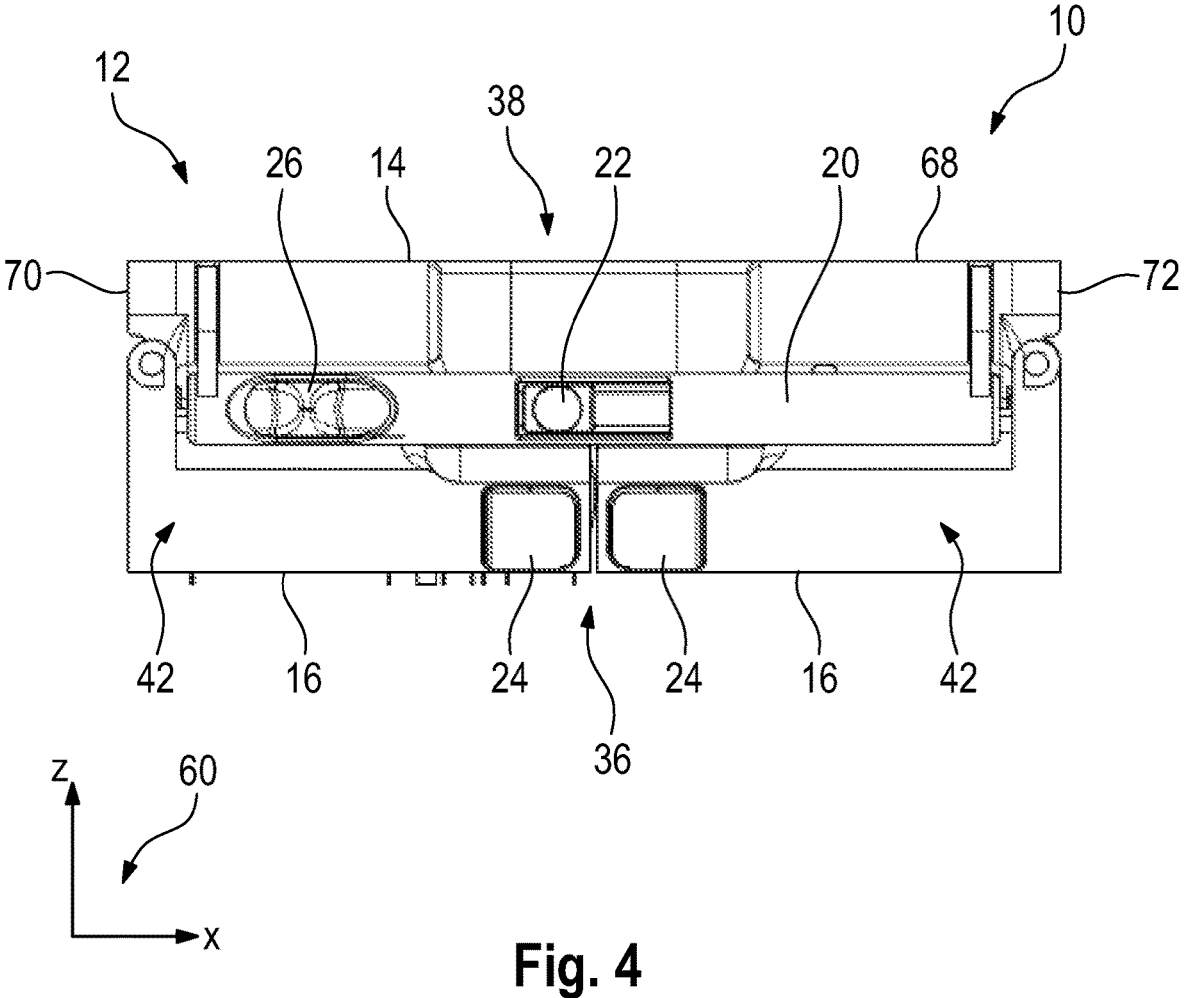
FIG. 4 is a top view of the upper side of the transport cart from FIG. 1.
Figure 5:
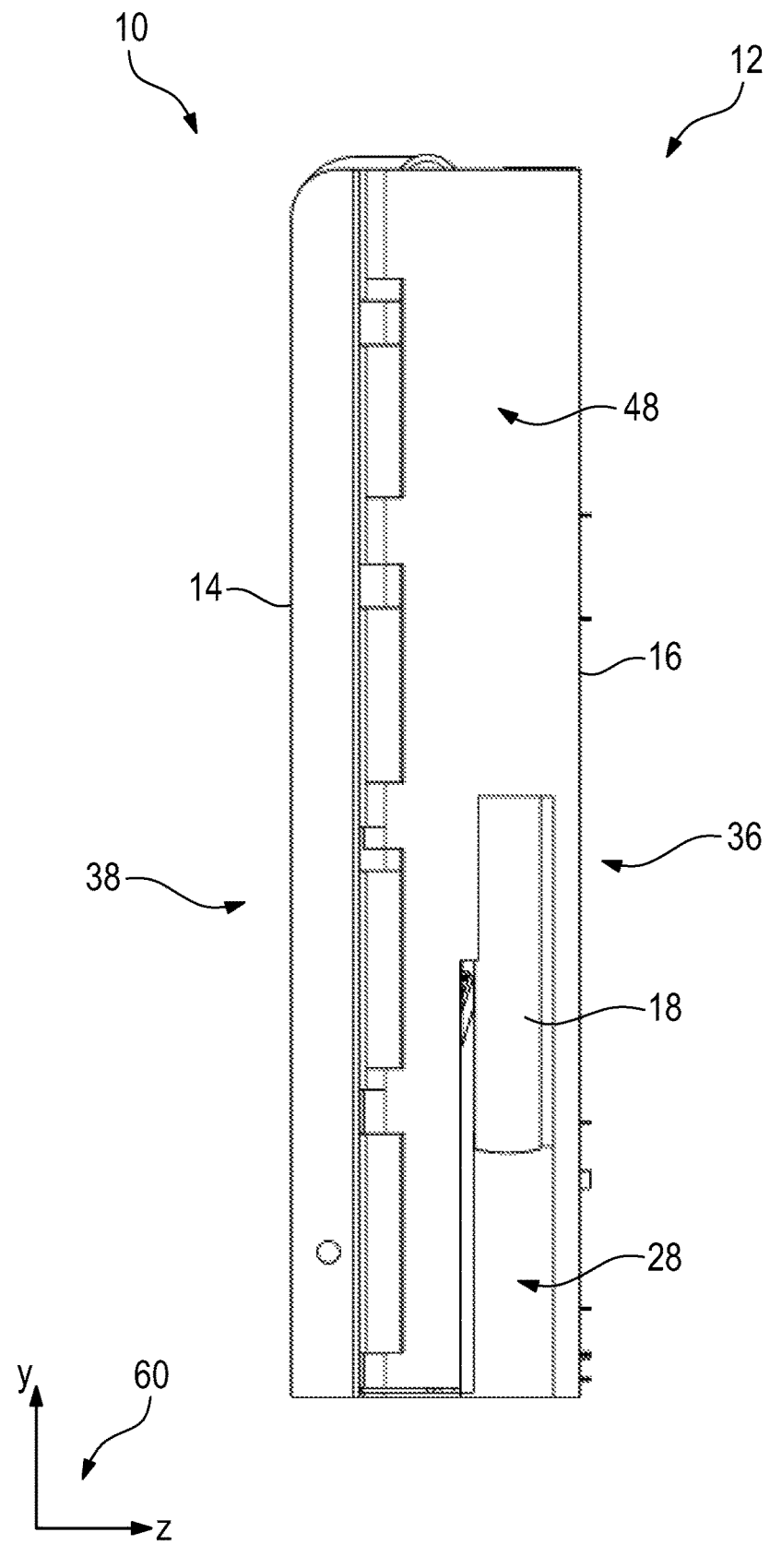
FIG. 5 is a side view of the transport cart from FIG. 1.

FIGS. 1 to 5 show an embodiment of a transport cart 10. The transport cart 10 is arranged in a packing mode 12. The packing mode is particularly suitable for storing or transporting the transport cart 10. The transport cart 10 includes a base assembly 14, two side assemblies 16, two wheels 18, and a handle 20. The wheels 18 may also be referred to as the rear wheels.

The transport cart 10 has a top side 32, a bottom side 34, a front side 36, and a back side 38. The sides of the transport cart 10 are arranged in space with respect to a Cartesian coordinate system 60. The y-direction of the coordinate system 60 is vertically oriented and thus corresponds in particular to a vertical direction. The y-direction and z-direction of the coordinate system 60 are oriented horizontally. The top side 32 and the bottom side 34 are arranged on opposite sides of the transport cart 10 in the y-direction. The front side 36 and the back side 38 are arranged on opposite sides of the transport cart 10 in the z-direction.

The base assembly 14 includes a top surface 62, a bottom surface 64, a front surface 66, a back surface 68, a first outer surface 70, and a second outer surface 72. The top surface 62 and the bottom surface 64 are disposed on opposite sides of the base assembly 14 in the y-direction. The front side 66 and the rear side 68 are disposed on opposite sides of the base assembly 14 in the z-direction. The first outer side 70 and the second outer side 72 are arranged in the x-direction on opposite sides of the base assembly 14.

Each side assembly 16 has a top side 42, a bottom side 44, an outer side 40, an inner side 41, a first edge side 46, and a second edge side 48. The top side 42 and the bottom side 44 are disposed on opposite sides of the respective side assembly 16 in the y-direction. In the packing mode 12, the outer side 40 and the inner side 41 are disposed on opposite sides of the respective side assembly 16 in the z-direction. In the packing mode 12, the first edge side 46 and the second edge side 48 are arranged in the x-direction on opposite sides of the respective side assembly 16.

The side assemblies 16 are arranged on the base assembly 14. The side assemblies 16 are arranged opposite each other. The side assemblies 16 are arranged on opposite sides of the base assembly 14. In particular, a side assembly 16 is pivotally mounted on each of first and second outer sides 70, 72 of the base assembly 14 such that each side assembly 16 extends between a folded closed position 76 in which the side assembly 16 abuts the base assembly and an unfolded position 80 in which the side assembly 16 extends away from the base assembly, preferably perpendicularly.

In the packing mode 12, the side assemblies 16 are disposed in the folded position 76. In the packing mode 12, the side assemblies 16 extend toward each other from the outer sides 70, 72 along the front side 66. The side assemblies 16 are thereby arranged in alignment with each other in the x-direction. In particular, the outer sides 40 of the side assemblies 16 are arranged parallel to each other and lie in one plane.

One of the wheels 18 is arranged on each side assembly 16. Each wheel 18 is thereby arranged to pivot about a respective axis on the corresponding side assembly 16, so that the wheel 18 can be given between a folded position 74, in which the wheel 18 is folded into the corresponding side assembly 16, and an unfolded position 78, in which the wheel 18 is unfolded from the corresponding side assembly. The unfolded position 78 may also be referred to as the first unfolded position. For pivotal mounting, each wheel is disposed in the corresponding side assembly 16 via a third arm 124, each third arm 124 being pivotally mounted to the corresponding side assembly 16. Each wheel 18 is disposed at one end of the respective third arm 124, with the pivot axis mounting point disposed at the other, opposite end of the respective third arm 124. The third arm 124 is not shown in FIGS. 1 to 5 and will be described in more detail later with reference to FIGS. 28 and 29.

Each side assembly 16 includes a first opening 28 through which the wheel may be folded into or unfolded from the side assembly. The first opening 28 is disposed on the second outer side 48 and/or the bottom side 44 of the corresponding side assembly 16.

The transport cart 10 further comprises a first actuating element 22. For example, the handle 20 can be adjusted by an actuation of the first actuating element 22. For example, the handle may be extended from the base assembly 14 to an unfolded position 106 upon actuation. The handle 20 may also be pivoted relative to the base assembly 14 upon another actuation. In the packing mode 12, the handle is arranged in a folded position 104 and not pivoted.

The transport cart 10 further comprises two second actuating elements 24. One of the second actuating elements 24 is arranged on each of the side assemblies 16. By actuating one of the second actuating elements 24, a lock of the corresponding side assembly 16 can be released so that the side assembly 16 can be pivoted.

The transport cart 10 further comprises a third actuating element 26. By actuating the third actuating element 26, a parking brake for the wheels 18 can be activated or released.

The side assemblies 16 each include recesses 30. The recesses 30 are arranged on the outer side 40 of each side assembly 16. Preferably, the recesses are disposed in an upper portion of the outer surface 40, particularly near the upper surface 42. The recesses 30 serve to allow a user to reach into the recesses 30 to unfold or fold the side assemblies. The recesses 30 may also be referred to as grip recesses.

The base assembly 14 has a recess 50 arranged on the rear side 68 of the base assembly 14. A transport box can be arranged in the recess 50. On the side of the recess 50 facing the underside 64, the base assembly 14 has two projections 52. The projections 52 serve to hold a transport box in the recess 50.

The transport cart 10 further comprises a support 54, which may also be referred to as a bottom flap. The support 54 preferably has a support surface on which, for example, a crate or box can be arranged for transport. The support 54 is pivotally mounted to the base assembly 14 between a vertical position 82, in which a support surface of the support 54 is arranged vertically, and a horizontal position 84, in which the support surface of the support 54 is arranged horizontally. In the packing mode, the support 54 is arranged in the vertical position 82.

Figure 6:
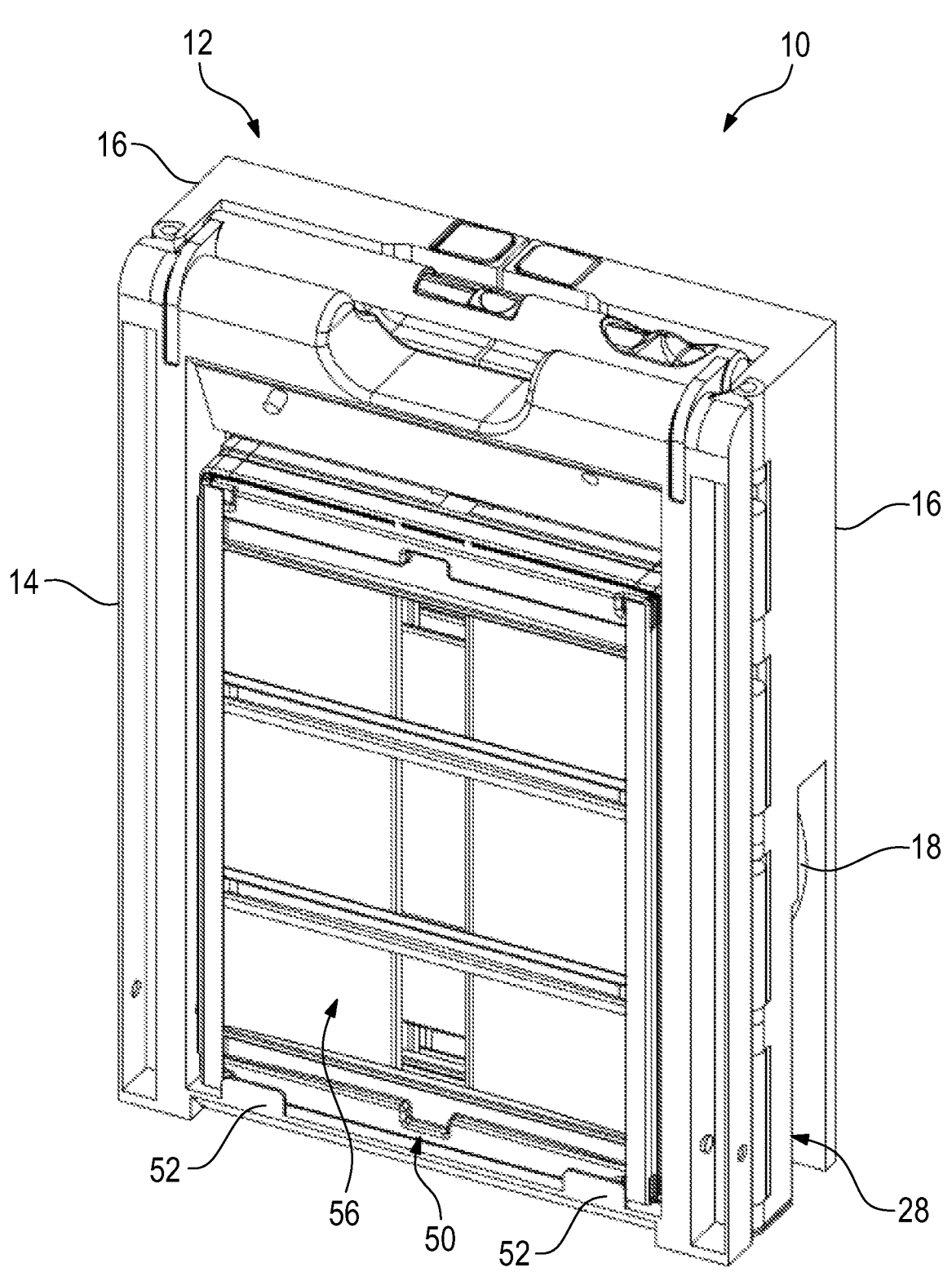
FIG. 6 is an isometric view of the rear of the transport cart of FIG. 1 with transport box in a recess.
Figure 7:
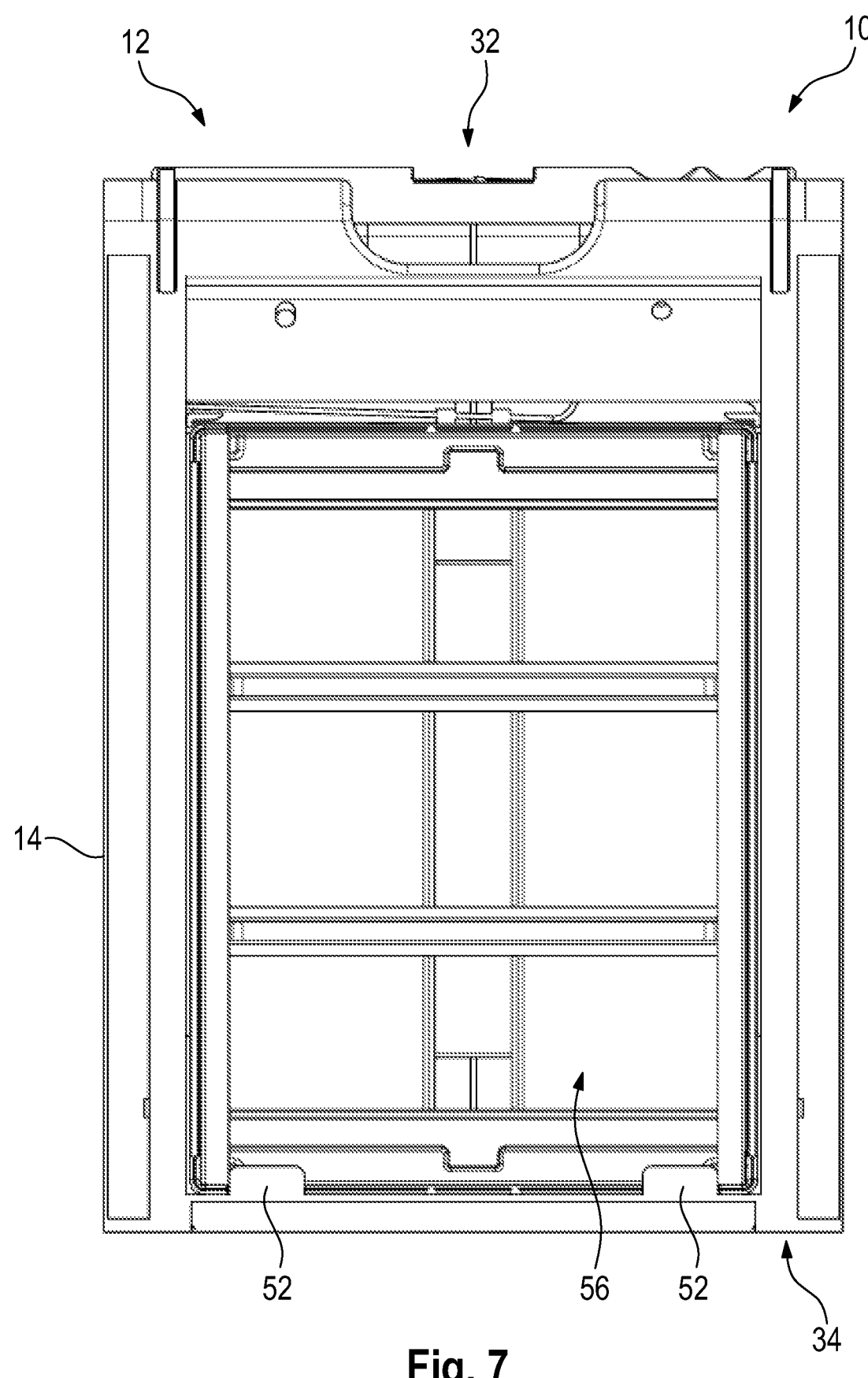
FIG. 7 is a top view of the rear of the transport cart from FIG. 1 with transport box in the recess.

FIGS. 6 and 7 show the rear of the transport cart 10 of FIGS. 1 to 5, wherein a transport box 56 is arranged in the recess 50 of the base assembly 14. The transport box 56 is folded together. The transport box 56 is arranged on edge in the recess 50. The projections 52' and 52" are configured to retain the transport box 56 in the recess 50.

Figure 8:
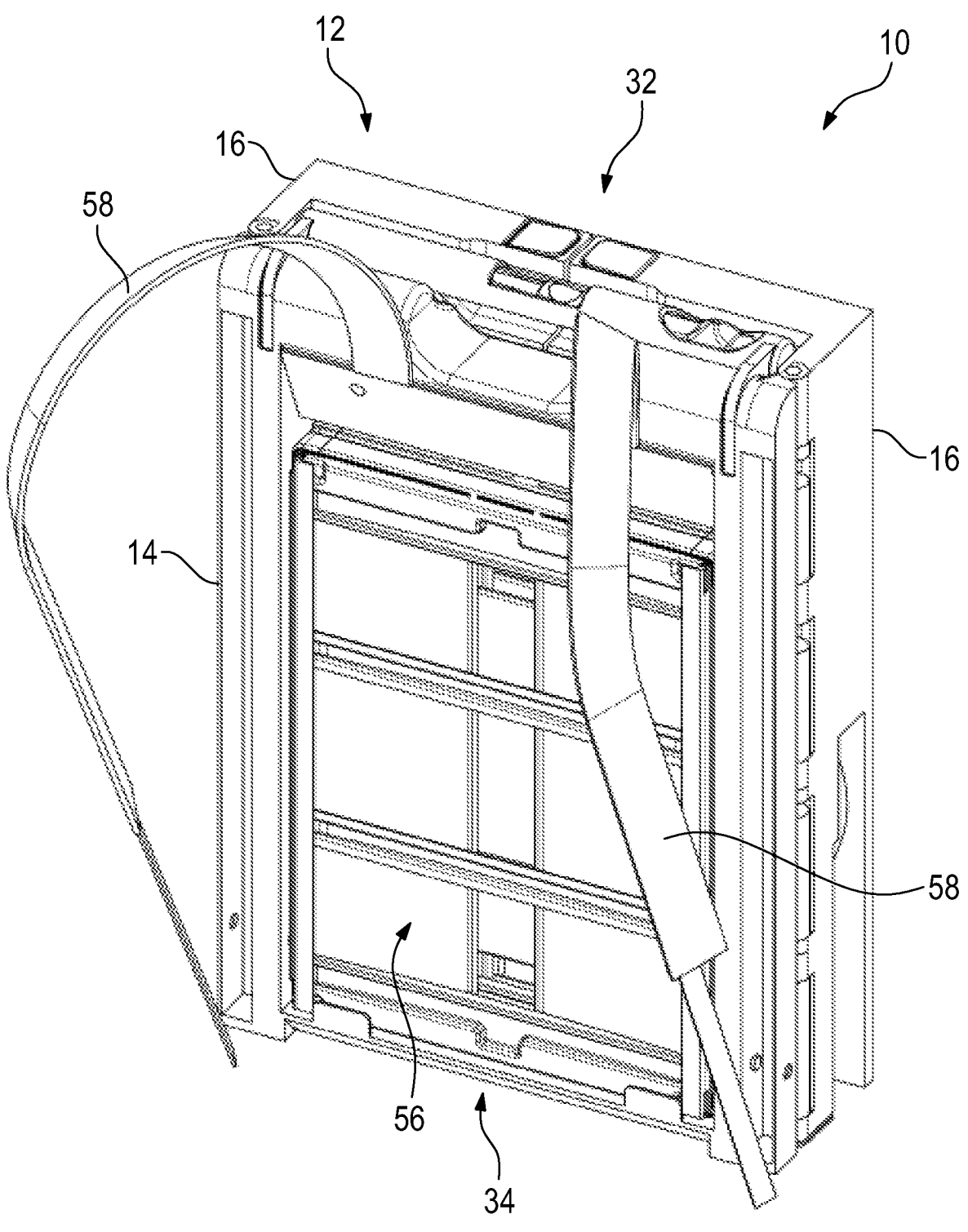
FIG. 8 is an isometric view of the rear of the transport cart from FIG. 1 with mounted belts.
Figure 9:
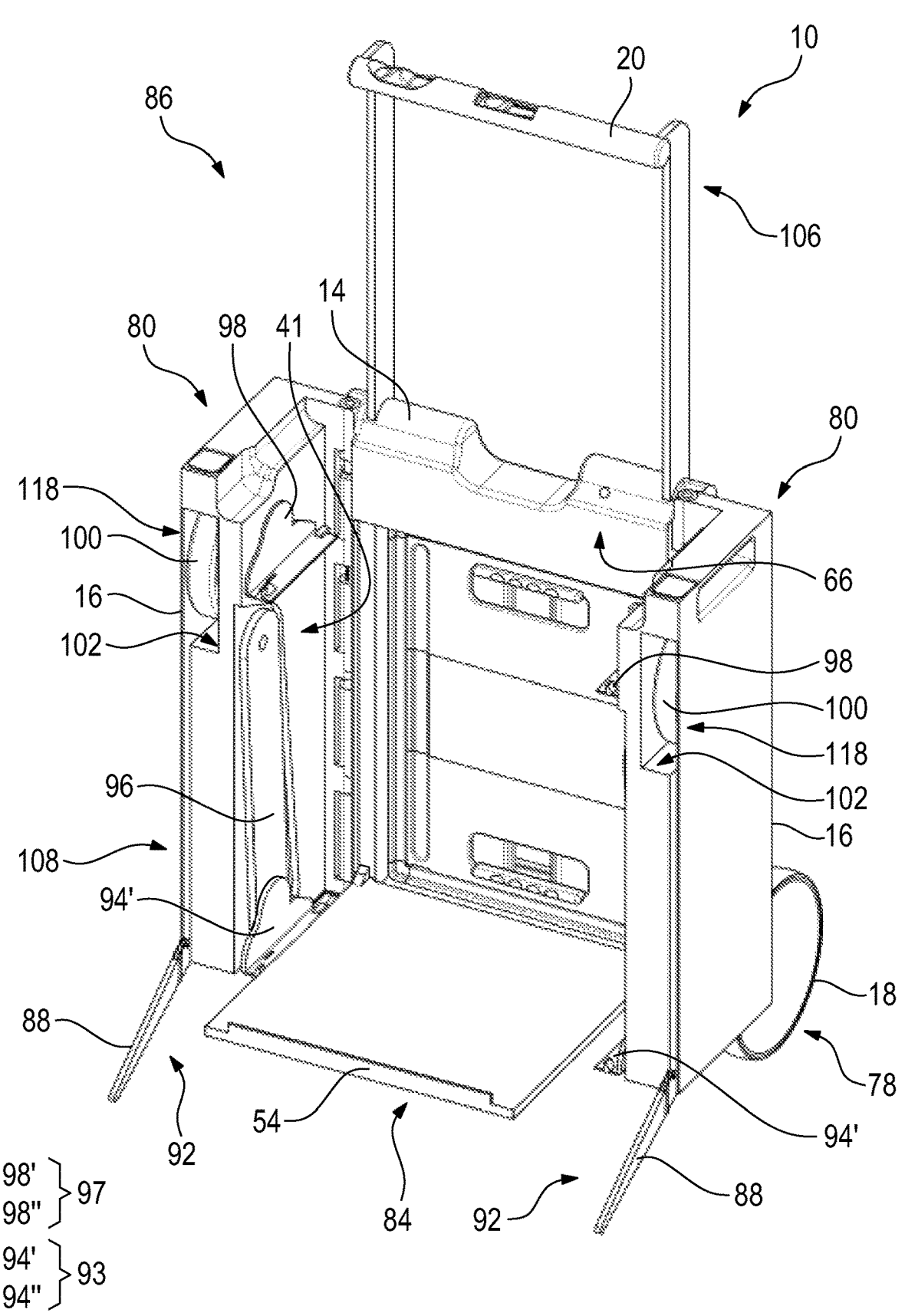
FIG. 9 is an isometric view of the front of the transport cart from FIG. 1 in a first operating mode.
Figure 10:
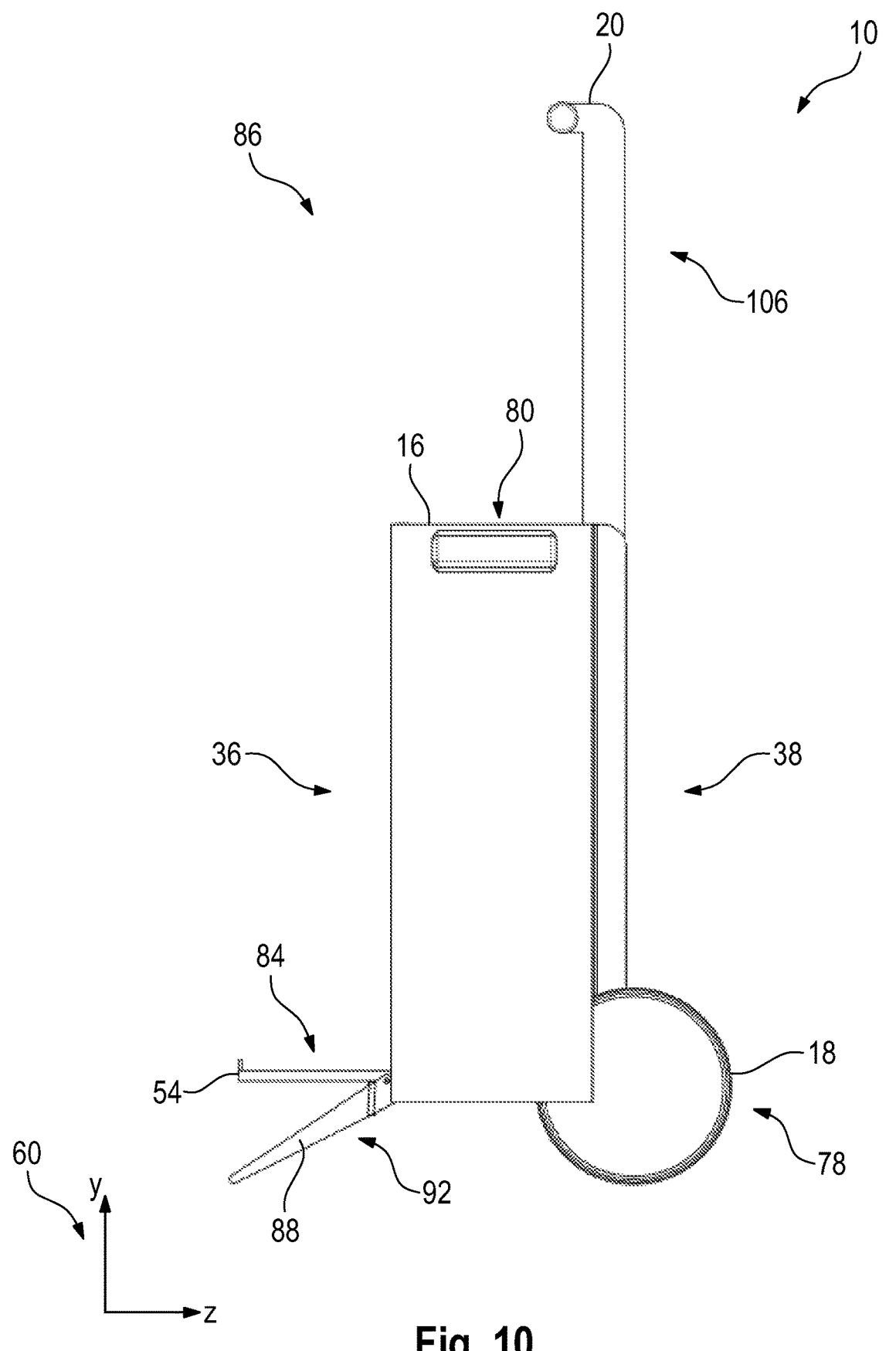
FIG. 10 is a side view of the transport cart from FIG. 9.
Figure 11:
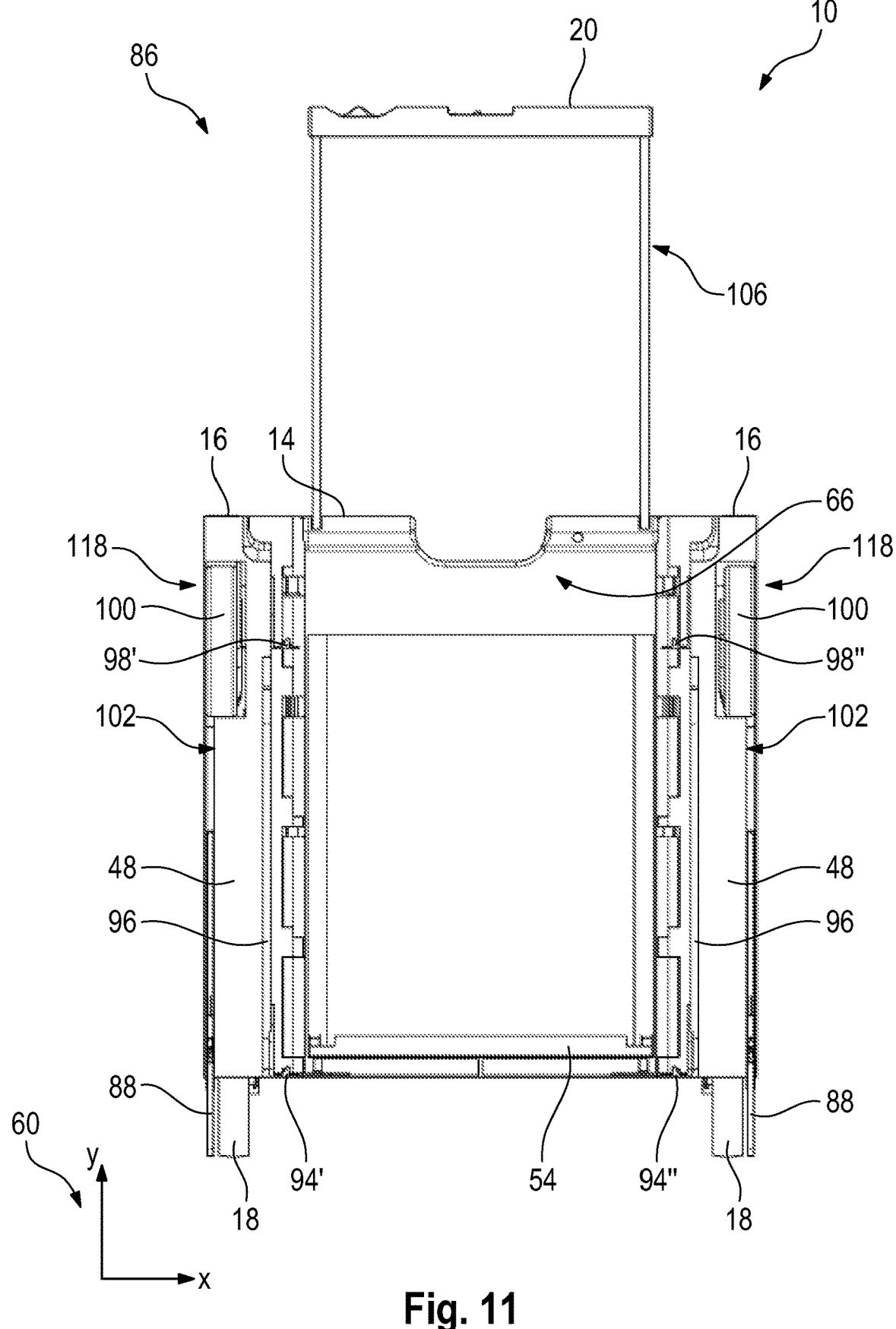
FIG. 11 is a top view of the front of the transport cart from FIG. 9.
Figure 12:
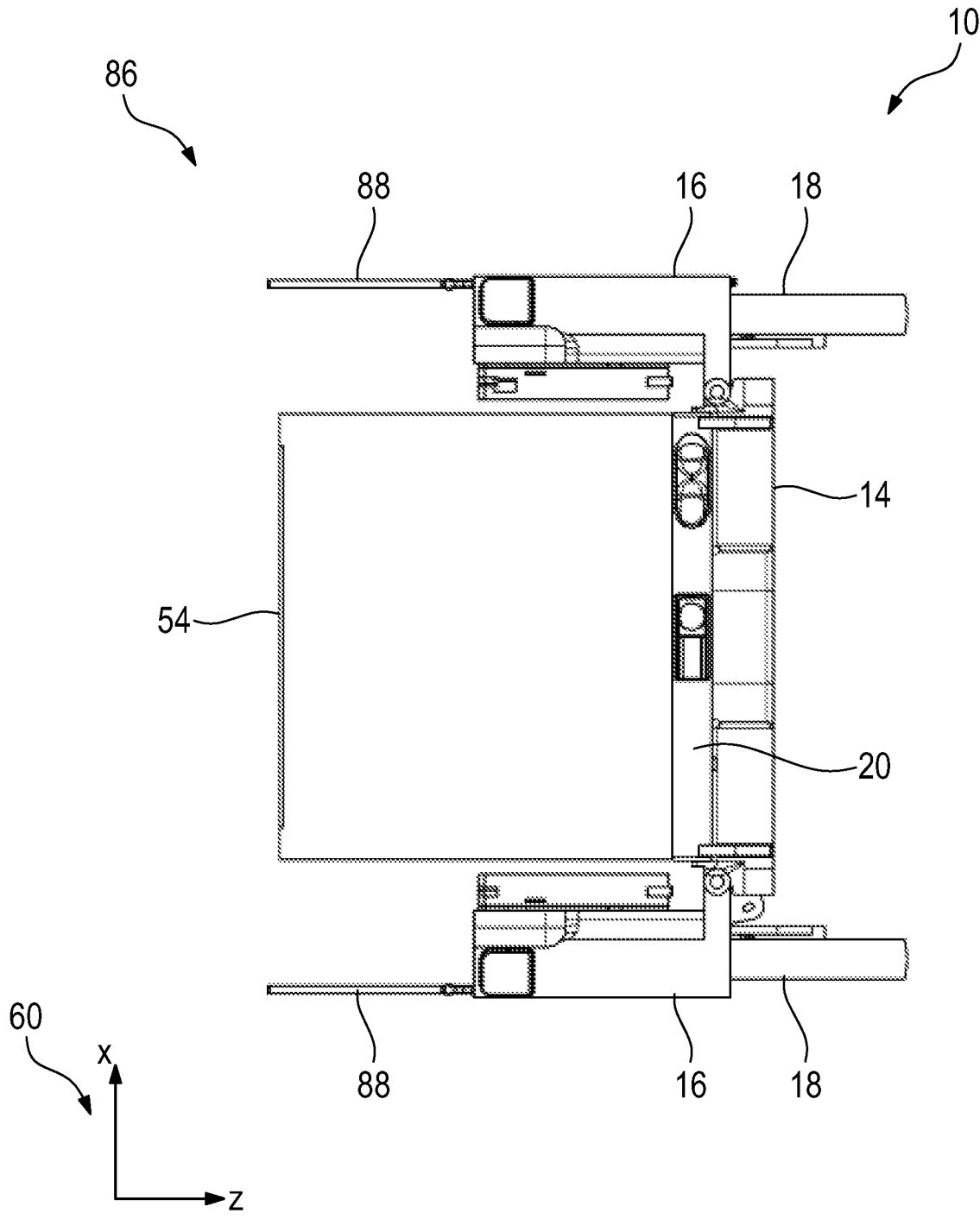
FIG. 12 is a top view of the upper side of the transport cart from FIG. 9.

FIG. 8 shows the rear of the transport cart of FIGS. 1 through 6, with two straps 58 attached to the rear of the base assembly for supporting the transport cart 10.

FIGS. 9 to 12 show the transport cart of FIG. 1 in a first operating mode 86. The first operating mode 86 is particularly suitable for transporting transport boxes on the transport cart or, in general, for pulling the transport cart 10 by the handle 20. The first operating mode 86 can therefore also be referred to as a pull-behind mode.

In the first mode of operation 86, the side assemblies 16 are each disposed in an unfolded position 80. In the unfolded position 80, the side assemblies 16 extend away from the base assembly 14, preferably perpendicularly. The side assemblies 16 are thereby arranged parallel to each other in the z-direction. In particular, the outer sides 40 of the side assemblies 16 are arranged parallel to each other and do not lie in a plane.

In the first mode of operation 86, the outer side 40 and the inner side 41 of each side assembly 16 are disposed on opposite sides of the respective side assembly 16 in the x-direction. In the first mode of operation, the first edge side 46 and the second edge side 48 are arranged in the z-direction on opposite sides of the respective side assembly 16.

In the first mode of operation 86, the wheels 18 are each arranged in the unfolded position 78. In the first operating mode 86, the handle 20 is arranged in the unfolded position 106.

The transport cart 10 further comprises a first receptacle 93 for a transport box. The first receptacle 93 is formed by two first receptacle elements 94. The two first receiving elements 94 are marked in the figures with the reference signs 94' and 94" for differentiation. One first receiving element 94 is arranged on each side assembly 16. The first receiving elements 94 are each arranged on the inner side 41 of the corresponding side assembly 16. In other words, the first receptacle 93 is arranged between the side assemblies 16 in the first operating mode 86.

Each first receiving member 94 is disposed on corresponding side assembly 16 via a respective first arm 96. Each first arm 96 is pivotally mounted about an axis on the inner surface 41 of the corresponding side assembly 16. In the first mode of operation 86, these pivot axes are parallel to the x-direction. In particular, the pivot axes of the arms 96 are aligned with each other. Each receiving element 94 is arranged at one end of the respective first arm 96, with the bearing point of the pivot axis being arranged at the other, opposite end of the respective first arm 96.

By means of the first arms 96, the first receptacle 93 can be pivoted between a transport position 108 and a loading position 110. In the transport position 108, the first receptacle 93 is arranged lower in the y-direction, in particular closer to the underside 34 of the transport cart 10, than in the loading position 110.

The transport cart 10 further comprises a second receptacle 97 a transport box. The second receptacle 97 is formed by two second receptacle elements 98. One second receiving element 98 is arranged on each side assembly 16. The second receiving elements 98 are each arranged on the inner side 41 of the corresponding side assembly 16. In other words, the second receptacle 97 is arranged between the side assemblies 16 in the first operating mode 86.

In the transport position 108, the first receptacle 93 is arranged below the second receptacle in the y-direction. The first receptacle 93 is arranged closer to the underside 34 than the second receptacle. In other words, the first holder 93 and the second holder 97 are arranged one above the other.

The transport cart 10 further has two supports 88. One support 88 is arranged on each side assembly 16. Each support 88 is arranged on the corresponding side assembly 16 to pivot about an axis between a folded position 90 and an unfolded position 92. The pivot axes extend in the x-direction in the first mode of operation. The pivot axes are also arranged in alignment with each other. In the packing mode 12, the supports 88 are each arranged in the folded position 90. In the first operating mode, the supports 88 are each arranged in the unfolded position 92. One or each support 88 may in particular be a lever element. The lever element can then support the transport cart on the ground with its free end. In particular, the lever element or support 88 can then support the transport cart 10 directly on the ground with its free end. In particular, the lifting element or the support 88 may not have a wheel. The lifting element or the support 88 can be formed without a wheel at its free end.

The transport cart 10 further has two support wheels 100. One support wheel 100 is arranged on each side assembly 16. Each support wheel 100 is thereby arranged to be pivotable about a respective axis on the corresponding side assembly 16, so that the support wheel 100 can be given between a folded position 118, in which the support wheel 100 is folded into the corresponding side assembly 16, and an unfolded position 120, in which the support wheel 100 is folded out of the corresponding side assembly.

Each support wheel 100 is disposed on the corresponding side assembly 16 via a respective second arm 122. Each second arm 122 is pivotally mounted about an axis in the corresponding side assembly 16. In the first mode of operation 86, these pivot axes are parallel to the x-direction. In particular, the pivot axes of the second arms 122 are aligned with each other. Each support wheel 100 is arranged at one end of the respective second arm 122, with the bearing point of the pivot axis being arranged at the other, opposite end of the respective second arm 122.

Each side assembly 16 includes a second opening 102 through which the corresponding support wheel 100 can be folded into or unfolded from the side assembly 16. The first opening 28 is disposed on the first outer surface 48 of the corresponding side assembly 16.

In FIGS. 9 to 12, the support 54 is arranged in the horizontal position 84. In the horizontal position 84, the support 54 is arranged between the first receptacle elements 94 and thus blocks the first receptacle. In order to be able to insert a transport box into the first receptacle 93, the support 54 must be transferred to the vertical position 82. Alternatively, it may be provided that the support 54 is arranged lower than the receiving elements 94 so that the first receptacle 93 is not blocked.

In principle, the support 54 can be arranged in both the vertical position 82 and the horizontal position 84 in the first operating mode 86. In the horizontal position 84, a box, for example, can be transported on the support surface of the support 54.

Figure 13:
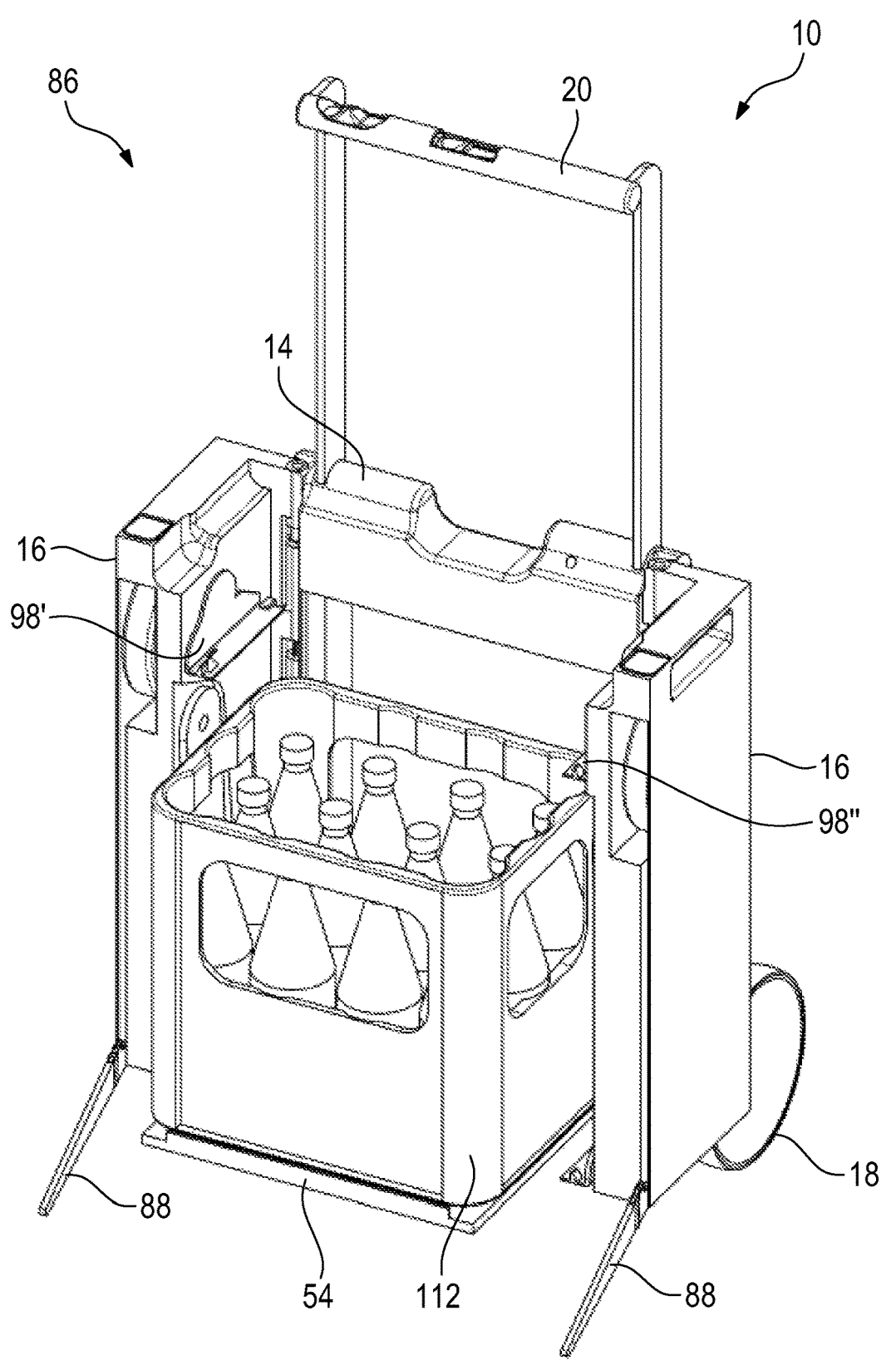
FIG. 13 is an isometric view of the front of the transport cart from FIG. 9 with box on a support.

FIG. 13 shows the transport cart 10 according to FIGS. 9 to 12, wherein a crate 112 with bottles is arranged on the support surface of the support 54.

Figure 14:
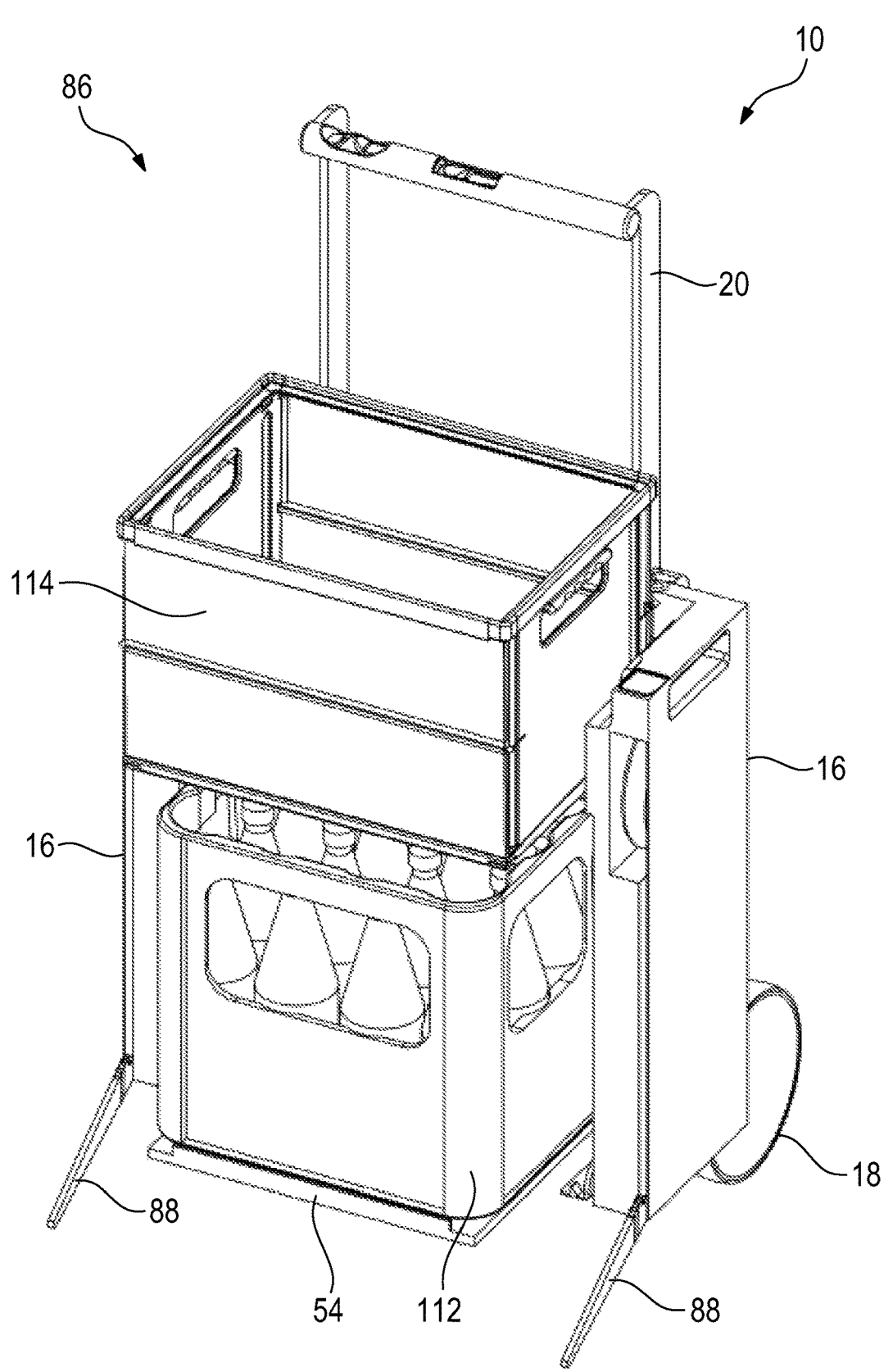
FIG. 14 is an isometric view of the front of the transport cart from FIG. 9 with box on the support and transport box in a second receptacle.
Figure 15:
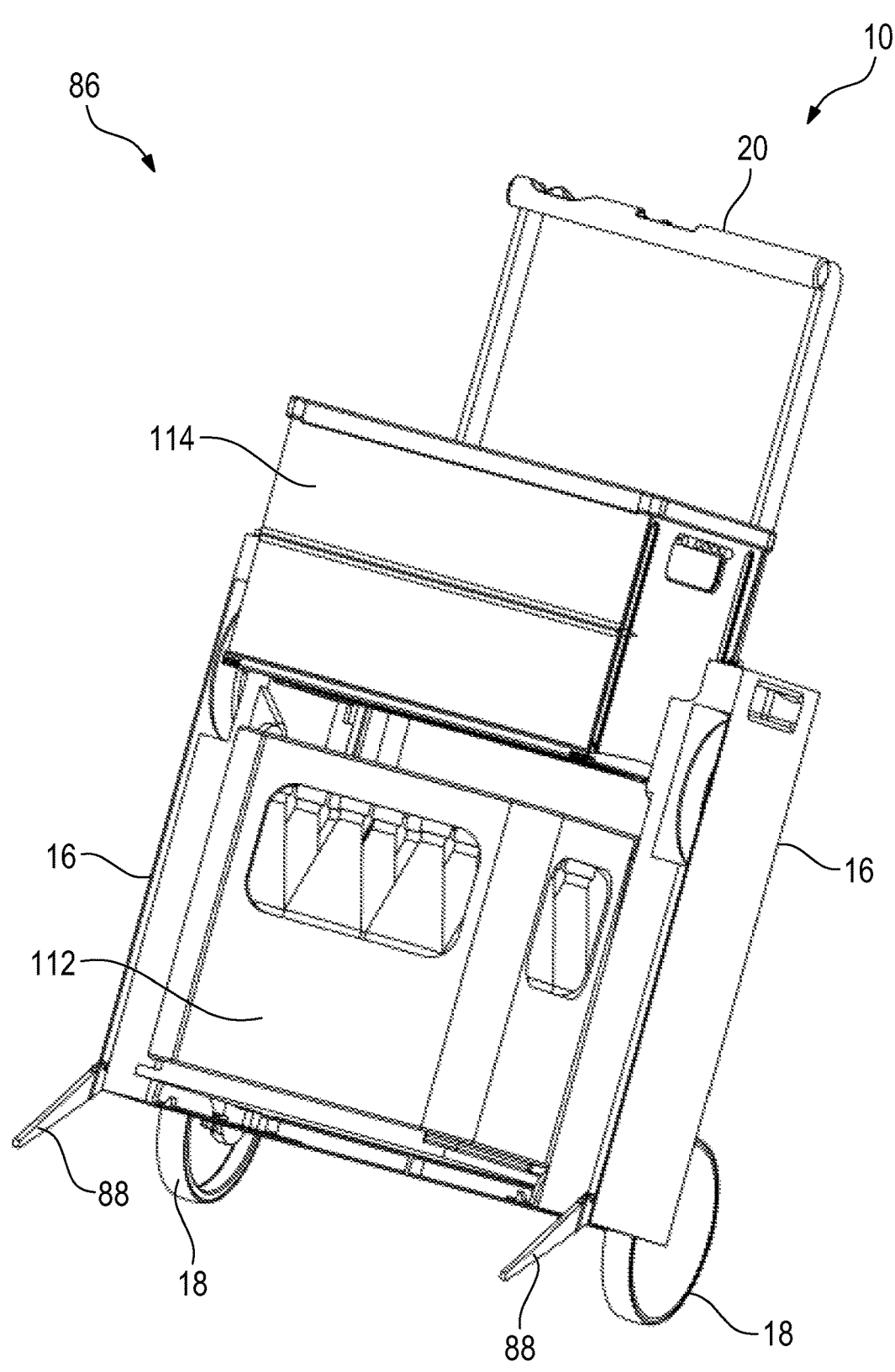
FIG. 15 is an isometric view of the front of the transport cart from FIG. 14 during pulling.
Figure 16:
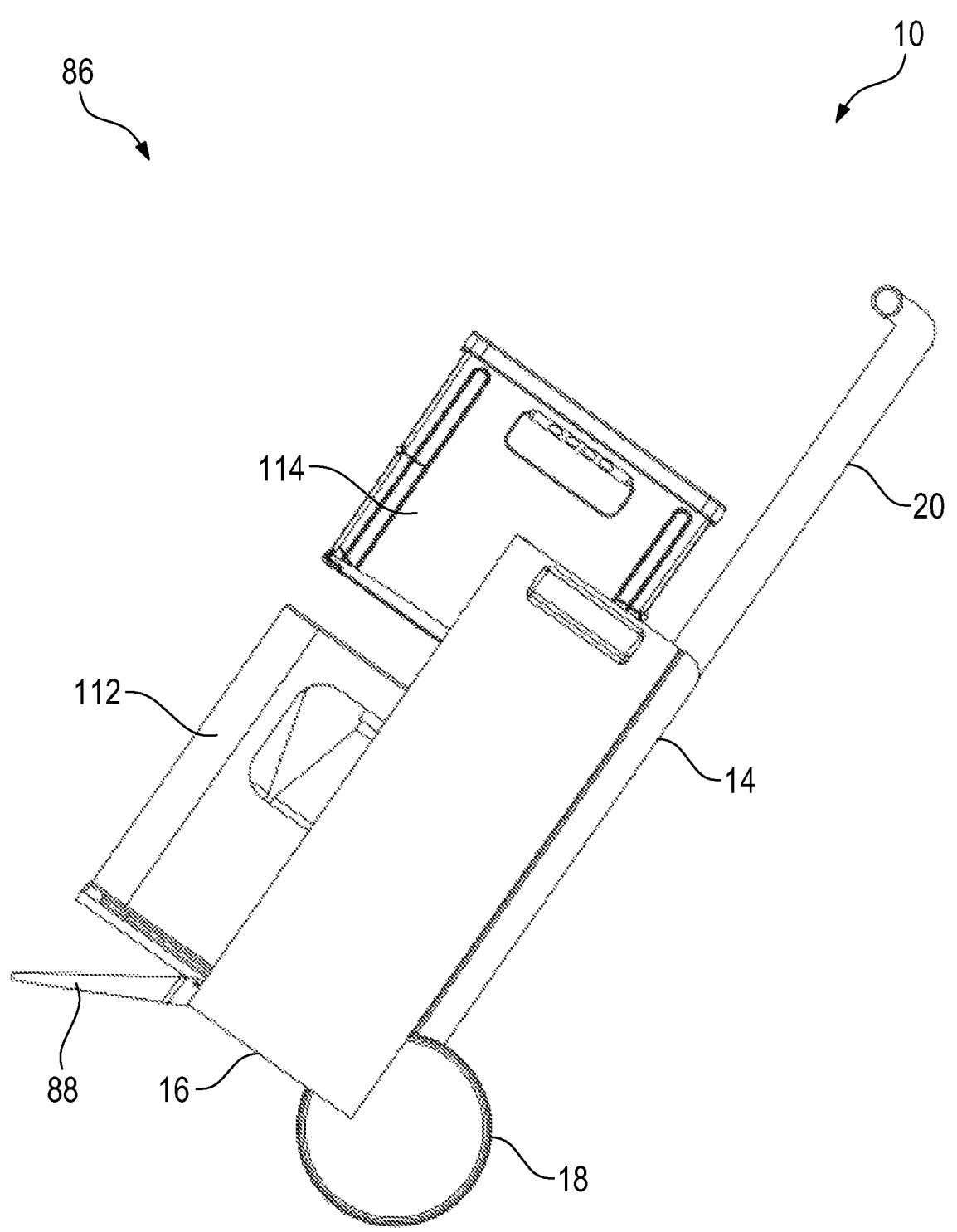
FIG. 16 is a side view of the transport cart from FIG. 15.

FIGS. 14 to 16 show the transport cart 10 as shown in FIG. 13, with a transport box 114 arranged in the second receptacle. To pull the transport cart 10, the transport cart 10 is tilted with respect to a horizontal line about an axis of rotation of the wheels 18, as shown in FIGS. 15 and 16, so that the supports 88 are released from the ground and the transport cart 10 can be pulled.

Figure 17:
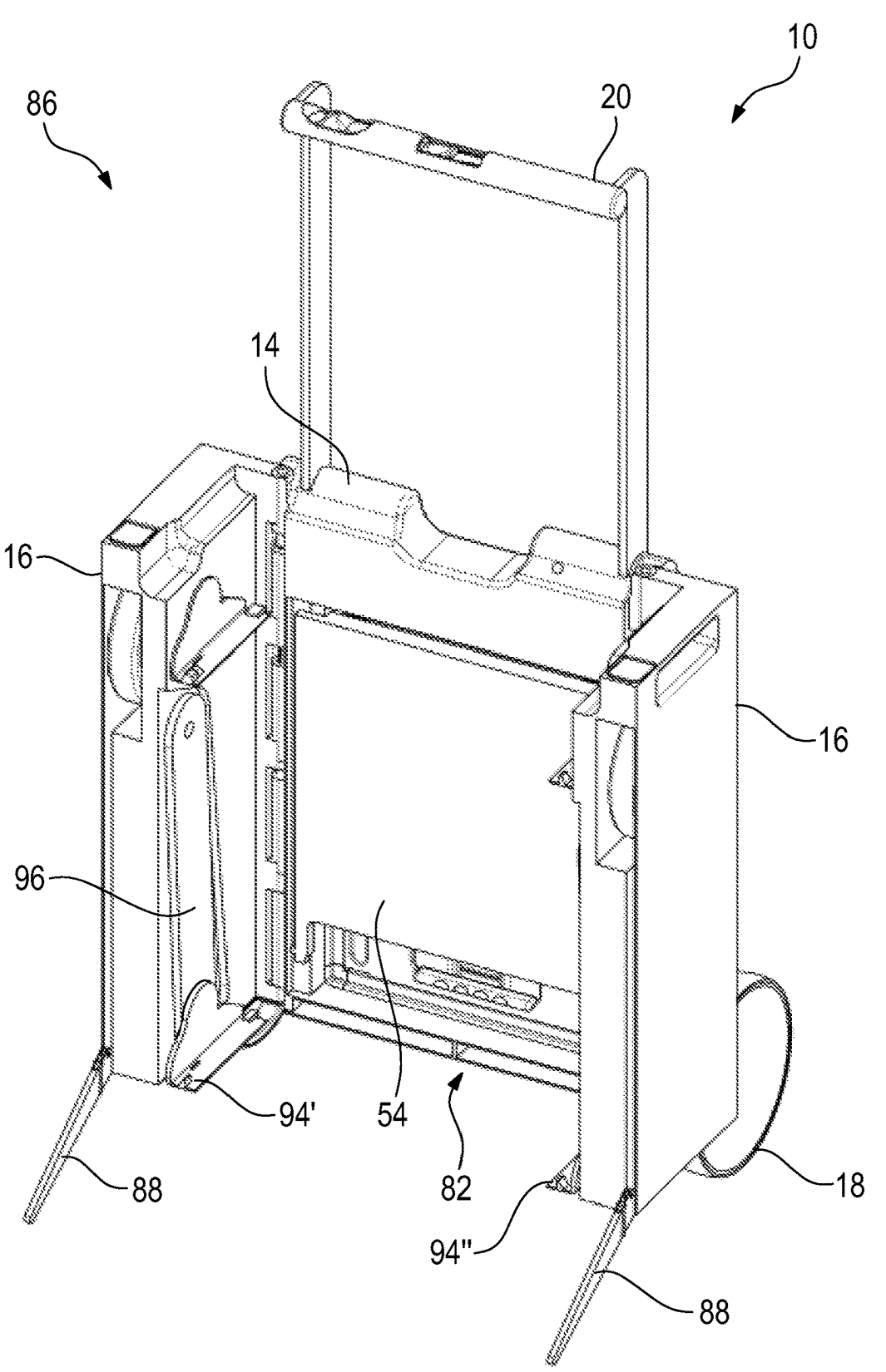
FIG. 17 is an isometric view of the front of the transport cart from FIG. 9 with the support arranged in the vertical position.

FIG. 17 shows the transport cart 10 according to FIGS. 9 to 12, with the support 54 arranged in the vertical position 82.

Figure 18:
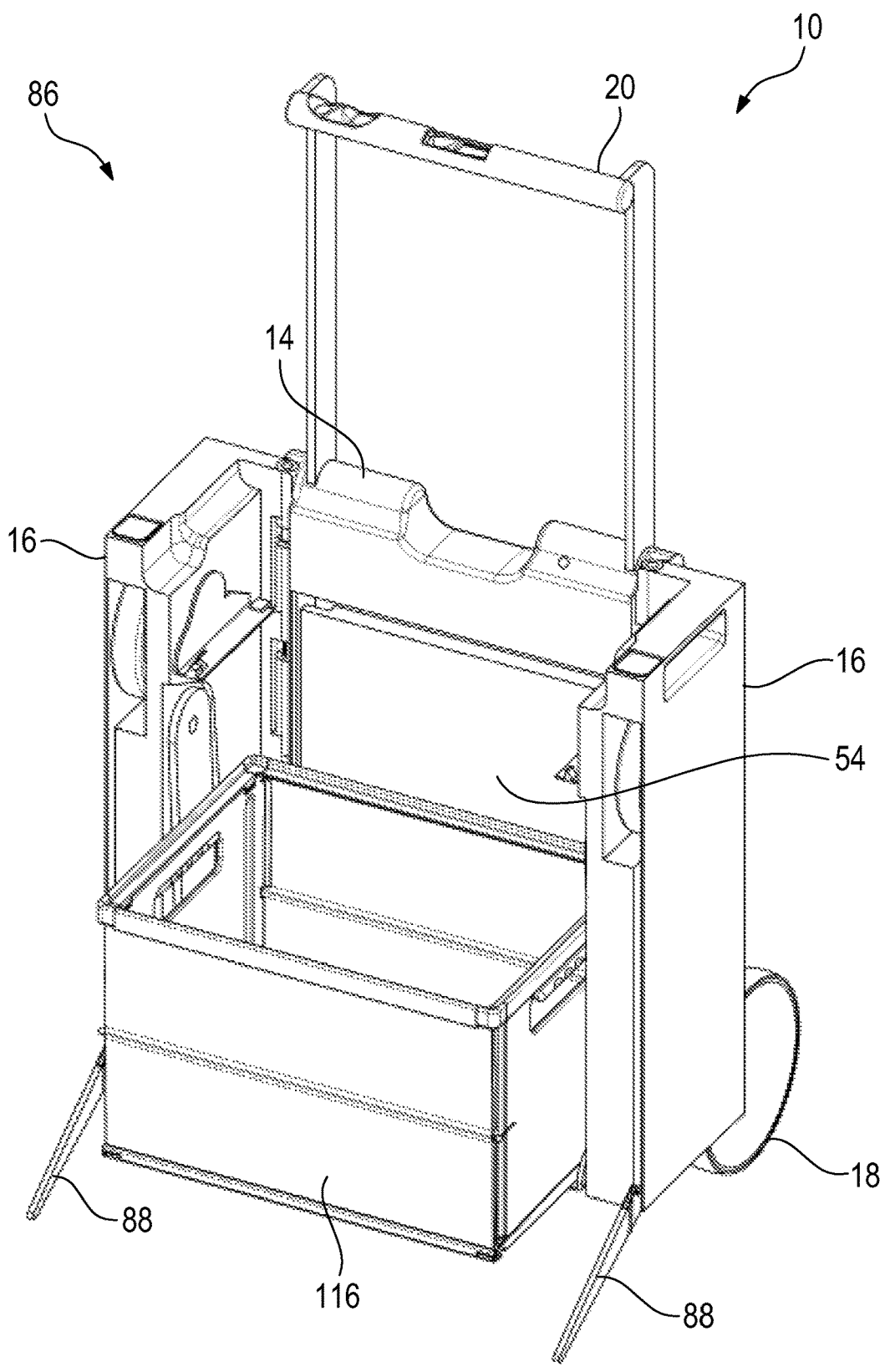
FIG. 18 is an isometric view of the front of the transport cart of FIG. 19 with transport box in a first receptacle.
Figure 19:
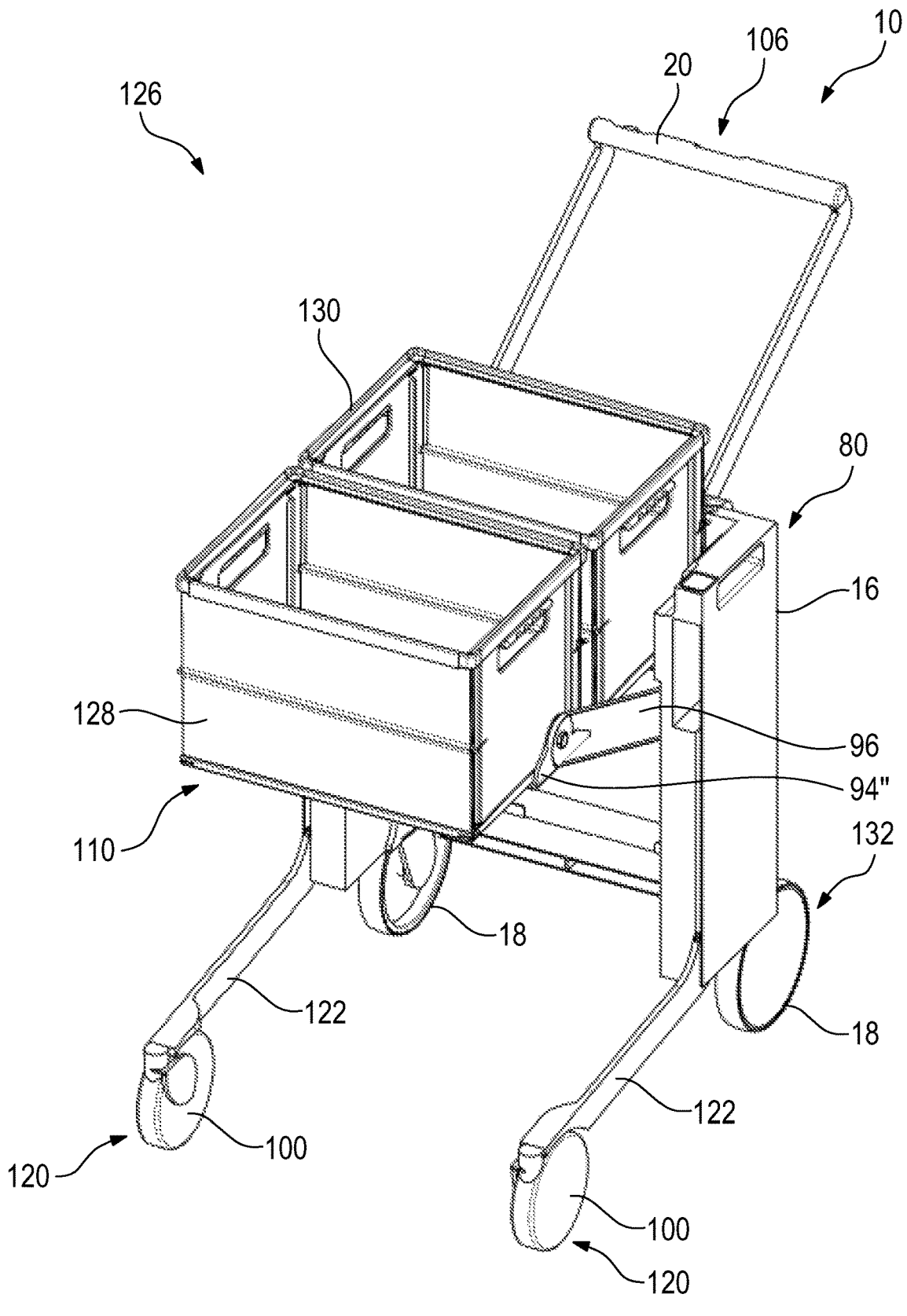
FIG. 19 is an isometric view of a front of the transport cart of FIG. 1 in a second mode of operation.
Figure 21:
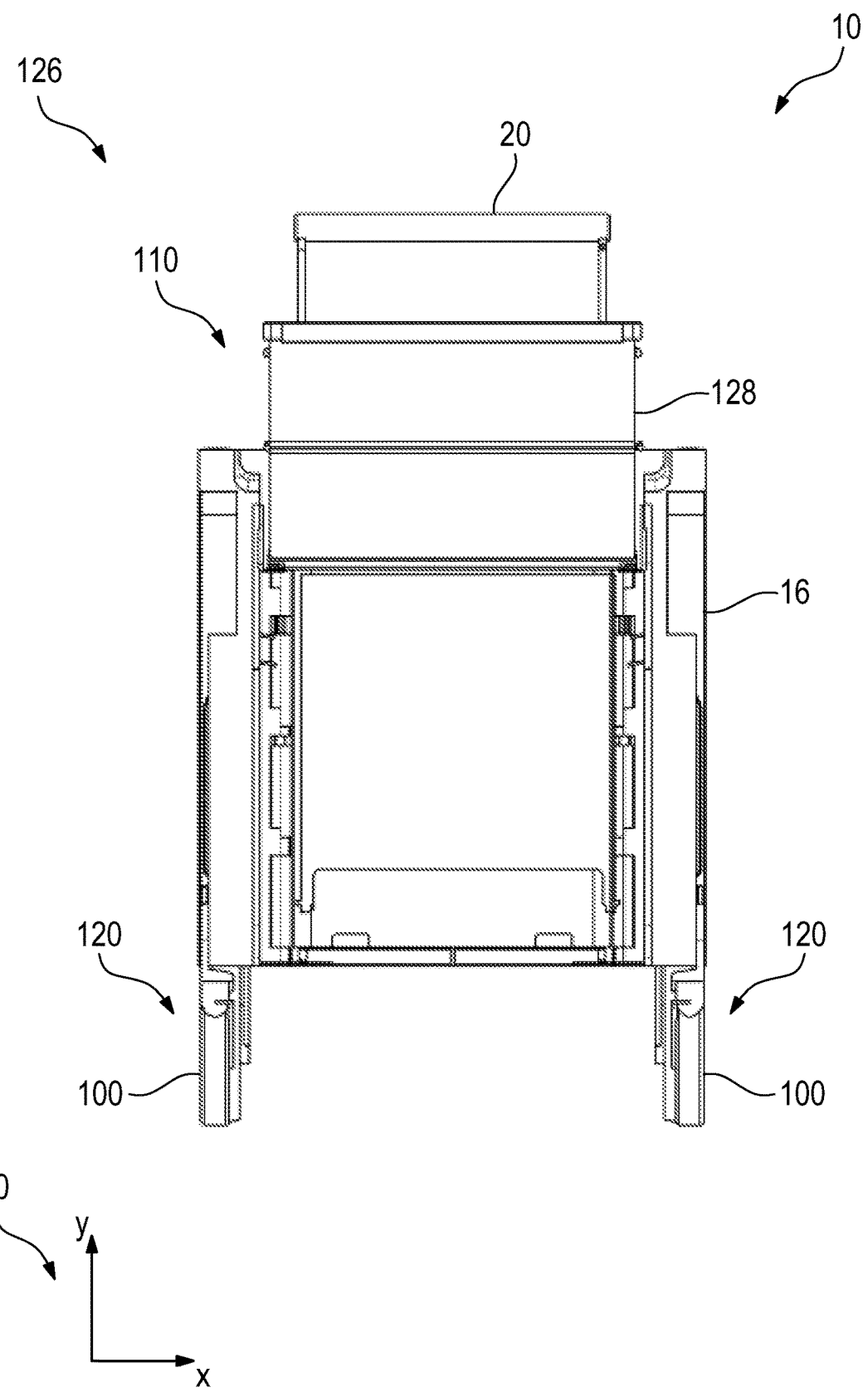
FIG. 21 is a top view of the front of the transport cart from FIG. 19.
Figure 22:
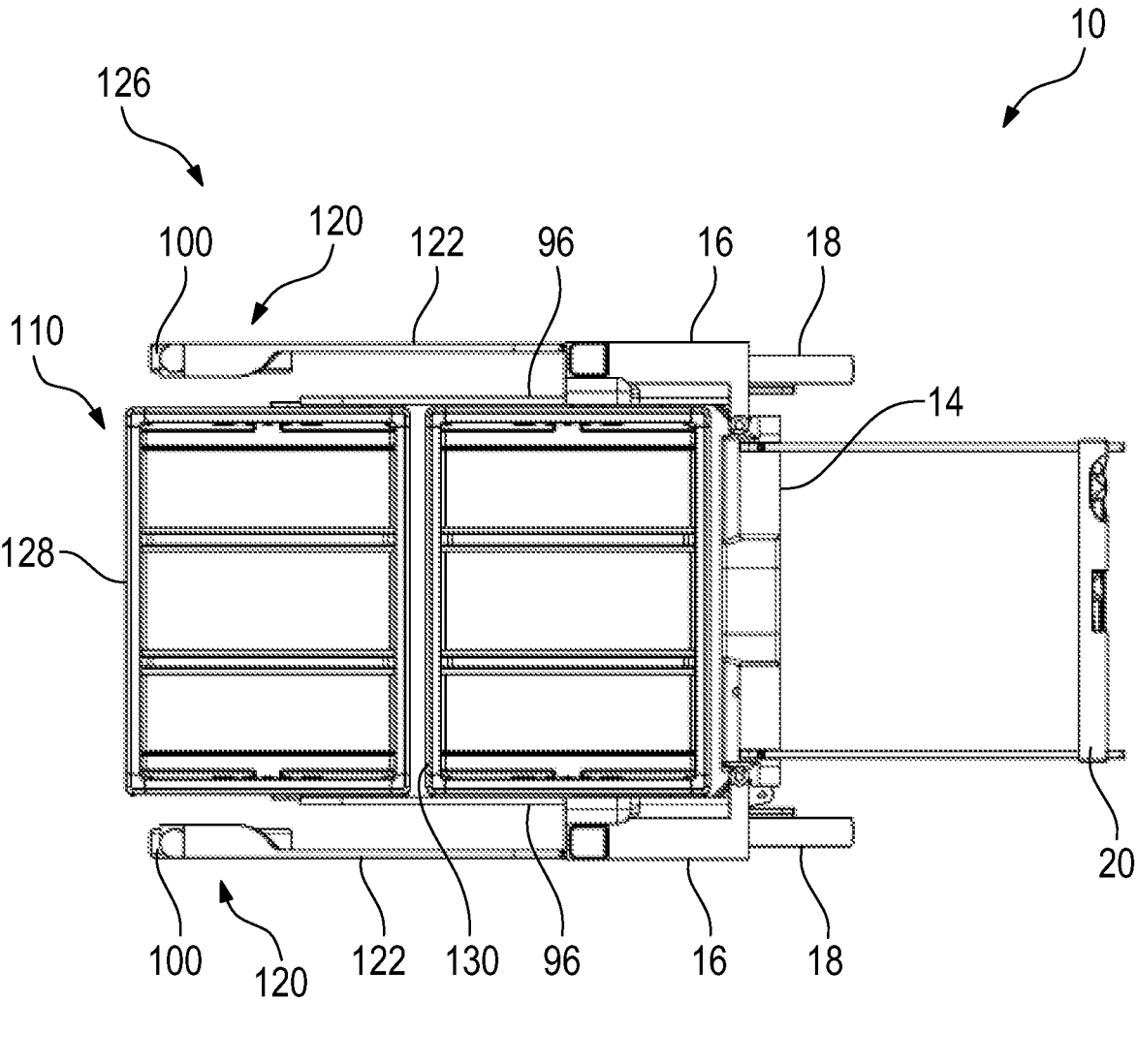
FIG. 22 is a top view of the upper side of the transport cart from FIG. 19.

FIG. 18 shows the transport cart 10 according to FIG. 17, wherein a transport box 116 is arranged in the first receptacle 93.

FIGS. 19 to 22 show the transport cart 10 in a second operating mode 126. The second operating mode 126 is particularly suitable for loading transport boxes on the transport cart or generally for pushing the transport cart 10 over the handle 20. The second operating mode 126 may therefore also be referred to as the pushing mode.

In the second mode of operation 126, the handle 20 is disposed in the unfolded position 106. The handle is arranged on the base assembly 14 to pivot about an axis. The axis is parallel to the x-direction. Compared to the orientation in the first mode of operation 86, in which the handle extends parallel to the y-direction, the handle 20 is pivoted about the axis in the z-y plane in the direction away from the side assemblies 16.

In the second mode of operation 126, each side assembly 16 is disposed in the unfolded position 80. In the second operating mode 126, each support wheel is arranged in the unfolded position 120. In the second operating mode 126, the second receptacle 97 is arranged in the loading position.

In the second mode of operation 126, each wheel 18 is disposed in a further unfolded position 132, also referred to as a second unfolded position. In the further unfolded position 132, each wheel is further unfolded than in the unfolded position 78. In particular, each wheel 18 is arranged lower in the y-direction with respect to the underside 44 of the side assemblies than in the unfolded position 78. In other words, in the y-direction, a distance of the axis of rotation of the wheels 18 from the underside 44 in the corresponding side assembly 16 is greater in the further unfolded position 132 than in the unfolded position 78.

Further, in the second mode of operation 126, each support 88 is disposed in a folded back position 134. The folded-back position 134 is disposed in an angular range about the corresponding axis between the folded position 90 and the unfolded position 92. In particular, each second arm 122 has a recess into which the corresponding support can be folded when the support wheels are unfolded. In the folded back position 134, each support wheel is disposed in the recess of the corresponding arm.

In the loading position 110, the first receptacle 93 and the second receptacle 97 are arranged at the same height with respect to the y-direction. In the x-direction, the first receptacle 93 and the second receptacle 97 are arranged next to each other.

A first transport box 128 can be arranged in the first receptacle 93. A second transport box 130 can be arranged in the second receptacle.

Figure 23:
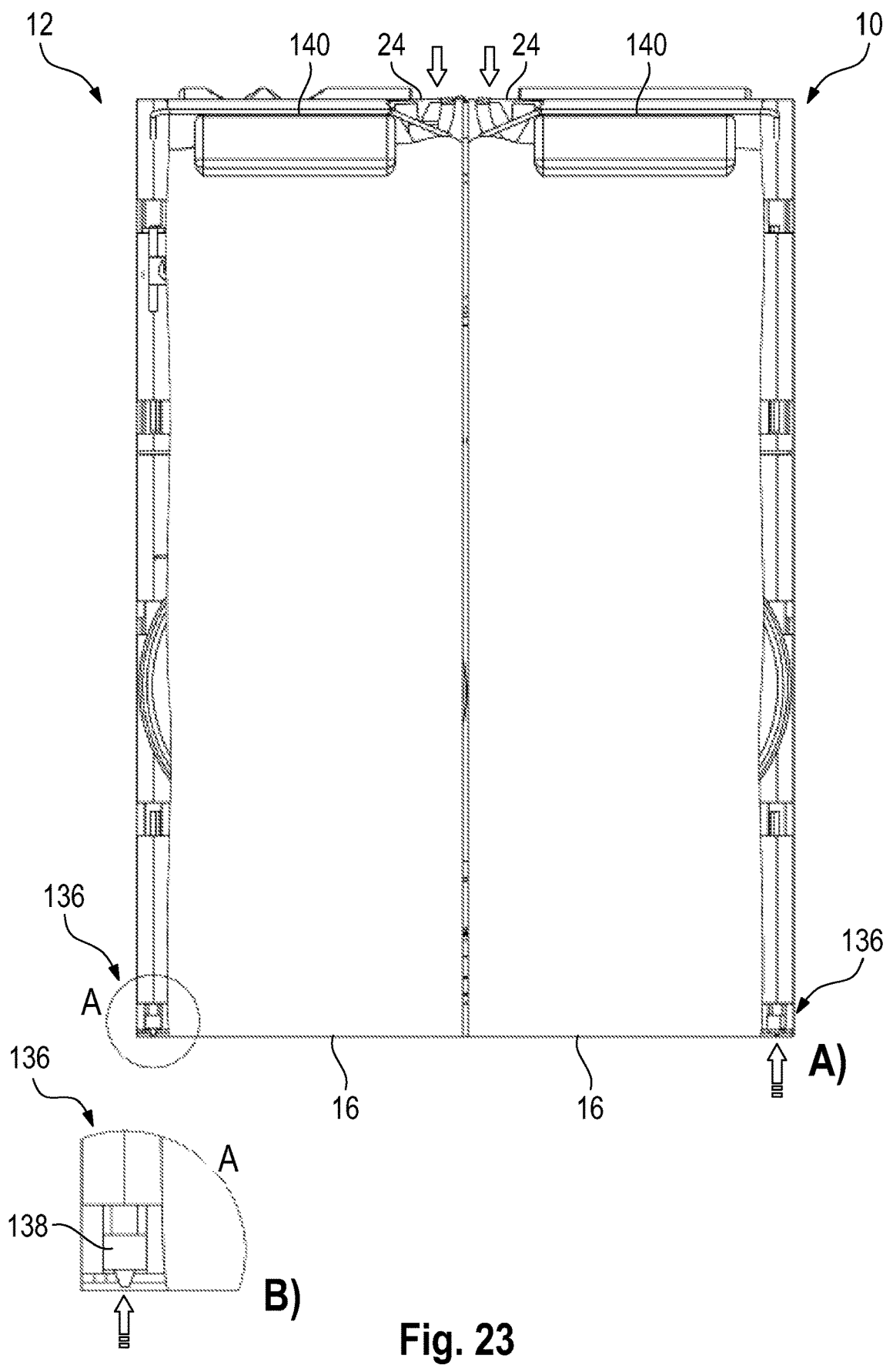
FIGS. 23A and 23B are a top view of a front side of the transport cart from FIG. 1 when the locking mechanism is released.
Figure 24:
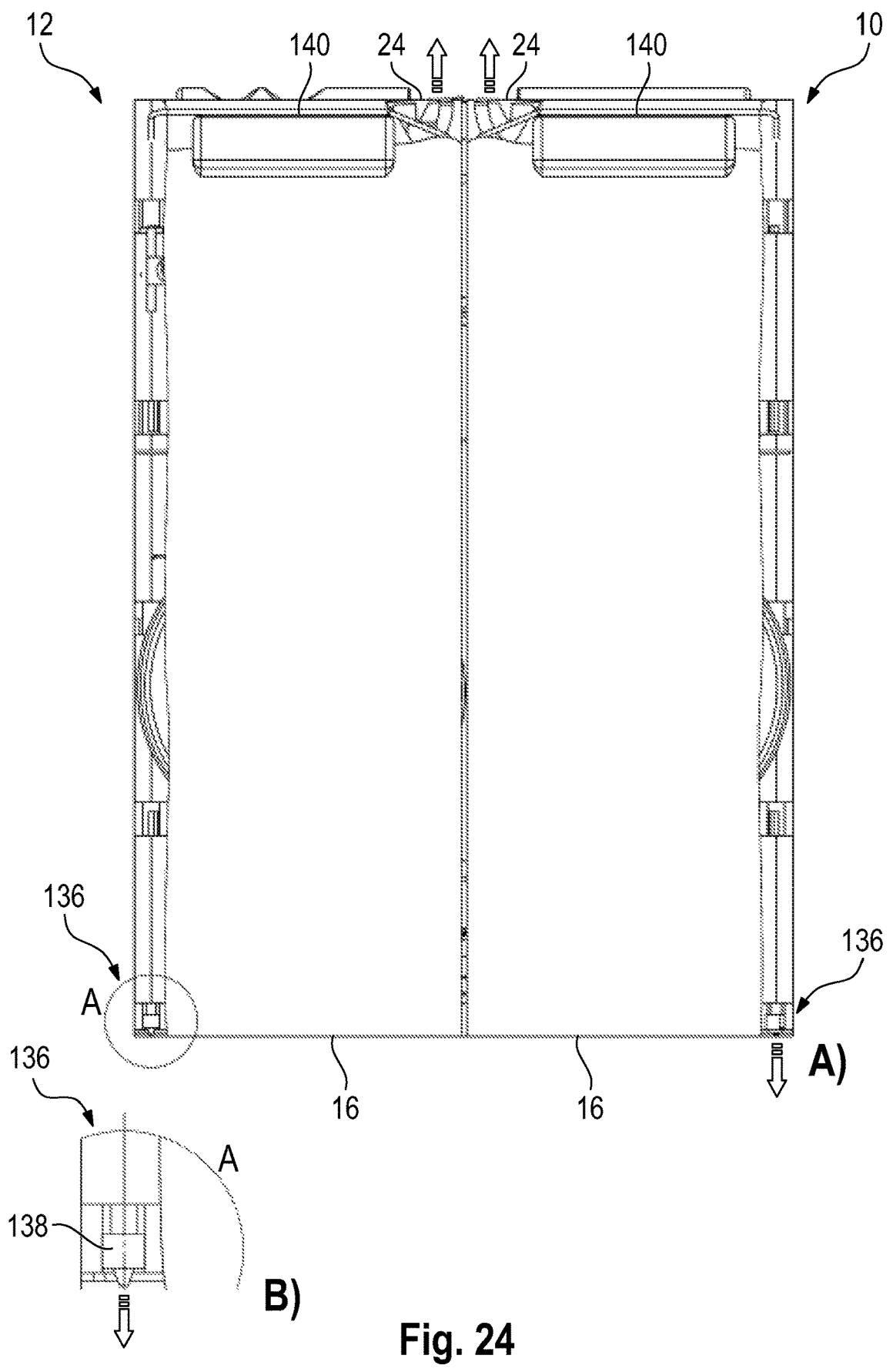
FIGS. 24A and 24B are a top view of a front side of the transport cart from FIG. 1 when the locking mechanism is closed.

FIGS. 23 and 24 show a mechanism by which the side assemblies 16 can be locked in both the closed position 76 and the open position 80. For this purpose, the transport cart 10 has at each a locking device 136 for each side assembly 16. The locking device 136 includes a peg 138 that is engageable with a corresponding recess on the base assembly 14 in each of the folded position 76 and the expanded position 80, to retain the side assemblies in the folded position 76 and the expanded position 80, respectively. Each peg 138 is disposed on the underside of the corresponding side assembly 16.

Each peg 138 is disengageable from the corresponding recess by an actuation of the corresponding second actuating element 24, so that the corresponding side assembly 16 is pivotable about the respective pivot axis between the closed position 76 and the open position 80. To this end, each pivot is connected to the corresponding actuating member 24 by a cable 140 which is tensioned when the actuating member is actuated so that the pivot is pulled out of the corresponding recess. Preferably, the cable 140 extends along the pivot axis of the respective side assembly 16. In other words, the cable is guided from the bottom to the top of the side assembly 16 by the mounting of the respective side assembly 16 to the base assembly.

In FIG. 23, it is shown that when an actuating element 24 is actuated, the corresponding peg 138 is pulled out of the respective recess. In FIG. 24, it is shown that the corresponding peg 138 is moved back into the respective recess when actuation of the actuating element 24 no longer occurs.

Figure 25:
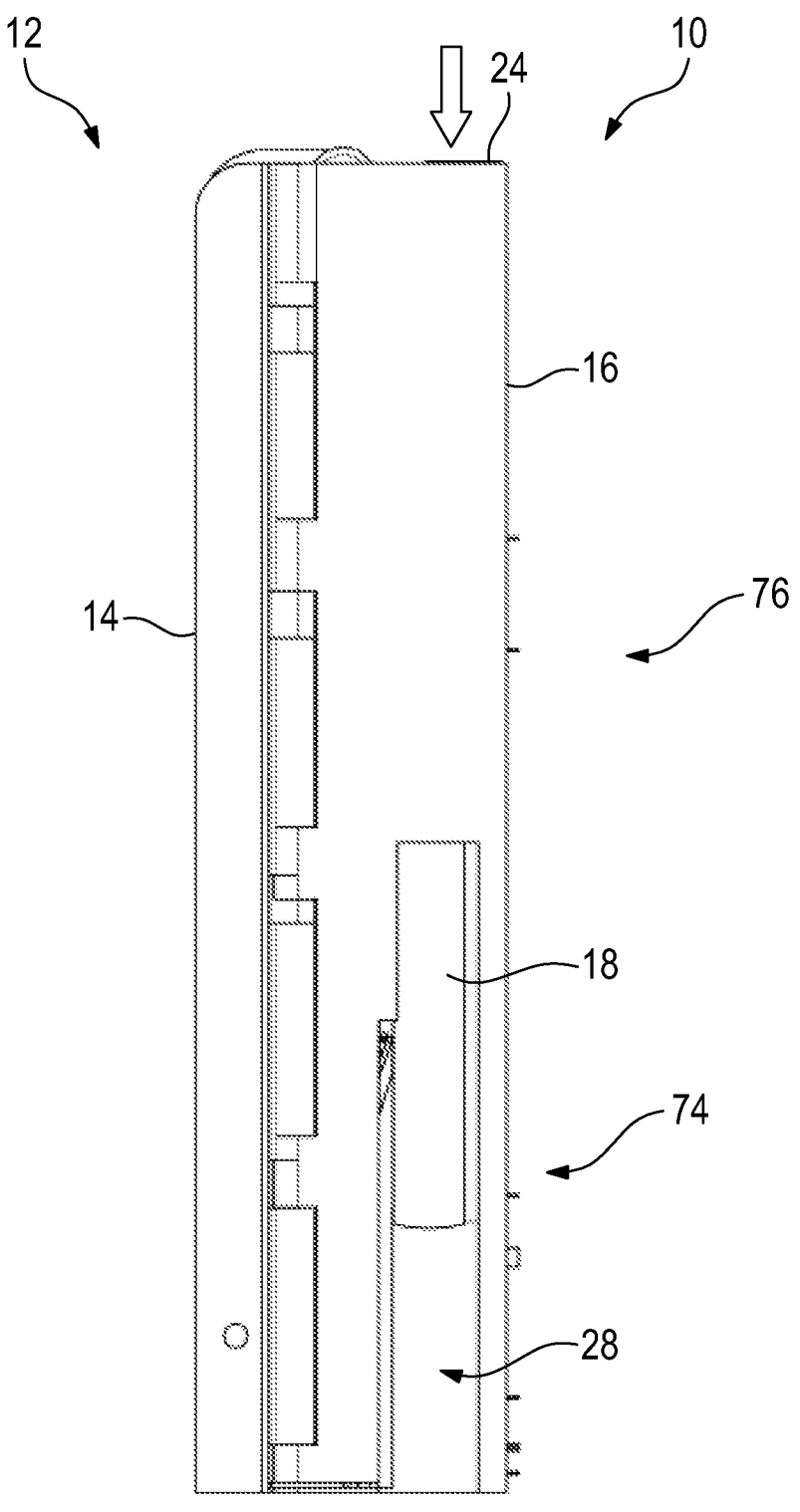
FIG. 25 is a side view of the transport cart from FIG. 1 during unfolding.
Figure 26:
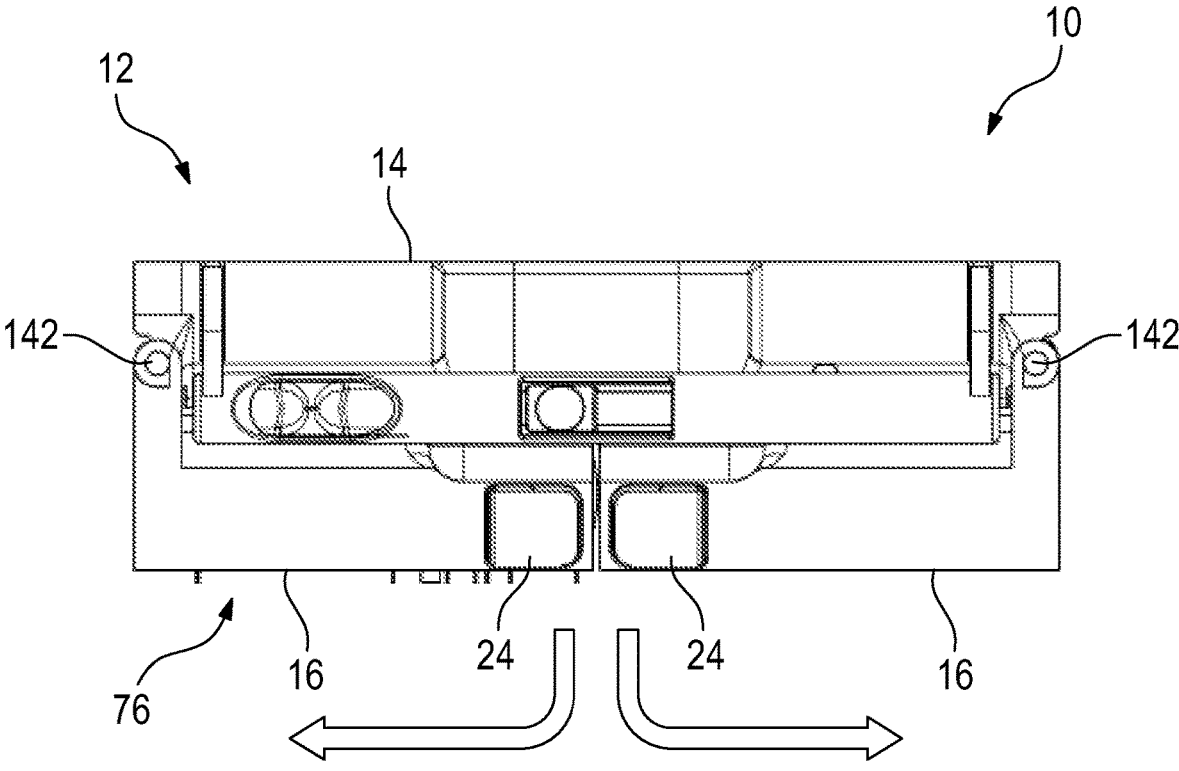
FIG. 26 is a top view of a top side of the transport cart from FIG. 1 when unfolding the side assemblies.
Figure 27:
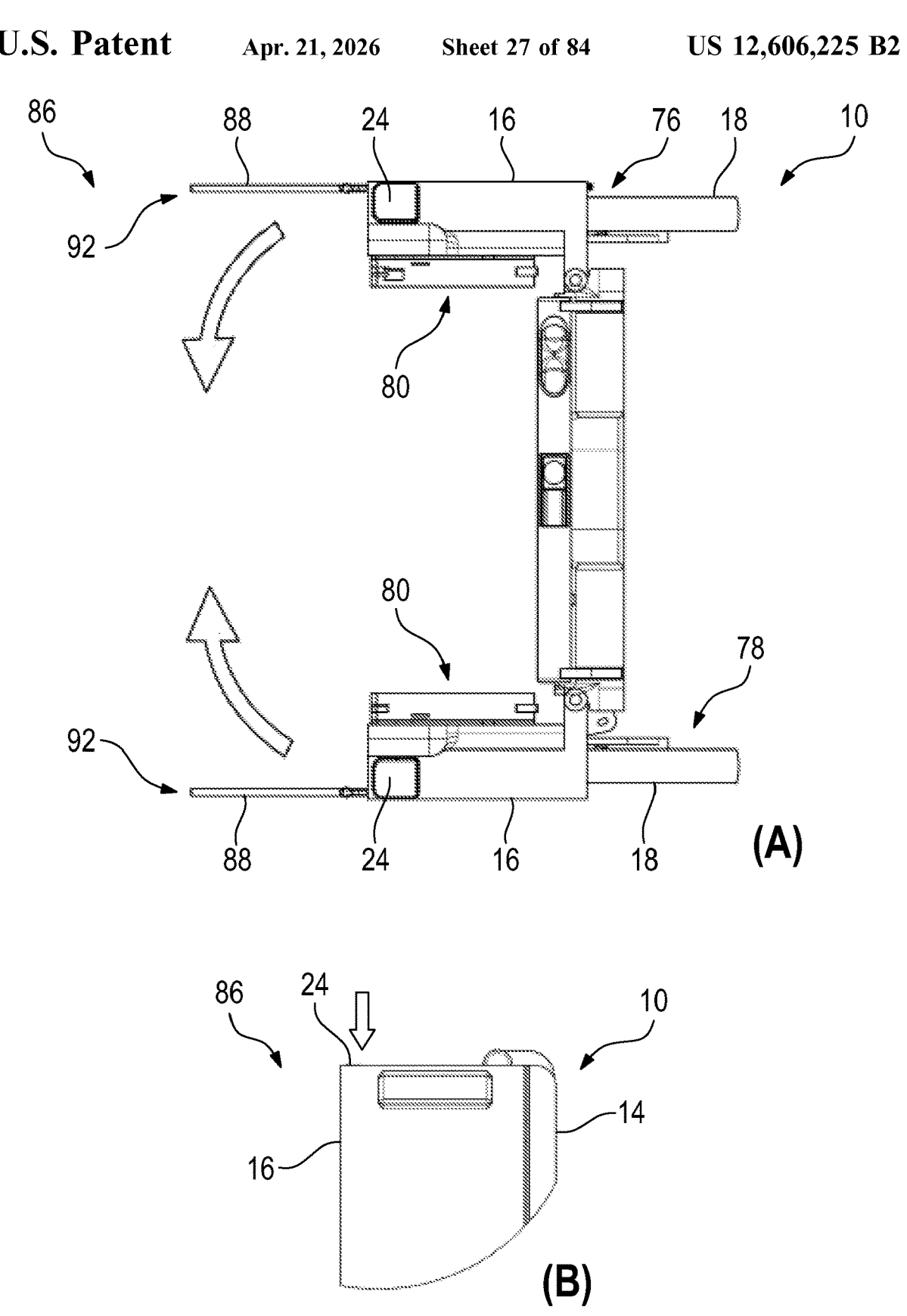
FIGS. 27A and 27B are a side view and a top view of a top side of the transport cart from FIG. 1 when the side assemblies are folded shut.

FIGS. 25 to 27 show a mechanism by means of which the side assemblies 16 can be folded open or closed. For this purpose, each side assembly 16 is pivotally mounted on the base assembly 14 about a respective pivot axis 142.

FIGS. 25 and 26 show the unfolding of the side assemblies 16. First, as shown in FIG. 25, the actuating elements 24 are actuated to release the lock of the locking device 136. Then, as shown in FIG. 26, each side assembly 16 is pivoted about the corresponding pivot axis 142 from the closed position 76 to the unfolded position 80.

In the views of FIG. 27, the folding of the side assemblies 16 is shown. First, as shown in view (A) of FIG. 27, the actuating elements 24 are actuated to release the locking of the locking device 136. Then, as shown in view (B) of FIG. 27, each side assembly is pivoted about the corresponding pivot axis 142 from the unfolded position 80 to the folded position 76.

Figure 28:
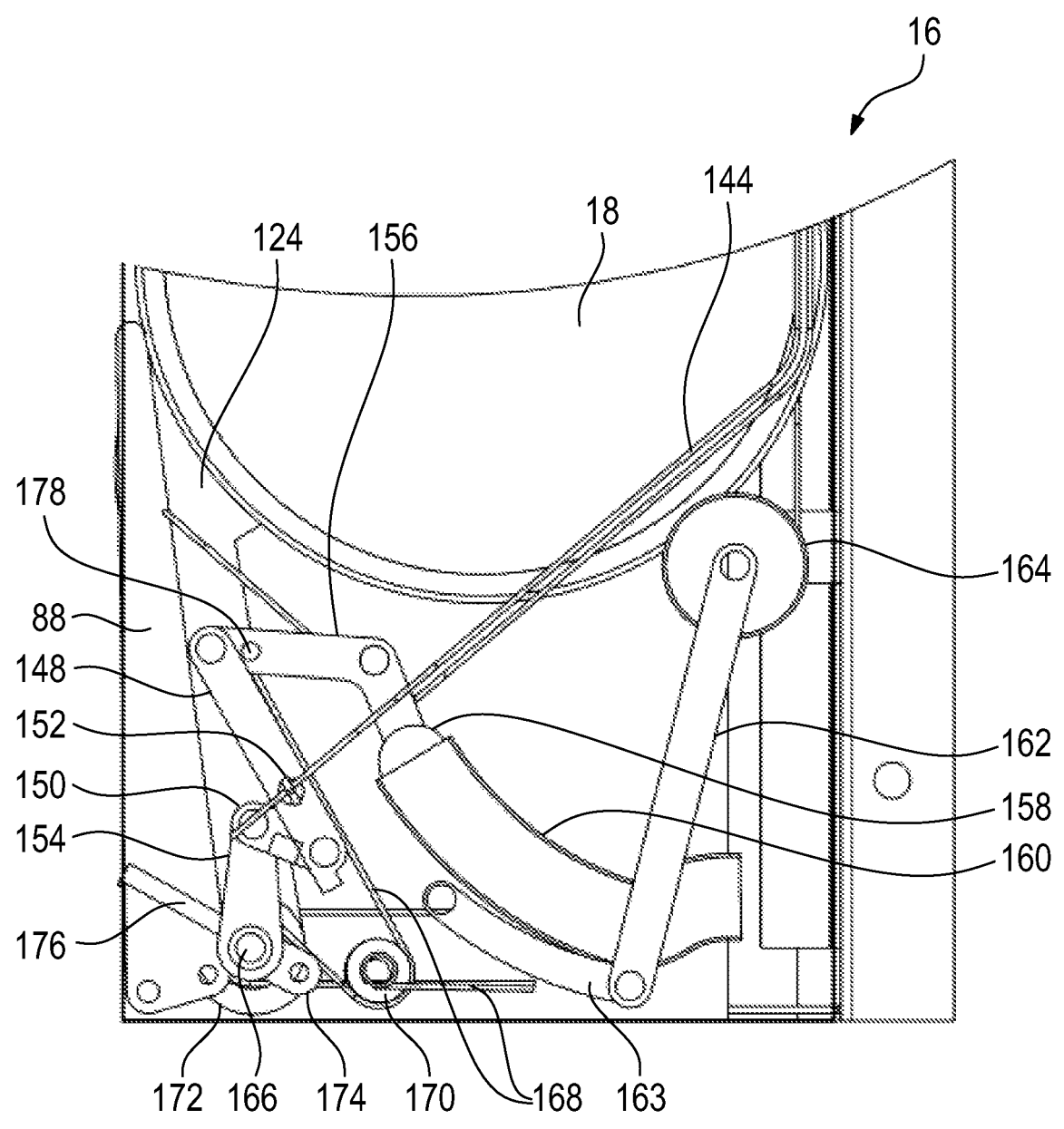
FIG. 28 is a sectional view of an embodiment of a side assembly in the packing mode.
Figure 29:
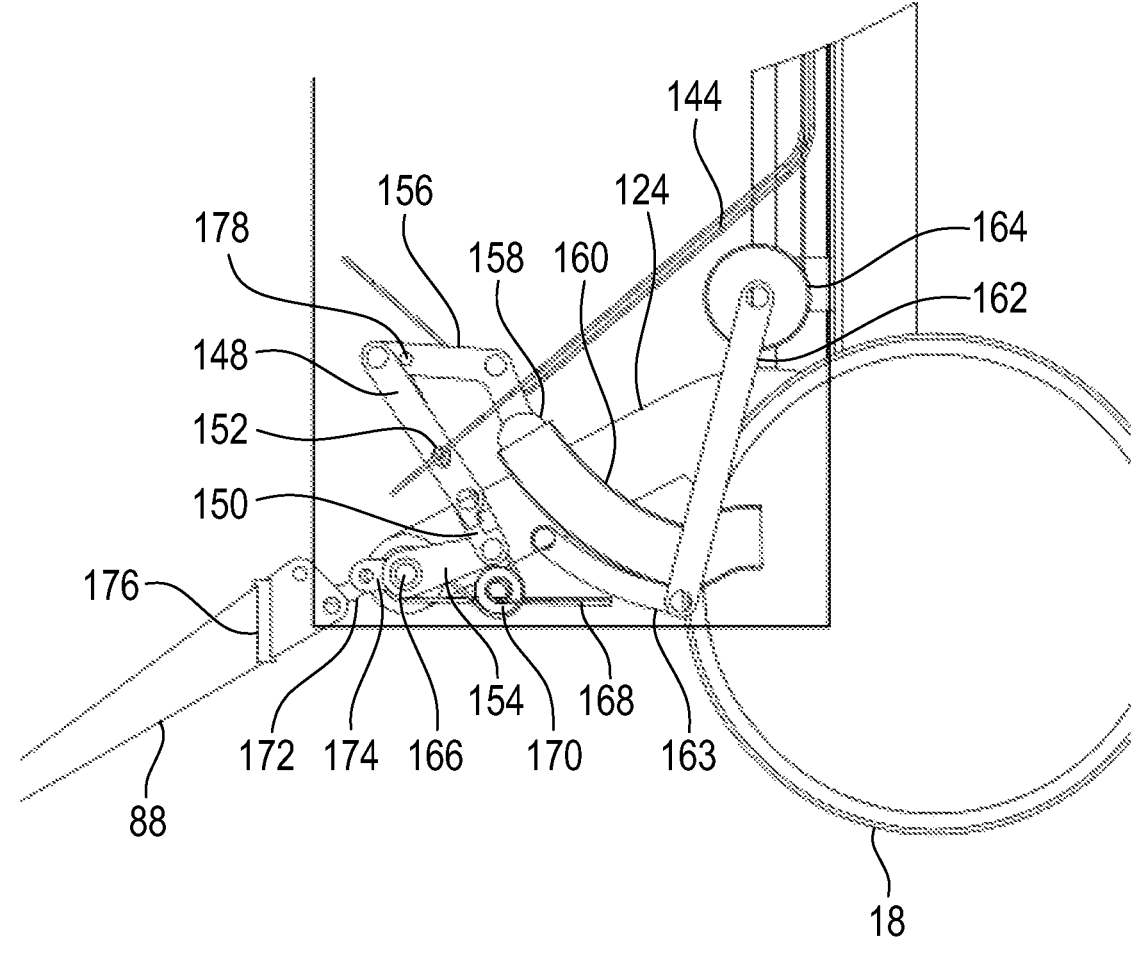
FIG. 29 is a sectional view of the side assembly of FIG. 28 in the first operating mode.

FIGS. 28 and 29 illustrate a mechanism by which a wheel 18 and a support 88 can be unfolded and folded, respectively, from a side assembly 16. In FIG. 28, the side assembly 16 is arranged in the folded position 76. Accordingly, the transport cart 10 is arranged in the packing mode 12, the wheel 18 is arranged in the folded position 74, and the support 88 is arranged in the folded position 90. In FIG. 29, the side assembly 16 is arranged in the unfolded position 80. Accordingly, the transport cart 10 is arranged in the first operating mode 86, the wheel 18 is arranged in the unfolded position 78, and the support 88 is arranged in the unfolded position 92.

For the mechanism for extending and retracting the wheel 18 and the support 88, the side assembly 16 includes a cable pull 144, a first toggle lever 146, a first lever 154, a second lever 156, another cable pull 168, a third lever 174, and a fourth arm 172.

A first end of the cable pull 144 is pulled when the side assembly 16 is unfolded. A spring element is arranged at the other end of the cable pull 144, which is tensioned when the first end is pulled. When the side assembly 16 is folded closed, the cable pull 144 is released so that the cable pull is pulled in the opposite direction due to the restoring force of the spring element.

The toggle 146 includes a first lever member 148 and a second lever member 150. The cable pull 144 is coupled to the first attachment element 148. To this end, the cable pull 144 is attached or secured to the first lever element 148 at an attachment point 152.

The first lever element 148 is coupled to the second lever 156. The second lever element 150 is coupled to the first lever 154. The first lever element 148, the second lever element 150, and the first lever 154 each have a straight shape. The second lever 156 has a bent, in particular L-shaped or boomerang-shaped, shape.

A wheel 158 is rotatably disposed on the side of the second lever 156 remote from the first lever member 148. The wheel 158 is arranged at a first end of a pot cam 160. The wheel 158 is movable only along the guide provided by the cup curve 160. The cup cam is rigidly connected to a third lever element 162. The third lever element 162, together with a fourth lever element 163, forms a second toggle 165. The third lever element 162 is coupled to the fourth lever element 163. The fourth lever element 163 is coupled to the support wheel 100 of the side assembly 16. The second toggle 165 and the cup cam 160 are not moved when the side assembly 16 is unfolded or folded. Similarly, the wheel remains disposed at the first end of the cup cam 160. The function of the second toggle 165 and the cup cam 160 will be explained in detail with reference to FIGS. 58 through 62.

The first lever 154 is freely rotatable on a pivot axis 166. The third arm 124 of the wheel 18 is also freely rotatably mounted on the pivot axis 166, wherein the pivoting motions of the first lever 154 and the third arm 124 are coupled to each other. In particular, the first lever 154 and the third arm 124 are coupled together for rotation about the pivot axis 166. The third lever 174 is coupled to the support 88 via the arm 172. The third lever 174 is also freely rotatable on the pivot axis 166.

The third lever 174 is coupled in a rotationally fixed manner to a deflection pulley around which the further cable 168 runs. This deflection pulley is also freely rotatably mounted on the pivot axis 166. Thereby, a pulling movement of the cable pull 168 is transmitted to a rotational movement of the deflection pulley and thus also to a pivoting movement of the third lever 174. A first end of the cable pull 168 is coupled to the second lever 156. In this regard, the first end of the pulley 168 is attached or secured to the second lever 156 at an attachment point 178. The second end of the pulley 168 is coupled to a spring member 180, wherein the spring member 180 is tensioned when the pulley 168 is pulled toward the first end. Further, the cable 168 is deflected around a deflection pulley 170. With respect to the path of the cable 168, the deflection pulley 170 is disposed between the deflection pulley mounted on the pivot axis 166 and the second lever 156.

In other words, the toggle 146 is directly coupled to the arm 124 of the wheel 18 via the lever 154 and coupled to the arm 172 of the support 88 via the cable 168 and the lever 174. As a result, a pivoting motion of the wheel 18 between the folded position 74 and the unfolded position 78 and a pivoting motion of the support 88 between the folded position 90 and the unfolded position 92 are coupled together.

The support includes a stop member 176 that engages the pivot axis 166 when the support 88 is in the folded position 90.

In FIG. 28, the side assembly 16 is arranged in the folded position 76. Here, the toggle 146 is arranged in a bent position. In other words, the first lever element 148 and the second lever element 150 enclose an angle with each other that is less than 90°. Preferably, the angle is 10° to 30°, in particular 15°.

In FIG. 29, the side assembly 16 is arranged in the unfolded position 80. Here, the toggle 146 is extended. In other words, the first lever element 148 and the second lever element 150 enclose an angle of substantially 180° with each other. Thus, the first lever element 148 and the second lever element 150 are arranged collinearly. Furthermore, the lever 154 and the lever 174 are rotated about the pivot axis 166 compared to the arrangement shown in FIG. 28. The angle of rotation is selected such that the wheel 18 and the support 88 are transferred from the respective folded position to the corresponding unfolded position. The angle of rotation is preferably less than 180°, further preferably 150° to 175°, in particular 165°.

Preferably, it may also be provided that the pivoting motion of the support 54 between the vertical position 82 and the horizontal position 84 is also coupled to the pivoting motion of the side assemblies 16 between the folded position 76 and the unfolded position 80 so that the support 54 is pivoted from the vertical position 82 to the horizontal position 84, when the side assemblies 16 are pivoted from the folded position 76 to the expanded position 80, and from the horizontal position 84 to the vertical position 82 when the side assemblies 16 are pivoted from the expanded position 80 to the folded position 76.

Figure 30:
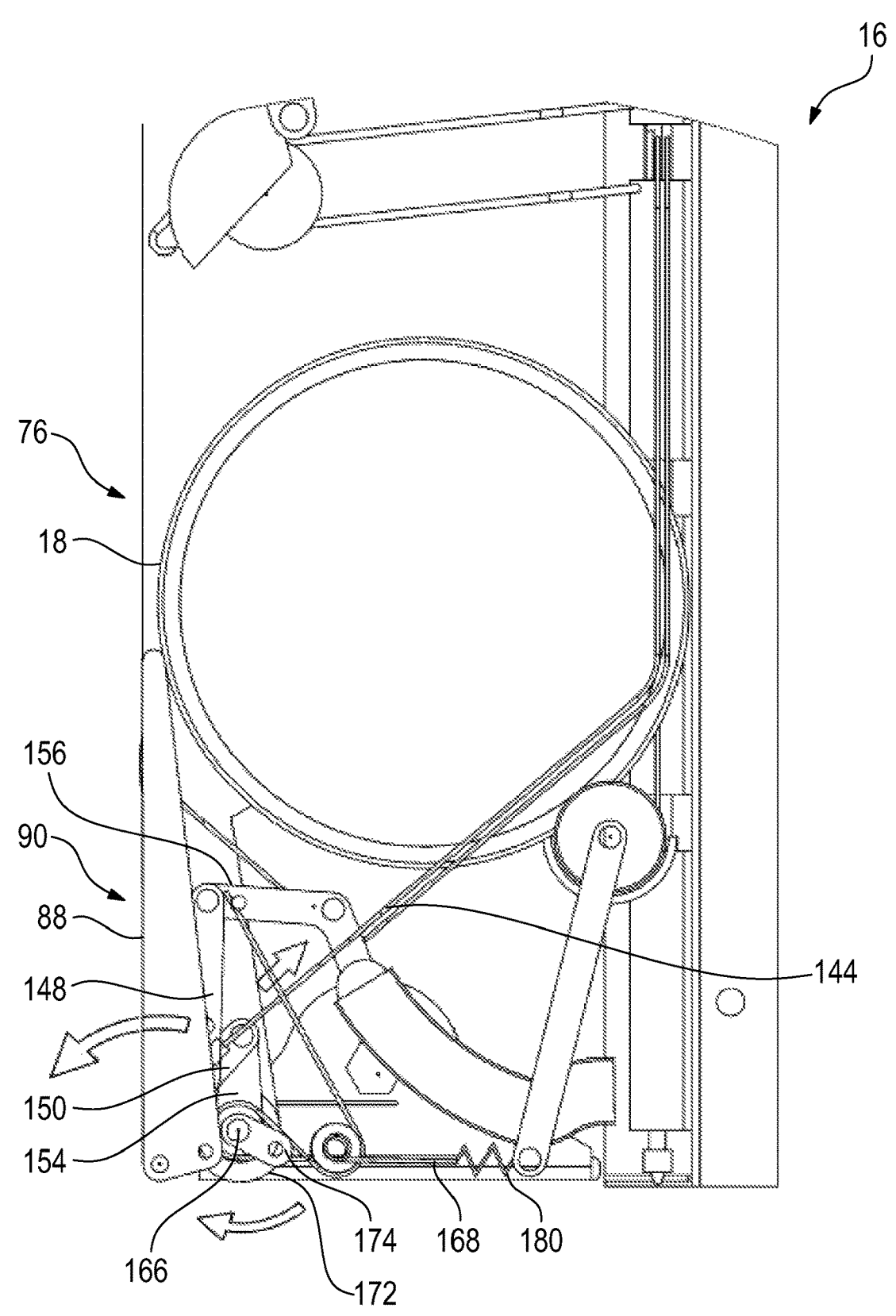
FIG. 30 is a sectional view of the side assembly of FIG. 28 in the packing mode during transfer from the packing mode to the first operating mode.
Figure 31:
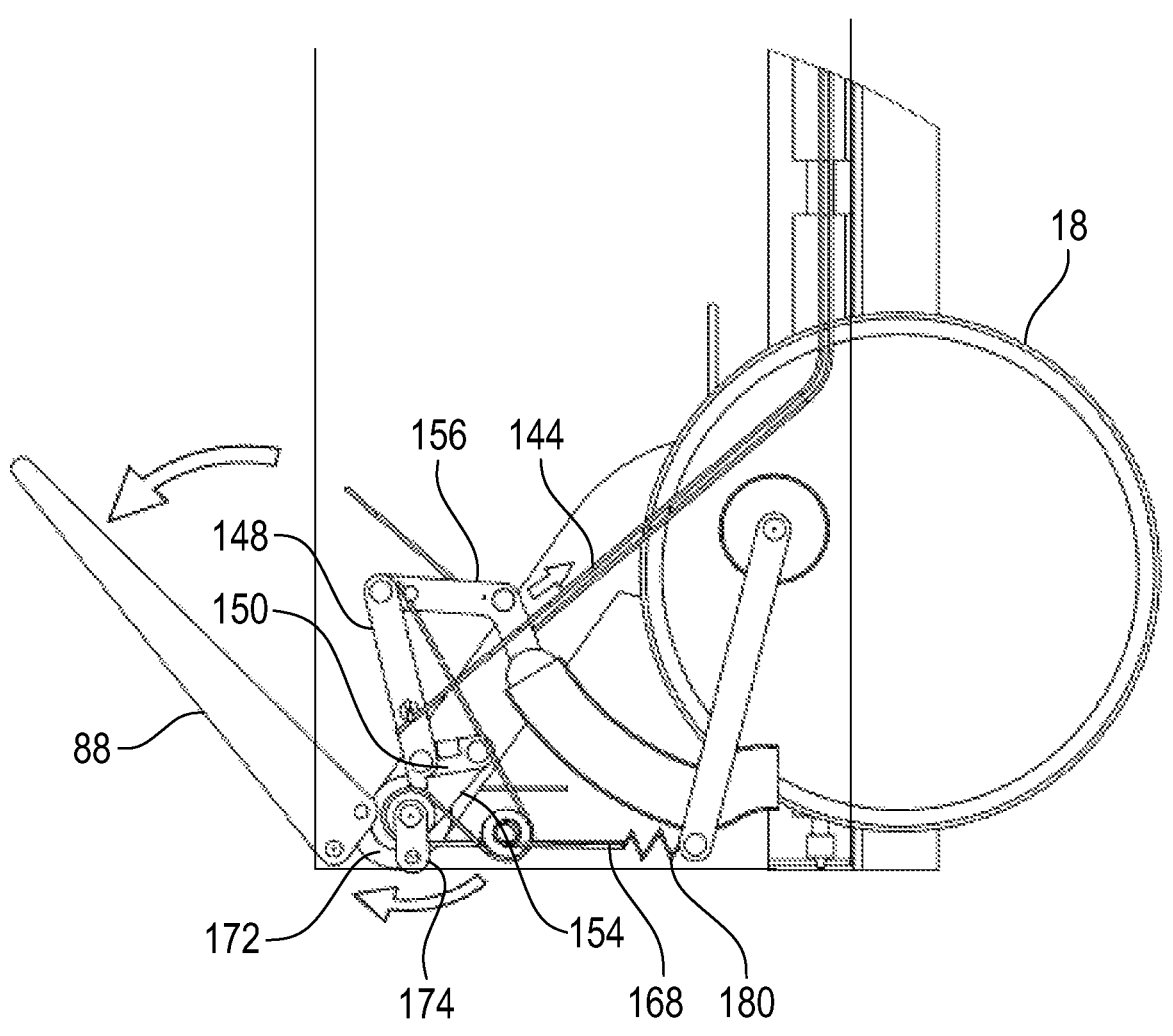
FIG. 31 is a sectional view of the side assembly of FIG. 28 in an arrangement between the packing mode and the first mode of operation during transfer from the packing mode to the first mode of operation.
Figure 32:
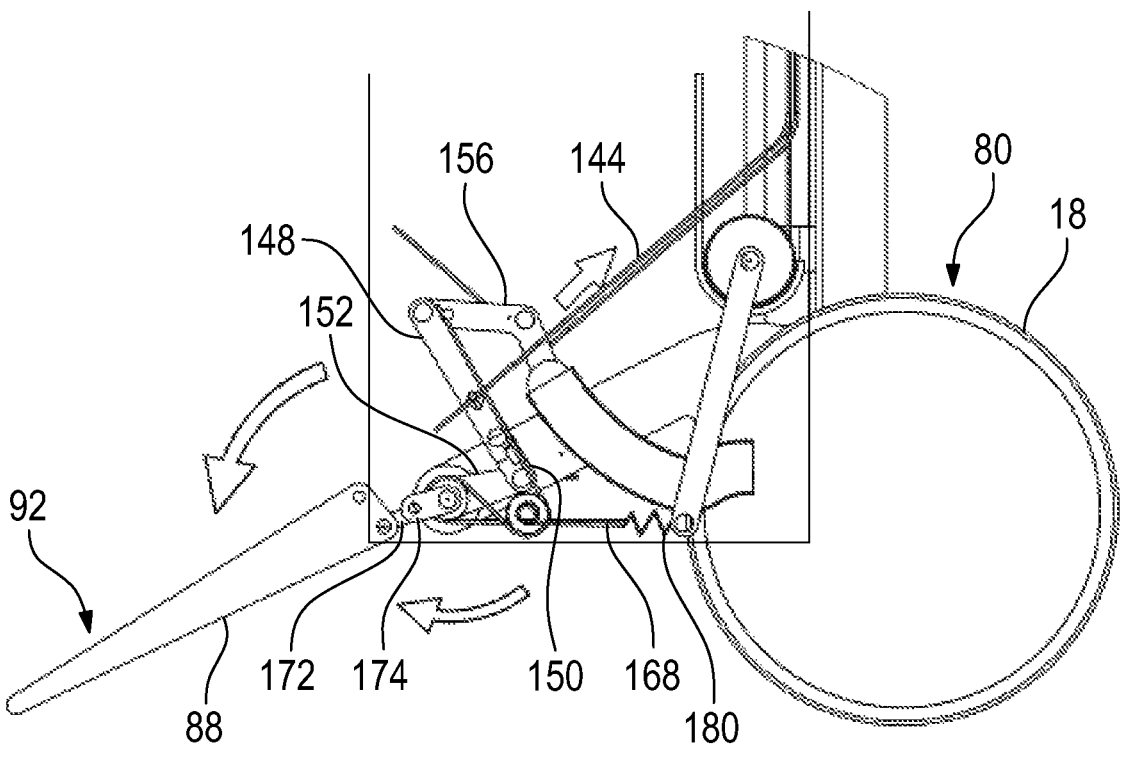
FIG. 32 is a sectional view of the side assembly of FIG. 28 in the first mode of operation during transfer from the packing mode to the first mode of operation.

FIGS. 30 to 32 show how the individual components of the side assembly interact when the side assembly is unfolded, so that the wheel 18 and the support 88 are unfolded in the process.

When the side assembly 16 is unfolded, the cable pull 144 is pulled at the first end in the direction of the arrow shown in FIG. 30. As the cable pull 144 is connected to the first lever element 148 of the toggle 146, the first lever element 148 is pulled in the same direction. As this occurs, the toggle 146 is gradually stretched. In other words, an angle that the first lever element 148 and the second lever element 150 include with each other increases the more the cable pull 144 is pulled.

As the toggle lever 146 is extended, the first lever 154 is rotated about the pivot axis 166 and the end of the second lever 156 facing the first lever element 148 is raised. Rotating the lever 154 pivots the arm 124 about the pivot axis 166, thereby also unfolding the wheel 18. Raising the second lever 156 pulls the cable 168 toward the first end, which is attached to the second lever. Since a pulling motion of the cable 168 is coupled to a pivoting motion of the third lever 174, this causes the support 88 to unfold.

FIG. 30 here shows the initial state of the unfolding motion, in which the side assembly 16 is in the folded position 76 and the wheel and support are each in the folded position and the first toggle 146 is fully angled.

FIG. 31 shows an intermediate state of unfolding movement in which the side assembly 16 is partially unfolded and the wheel and support are each partially unfolded, and the first toggle 146 is partially extended.

FIG. 32 shows the final state of the unfolding motion, in which the side assembly 16 is in the unfolded position 80 and the wheel and support are each in the unfolded position and the first toggle 146 is fully extended.

During the closing movement of the side assembly 16, the cable pull 144 is released so that the spring element, which is arranged at the second end of the cable pull 144, pulls the cable pull 144 against the direction of the arrow shown in FIG. 30 due to the restoring force. As a result, the first toggle lever is bent and the second lever 156 is lowered. As a result, the second cable pull is released so that the spring element 180 pulls the cable pull 168 in the direction of the second end. Since a pulling motion of the cable 168 is coupled to a pivoting motion of the third arm 124 and the third lever 174, this causes the wheel 18 and the support 88 to fold.

Figure 33:
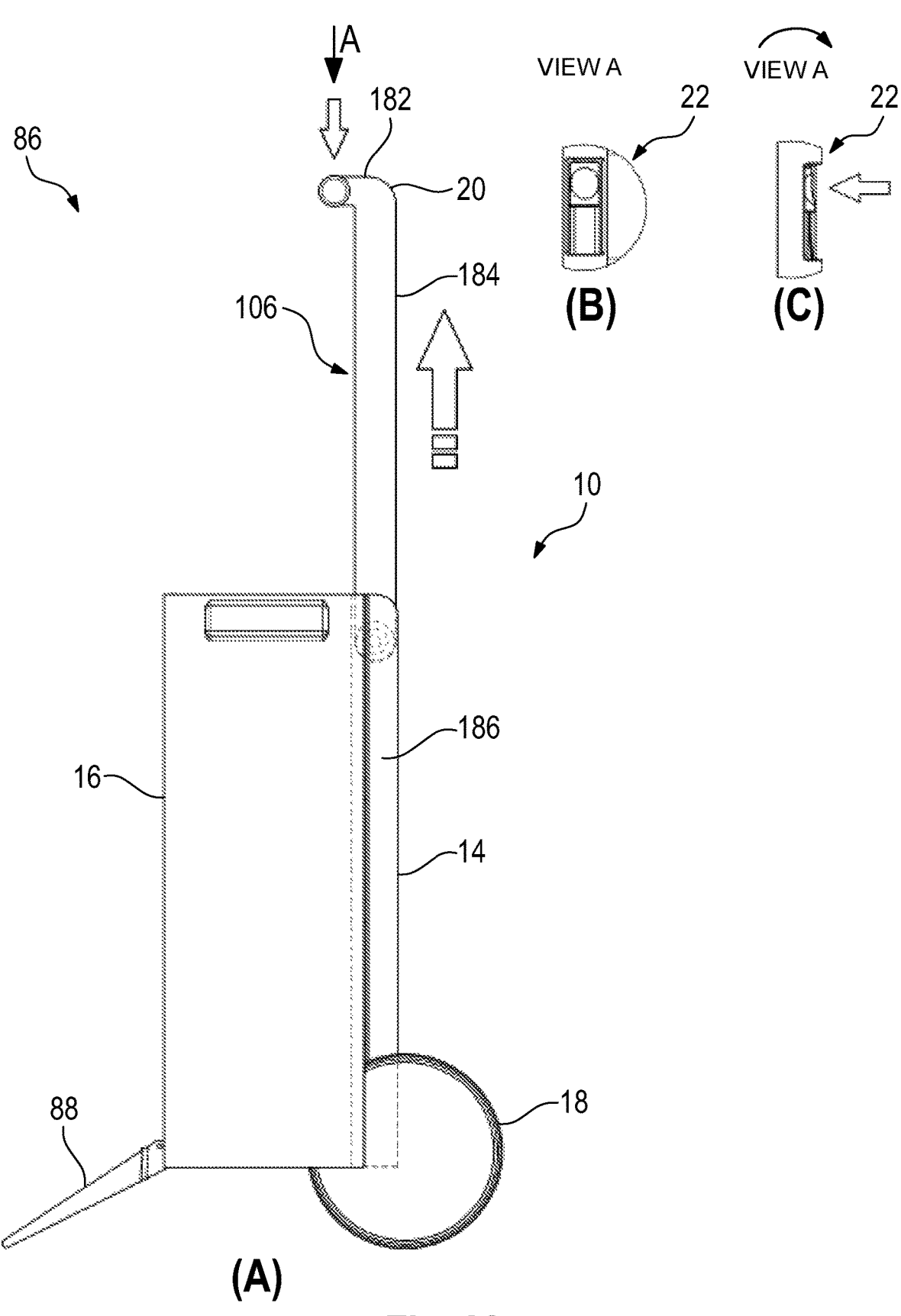
FIGS. 33A, 33B and 33C are a side view of the transport cart from FIG. 9 when the handle is pulled out and two detailed views of an actuating element.
Figure 34:
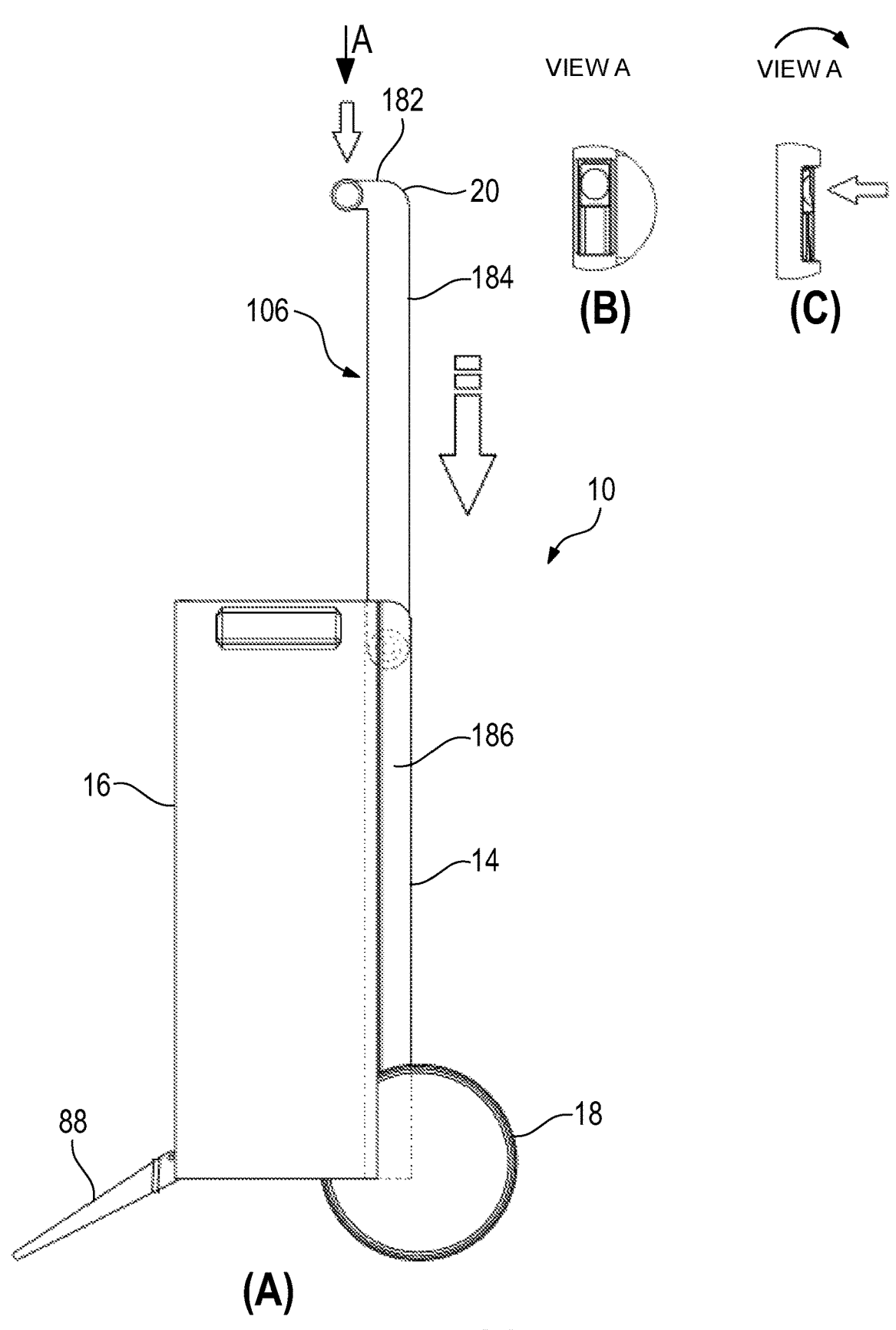
FIGS. 34A, 34B and 34C are a side view of the transport cart from FIG. 9 during insertion of the handle as well as two detailed views of an actuating element.

FIGS. 33 and 34 show a mechanism by means of which the handle 20 can be extended and retracted. In particular, the handle 20 is movable between the folded position 104 and the unfolded position 106 by means of this mechanism.

The handle 20 includes a handle bar 182 and a handle extension 184 at each end of the handle bar 182. The handle bar 182 is provided to allow a user of the transport cart to grasp the handle 20 at the handle bar 182 to move the transport cart. The handle bar 182 extends in the x-direction and each handle extension 184 extends in the y-direction. The handle extensions are thus arranged parallel to each other.

The base assembly 14 has a slide-in box 186 in which the two handle extensions 184 can be arranged. For this purpose, the slide-in box 186 also extends in the y-direction. In particular, the handle extension 184 can be pushed into the slide-in box 186 or pulled out of the slide-in box 186.

In FIG. 33, it is shown that the actuating element 22 is actuated to extend the handle 20. This releases a lock of the handle 20 in the insertion box 186 so that the handle can be moved from the folded position 104 to the unfolded position 106 along the y-direction.

In FIG. 34, it is shown that to push in the handle 20, the actuating element 22 is also actuated. This releases the locking of the handle 20 in the insertion box 186, so that the handle can be moved from the unfolded position 106 to the folded position 104 along the y-direction.

Figure 35:
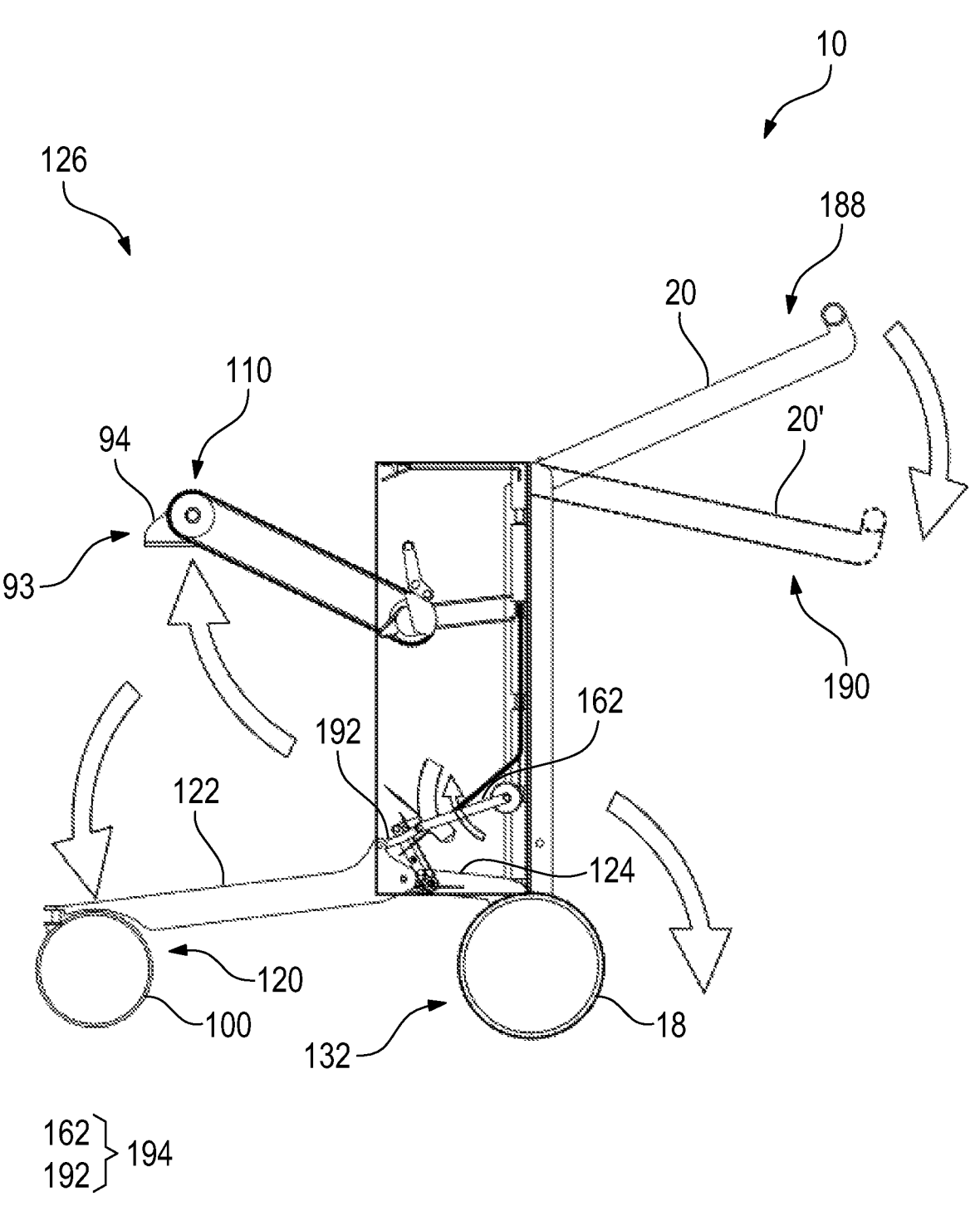
FIG. 35 is a side view of the transport cart from FIG. 19 during transformation to the second operating mode.

FIG. 35 shows how the transport cart 10 is transformed or transferred from the first operating mode 86 to the second operating mode 126. The transformation is effected by a pivoting movement of the handle 20. As previously described, in the unfolded position 106, the handle is pivotable relative to the base assembly 14 about a pivot axis 194 that is parallel to the x-direction. The handle 20 is thereby moved, for example, from a first pivot position 188 to a second pivot position 190. Preferably, only a movement in one direction of rotation about the pivot axis 194 is used for transformation. In other words, a pivoting movement from the first pivot position 188 to the second pivot position 190 is used for transformation, while a movement of the handle in the opposite direction is not used.

In other words, movement in a rotational direction about pivot axis 194 from first pivot position 188 to second pivot position 190 is coupled with movement of each support wheel 100 and first receptacle 93 to transfer support wheel 100 from folded position 118 to unfolded position 128 and to transfer first receptacle 93 from transport position 108 to loading position 110. In addition, this pivoting motion is also partially coupled with the pivoting motion of the wheels 18 and the support 88 to transfer the wheels 18 from the first unfolded position 78 to the second unfolded position 132 and to transfer the supports 88 from the unfolded position to the folded back position 134. Further, movement in an opposite rotational direction about pivot axis 194 from second pivot position 190 to first pivot position 188 is not coupled to movements of support wheels 100, each wheel 18, each support 88, and first receptacle 93.

Thus, during the transfer from the first operating mode 86 to the second operating mode 126 shown in FIG. 35, the handle 20 is moved one or more times from the first pivot position 188 to the second pivot position 190 or between the first and second pivot positions 188, 190. In this process, the support wheels 100 are pivoted from the folded position 118 to the unfolded position 120, the receiver 94 is pivoted from the transport position 108 to the loading position 110, the wheels 18 are pivoted from the first unfolded position 78 to the second unfolded position 132, and the supports 88 are pivoted from the unfolded position 92 to the folded back position. In addition, the second toggle lever 165 is stretched in the process.

Figure 36:
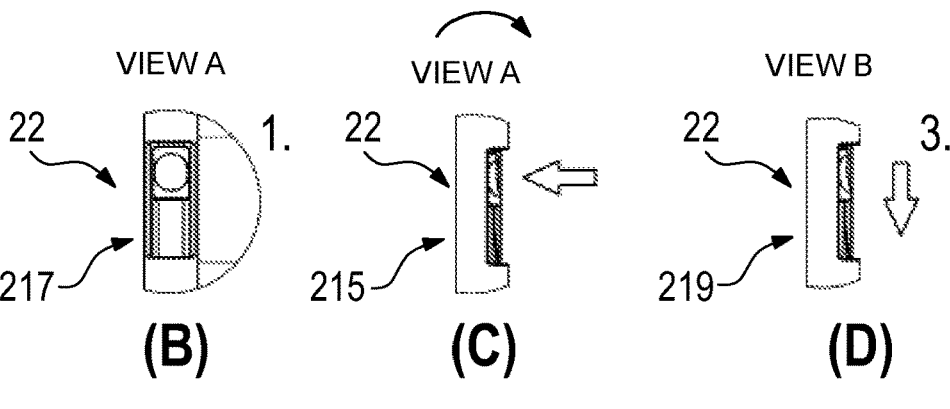
FIGS. 36A, 36B, 36C and 36D are a side view of the transport cart from FIG. 19 during transformation to the second operating mode with transport boxes as well as detailed views of the actuation.

In FIG. 36, the transformation, in particular the transfer, from the first operating mode 86 to the second operating mode 126 is described in more detail. The first actuating element 22 can be arranged in a locking position 217, a free rotation position 215, and a coupling position 219. In the locking position 217, the first actuating element 22 is not actuated. In the free-rotation position 215, the first actuating element 22 is transferred by the actuating element 22 being pressed in. In the coupling position 219, the first actuating element 22 is transferred by the actuating element 22 being displaced laterally.

As previously described, the handle 20 is pivotally mounted to the base assembly 14 via a coupling mechanism 192 about the pivot axis 194 that is parallel to the x-direction. The coupling mechanism 192 is coupled to the actuating member 22. As will be explained below with reference to FIGS. 39 to 41, the coupling mechanism 192 is arranged in a locking state 216 in which the handle 20 cannot be pivoted with respect to the base assembly 14, a coupling state 218 in which the handle 20 can be pivoted with respect to the base assembly 14 and pivotal movement of the handle 20 can be transmitted, and a free-rotation state 214 in which the handle 20 can be pivoted with respect to the base assembly 14 and pivotal movement of the handle 20 cannot be transmitted. The coupling mechanism 192 assumes the locking state 216 when the first actuating member 22 is moved to the locking position 217. The coupling mechanism 192 assumes the coupling state 218 when the first actuating member 22 is placed in the coupling position 219. The coupling mechanism 192 assumes the free rotation state 214 when the first actuating element 22 is brought into the free rotation position 215. Preferably, the coupling mechanism 192 is biased to the locking position 216.

When transferring the transport cart 10 from the first operating mode 86 to the second operating mode 126, first, as shown in view (B) and (C) of FIG. 36, the first actuating element 22 is transferred from the locking position 217 to the free-rotation position 215 to allow the handle 20 to pivot about the pivot axis 194, for example to the first pivot position 188. Then, as shown in view (D) of FIG. 36, the first actuating element 22 is transferred to the coupling position 219 so that the pivoting movement can be transmitted and used to transform the transport cart 10. Thereafter, the handle 20 is moved one or more times from the first pivot position 188 to the second pivot position 190 or between the first and second pivot positions 188, 190 to transform the transport cart 10 from the first operating mode 86 to the second operating mode 126. Finally, the actuating member 22 is moved to the locking position 217 so that the handle 20 can no longer be pivoted.

Figure 37:
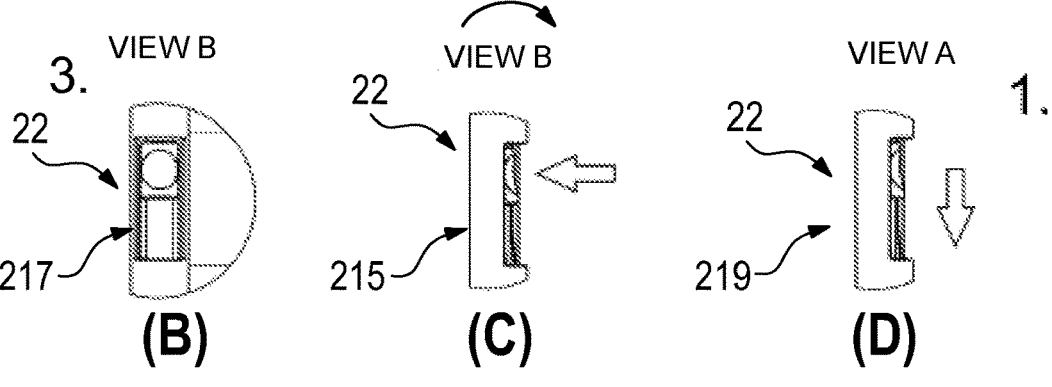
FIGS. 37A, 37B, 37C and 37D are a side view of the transport cart from FIG. 19 during transformation to the first operating mode with transport boxes as well as detailed views of the actuation.

In FIG. 37, it is shown how the transport cart is transferred from the second operating mode 126 to the first operating mode 86. In this process, as described in view (D) of FIG. 37, the actuating element 22 is first transferred or brought from the locking position 217 to the coupling position 219, whereby a pivoting movement of the handle 20 can be transmitted via the coupling mechanism 192. Then, the handle 20 is moved one or more times from the first pivot position 188 to the second pivot position 190 or between the first and second pivot positions 188, 190. In this process, the support wheels 100 are pivoted from the unfolded position 120 to the folded position 118, the receiver 94 is pivoted from the loading position 110 to the transport position 108, the wheels 18 are pivoted from the second unfolded position 132 to the first unfolded position 78, and the supports 88 are pivoted from the folded back position 134 to the unfolded position 92. In addition, the second toggle 165 is bent in the process. Then, as shown in views (B) and (C), the actuating element 22 is transferred to the free rotation position 215 so that the handle 20 can be pivoted to the unfolded position 106. Finally, the actuating element 22 is transferred to the locking position 217 so that the handle 20 can no longer be pivoted.

The handle 20 may further include a locking device that holds the first actuator 22 in the coupling position 219 or the coupling mechanism in the coupled state until the first mode of operation 86 or the second mode of operation 126 is reached during transfer of the transport cart 10.

Figure 38:
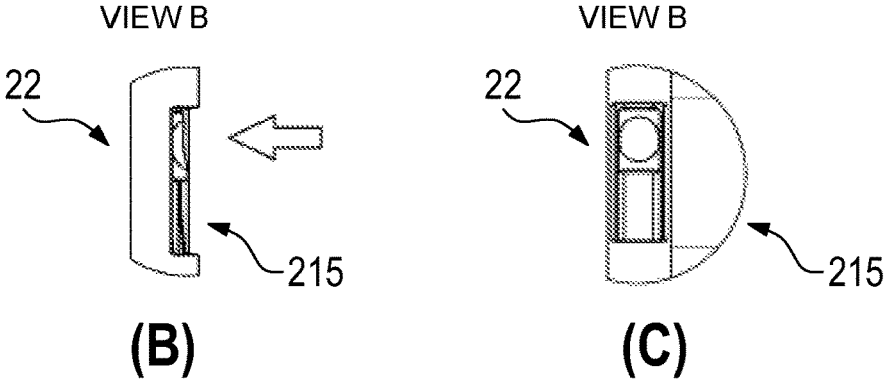
FIGS. 38A, 38B and 38C are a side view of the transport cart from FIG. 19 when adjusting the handle height as well as detailed views of the actuation.

FIG. 38 again shows how the handle height of the handle 20 can be adjusted when the transport cart 10 is arranged in the second operating mode. To do this, as shown in views (B) and (C) of FIG. 38, the first actuating element 22 is first moved from the locking position 217 to the free-rotation position 219 so that the handle 20 can be pivoted relative to the base assembly 14 about the pivot axis 194 to set the desired handle height. Since the pivot axis 194 is parallel to the x-direction, the pivot axis 194 is a horizontal axis. Thus, by pivoting the handle 20 about the pivot axis 194, the handle height can be adjusted. Finally, the actuating element 22 is transferred to the locking position 217 so that the handle 20 can no longer be pivoted.

Figure 39:
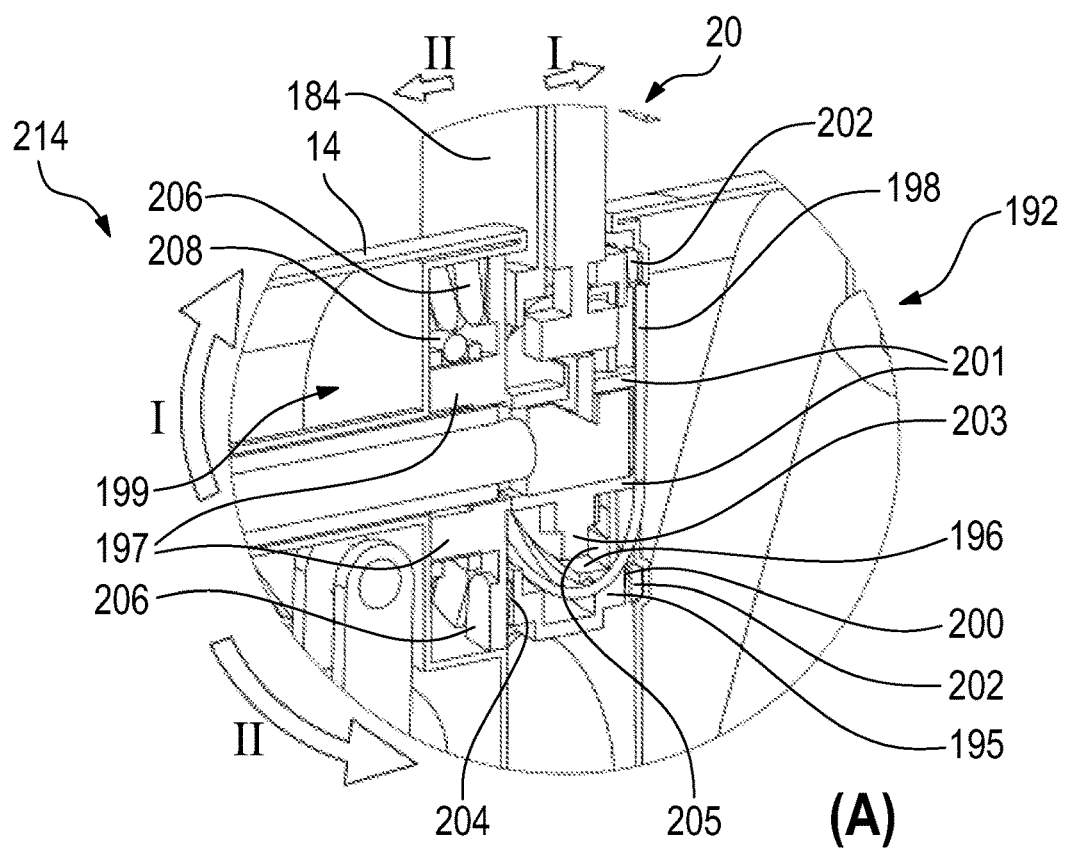
FIGS. 39A and 39B are two sectional views of an embodiment of a coupling mechanism in a free-rotation position.
Figure 39:
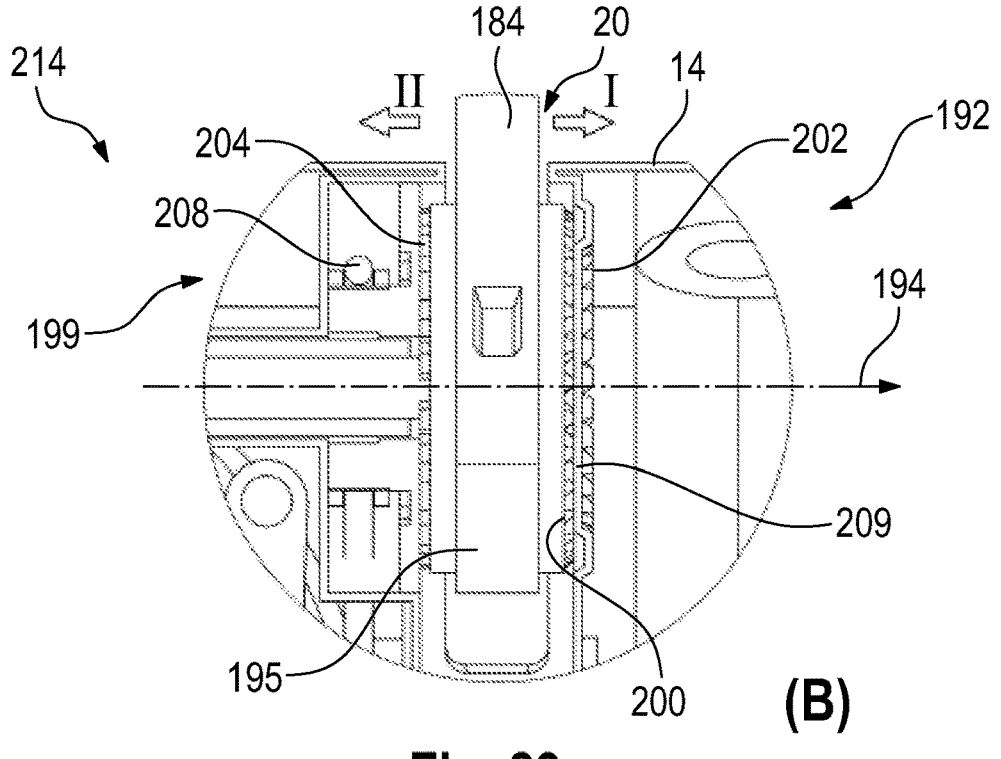
Figure 40:
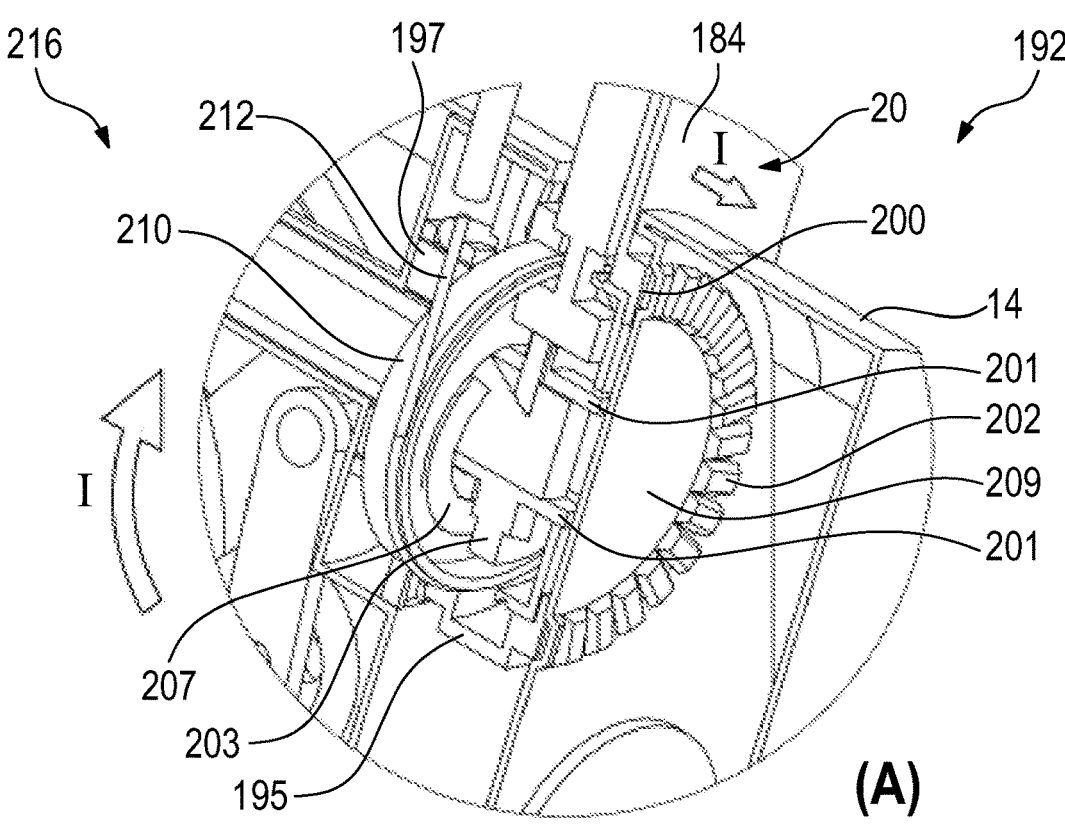
FIGS. 40A and 40B are two sectional views of the coupling mechanism from FIG. 39 in a locking position.
Figure 40:
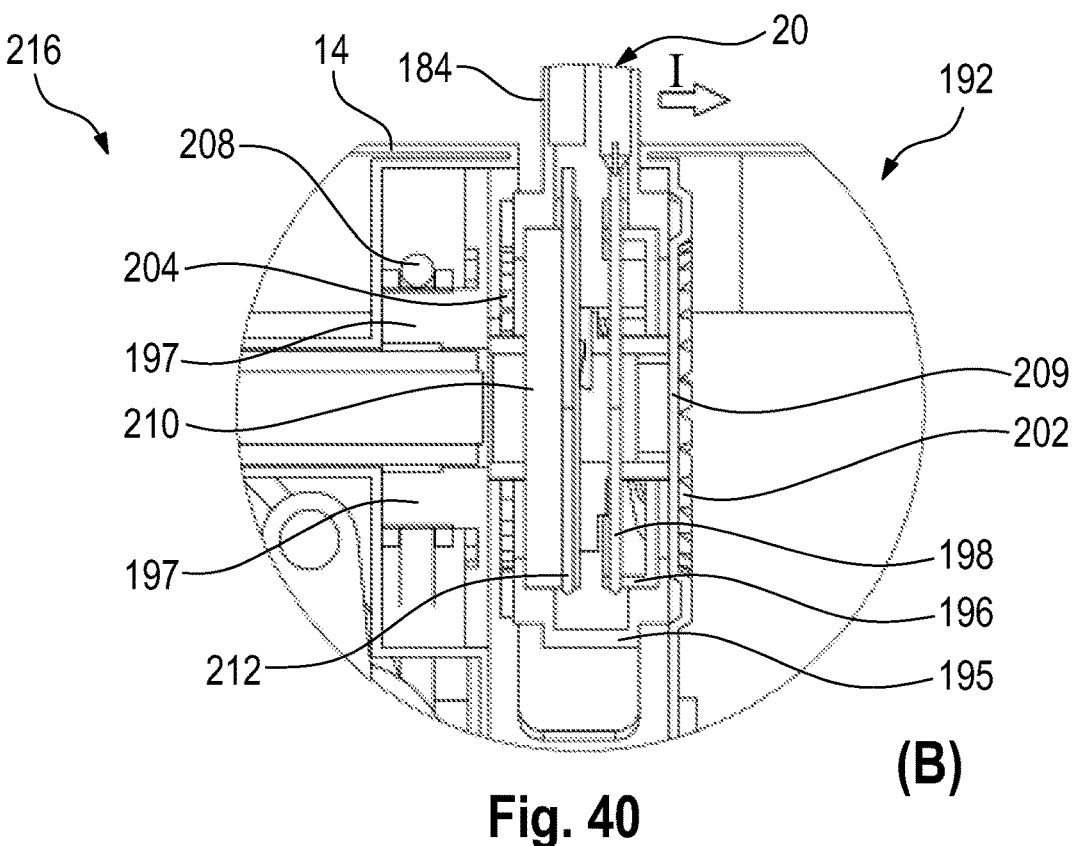
Figure 41:
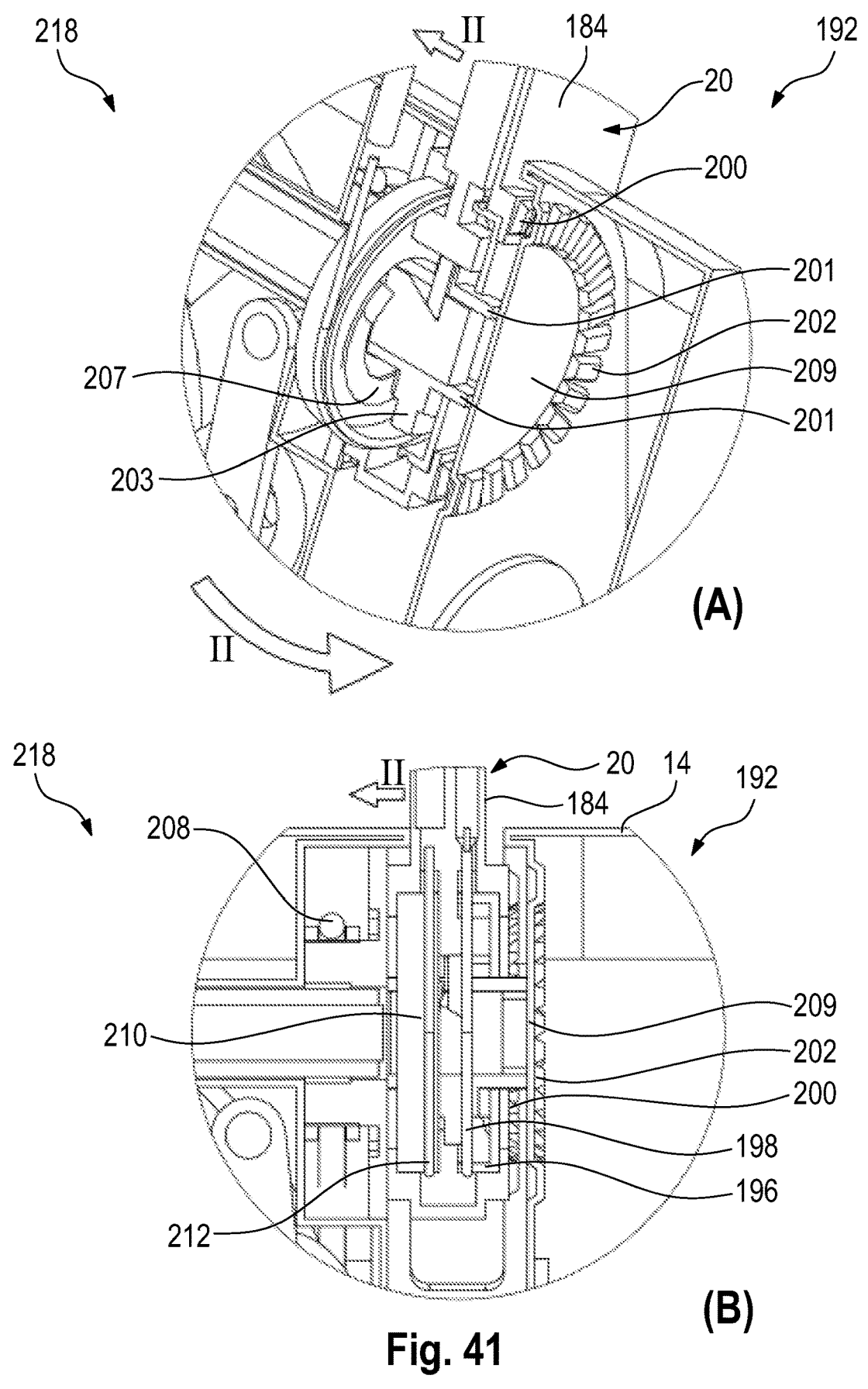

FIGS. 39 to 41 show in detail the coupling mechanism 192 of the transport cart 10. The base assembly 14 has such a coupling mechanism on each side at the top of each slide-in box 186.

The actuating element 22 is coupled to the coupling mechanism 192 via a first cable 198 and a second cable 212. The first cable pull 198 is tensioned when the actuating element 22 is moved to the free rotation position 215. The second cable pull 212 is tensioned when the actuating element 22 is transferred to the coupling position 219.

The coupling mechanism 192 has a base body 195. The base body 195 is fixedly or rigidly connected to a lower end of the handle extension 184 of the handle 20. The base body 195 is rotatably mounted in the base assembly 14 about the pivot axis 194. The base body 195 has first protrusions 200 on a first side and second protrusions 204 on a second side. the first side and the second side are arranged opposite each other in the x-direction. The first projections 200 and the second projections 204 are each symmetrically distributed about the pivot axis 194.

The base assembly 15 has a locking element 209. The locking element 209 is arranged in an axial direction of the pivot axis 194 on one side of the base assembly 195. The locking element 209 is rigidly connected to the base assembly. The locking element 209 includes first recesses 202 that are complementary in shape to the first protrusions 200. The projections 200 are thus arranged on the side of the base assembly 195 facing the locking element 209. The first recesses 202 are also symmetrically distributed around the pivot axis 194. In particular, all the first projections 200 are of the same shape, each first recess 202 having a profile complementary to the first projections 200.

The coupling mechanism 192 can be coupled to an actuating element 197 of an actuating device 199, which is also rotatably mounted in the base assembly 14 about the pivot axis 194. The actuating element 197 is arranged in the axial direction of the pivot axis 194 on a side of the base body 195 opposite the locking element 209. In other words, the base body 195 is arranged between the actuating element 197 and the locking element 209 in the axial direction of the pivot axis 194.

The actuating member 197 includes second recesses 206 that are complementary in shape to the second projections 204. The second recesses 206 are also symmetrically distributed about the pivot axis 194. In particular, all of the second protrusions 204 are shaped the same, with each second recess 206 having a profile complementary to the second protrusions 204.

The coupling mechanism 192 further comprises a first profiled disk 196. The first profile pulley 196 is arranged coaxially with the pivot axis 194. The first pulley 198 is coupled to the first profiled pulley 196 so that a pulling motion of the pulley 198 is transmitted to a rotational motion of the profiled pulley 196 about the pivot axis 194.

The coupling mechanism 192 further comprises a second profile disc 210. The second profile pulley 210 is arranged coaxially with the pivot axis 194. The second cable 212 is coupled to the second profile pulley 210 so that a pulling movement of the cable 212 is transmitted to a rotational movement of the profile pulley 210 about the pivot axis 194.

The first and second profiled sheaves 196, 210 may each be biased by a respective spring means against the direction of pull of the cables 198, 212.

The first profile disc 196 and the second profile disc 210 are arranged in the base body. In other words, the base body 195 surrounds the profile discs 196, 210. The profile discs 196, 210 are rotatable relative to the base body 195 about the pivot axis 194. The first profile disc 196, the second profile disc 210 and the base body 195 are coupled together parallel to the pivot axis, preferably positively, so that the first profile disc 196, the second profile disc 210 and the base body 195 can be moved together parallel to the pivot axis 194.

The first and second profile discs 196, 210 are arranged at a distance from one another in the direction of the pivot axis 194, in particular next to one another. In particular, the first profile disc 196 is arranged closer to first recesses 202 than the second profile disc 210 and the second profile disc 210 is accordingly arranged closer to the second recesses 206 than the first profile disc 196.

The coupling mechanism 192 further comprises a sleeve 203 arranged coaxially with the pivot axis 194. The sleeve 203 is arranged in the base body 195. In other words, the base body 195 surrounds the sleeve 203, with the two profiled disks 196, 210 being arranged between the base body 195 and the sleeve 203. The sleeve is arranged between the actuating element 197 and the locking element 209 in the axial direction of the pivot axis 194 and abuts both the actuating element 197 and the locking element 209 in the axial direction of the pivot axis 194, so that the sleeve 203 is supported or held by the actuating element 197 and the locking element 209 in the axial direction of the pivot axis 194.

The sleeve 203 has a projection 205. The protrusion 205 is arranged on the side of the sleeve 203 facing away from the handle extension 184.

An inner profile of the first profile disc 196 facing the sleeve 203 has a first threaded section 205. The threaded portion 205 extends in a circumferential direction about the pivot axis 194 partially along the inner profile of the first profiled washer 196. The threaded portion 205 has a pitch in the axial direction of the pivot axis 194. In other words, the threaded portion 205 is formed as a circumferential ramp having a pitch in the axial direction of the pivot axis 194. The threaded portion 205 abuts on one side of the projection 203 in the axial direction of the pivot axis 194. When the first profiled washer 196 is rotated about the pivot axis 194 relative to the sleeve 203, the threaded section 205 is guided along the projection 203 so that the first profiled washer 196 is moved in the axial direction of the pivot axis 194.

An inner profile of the second profile disc 210 facing the sleeve 203 has a second threaded section 207. The threaded portion 207 extends in a circumferential direction about the pivot axis 194 partially along the inner profile of the second profile disc 210. The threaded portion 207 has a pitch in the axial direction of the pivot axis 194. In other words, the threaded portion 207 is formed as a circumferential ramp having a pitch in the axial direction of the pivot axis 194. The second threaded portion 207 abuts a side of the projection 203 opposite the first threaded portion 205 in the axial direction of the pivot axis 194. When the second profiled washer 210 is rotated about the pivot axis 194 relative to the sleeve 203, the threaded portion 205 is guided along the protrusion 203 so that the second profiled washer 210 is moved in the axial direction of the pivot axis 194.

The pitches of the thread sections 205, 207 run in the same direction, in particular with the same sign. This ensures that a rotation of one of the profile disks 196, 210 relative to the sleeve 203 displaces the corresponding profile disk 196, 210 in the axial direction of the pivot axis 194. Due to the axial coupling of the profiled disks 196, 210 with the base body 195, the base body 195 is thereby also displaced in the axial direction of the pivot axis 194.

The pitch of each threaded section 205, 207 are selected such that when the corresponding cable 198, 212 is pulled, the base body is displaced in the axial direction of the pivot axis 194 by the locking element 209 in the direction of the actuating element 197.

The pitch of the threaded section 207 is greater than the pitch of the threaded section 205. As a result, a rotation of the second profiled washer 210 about the pivot axis 194 displaces the base body 195 further in the axial direction of the pivot axis 194 in the direction of the actuating element 197 than a rotation of the first profiled washer 196 about the pivot axis 194.

The base body 195 is biased into the locking state 216 via a spring device. The locking state 216 is shown in FIG. 40. In the locking state 216, the first projections 200 of the base body 195 are in engagement with the first recesses 202 of the locking element 209 of the base assembly 14, with the second projections 204 of the base body 195 being out of engagement with the second recesses 206 of the actuating element 197. The base body 195 and, in particular, also the handle 20 are thereby coupled together in a rotationally fixed manner with respect to the pivot axis 194 so that the handle 20 cannot be pivoted about the pivot axis 194 relative to the base assembly 14.

In order to transfer the base body 195 from the locking state 216 to the free rotation state 214, the first actuating element 22 is transferred from the locking position 217 to the free rotation position 215. In this process, the first cable 198 is pulled, causing the profiled pulley 196 to rotate. In the process, the profile disc 196 and the base body 195 are pushed by the locking element 209 in the direction of the actuating element 197, so that both the first projections 200 are disengaged from the first recesses 202 and the second projections are disengaged from the second recesses 206.

In FIG. 39, the base body 195 is arranged in the free rotation state 214. In the free-rotation state 214, the first projections 200 of the base body 195 are disengaged from the first recesses 202 of the locking element 209 of the base assembly 14, and the second projections 204 of the base body 195 are also disengaged from the second recesses 206 of the actuating element 197. As a result, the base body 195 and, in particular, the handle 20 are rotatable with respect to the pivot axis 194 relative to the base assembly, so that the handle 20 cannot be pivoted about the pivot axis 194 relative to the base assembly 14.

In order to transfer the base body 195 from the locking state 216 or from the free rotation state 214 to the coupling state 218, the first actuating element 22 is transferred from the locking position 217 or from the free rotation position 215 to the coupling position 219. In the process, the second cable 212 is pulled, causing the profiled pulley 210 to rotate. In the process, the profile disc 210 and the base body 195 are pushed by the locking element 209 in the direction of the actuating element 197, so that both the first projections 200 are disengaged from the first recesses 202 and the second projections are engaged from the second recesses 206.

In FIG. 41, the base body 195 is arranged in the coupling state 218. In the coupling state 218, the first projections 200 of the base body 195 are out of engagement with the first recesses 202 of the locking element 209 of the base assembly 14. Instead, the second projections 204 of the base body 195 are in engagement with the second recesses 206 of the actuating element 197. As a result, the base body 195 and, in particular, the handle 20 are rotatable with respect to the pivot axis 194 relative to the base assembly, so that the handle 20 cannot be pivoted about the pivot axis 194 relative to the base assembly 14. In addition, the base assembly 195 and the actuating element 197 are coupled together in a rotationally fixed manner with respect to the pivot axis 194 so that a pivoting movement of the handle 20 about the pivot axis 194 is transmitted to the actuating element 197.

The locking device disposed in the handle 20 may be configured to clamp the cable pull 212 such that the coupling mechanism 192 is held in the coupling state 219 until the first operating mode 86 or the second operating mode 126 is reached during transfer of the transport cart 10. The locking device is thereby activated when the first actuating element 22 is transferred to the coupling position 219. Such a locking device 290 and a corresponding unlocking device 280 for unlocking the locking device 290 will be described in more detail with reference to FIGS. 49 and 50.

The actuating element 197 is coupled to one end of a cable pull 208 of the actuating device 199, so that the cable pull 208 is pulled or tensioned by a rotational movement of the actuating element 197 in a rotational direction about the rotational axis 194. The cable pull 208 is thereby pulled in a first direction of movement. The other end of the cable pull 208 is coupled to a spring means, which is tensioned when the cable pull 208 is pulled in the first direction of movement. If the actuating element 197 is rotated in the opposite direction of rotation, the cable pull 208 is relaxed and pulled in the opposite direction of movement by the restoring force of the spring device. The cable pull 208 is thus moved either in or against the first direction of movement, depending on the direction of rotation of the actuating element 197.

As previously described, a coupling mechanism 192 is disposed on each side of the base assembly 14 that couples to the respective handle extension 184 of the handle 20. Thus, each coupling mechanism 192 is coupled to a corresponding pulley 208. The two coupling mechanisms 192 are identically configured so that the two cable pulls 208 are moved equally when the handle 20 is pivoted relative to the base assembly. They can be brought together in the base assembly 14 via a coupling element. This is described in more detail below with reference to FIG. 43, for example.

The cable pull 208 are coupled in common with a motion conversion device 264, which is described in detail below with reference to FIGS. 42 through 51.

The actuating device 199 further comprises the motion conversion device 264. The motion conversion device 264 is configured to convert a motion of each cable pull 208 in the first direction of movement into a second motion, by means of which the transformation between the first mode of operation 86 and the second mode of operation 126 is performed. The second movement thus drives the pivoting movements of the support wheels 100 and the first receptacle 93.

Further, the actuating device 199 may include a translation device 220. Embodiments of a transmission device 220 are shown, for example, in FIGS. 42 and 43. The transmission device 220 is coupled to the cable pulls 208 and converts a movement of the cable pulls into rotational movements of different strengths depending on the transmission ratio. The transmission ratio is determined by the force with which the cable pull 208 is pulled. In other words, the transmission device is configured to provide a corresponding transmission ratio depending on the force with which the cable pull 208 is pulled. The force to be applied depends, for example, on the weight of a transport box arranged in the first receptacle 93. The heavier the weight of the transport box, the greater the load acting on the cable pull 208 when transferring the first receptacle 93 between the transport position 108 and the loading position 110. The tensile force with which the cable pull 208 must be pulled is correspondingly greater.

Further, the actuating device 199 may include a freewheeling device. For example, the freewheeling device may be disposed between the translation device 220 and the motion conversion device 264. The freewheeling device may be configured to transmit a rotational movement of the translation device 220 corresponding to the first direction of movement to the movement conversion device 264, and to not transmit a rotational movement of the translation device 220 opposite to the first direction of movement to the movement conversion device 264.

Alternatively, the motion conversion device 264 may be coupled directly to the cable pull 208 via a freewheeling device, wherein the freewheeling device transmits only the motion of the cable pull 208 in the first direction of movement to the motion conversion device 264 and does not transmit the motion of the cable pull 208 opposite to the first direction of movement to the motion conversion device 264.

Figure 42:
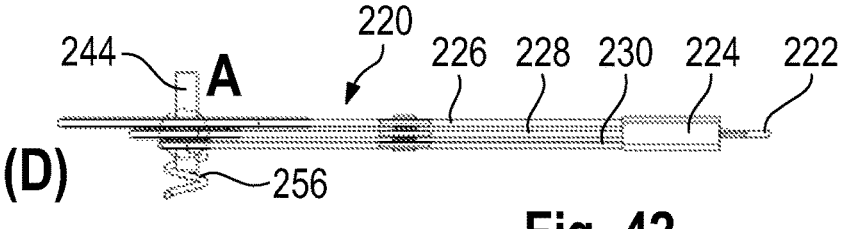
FIGS. 42A, 42B, 42C, 42D, 42E and 42F are various views of an embodiment of a coupling device.

FIG. 42 shows various views of a first embodiment of a translation device 220. Here, view (A) shows an exploded view of translation device 220, view (B) shows an isometric view of translation device 220, view (C) shows a side view of translation device 220, view (D) shows a top view of translation device 220, view (E) shows a detailed view of a disk 242 of translation device 220, and view (F) shows a detailed view of view (D) in which disks 238, 240, 242 of translation device 220 are shown enlarged.

The transmission device 220 includes a cable pull 222. The cable pull 222 is attached to a first side of a coupling member 224. The cable pull 222 is preferably coupled to the cable pull 208. For this purpose, the cable pull 222 may be connected to the cable pull 208 via another coupling element, for example.

The transmission device 220 further includes a first pull cable 226, a second pull cable 228, and a third pull cable 230. A first end of each pull cable 226, 228, 230 is respectively attached to a second side of the coupling member 224.

The transmission device 220 further comprises a first idler pulley 232, a second idler pulley 234, and a third idler pulley 236. The idler pulleys 232, 234, 236 are identically configured, share a common axis of rotation, and are arranged side-by-side in the direction of the axis of rotation. The first traction rope 226 is deflected around the first deflection pulley 232, the second traction rope 228 is deflected around the second deflection pulley 234, and the third traction rope 230 is deflected around the third deflection pulley 236. The three traction cables 226, 228, 230 run parallel to each other up to the deflection pulleys 232, 234, 236.

The translation device 220 further comprises a first disk 238, a second disk 240, and a third disk 242. The first disc 238 has a larger diameter than the second disc 240. The second disc 240 has a larger diameter than the third disc 242. The three discs 238, 240, 242 have a common axis of rotation and are arranged side by side in the direction of the axis of rotation. The three discs are rotatably mounted on an axis 244.

The first traction cable 226 is coupled to the first sheave 238. The second traction cable 228 is coupled to the second sheave 240. The third traction rope 230 is coupled to the third sheave 242. To this end, the three traction cables 226, 228, 230 are along the circumference of the respective sheave 238, 240, 242. A second end of the first traction cable 226 is attached to the first sheave 238. A second end of the second pull rope 228 is attached to the second sheave 240. The three traction cables 226, 228, 230 are coupled to respective sheaves 238, 240, 242 such that a traction motion of a traction cable is transmitted to a rotational motion of the corresponding sheave. Since the traction ropes 226, 228, 230 are pulled together due to the coupling by means of the coupling element 224 and the sheaves 238, 240, 242 each have different diameters, however, the sheaves 238, 240, 242 are rotated through different angles of rotation when the traction ropes 226, 228, 230 are pulled together. In particular, the angle of rotation of the first sheave 238 is less than the angle of rotation of the second sheave 240, and the angle of rotation of the second sheave 240 is less than the angle of rotation of the third sheave 242. The first sheave 238 may be coupled to the motion conversion device 264 via a freewheeling device.

The first disk 238 has recesses 246 on the side facing the second disk 240, the recesses 246 being distributed in the circumferential direction. The second disc 240 has projections 248 on the side facing the first disc 238, which are arranged and shaped complementarily to the recesses 246. The recesses 246 and the projections 248 are engageable with each other.

The second disc 240 has, on the side facing the third disc 242, recesses 250 arranged in a circumferentially distributed manner. The third disc 242 has projections 252 on the side facing the second disc 240, the projections 252 being arranged and shaped complementary to the recesses 250. The recesses 250 and the projections 252 are engageable with each other.

The transmission device 220 further includes a spring element 256, such as a coil spring, by means of which the three discs are urged together in the direction of the axis 244 so that the projections 248 and 252 are engaged with the corresponding recesses 246 and 250.

The transmission device 220 further includes another pulley 254. The third pull cable 230 extends from the coupling member 224 first to the third idler pulley 236, then to the third sheave 242, from the third sheave 242 to the idler pulley 254, and from the idler pulley 254 to a spring means not shown, a second end of the third pull cable being connected to the spring means. A pulling motion of the third pull cable 230 directed from the second end to the first end tensions the spring means.

As shown in view (E) of FIG. 42, the projections 248 and 252 each have a straight flank and an inclined flank. The straight flank and the oblique flank are arranged in the circumferential direction on opposite sides of the respective projection 248, 252, the oblique flanks being arranged upstream of the straight flank when the pulling ropes 228, 230 are pulled from the respective second end in the direction of the first end, in particular in the resulting direction of rotation of the respective sheave.

As previously described, when the traction cables 226, 228, 230 are pulled together, the third sheave 242 is rotated through a greater angle than the second sheave 240 and the second sheave 240 is rotated through a greater angle than the first sheave 238 due to the different diameters of the sheaves 238, 240, 242. Due to the coupling of the disks 238, 240, 242 via the respective projections 248, 252 and recesses 246, 250, the first and second disks 238, 240 are rotated via the third disk by the same angle as the third disk 242 so that the first and second pull ropes 226, 228 are relaxed during a rotational movement, in particular so that the first and second pull ropes 226, 228 sag.

If all sheaves 238, 240, 242 are coupled to each other, in particular via the projections 248, 252 and recesses 246, 250 in engagement with each other, a pulling movement is transmitted by the cable pull 222 via the third pull cable 230 and the third sheave 242 to a rotational movement of the first sheave 238. An angle of rotation of the rotational movement of the first sheave 238 and a pulling distance of the pulling movement of the cable pull 222 and the third cable pull 230, respectively, thereby have a third transmission ratio. The transmission ratio indicates the ratio of the angle of rotation to the traction distance.

The formation of the projections 252 by means of an inclined flank ensures that, depending on the tensile force transmitted via the third pull cable 230, the third sheave 242 can be disengaged from that of the second sheave 240 against the biasing force of the spring element 256. Once the second and third sheaves 240, 242 are disengaged, the third sheave 242 is free to rotate and the second traction cable 228 is tensioned so that a traction motion is transmitted by the cable 222 through the second traction cable 228 and the second sheave 240 to a rotational motion of the first sheave 238. In this regard, a rotational angle of the rotational movement of the first sheave 238 and a traction distance of the traction movement of the cable pull 222 and the second cable pull 228, respectively, have a second transmission ratio that is smaller than the third transmission ratio.

The formation of the protrusions 248 by means of an inclined flank ensures that, depending on the tensile force transmitted through the second pull cable 228, when the third sheave 242 is disengaged from the second sheave 240, the second sheave 240 can be disengaged from that of the first sheave 238 against the biasing force of the spring element 256. Once the first and second sheaves are disengaged, the second sheave 240 is also free to rotate and the first traction cable 226 is slackened so that a traction movement by the cable 222 is transmitted to a rotational movement of the first sheave 238 via the first traction cable 226. A rotation angle of the rotational movement of the first sheave 238 and a pulling distance of the pulling movement of the cable pull 222 or the first cable pull 226 thereby have a first transmission ratio that is smaller than the second transmission ratio.

In this way, the transmission ratio of the transmission device 220 can be controlled automatically depending on the applied traction force acting on the cables.

Figure 43:
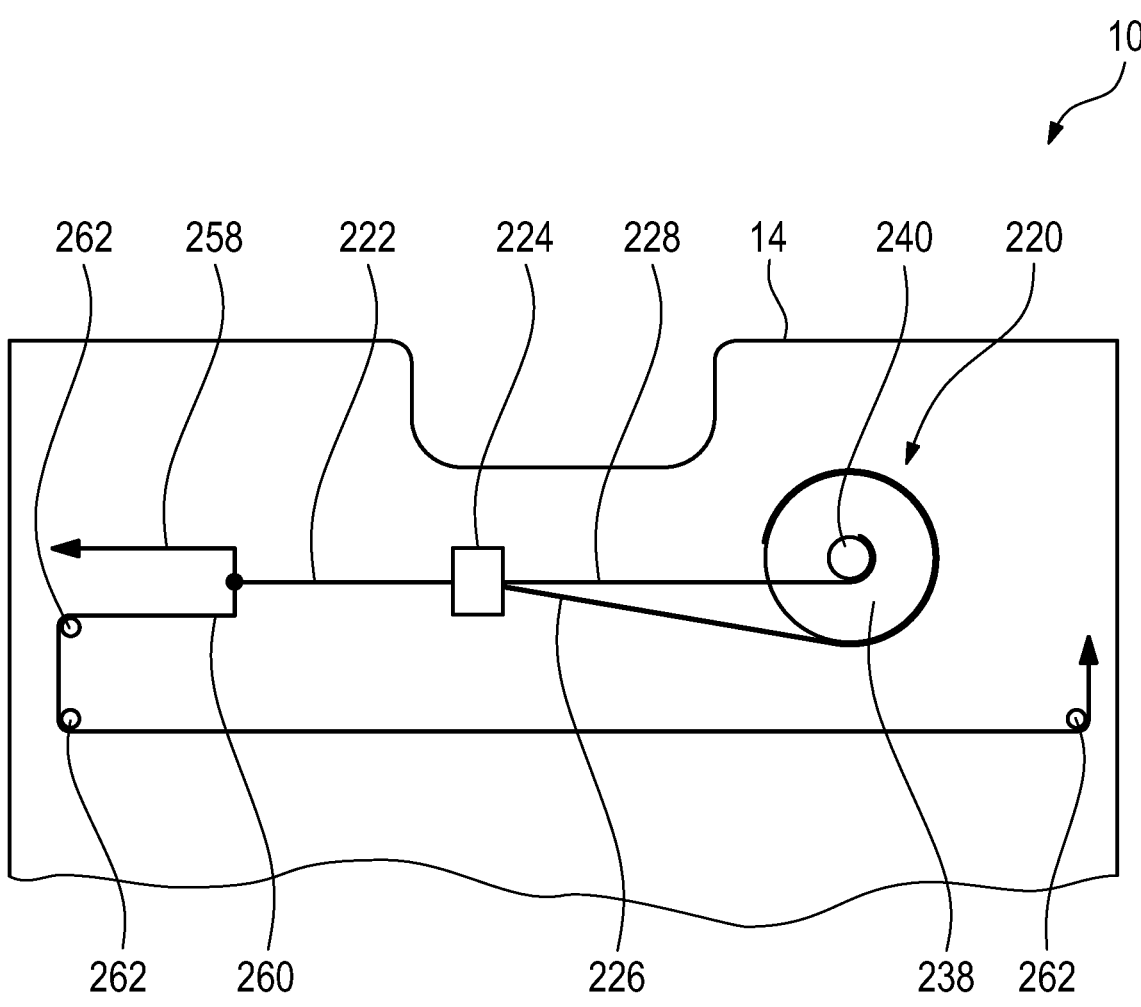
FIG. 43 is a schematic view of a coupling device in a basic assembly of the transport cart from FIG. 1.

FIG. 43 shows a second embodiment of a translation device 220' in a schematic representation. The translation device 220' is arranged in the base assembly 14, in particular in an upper part of the base assembly 14. The translation device 220' has substantially the same components as the translation device 220 of FIG. 42. The difference from the translation device 220 of FIG. 42 is that the translation device 220' has only two disks 238, 240 instead of three disks. In principle, any number of more than one disc may be provided, with the discs each being engageable with each other via complementarily shaped recesses and projections.

In FIG. 43, the cable pull 222 is connected to two cable pulls 258 and 260. For example, the cable pull 258 may correspond to the cable pull 208 of a first coupling mechanism 192 on one side of the base assembly 14 and the cable pull 260 may correspond to the cable pull 208 of a second coupling mechanism 192 on an opposite side of the base assembly 14. As shown in FIG. 43, one of the two cable pulls, in this case cable pull 260, may be guided to the opposite side of base assembly 14 by means of pulleys 262.

FIGS. 44 through 48 illustrate a first embodiment of a motion conversion device 264. The motion conversion device 264 includes a disc 266 and a lever 268. The disc is rotatably mounted in the base assembly 14 with respect to an axis of rotation.

The disc 266 is not rotationally symmetrical with respect to the axis of rotation. Instead, the disc 266 has a radial profile that changes along a circumferential direction of the disc 266. In other words, the radius of the disc 266 changes along the circumferential direction. The radial profile is preferably oval in shape and has an axis of symmetry. As a result, the radial profile is mirror symmetrical in shape. The oval radial profile intersects the axis of symmetry at a first point and a second point, wherein the first point has the smallest radius, in particular distance to the axis of rotation, and the second point has the largest radius. The two points are spaced 180° from each other about the axis of rotation. The radius increases steadily along the circumference of the disk 266 from the first point to the second point.

A first end of the lever 268 is pivotally mounted in the base assembly. The lever includes a wheel 270 rotatably supported on the lever 268 between the first end and a second end of the lever 268. The bearing point of the wheel 270 is located closer to the first end of the lever 268 than to the second end of the lever 268.

The wheel 270 abuts the circumferential surface of the disk 266. The wheel 270 is configured to roll along the circumferential surface of the disc 266 as the disc 266 rotates. Since the disc is oval in shape and thus the radial profile changes along the circumferential direction, the wheel is displaced in a radial direction with respect to the axis of rotation of the disc 266 when the disc 266 is rotated. This causes the lever to deflect or pivot about its mounting point in the base assembly 14. In other words, a pitch or slope of the radial profile of the disc 266 causes the lever to deflect when the disc is rotated. As a result, the lever 268 performs a pendulum or oscillating motion as the disc 266 is rotated.

The second end of the lever 268 is coupled to a first end of a cable 276. A second end of the cable pull 276 is coupled to a spring element. Depending on the deflection of the lever 268, the cable pull 276 is pulled or tensioned in a second direction of movement or released in opposition to the second direction of movement. When the cable pull 276 is tensioned, the spring element is also tensioned. When the cable pull 276 is released, the cable pull 276 is pulled against the second direction of movement due to the restoring force of the spring element. In other words, the reciprocating motion of the lever 268 causes the cable pull 276 to alternately move in and against the second direction of movement.

The disc 266 further has a crescent-shaped protrusion 272 on one side of the axis of symmetry, which also has the same radial profile on that side of the axis of symmetry. The lever 268 further comprises a braking protrusion 274. The braking protrusion 274 extends from the bearing point of the wheel 270 in the direction of the disc 266. The braking protrusion 274 is preferably semicircular in shape and extends in the direction of the disc 266 as far as the wheel 270. When the wheel is in contact with the side of the disc on which the crescent-shaped protrusion 272 is arranged, the braking protrusion 274 is in contact with the protrusion 272 and thus brakes the rolling of the wheel 270.

The pulley 266 is connected to the transmission device 220' via a freewheeling device, so that the pulley is driven in only one direction of rotation. In other words, a rotational movement of the actuating element 197 in the first direction of movement is transmitted to the pulley 266 via the cable 208, the transmission device 220' and the freewheeling device, whereas a rotational movement of the actuating element 197 against the first direction of movement is not transmitted to the pulley 266 due to the freewheeling of the freewheeling device.

Figure 44:
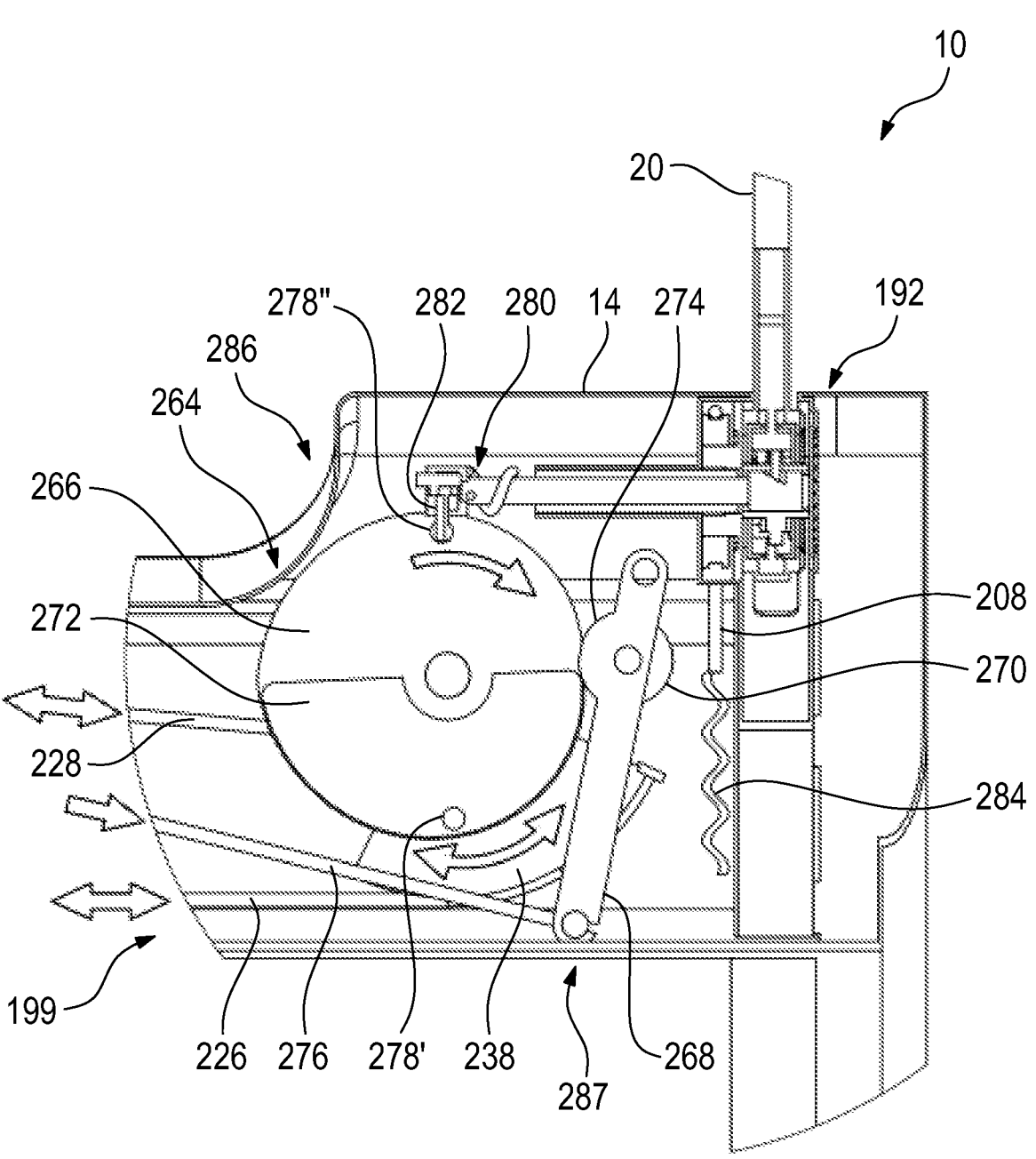
FIG. 44 is a schematic view of an embodiment of an actuating device in the base assembly of the transport cart from FIG. 1 in a first stop position.

In FIG. 44, the disk 266 is disposed in a first rotational position 286. In the first rotational position 286, the wheel 270 is disposed at the first point of the radial profile of the disc 266. The lever 268 is disposed in a first end position 287. The transport cart is disposed in the first mode of operation 86 when the disc 266 is disposed in the first rotational position 286.

Figure 45:
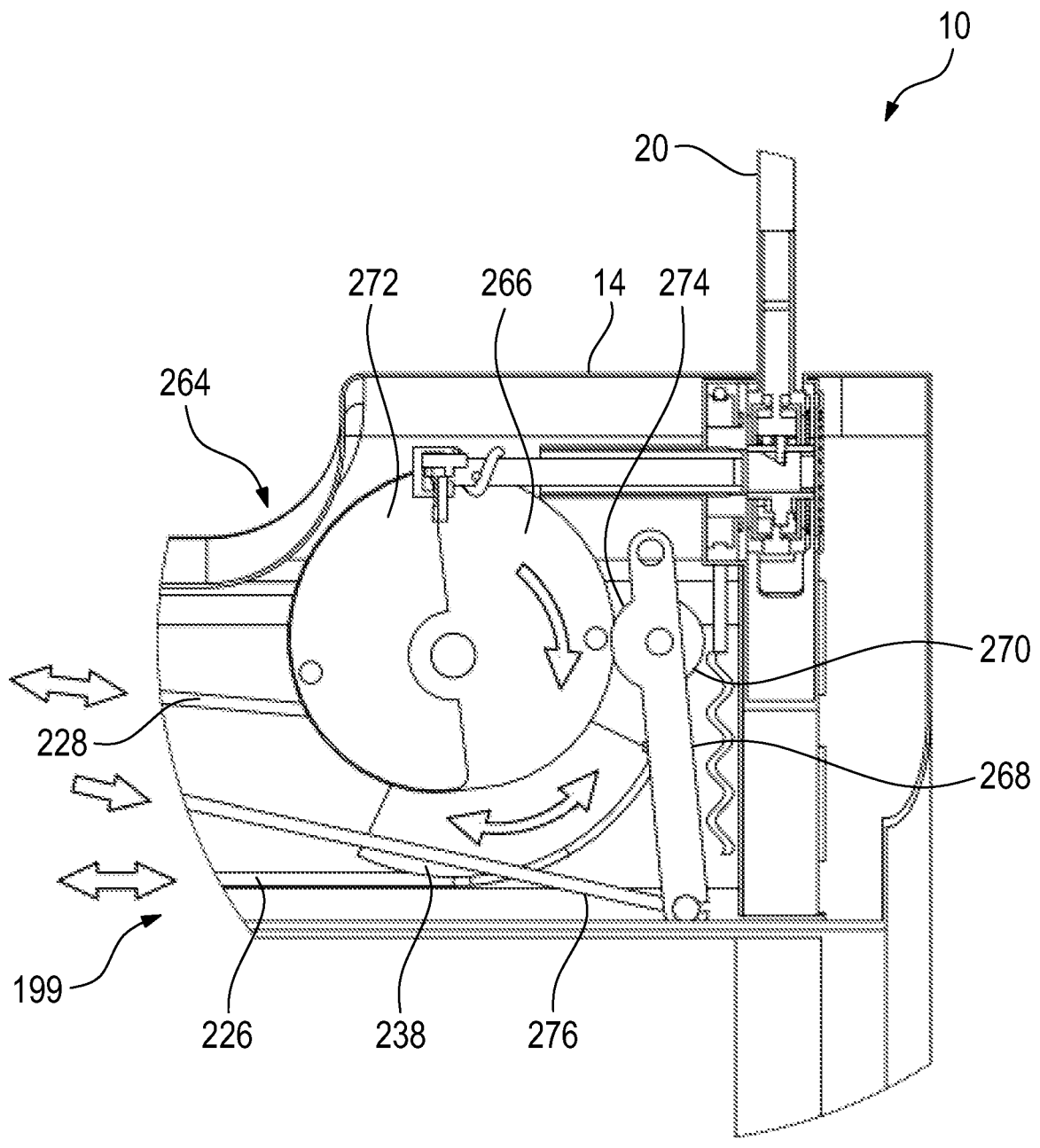
FIG. 45 is a schematic view of the actuating device of FIG. 44 between the first stop position and a second stop position.
Figure 46:
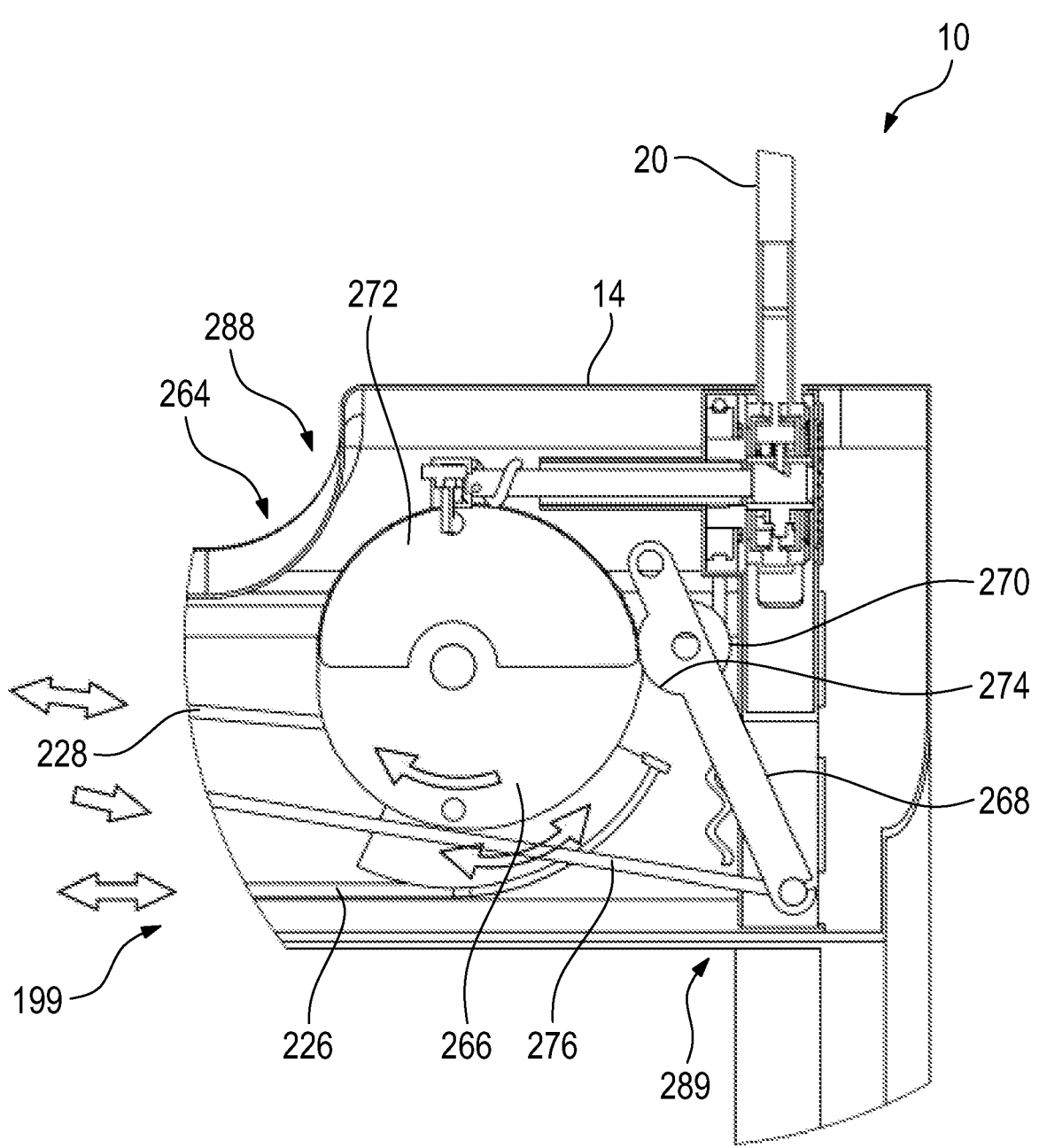
FIG. 46 is a schematic view of the actuating device of FIG. 44 between the second stop position and the first stop position.

In FIGS. 45 and 46, it is shown that the pulley 266 is rotated from the first rotational position 286 to a second rotational position 288 as it rotates in the direction of rotation. As this occurs, the lever 268 is given from the first end position 287 to a second end position 289, pulling the cable 276 in the second direction of movement. During this movement, the transport cart 10 is transferred from the first operating mode 86 to the second operating mode 126, wherein the support wheels and the first receptacle 9 are unfolded.

In FIG. 46, the disk 266 is disposed in the second rotational position 288. In the second rotational position 288, the wheel 270 is arranged at the second point of the radial profile of the disc 266. The lever 268 is disposed in the second end position 289. The transport cart is disposed in the second mode of operation 126 when the disc 266 is disposed in the second rotational position 288.

Figure 47:
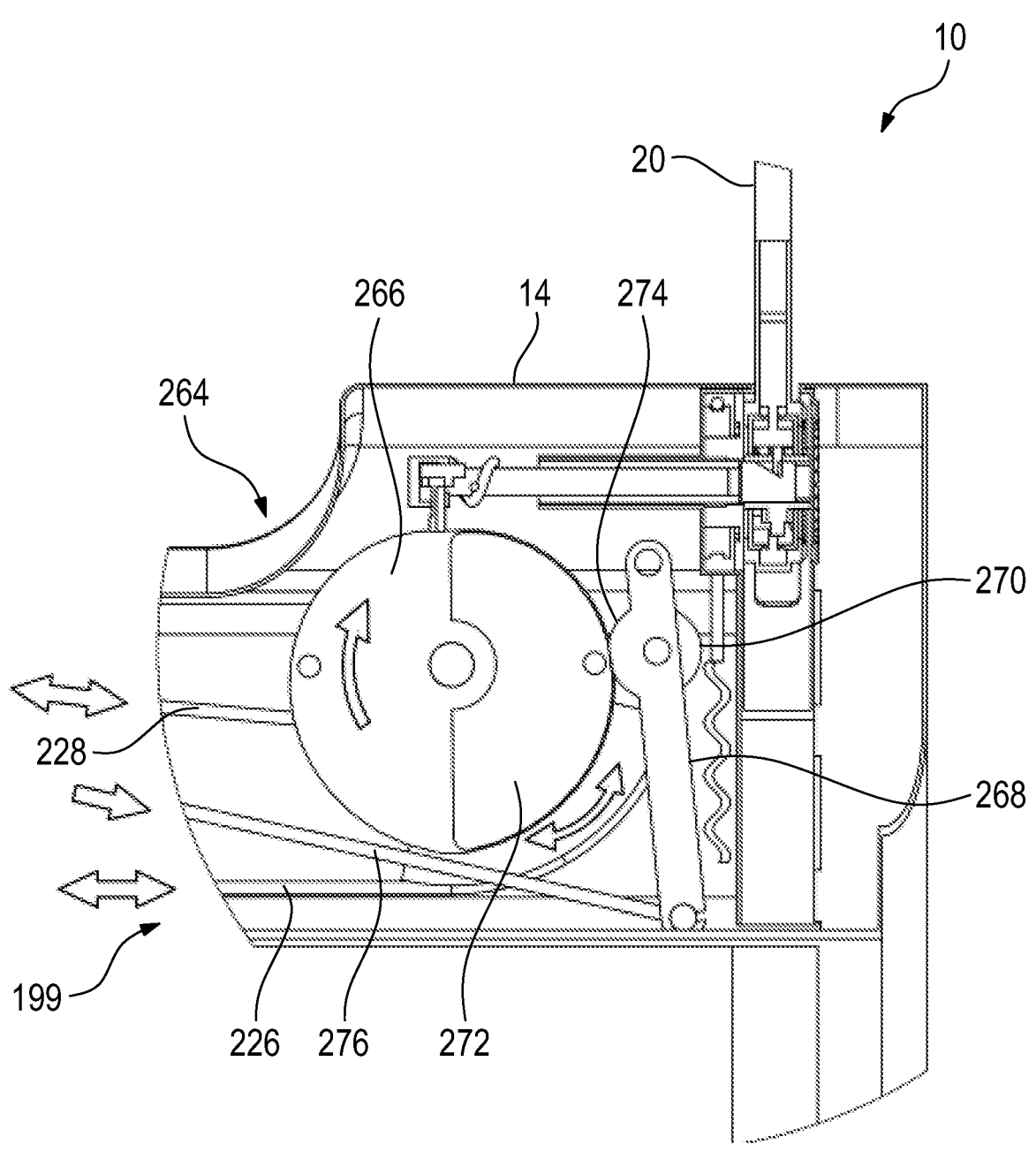
FIG. 47 is a schematic view of the actuating device of FIG. 44 in a first stop position.
Figure 48:
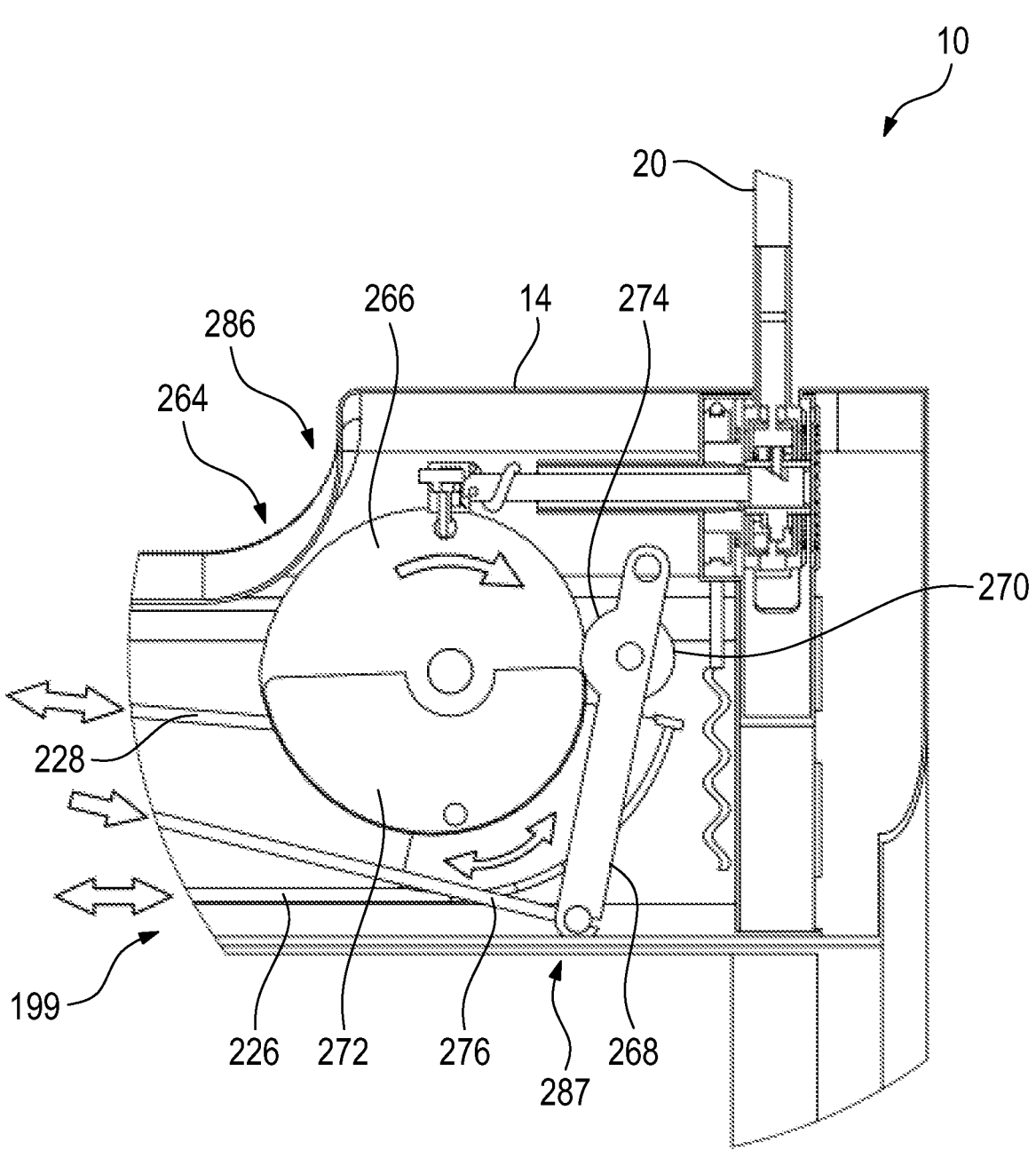
FIG. 48 is a schematic view of the actuating device of FIG. 44 in the first stop position.

FIGS. 47 and 48 show that the pulley 266 is rotated from the second rotational position 288 to the first rotational position 286 as it rotates in the direction of rotation. In this process, the lever 268 is given from the second end position 289 to the first end position 287, pulling the pulley 276 against the second direction of movement. During this movement, the transport cart 10 is transferred from the second mode of operation 126 to the first mode of operation 86, wherein the support wheels and the first receptacle 94 are folded. As the disc 266 rotates from the second rotational position 288 to the first rotational position 286, the brake protrusion 274 engages the elevation 272 to brake the rotational movement. Due to the weight of a transport box in the first receptacle 93, a pulling force may be exerted on the cable 276, which may be transmitted to the disc 266 via the lever 268 and the wheel 270. To avoid this, the brake protrusion 274 and the elevation 272 are provided. In the second rotational position 288, the brake protrusion 274 and the elevation 272 hold the disc 266 in the second rotational position 288 due to static friction and thus ensure that the transport cart is not transferred from the second operating position 126 to the first operating position 86 by itself due to a weight of a transport box. When rotating from the second rotational position 288 to the first rotational position 286, the brake protrusion 274 and the elevation 272 brake the rotational movement due to sliding friction, so that the rotational movement is not accelerated due to a weight of a transport box.

In FIG. 48, the disc 266 is again in the first rotational position 286, the lever 268 is in the first end position 287, and the transport cart 10 is in the first operating mode 86.

The motion conversion device 264 further includes first and second trunnions 278', 278". The two trunnions 278', 278" are also spaced 180° apart in the circumferential direction. The trunnions 278', 278" cooperate with an unlocking device 280 shown in detail in FIGS. 49 and 50.

The unlocking device 280 is configured to automatically return the first actuating element 22 to the locking position 217 when the turntable 266 reaches the first rotational position 286 or the second rotational position 288, with the transport cart in the first operating mode 86 or the second operating mode 126, respectively. For this purpose, the unlocking device 280 releases a corresponding lock of the locking device 290.

As previously described, the locking device 290 maintains the coupling mechanism 192 in the coupling state 219 by, for example, the locking device 290 clamping the pulley 212. The unlocking device 280 releases this lock when the turntable 266 reaches the first rotational position 286 or the second rotational position 288, particularly when the transport cart 10 reaches the first operational mode 86 or the second operational mode 126.

Figure 49:
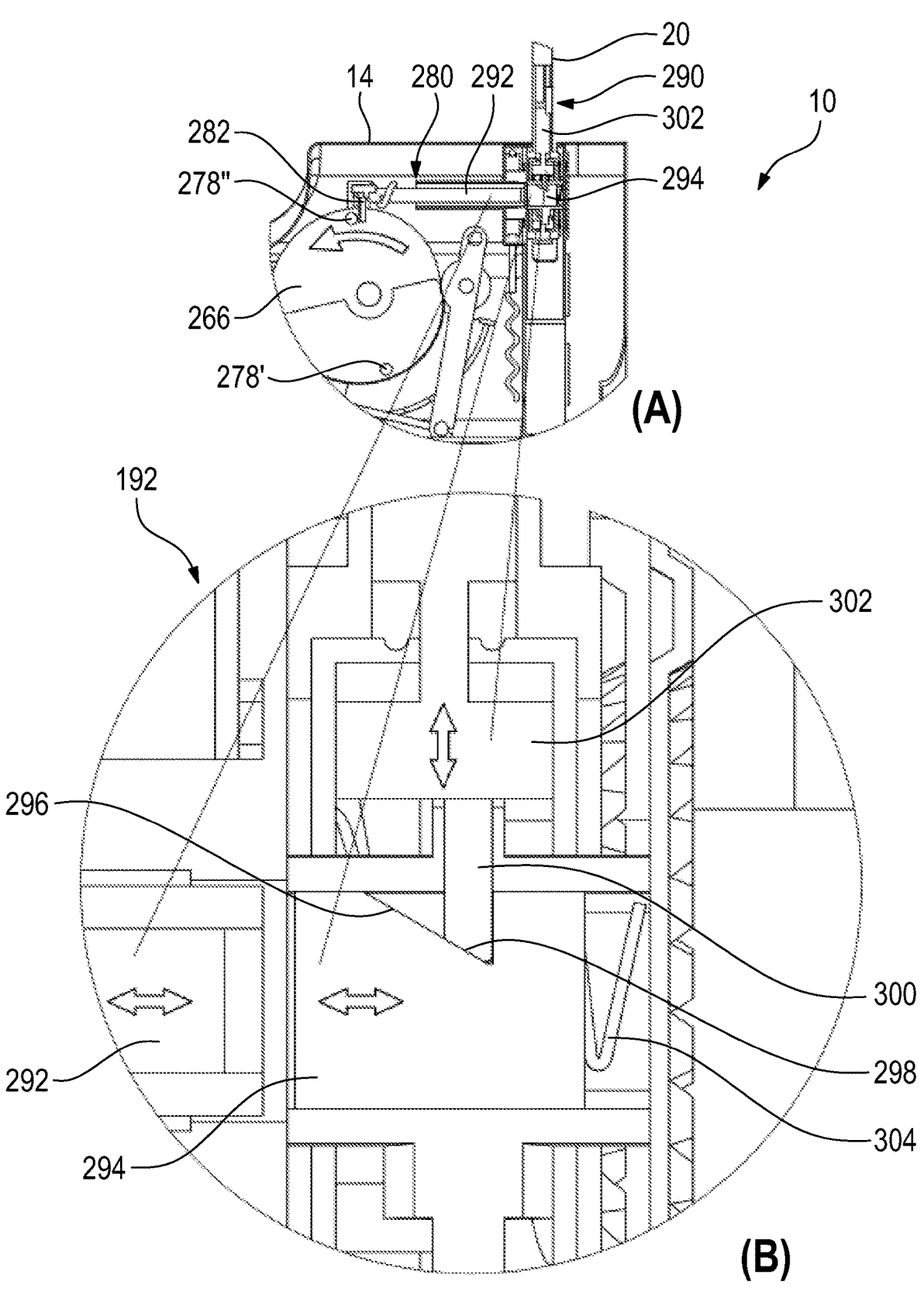
FIGS. 49A and 49B are a schematic view and a detailed view of an unlocking mechanism in the base assembly of the transport cart from FIG. 1.
Figure 50:
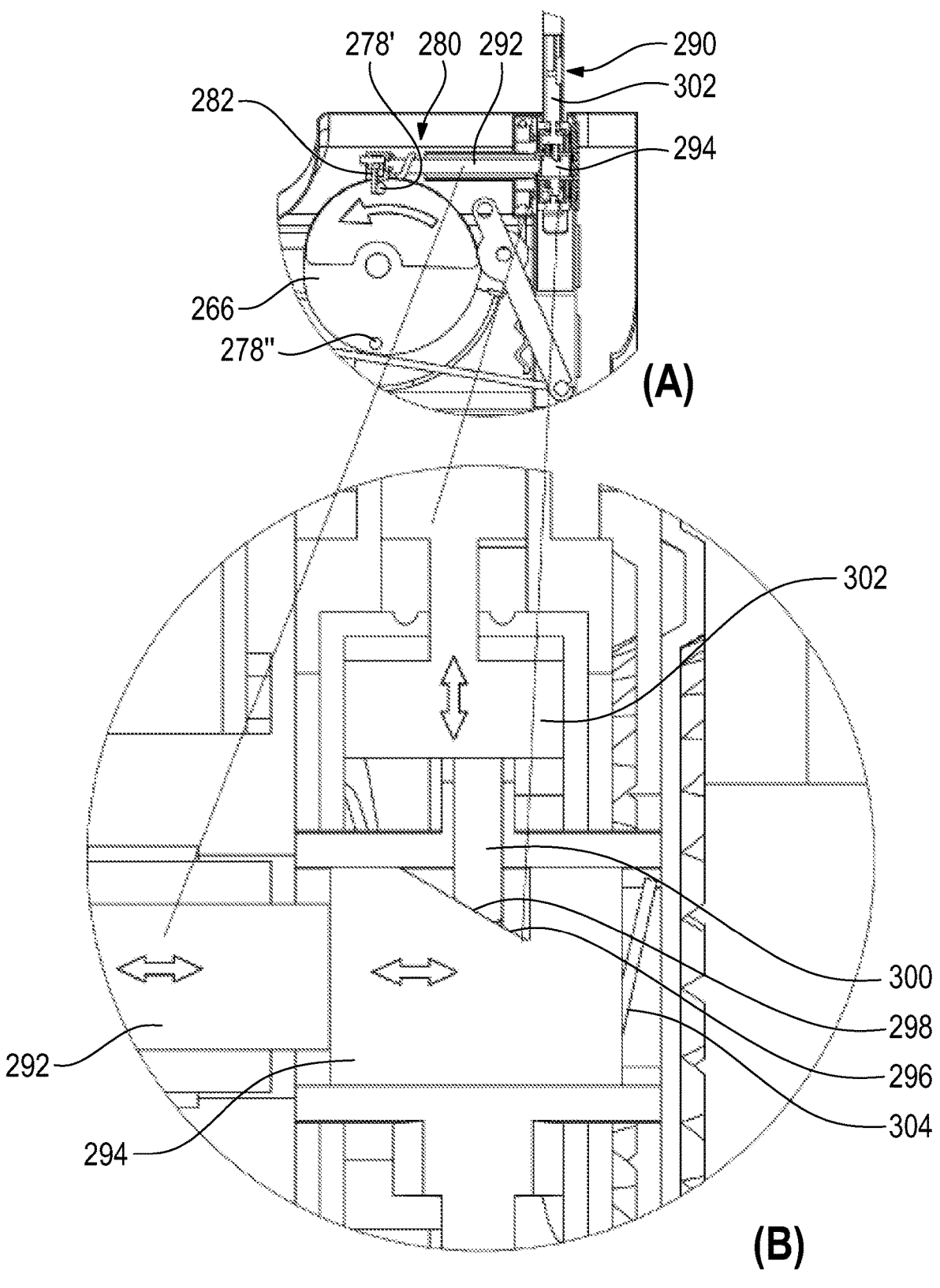
FIGS. 50A and 50B are a schematic view and a detailed view of the unlocking mechanism from FIG. 49 during unlocking.

To this end, the unlocking device 280 includes a flap 282 that can be moved by means of the pins 278 when one of the pins 278 is pressed or rotated against the flap 282. The flap 282 is in contact with a rod 292. The rod 292 is coaxially aligned with the pivot axis 194 of the coupling mechanism 192. The flap 282 is coupled to the rod 292 such that when the flap 282 is pushed to the side by a pivot, the flap 282 displaces the rod 292 parallel to the pivot axis 194 in the direction of the coupling mechanism 192. The rod 292 is coupled to a spring element. In a rest position of the spring element, the flap 282 is not deflected by one of the pivots 278 and, accordingly, the rod 292 is not displaced in the direction of the coupling mechanism 192. Thus, the spring element causes the flap 282 to be biased to an undeflected position. In FIGS. 49 and 50, the flap 282 is in the non-deflected position.

An unlocking element 302 is arranged in the handle extension 184 of the handle 20. The unlocking element 302 extends parallel to an extension direction of the handle extension 184 in the direction of the handle bar 182 and is arranged movably in this extension direction in the handle extension 184.

The rod 292 is coupled to the unlocking element 302 via a first deflection element 294 and a second deflection element 300. The rod 292 is thereby located at the first deflection element 294. The first deflection element 294 is movable parallel to the leg axis 194. The rod can thus move the first deflection element 294 parallel to the pivot axis 194. On the side of the first deflection element 294 opposite the rod 292, a spring element 304 is arranged to press the first deflection element 294 against the rod 292. The second deflecting element 300 is in contact with the unlocking element 302. The second deflection element 300 is arranged perpendicular to the pivot axis 194 and parallel to the direction of extension of the handle extension 184. The second deflection element 300 can thus displace the unlocking element parallel to the direction of extension of the handle extension 184. The unlocking element 302 may also be biased against the second deflecting element 300 by means of a spring element.

The first deflector element 294 has a first sloping flank 296 and the second deflector element 300 has a second sloping flank 298. The first sloping flank 296 and the second sloping flank 298 are shaped complementary to each other. The two deflection elements 294, 300 are coupled to each other via the inclined flanks 296, 298. In particular, this is also referred to as an inclined flank coupling. When the first deflection element 294 is displaced along the pivot axis, the second deflection element 300 is displaced perpendicular to the pivot axis 194, in particular parallel to the direction of extension of the handle extension 184.

The unlocking member 302 is coupled to the locking device 290 such that displacement of the unlocking member 302 releases the clamping of the locking device 290.

If the turntable now reaches the first or second rotational position 286 or 288, the corresponding pin 278 pushes the flap to the side and thus displaces the rod 292 parallel to the leg axis 194 in the direction of the first deflecting element 294. In the process, the first deflecting element 294 is also displaced so that the second deflecting element 300 is pushed in the direction of the unlocking element 302 via the inclined flank coupling. In the process, the unlocking element 302 is also displaced so that the clamping of the locking device 290 is released. As a result, the cable 212 is released again and the first actuating element 22 is transferred back to the free rotation position 215 or the locking position 217, so that the coupling mechanism 192 is no longer arranged in the coupling state 218.

Figure 51:
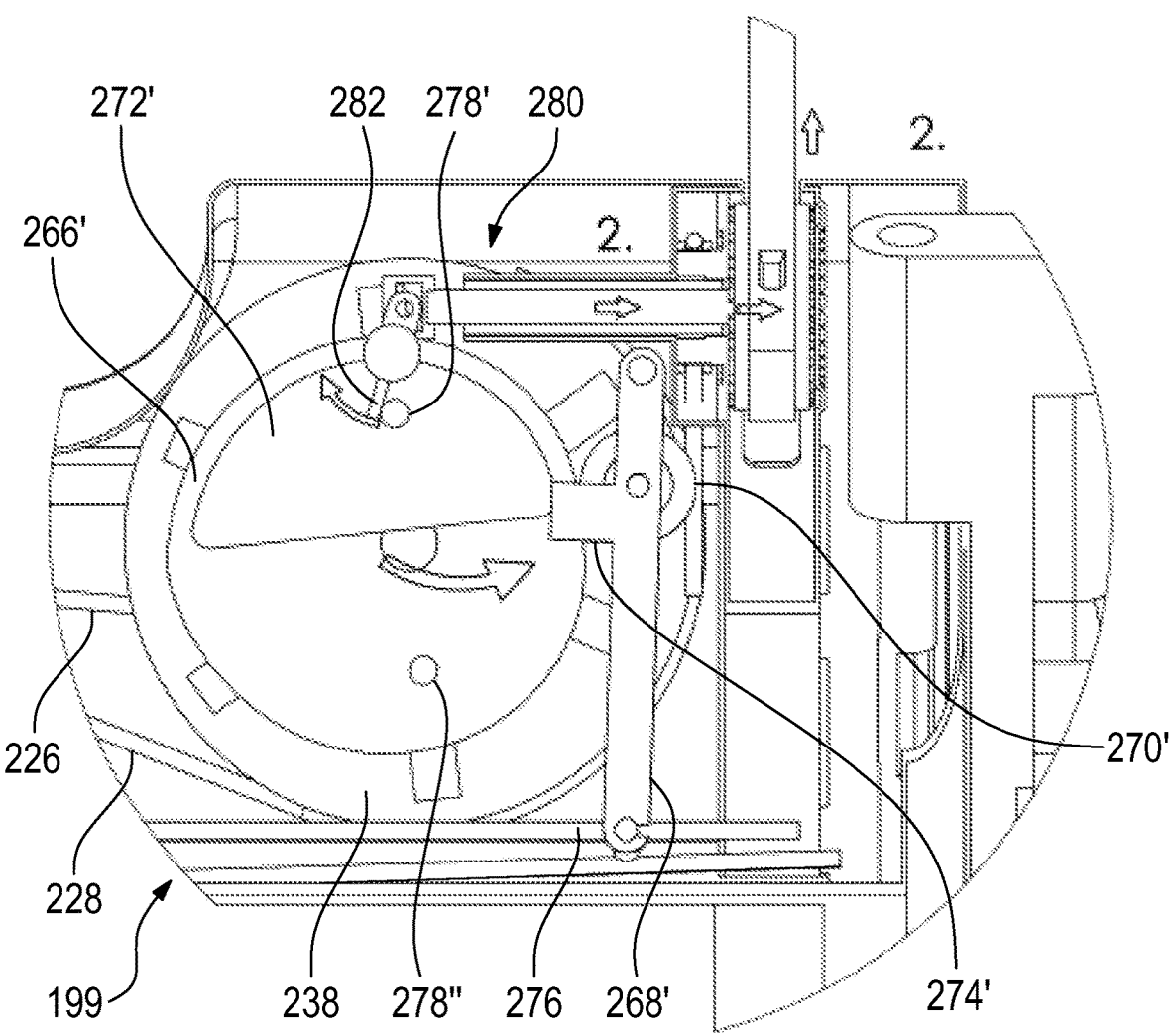
FIG. 51 is another embodiment of an actuating device.

FIG. 51 shows a second embodiment of a motion conversion device 264'. The motion conversion device 264' has basically the same structure as the motion conversion device 264. The difference lies in the different design of the lever 268 and the disk 266. In particular, the brake protrusion 274' of the lever 268' is not semicircular but angular. Further, the brake protrusion 274' extends further towards the disc 266' than the wheel 270'. The protrusion 272' has a radial profile that is distinct from the disc 266', the protrusion being offset inwardly by the same length with respect to the axis of rotation that the braking protrusion 274' extends further toward the disc 266' than the wheel 270'.

Figure 52:
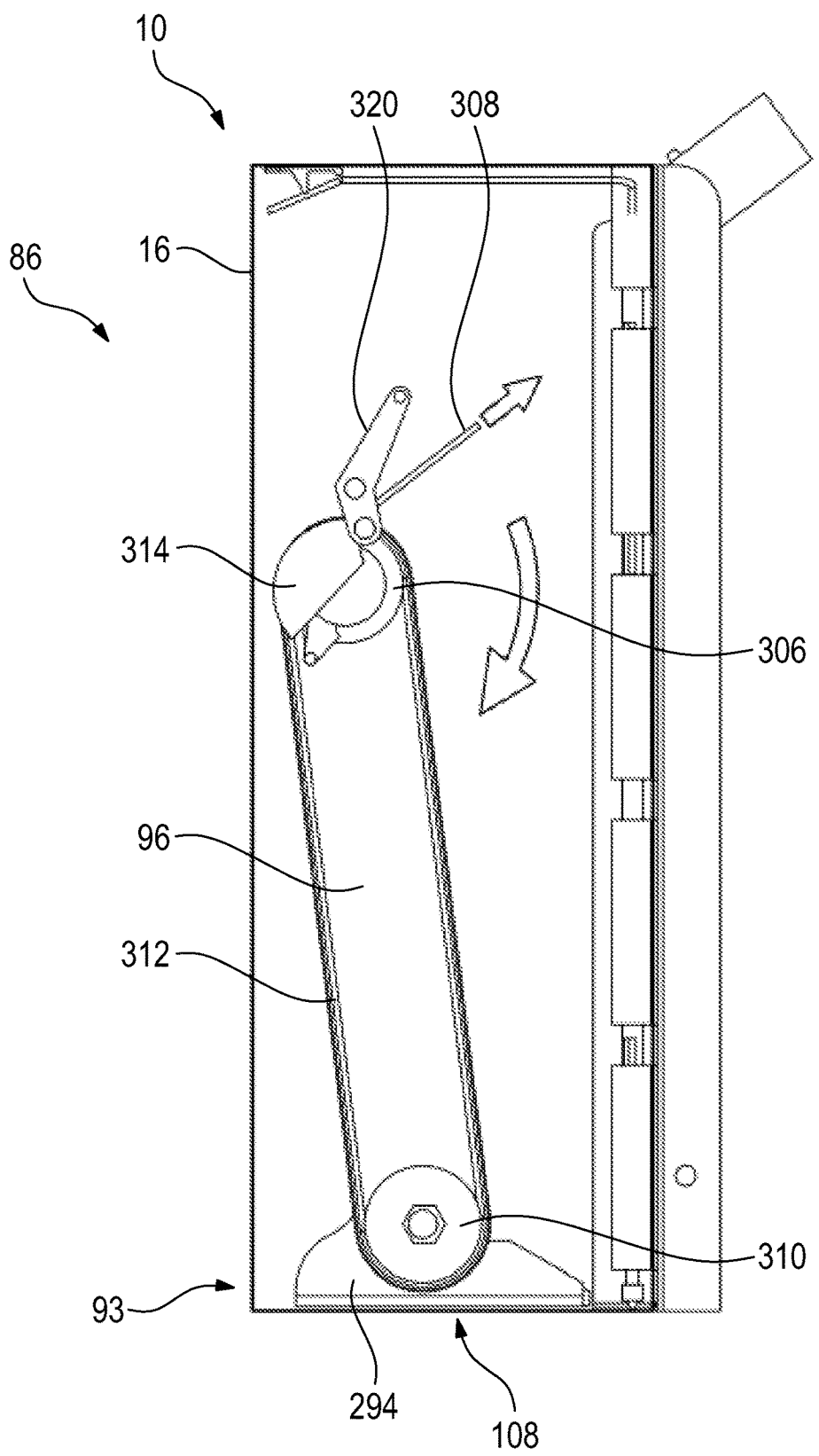
FIG. 52 is an embodiment of a transfer mechanism of a receptacle of the transport cart of FIG. 1 in the transport position.
Figure 53:
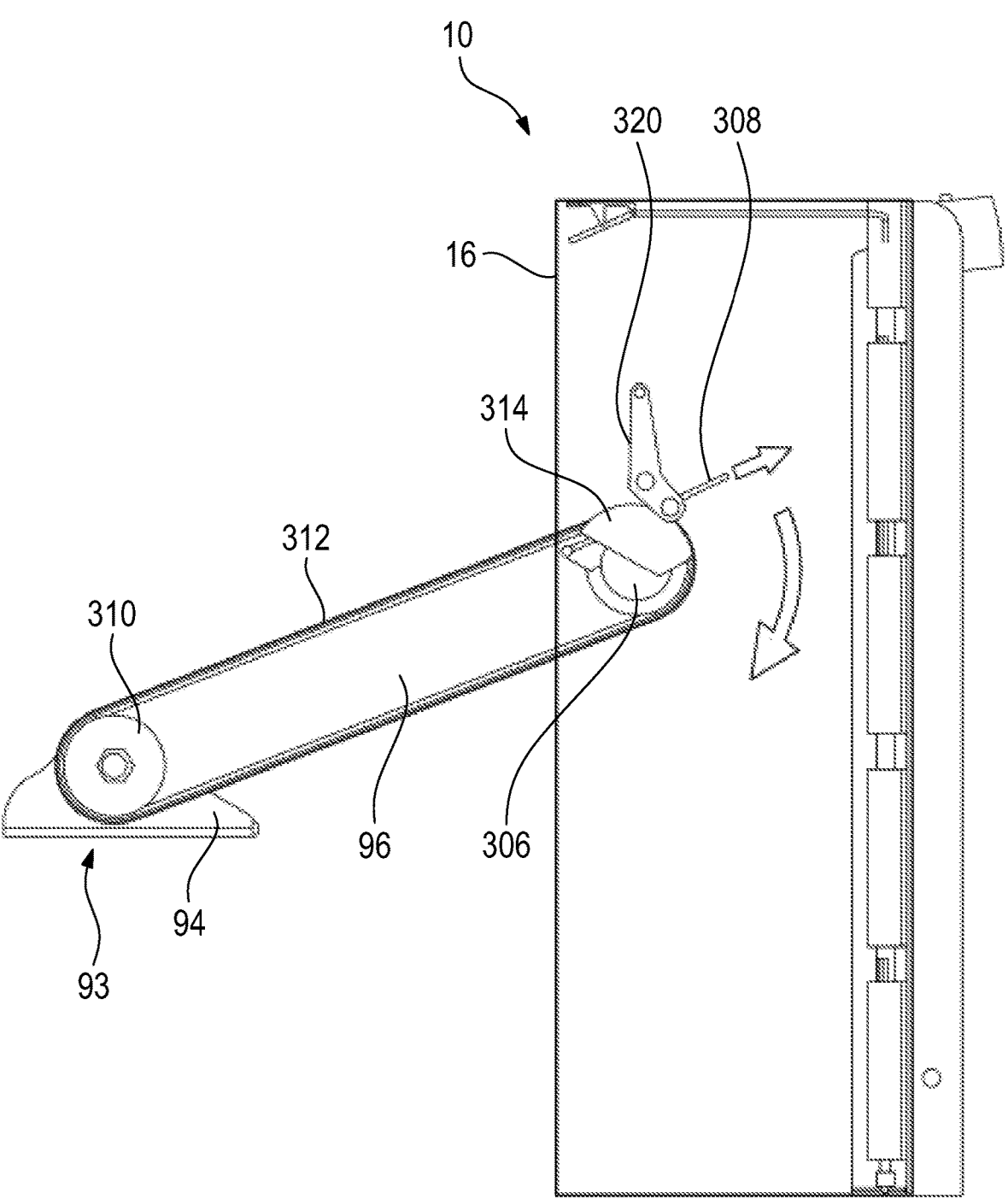
FIG. 53 is an embodiment of the transfer mechanism of FIG. 52A between the transport position and a loading position.
Figure 54:
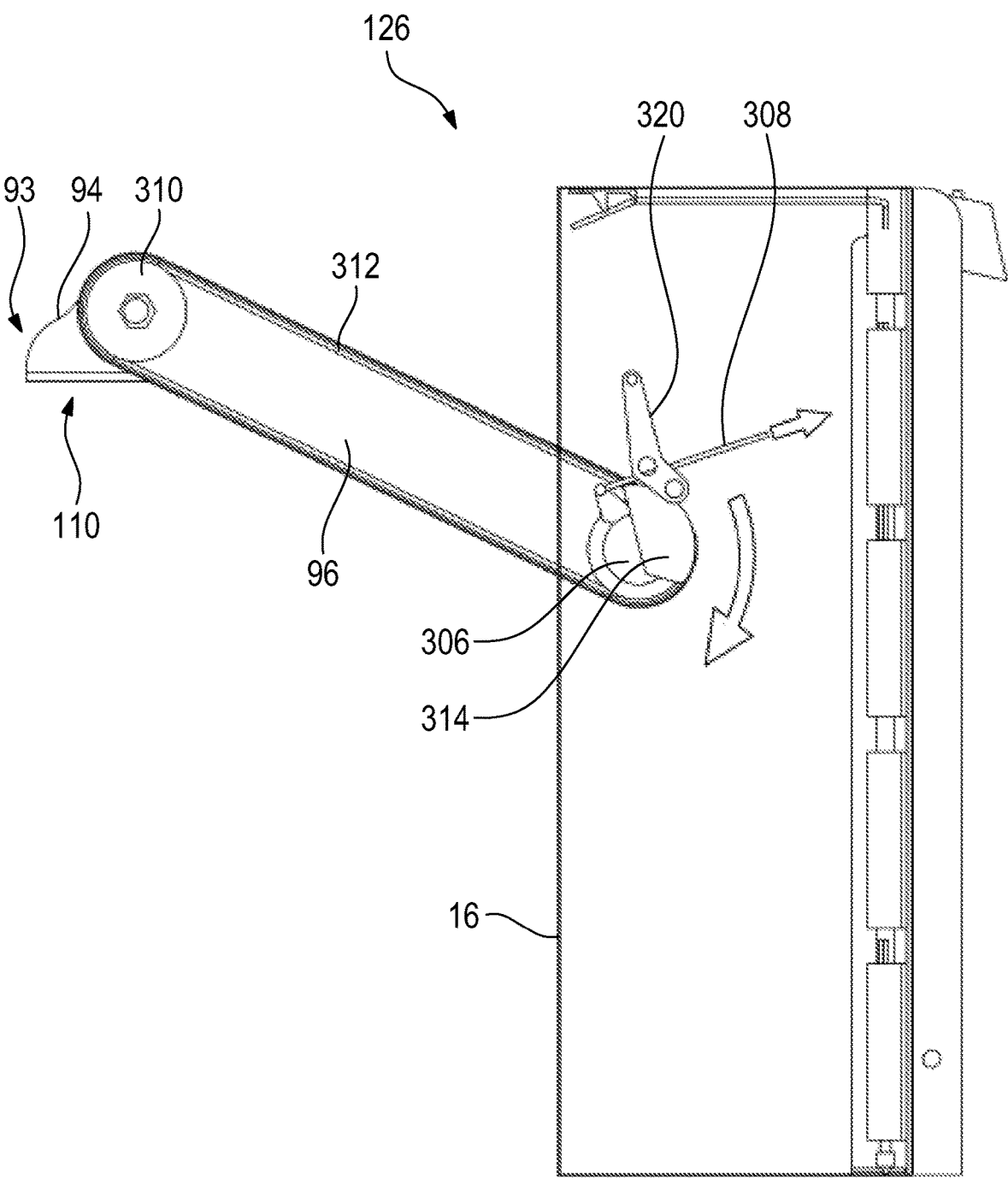
FIG. 54 is an embodiment of the transfer mechanism of FIG. 52A in the loading position.

Referring to FIGS. 52 through 54, an example of one of the side assemblies 16 illustrates a mechanism for moving each first receiving element 94 of the first receptacle 93 between the transport position 108 and the loading position 110. This mechanism is formed equally in both side assemblies.

In this mechanism, the arm 96 is rotatably mounted to the corresponding side assembly 16 via a roller 306 so that the corresponding receiving member 94 is movable between the transport position 108 and the loading position 110.

A cable 308 is coupled to the roller 306. To this end, a first end of the cable pull 308 is attached to the reel 306 such that a pulling motion in the direction of a second end of the cable pull 308 rotates the reel 306 about its axis of rotation. The second end of the pulley 308 is coupled to the pulley 276 of the motion conversion device 264 such that a motion of the pulley 276 in the second direction of movement is transmitted to the pulley 308. Preferably, the cable pull 308 extends from the side assembly 16 into the base assembly 14.

The pulley 306 may further be coupled to a spring means that is tensioned when the cable pull 308 is pulled in the direction of the second end, particularly in the second direction of movement. When the pulley 276 is moved in the second direction of movement by the lever 268, the pulley 308 is also pulled in the second direction of movement. As a result, the arm 96 is pivoted from the transport position 108 towards the loading position 110 and the spring device is tensioned. If the cable pull 276 is moved against the second direction of movement by means of the lever 268, the cable pull 308 is relaxed again, whereby the restoring force of the spring device causes the cable pull 308, and thus also cable pull 276, to be pulled against the second direction of movement.

The pick-up element 94 is rotatably mounted on the arm 96 by means of a roller 310. The arm 96 further includes a circumferential rope or tape 312 that rotates around the pulley 306 and the pulley 310. The pulleys 306 and 310 have the same circumference. This ensures that when the arm 96 is pivoted, the receiving element 94 always has the same orientation in space, in particular with respect to the vertical direction.

In FIG. 52, the transport cart 10 is arranged in the first operating mode 86. The first pick-up element 94 is thus arranged in the transport position 108. Thereby, the disk 266 is arranged in the first rotational position 286.

To transfer the transport cart 10 from the first mode of operation 86 to the second mode of operation 126, the cable 308 is pulled in the second direction of movement, as previously described. This causes the roller 306 to rotate about the axis of rotation in one direction, causing the arm 96 to pivot upwardly above the roller 306. This changes the vertical position of the pickup member 94, whereas the orientation of the pickup member 94 is maintained. For example, in FIG. 53, the transport cart 10 is in a state between the first mode of operation 86 to the second mode of operation 126, with the first pickup 93 positioned between the transport position 108 and the loading position 110.

The receiving element 94 is pivoted upward until it reaches the loading position 110. The loading position 110 is reached when the disc 266 is arranged in the second rotational position 288. This condition is shown in FIG. 54. In FIG. 54, the transport cart 10 is thus arranged in the second operating mode 126.

To transfer the transport cart 10 from the second mode of operation 126 to the first mode of operation 86, the cable 308 is moved in a direction opposite to the second direction of movement, as previously described. This causes the roller 306 to rotate about the axis of rotation in an opposite direction of rotation, causing the arm 96 to pivot downwardly over the roller 306. This changes the vertical position of the receiving element 94, whereas the orientation of the receiving element 94 is maintained. The receiving element 94 is pivoted downward until it reaches the transport position 108. The transport position 108 is then reached when the disc 266 is arranged in the first rotational position 286. The transport cart is then again arranged in the first operating mode 86.

As previously described, a movement of the first receptacle 93 is coupled to a movement of the support wheels 100. This coupling is described in detail in FIGS. 55 to 57.

For this purpose, the roller 306 has a link guide 314. The link guide 314 has a first, straight section 316 that extends eccentrically from radially inward to radially outward with respect to the axis of rotation. The splitter guide includes a second, curved section 318 that is contiguous with the first section 316. The second section 318 extends along the circumference of the roller 306, with a radial distance of the splitter guide 314 along the second section 318 increasing steadily from the first section 316. The radial pitch of the splitter guide 314 is greater in the first section 316 than in the second section 318.

A lever 320 is disposed on the side assembly 16. A first end of the lever 320 is pivotally mounted to the side assembly about a pivot axis. The pivot axis is parallel to the axis of rotation of the roller 306. The pivot axis is disposed above the axis of rotation of the roller 306 in the y-direction. A wheel 322 is rotatably mounted on a second end of the lever 320. The wheel abuts the link guide 314 and can roll along the link guide 314 when the roller 306 is rotated.

The lever 320 is formed in an angled manner. To this end, the lever 320 includes a first straight portion 324 and a second straight portion 326 that are angled with respect to each other. The first end of the lever 320 is disposed at the first section 324, and the second end of the lever 320 is disposed at the second section 326. The lever 320 is coupled to another cable 328. For this purpose, the cable pull 328 is attached to the second portion 326 of the lever 320. Movement of the cable pull 328 causes the support wheels to unfold or fold.

Figure 55:
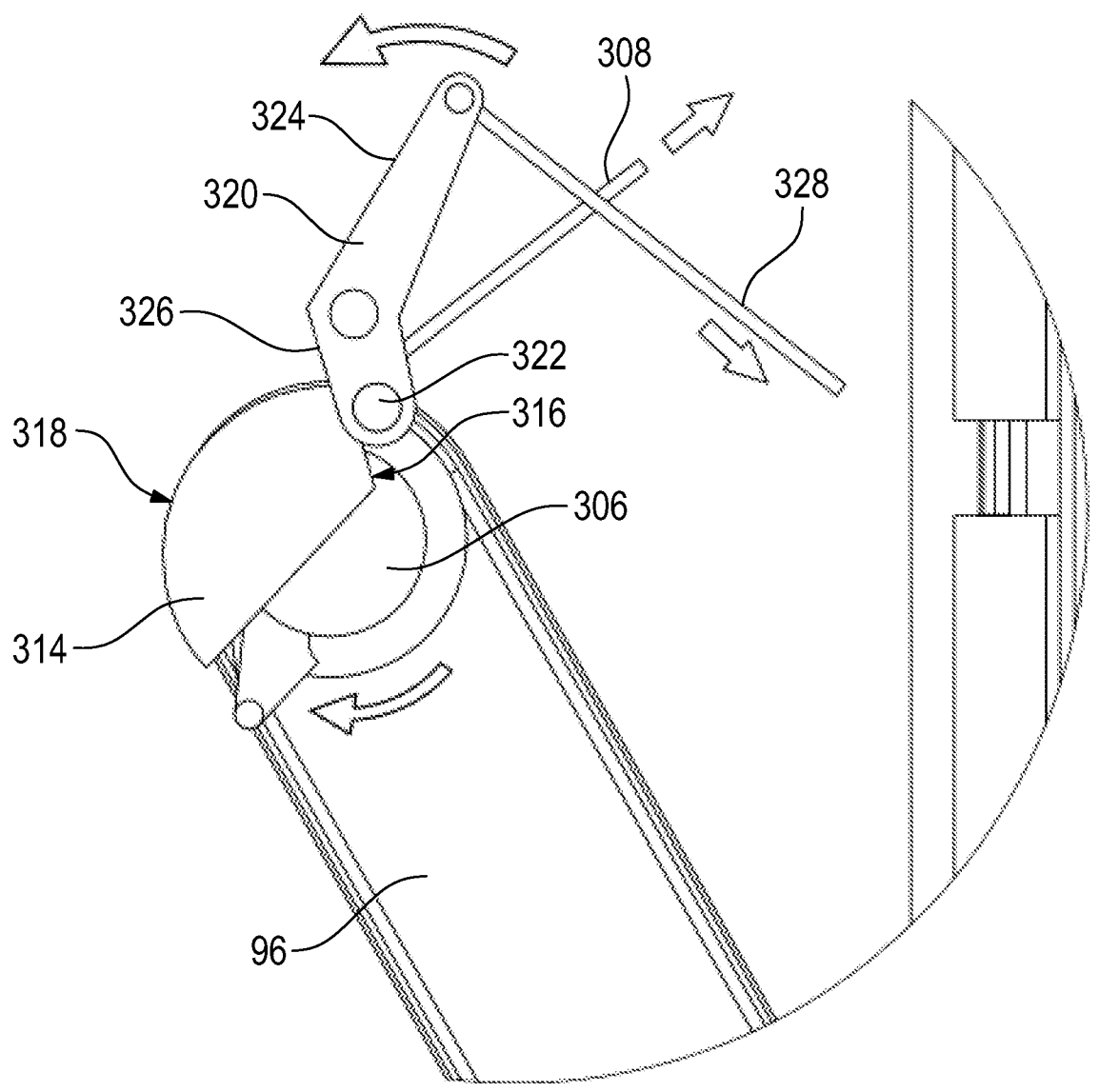
FIG. 55 is a detailed view of the transfer mechanism from FIG. 52.

In FIG. 55, the transport cart 10 is arranged in the first operating mode 86 with the first receptacle 93 correspondingly arranged in the transport position 108. The wheel 322 is in contact with the first portion of the gate guide 314. When the transport cart 10 is transferred from the first operating mode 86 to the second operating mode 126, the roller 306 is rotated about the axis of rotation, as previously described. As a result, the splitter guide 314 is also rotated about this axis of rotation, causing the wheel 322 to roll along the splitter profile of the splitter guide 314. In doing so, the wheel 322 first rolls along the first section 316 until the wheel 322 reaches the second section 318.

Figure 56:
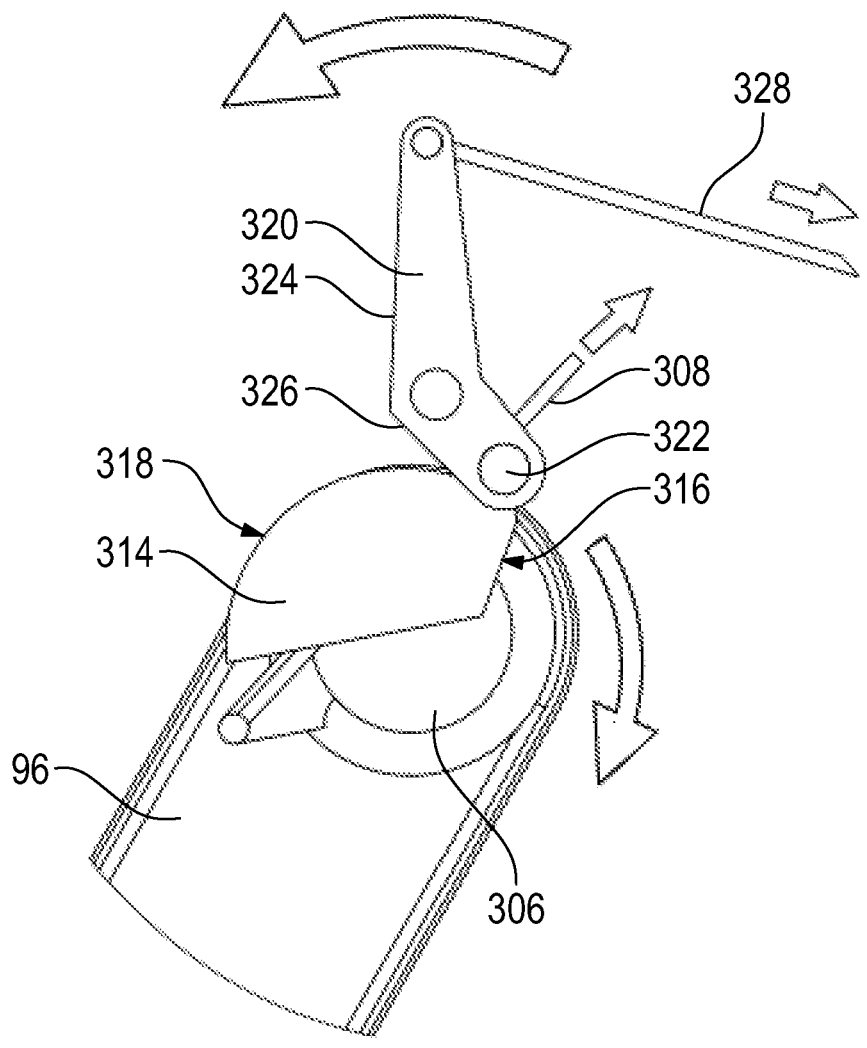
FIG. 56 is a detailed view of the transfer mechanism from FIG. 53.

This condition is shown in FIG. 56. Here, the wheel is arranged at the beginning of the second section 318. Here, the transport cart 10 is in a state between the first operating mode 86 to the second operating mode 126 and the first receptacle 93 is arranged between the transport position 108 and the loading position 110.

Figure 57:
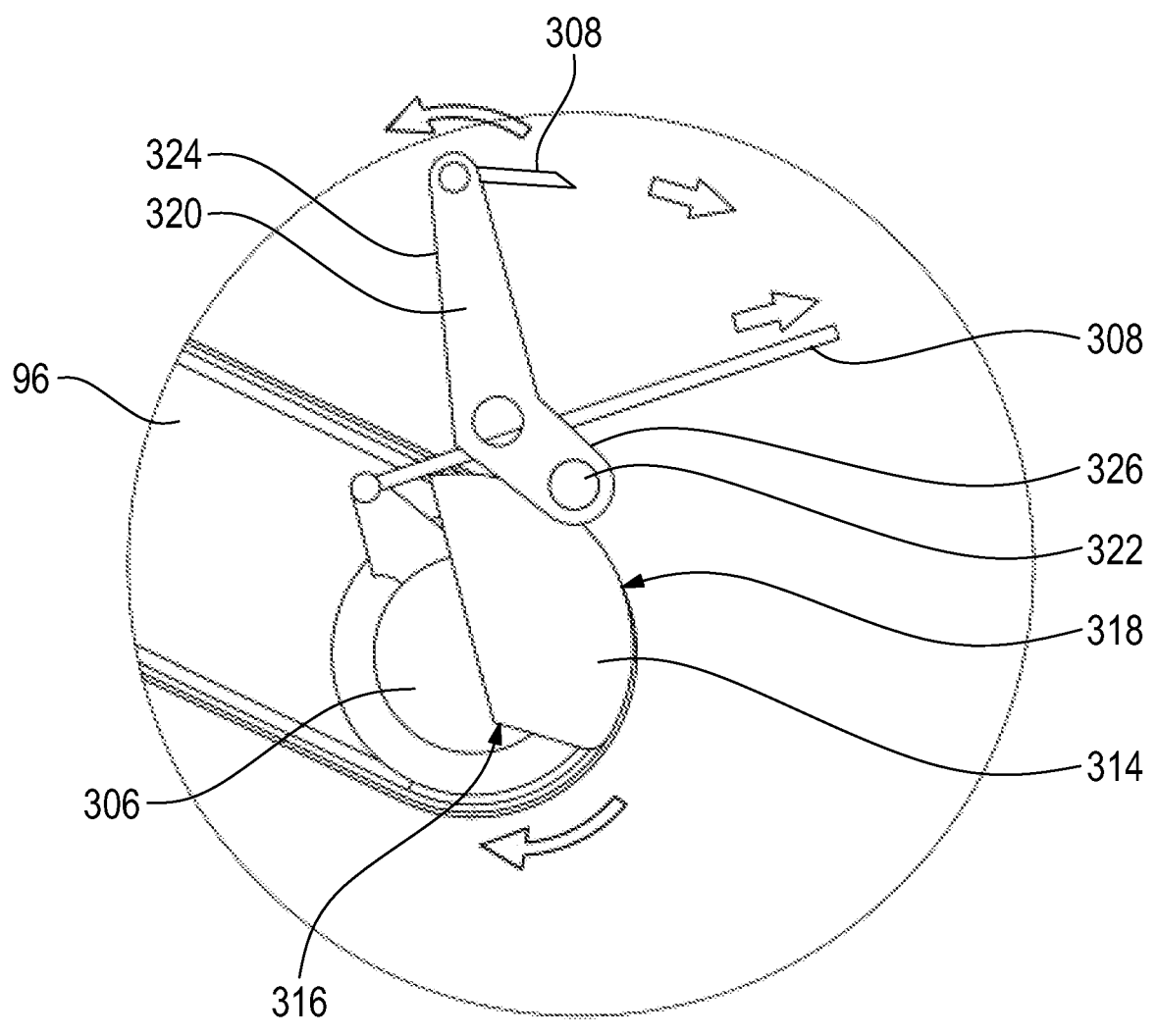
FIG. 57 is a detailed view of the transfer mechanism from FIG. 54.

The wheel 306 continues to rotate, as previously described, until the second mode of operation 126 is reached. As it does so, the wheel rolls along the second section 318. When the second mode of operation 126 is reached, the wheel 322 is located at one end of the second section 318. This condition is shown in FIG. 57.

As a radial distance of the splitter guide 314 with respect to the axis of rotation of the roller 306 steadily increases along the splitter guide 314 from the beginning of the first section 316 to an end of the second section 318, a radial distance of the wheel 322 with respect to the axis of rotation of the roller 306 also changes, causing the lever 320 to deflect, causing the lever 320 to pull on the cable 328. Due to the different radial pitches in the first section 316 and the second section 318, the lever is further deflected when the wheel 322 moves along the first section 316 than when the wheel 322 moves along the second section 318. Preferably, the ratio of deflections corresponding to the two sections is 1:2 to 1:10, particularly 1:5.

Figure 58:
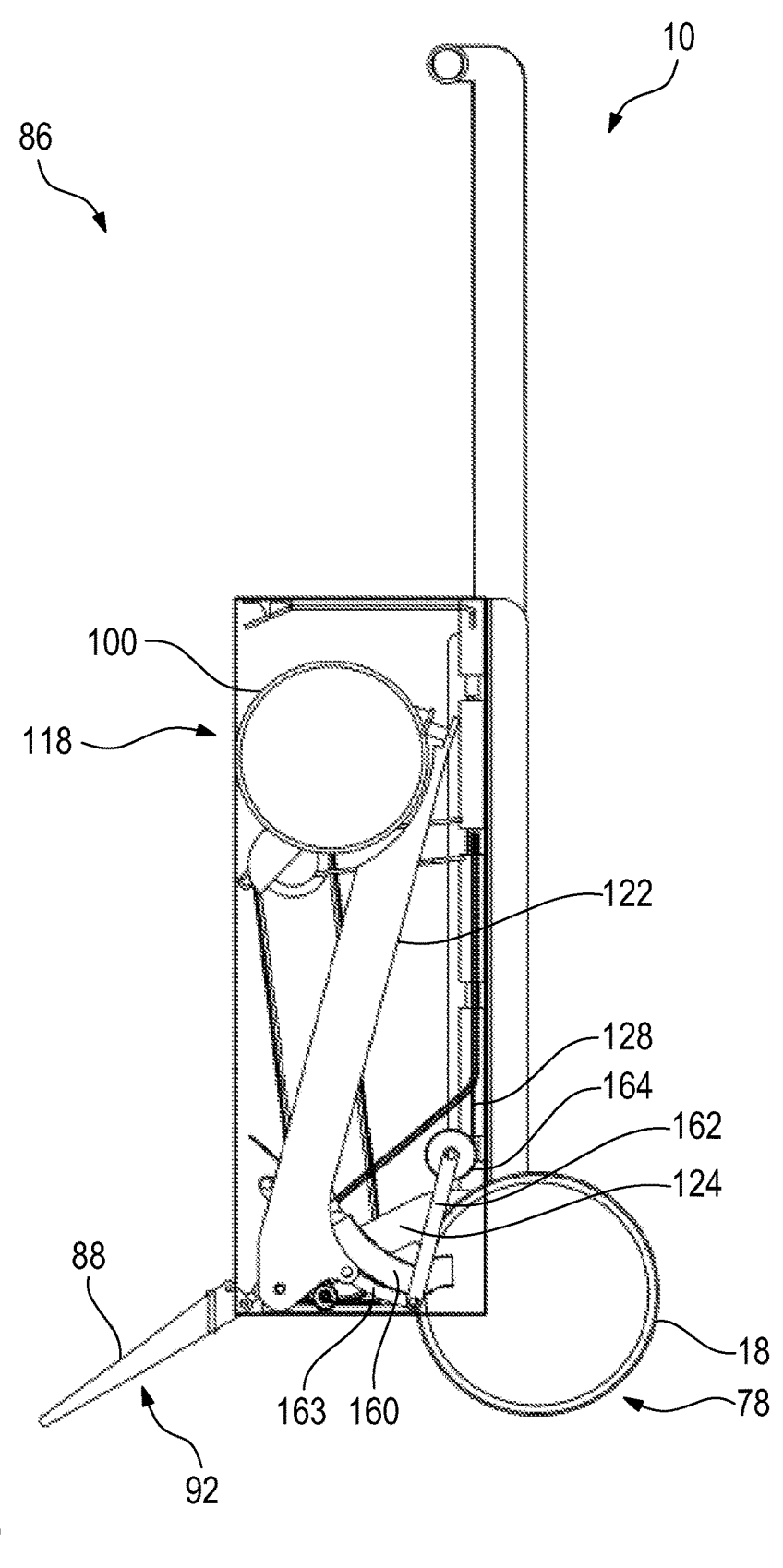
FIG. 58 is a sectional view of the side assembly of FIG. 28 in the first operating mode.
Figure 59:
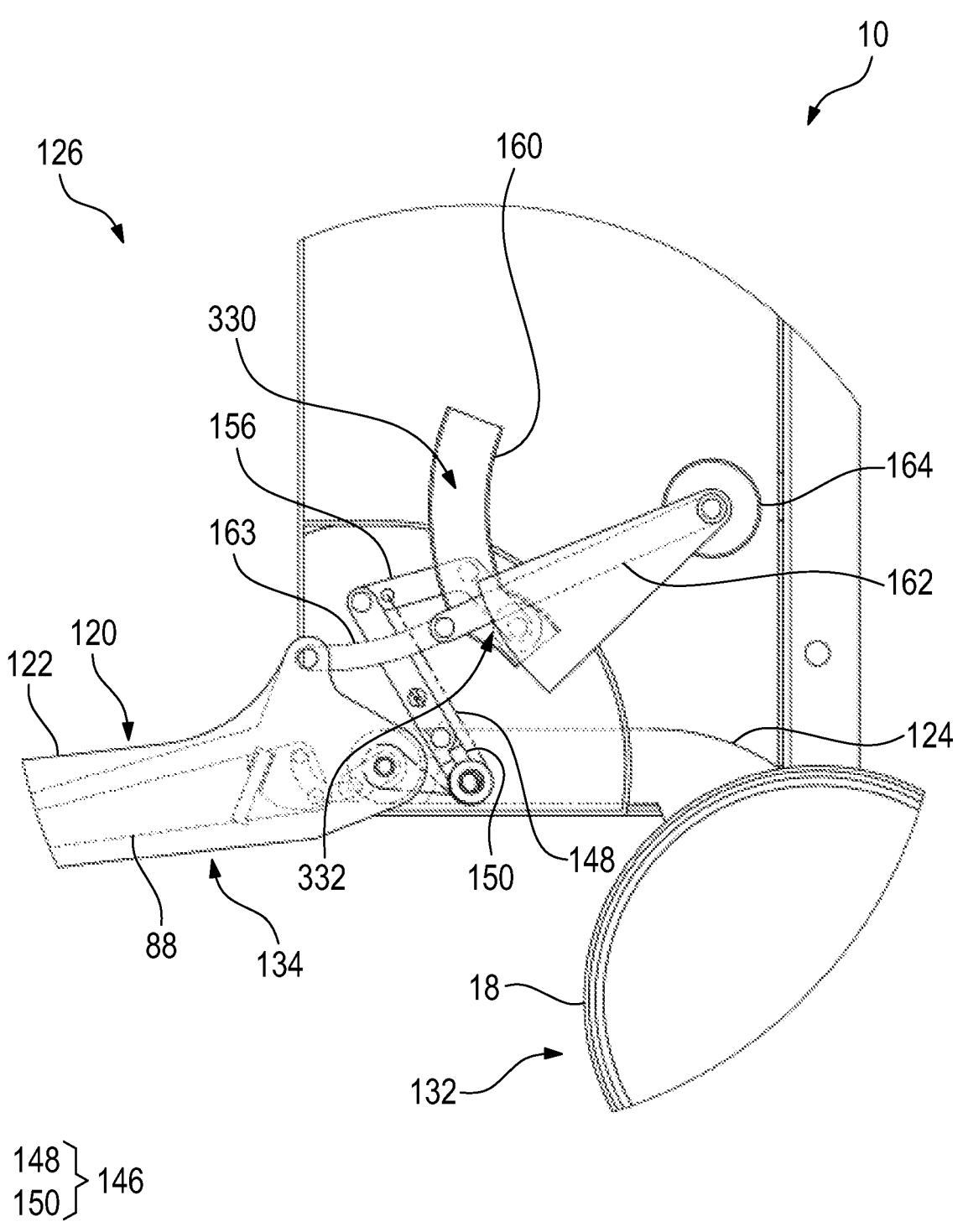
FIG. 59 is a sectional view of the side assembly of FIG. 28 in the second operating mode.

FIGS. 58 and 59 show a mechanism by which the support wheel 100 can be unfolded and folded, respectively, from a side assembly 16. In FIG. 58, the support wheel 100 is in the folded position 118, the wheel 18 is in the unfolded position 78, and the support 88 is in the unfolded position 92. Accordingly, the transport cart 10 is arranged in the first operating mode 86. In FIG. 58, the support wheel 100 is arranged in the unfolded position 120, the wheel 18 is arranged in the second unfolded position 132, and the support 88 is arranged in the folded back position 134. Accordingly, the transport cart 10 is arranged in the second operating mode 126. The individual components arranged in the side assembly 16 have already been explained with reference to FIGS. 28 to 32.

FIGS. 58 and 59 further show that the pulley 164 is coupled to the pulley 328. For this purpose, the pulley 328 is attached to the roller 164 so that the roller 164 is rotated when the pulley 328 is pulled. In this manner, the rotational movement of the roller 306, particularly the pivoting movement of the first receptacle, is coupled to the rotational movement of the roller 164 via the lever 320 and the pulley 328. The roller 164 may further be coupled to a spring means that is tensioned when the cable pull 328 is pulled. When the cable pull 328 is released, the roller 164 is rotated back due to the restoring force of the spring device, pulling the cable pull 328 in the opposite direction.

Furthermore, FIGS. 58 and 59 show that the fourth lever element 163 of the second toggle 165 is coupled to the arm 122 of the support wheel 100. For this purpose, the arm 122 is rotatably coupled to the fourth lever element 163 at the side of the fourth lever element 163 facing away from the third lever element 162. The arm 122 of the support wheel 100 is also rotatably mounted on the axis 166. Thus, a buckling motion or extending motion of the toggle 165 results in a pivoting motion of the arm 122 about the pivot axis 166. The third lever element 162 is straight in shape. The fourth lever element 163 is curved in shape. Preferably, a radius of curvature of the fourth lever element 163 is greater than, in particular twice as great as, a length of the fourth lever element 163 from the third lever element 162 to the arm 122. Preferably, a length of the third lever element 162 from the roller 164 to the fourth lever element 163 is longer than, in particular twice as long as, the length of the fourth lever element 163.

In FIG. 58, particularly in the first operating mode 86, the toggle 165 is arranged in a bent configuration. In other words, the first lever element 148 and the second lever element 150 enclose an angle with each other that is smaller than 145°. Preferably, the angle is 60° to 120°, in particular 90°.

In FIG. 59, particularly in the second mode of operation, the toggle 165 is in an unfolded position. In other words, the first lever element 148 and the second lever element 150 enclose an angle of 180° with each other. The first lever element 148 and the second lever element 150 are thus arranged in alignment with each other.

Figure 60:
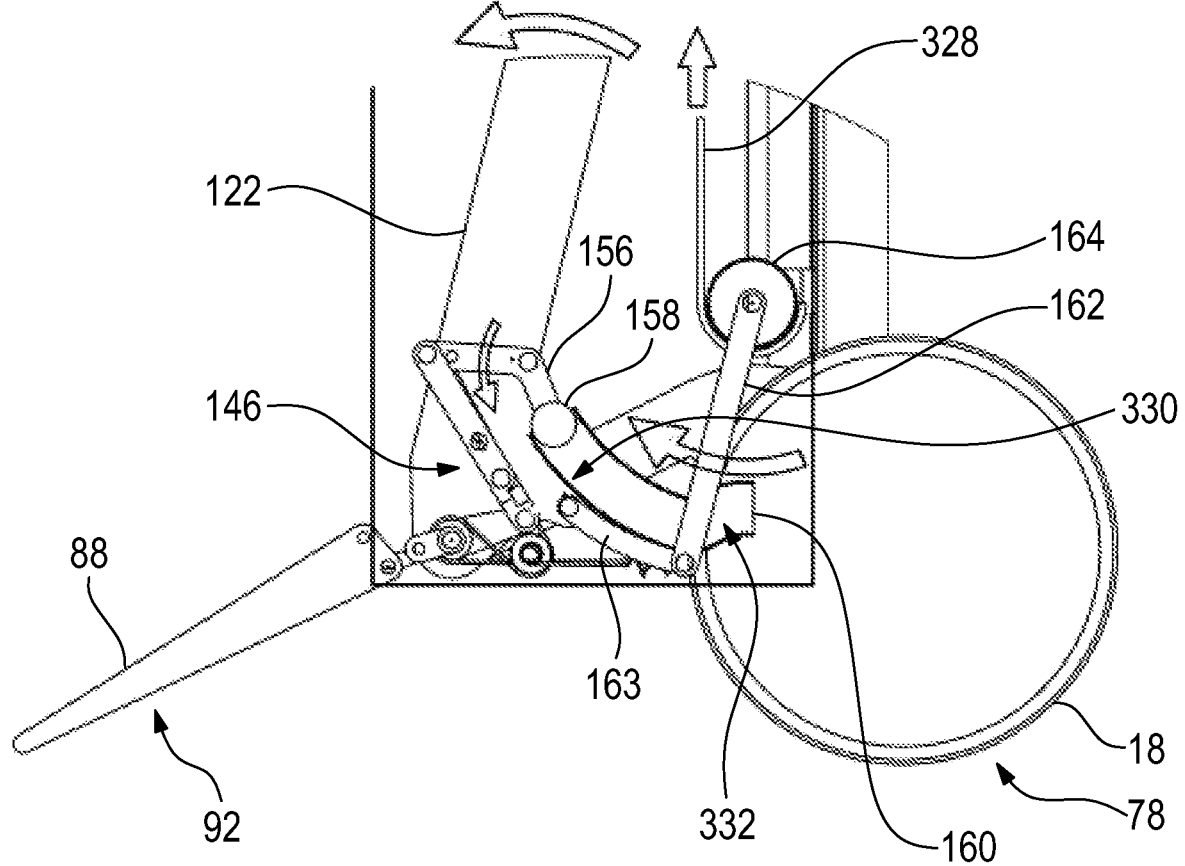
FIG. 60 is a sectional view of the side assembly of FIG. 56 in the first mode of operation during transition from the first mode of operation to the second mode of operation.
Figure 61:
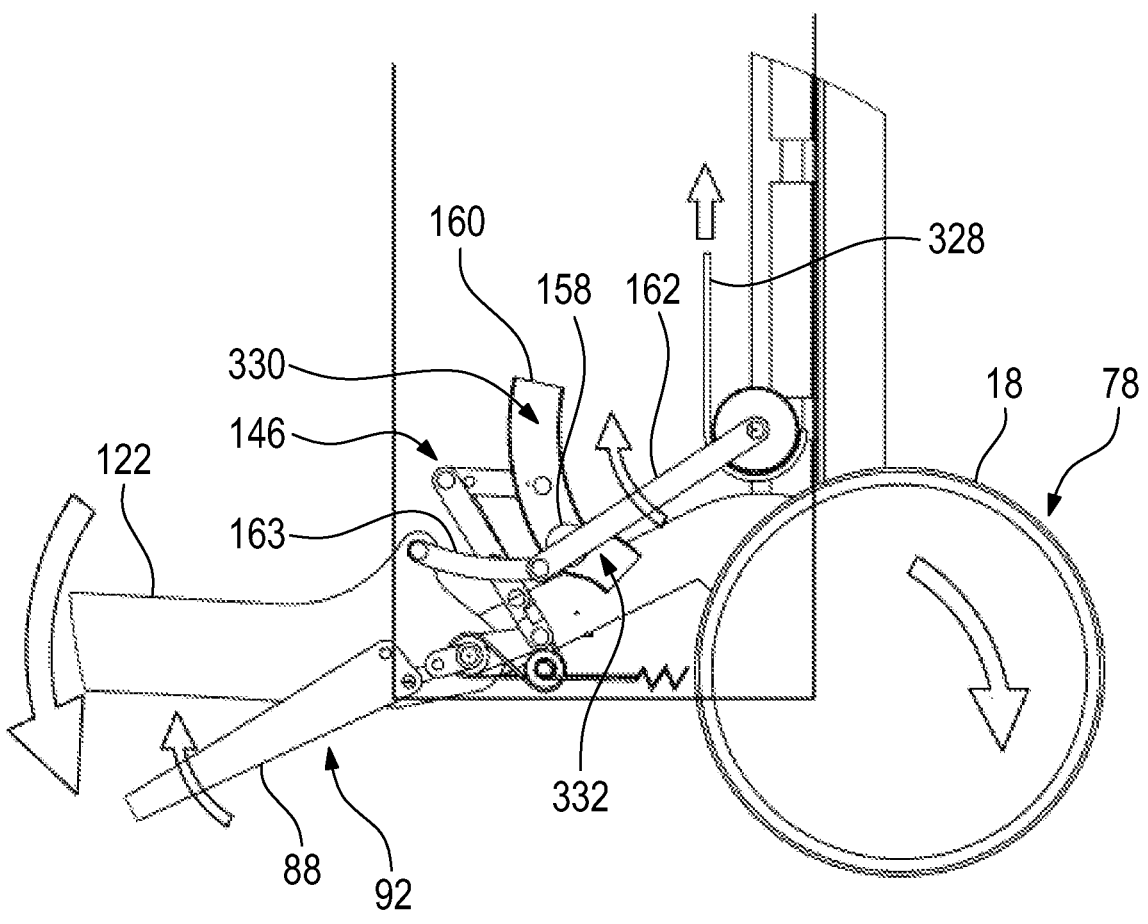
FIG. 61 is a sectional view of the side assembly of FIG. 56 in an arrangement between the first mode of operation and the second mode of operation when transitioning from the first mode of operation to the second mode of operation.
Figure 62:
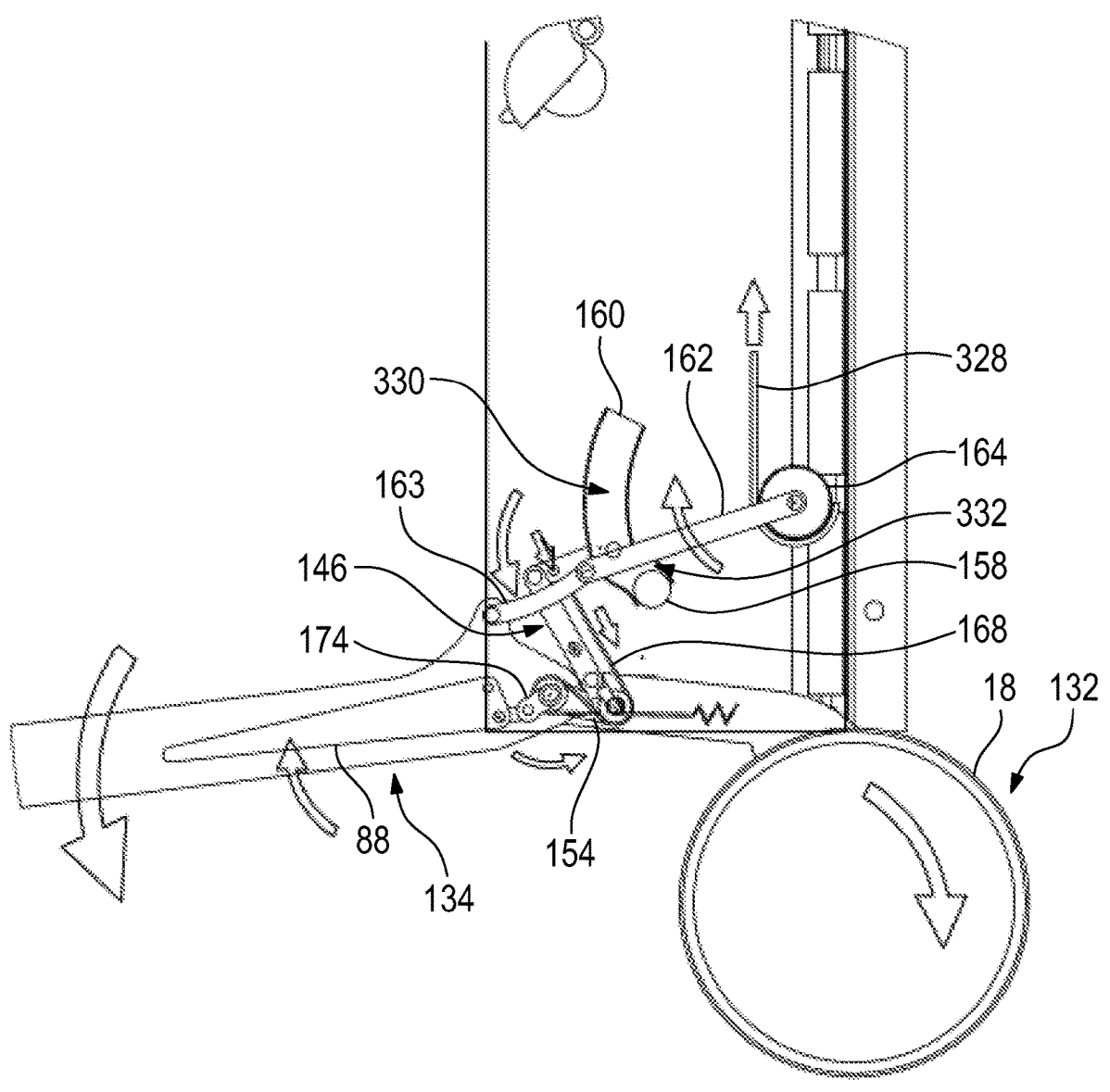
FIG. 62 is a sectional view of the side assembly of FIG. 56 in the second mode of operation during transition from the first mode of operation to the second mode of operation.

FIGS. 60 through 62 illustrate how the individual components of the side assembly 16 interact to cause the support wheel to pivot from the folded position 118 to the unfolded position 120, while simultaneously pivoting the wheel 18 from the first unfolded position 78 to the second unfolded position 132 and pivoting the support 88 from the unfolded position 92 to the folded back position 134.

When transferring the transport cart 10 from the first operating mode 86 to the second operating mode 126, the cable pull 328 is pulled in the direction of the arrow shown in FIG. 30. As a result, the roller 164 is rotated about its axis of rotation and thus the third lever element 162 is also pivoted about this axis of rotation. In the process, the second toggle 165 is gradually stretched. In other words, an angle that the third lever element 162 and the fourth lever element 163 include with each other increases the more the pulley 328 is pulled.

When the second toggle lever 165 is extended, the arm 122 of the support wheel 100 is pivoted about the leg axis 166 from the folded position 118 toward the unfolded position 120. Since the cup cam 160 is rigidly connected to the third lever element 162, the cup cam 160 is also pivoted about the axis of rotation of the roller 164. The wheel 158 thereby rolls along the inner profile of the cup cam 160.

The inner profile of the pot curve 160 includes a first section 330 and a second section 332. In the first operating mode 86, the wheel 158 abuts the beginning of the first section 330 and in the second operating mode 126, the wheel 158 abuts the end of the second section 332. The end of the first section 330 and the beginning of the second section 332 are adjacent to each other. Thus, the wheel 158 rolls along the inner profile of the pot curve 160 from the beginning of the first section 330 to the end of the second section 332.

The first section 330 is configured such that when the cup cam 160 is pivoted, the wheel 158 rolls along the inner profile of the cup cam without changing its position. In other words, a radial distance of the inner profile from the axis of rotation of the wheel 164 remains constant along the first section 330. The second section 332 is configured such that when the cup curve 160 is pivoted, the wheel 158 rolls along the inner profile of the cup curve while changing its position. In other words, a radial distance of the inner profile to the axis of rotation of the wheel 164 changes along the second section 330. In particular, the radial distance of the inner profile to the axis of rotation of the wheel 164 becomes smaller along the second section 330. This causes the wheel 158, and thus the second end of the lever 156, to move in the direction of the axis of rotation of the roller 164. The first end of the lever 156 is moved downward, with the toggle 146 also being moved downward. In one aspect, this causes the lever 154 to pivot further about the pivot axis 166 so that the wheel 18 is pivoted from the first unfolded position 78 to the second unfolded position. Secondly, the cable 168 is released so that the spring element 180 retracts the cable 168. This causes the lever 174 to pivot in the opposite direction about the pivot axis 166, so that the support is pivoted back from the unfolded position 92 to the folded back position.

FIG. 60 here shows the initial state, in particular the first operating state 86, in which the support wheel 100 is arranged in the folded position 118, the wheel 18 in the unfolded position 78 and the support 88 in the unfolded position 92. The second toggle lever 165 is angled in this case.

FIG. 61 shows an intermediate state in which the support wheel 100 is partially unfolded, in particular arranged between the folded position 118 and the unfolded position 120, and the second toggle lever 165 is partially extended. On the other hand, the wheel 18 is still in the unfolded position 78 and the support 88 is still in the unfolded position 92, as the roller 158 is arranged at the end of the first portion 330 of the cup curve 160.

FIG. 62 shows the final state of the unfolding movement, in which the support wheel 100 is in the unfolded position 120, the wheel 18 is in the second unfolded position 132 and the prop 88 is in the folded-back position 134. The second toggle lever 165 is completely extended in this case.

The folding of the support wheel 100 from the unfolded position 120 to the folded position 118 also proceeds in a corresponding manner, with the wheel 18 simultaneously being pivoted from the second unfolded position 132 to the first unfolded position 78 and the support 88 being pivoted from the folded-back position 134 to the unfolded position 92. In doing so, the pulley 328 is pulled in the direction opposite to the direction of the arrow shown in FIG. 30. This causes the roller 164 to rotate about its axis of rotation in the opposite direction. This causes the second toggle 165 to gradually bend, pivoting the arm 122 of the support wheel 100 about the leg axis 166 from the folded position 118 toward the unfolded position 120. Similarly, the pot cam 160 is pivoted about the axis of rotation in the opposite direction of the roller 164 so that the wheel 158 rolls from the end of the second section 332 to the beginning of the first section 330. This moves the wheel 158, and thus the second end of the lever 156, away from the axis of rotation of the roller 164. This causes the first end of the lever 156 to move upward, with the toggle 146 also moving upward. In one aspect, this pivots the lever 154 back about the pivot axis 166 so that the wheel 18 is pivoted from the second unfolded position 132 to the first unfolded position 78. Secondly, lever 156 pulls on cable 168, causing lever 174 to pivot about pivot axis 166 so that support 88 is pivoted from folded back position 134 to unfolded position 92.

Figure 63:
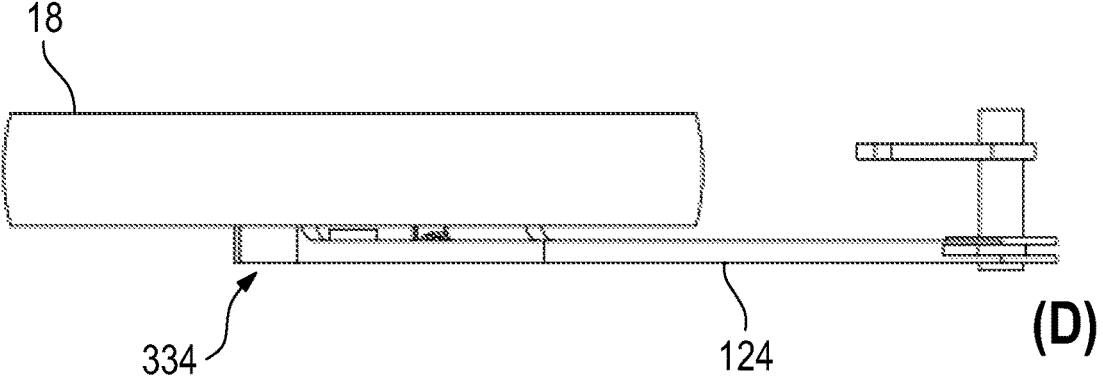
FIGS. 63A, 63B, 63C and 63D are three views of an embodiment of a braking device of the transport cart from FIG. 1.
Figure 64:
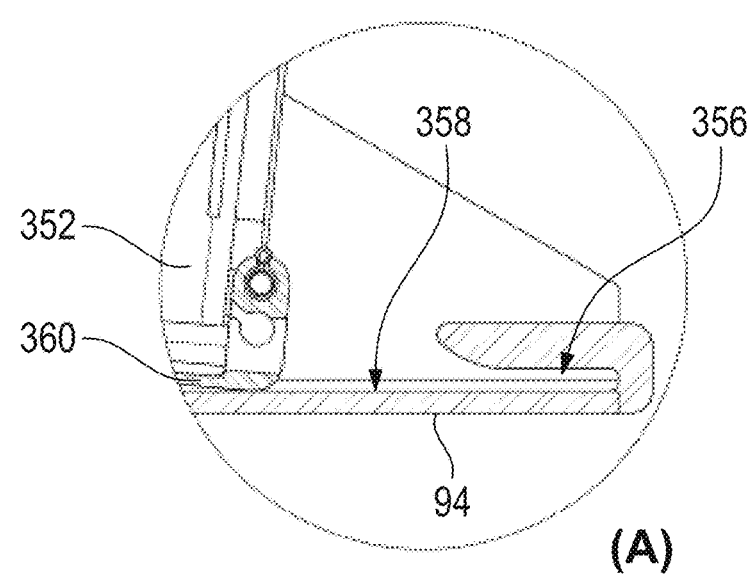
FIGS. 64A and 64B are a detailed view and a side view of the transport cart from FIG. 1 in the second operating mode during insertion of a transport box into the first receptacle.
Figure 64:
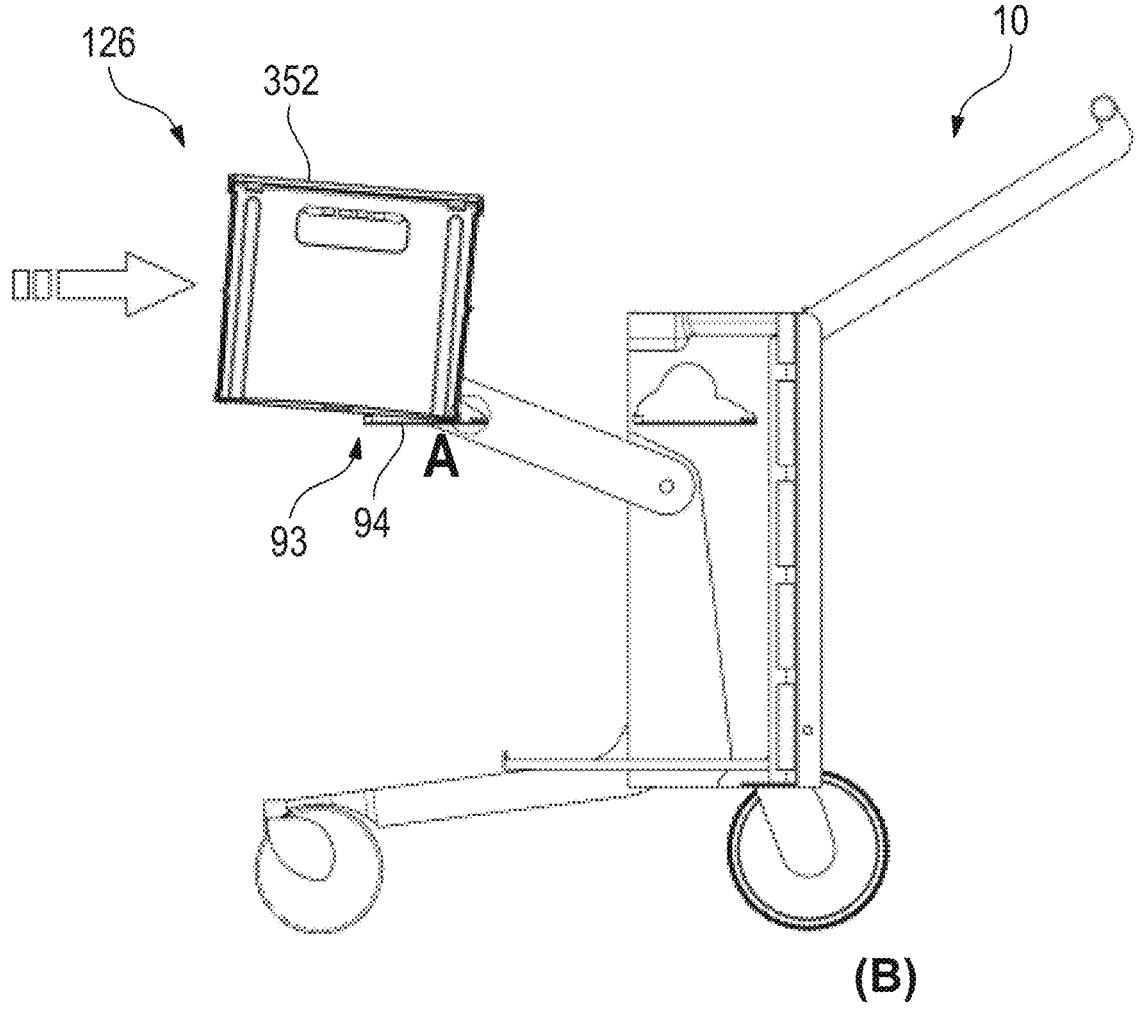
Figure 65:
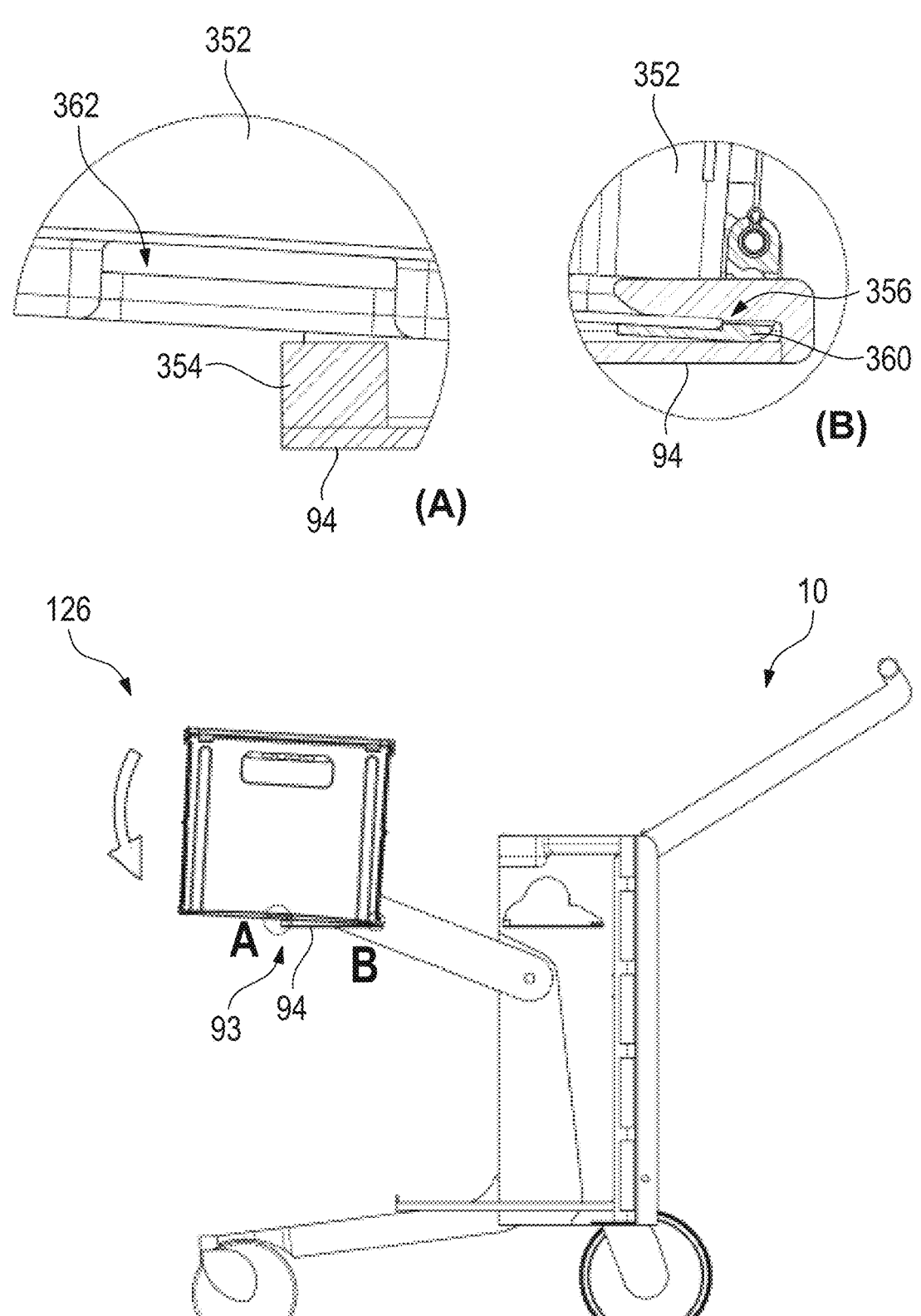
FIGS. 65A, 65B and 65C are detailed views and a side view of the transport cart from FIG. 64C during insertion of the transport box into the first fixture.
Figure 66:
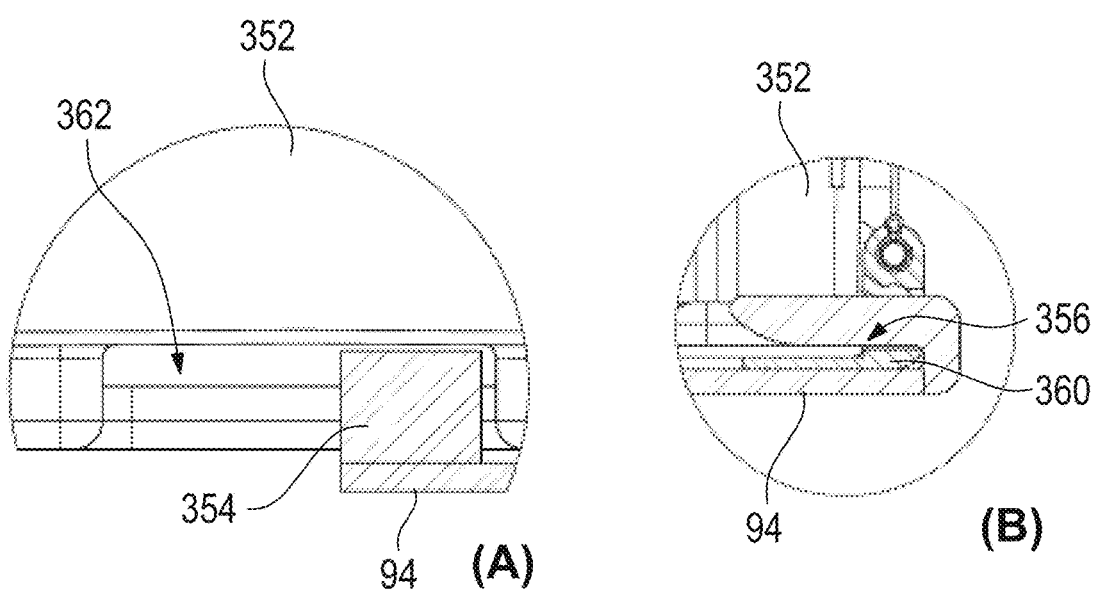
FIGS. 66A, 66B and 66C are detailed views and a side view of the transport cart of FIG. 1 in the second operating mode with a transport box in the first receptacle.
Figure 66:
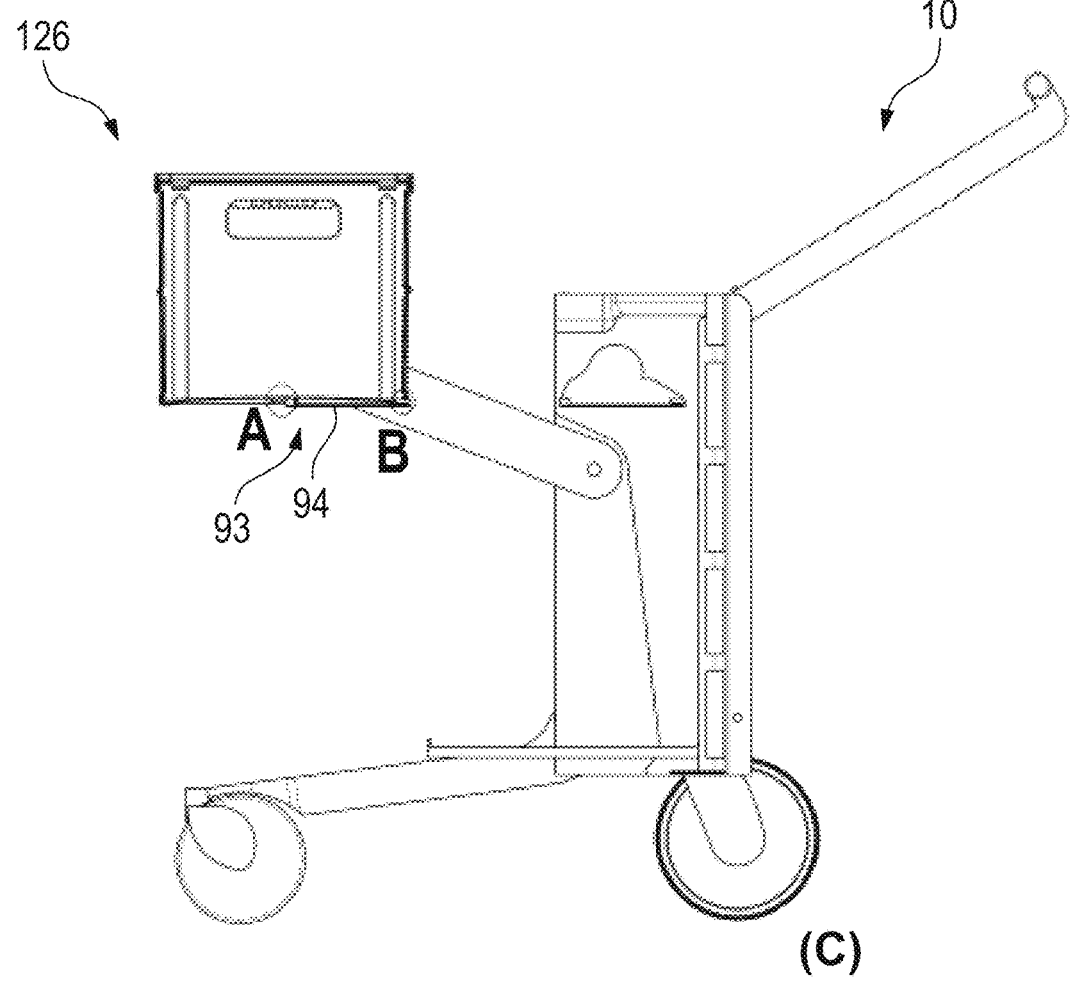
Figure 67:
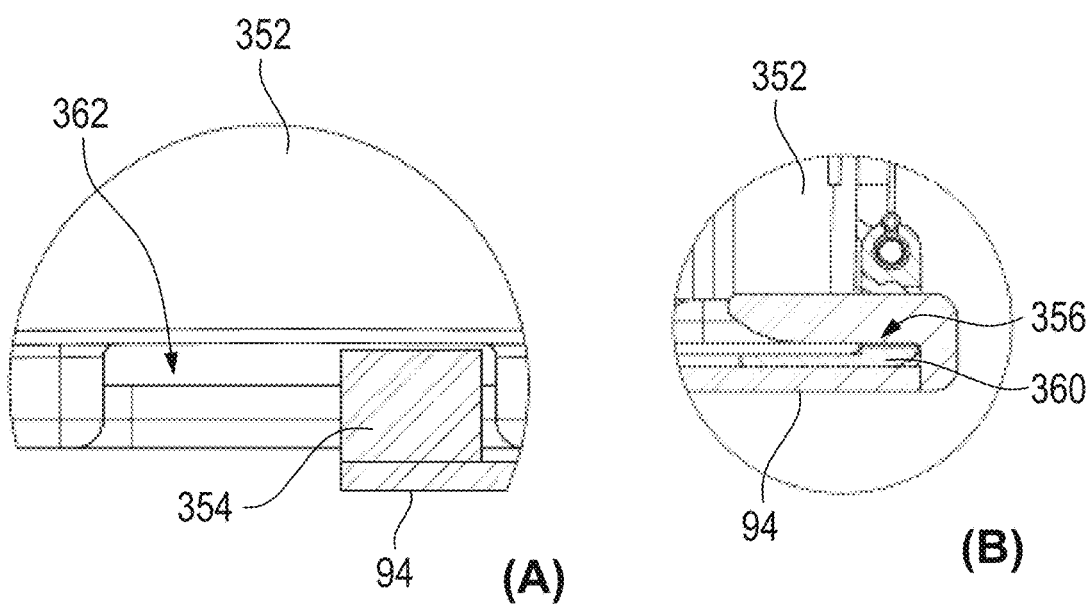
FIGS. 67A, 67B and 67C are detailed views and a side view of the transport cart from FIG. 1 in the second operating mode when removing a transport box from the first fixture.
Figure 67:
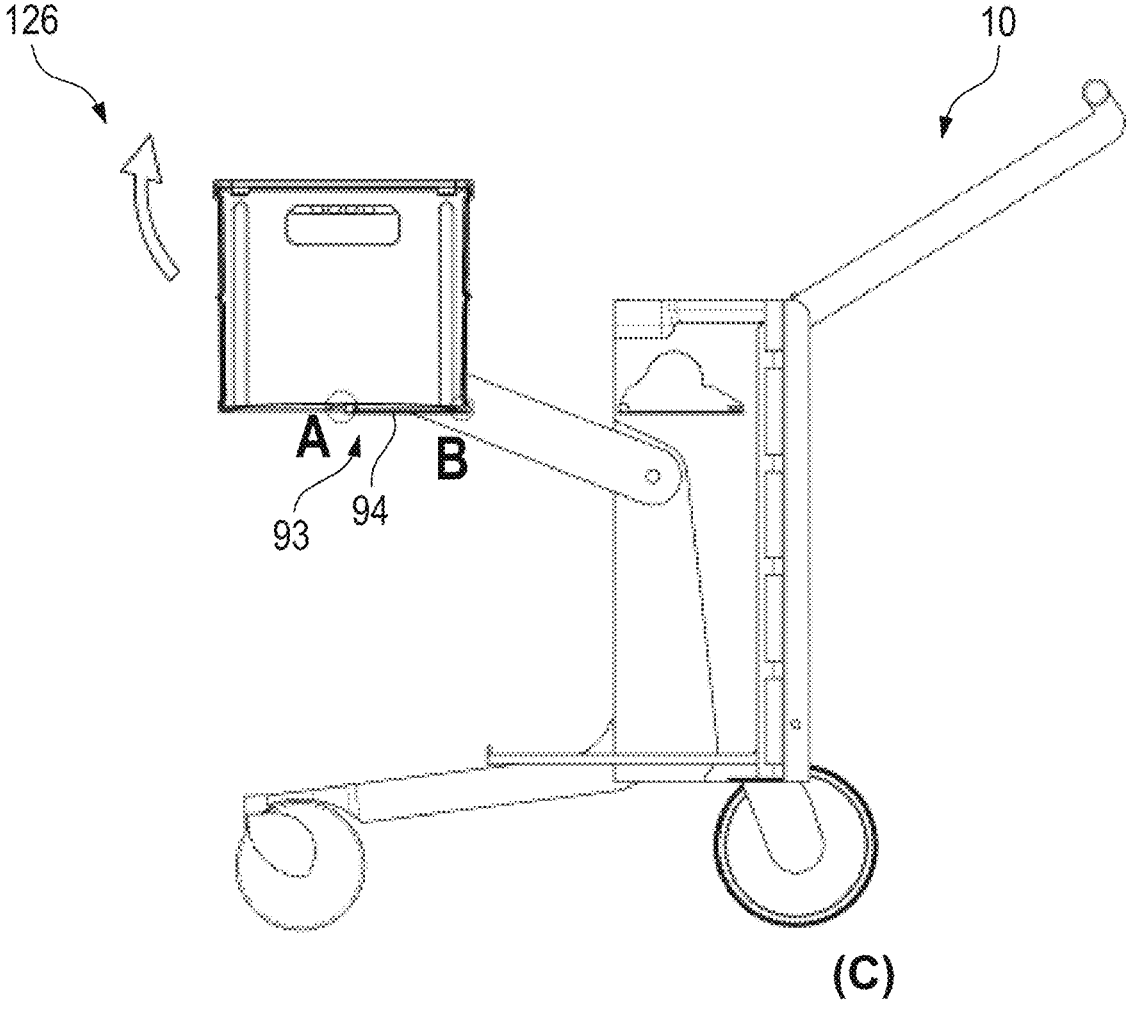
Figure 68:
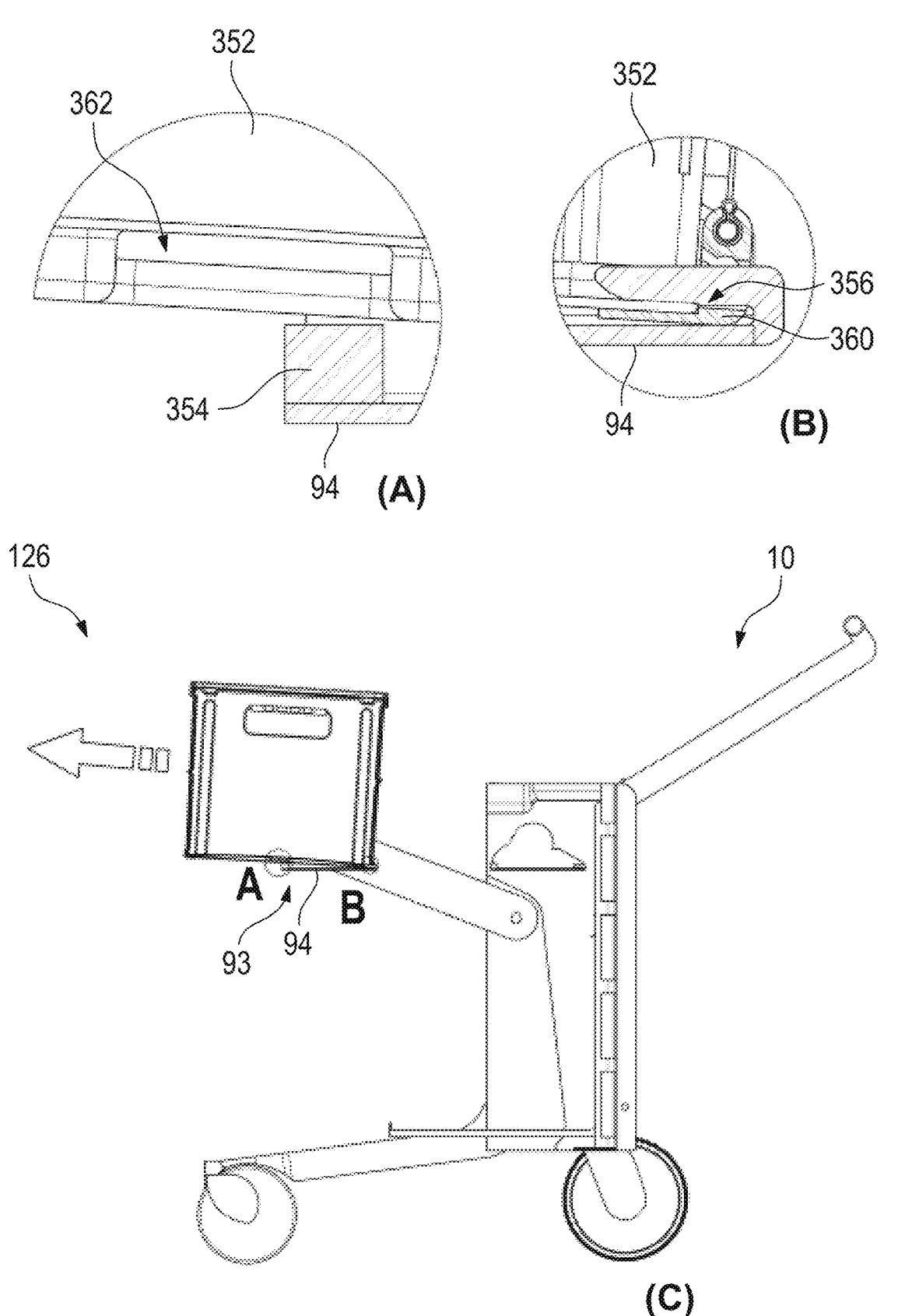
FIGS. 68A, 68B and 68C are detailed views and a side view of the transport cart from FIG. 67 when removing the transport box from the first fixture.

FIG. 63 shows an embodiment of a braking device 334. As shown in view (B), the braking device 334 is activated by an actuation, for example a depressing, of the third actuating element 26 on the handle 20.

As shown in view (A), the braking device 334 is arranged on a wheel 18, in particular in the arm 124, of the transport cart 10 in order to lock the wheel 18 against rotational movement. Thus, the braking device 334 acts as a parking brake to secure the transport cart 10 against unintended rolling loose.

A cable 336 extends from the third actuating member 26 to the braking device 334, and the third actuating member 26 is configured to pull the cable 336 when actuated.

The braking device 334 further includes a pin 338. A first end of the pin 338 is connected to the cable 336. The pin 338 is supported in the arm 124 such that it is axially movable. thereby, the cable 336 can pull the pin 338 in an axial direction. A second end of the pin 338 is coupled to a spring element 340. The spring element 340 biases the pin 338 against the axial direction.

Braking device 334 further comprises an angled flap 342. The pin 338 includes a head 344 at a second end thereof. A first end of the angled flap 342 is coupled to the head 344, such that the angled flap is pivoted when the cable 336 is pulled in response to an actuation of the third actuation member 26.

Braking device 334 further comprises a disc 346. The disc 346 is coupled to the wheel 18 in a rotationally fixed manner. The disc 346 has recesses 348 along its circumference. The recesses 348 are identically shaped and are symmetrically distributed around the circumference of the disc 346. The angled flap 342 includes a projection 350 at a second end, the projection 350 being shaped complementary to the recesses 348 and being engageable with one of the recesses 348 to rotationally couple the wheel 18 to the arm 124.

When the protrusion 350 is not engaged with any of the recesses, the wheel 18 is free to rotate relative to the arm.

When the actuating member 26 is not actuated, the projection 350 is out of engagement with the recesses 348.

An actuation of the third actuating element 26 pulls the pin 338 over the cable 336. This pivots the flap 342 toward the pulley 346, causing the protrusion 350 to engage one of the recesses 348.

When the actuation is released, the spring element 340 pulls the pin back in the opposite direction. This pivots the flap 342 away from the disc 346, disengaging the protrusion 350 from the recesses 348.

Such a braking device 334 may also be arranged on both wheels 18 of the transport cart 10.

FIGS. 64A to 80C show how transport boxes can be inserted into the first receptacle 93 and the second receptacle 97 in the first mode of operation 86 and the second mode of operation 126, respectively.

The receiving elements 94 and 98 of the first and second receptacles are of the same design. Each receiving element 94, 98 has a web 354 and a guide 356. The web 354 and the guide 356 are arranged on opposite sides of the receiving element 94, 98. A support surface 358 for one side of the transport box 352 extends between the web 354 and the guide 356. Each transport box 352 has a projection 360 on one or both corners on that side, extending outwardly away from the transport box 352. On the opposite side, the transport box 352 transport box 352 similarly has a protrusion 360 at one or both corners extending outwardly away from the transport box 352. Each transport box 352 has a recess 362 centrally on each side.

When inserted in a receptacle, the web 354 is disposed in the recess 362 and the projection 360 is disposed in the guide 356. This holds the transport box 352 in the receptacle.

FIGS. 64A to 68C illustrate how a transport box 352 can be inserted into or removed from the first receptacle 93 when the transport cart 10 is arranged in the second operating mode 126.

For insertion, the transport box 352 is placed with the two corners at which the projections 360 are arranged on the respective support surface 358 of each receiving element 94 and pushed along the support surface 358 in the direction of the corresponding guide 356. This is illustrated in FIGS. 64A and 64B.

The transport box 352 is pushed toward the guide 356 until the protrusion 360 reaches the end of the guide 356, at which point the protrusion 360 engages the guide. During this process, the recess 362 is aligned with the web 354. This is illustrated in FIGS. 65A to 65C.

The transport box 352 is then pivoted toward the support surface 358, engaging the recess 362 with the web 354. This is illustrated in FIGS. 66A to 66C.

To remove, the transport box 352 is first pivoted away from the support surface 358 so that the recess 362 is disengaged from the web 354. This is illustrated in FIGS. 67A to 67C.

Then, the transport box 352 is pulled with the two corners at which the projections 360 are disposed onto each of the support surfaces 358 such that the projection 360 is disengaged from the guide 356. This is illustrated in FIGS. 68A to 68C.

FIGS. 69 to 72 illustrate how a transport box 352 can be inserted into or removed from the second receptacle 97 when the transport cart 10 is disposed in the second operating mode 126.

Figure 69:
FIG. 69 is a side view of the transport cart from FIG. 1 in the second operating mode during insertion of a transport box into the second fixture.

For insertion, the transport box 352 is placed with the two corners at which the projections 360 are arranged on the support surface 358 of each receiving element 98 and pushed along the support surface 358 in the direction of the corresponding guide 356. This is illustrated in FIG. 69.

Figure 70:
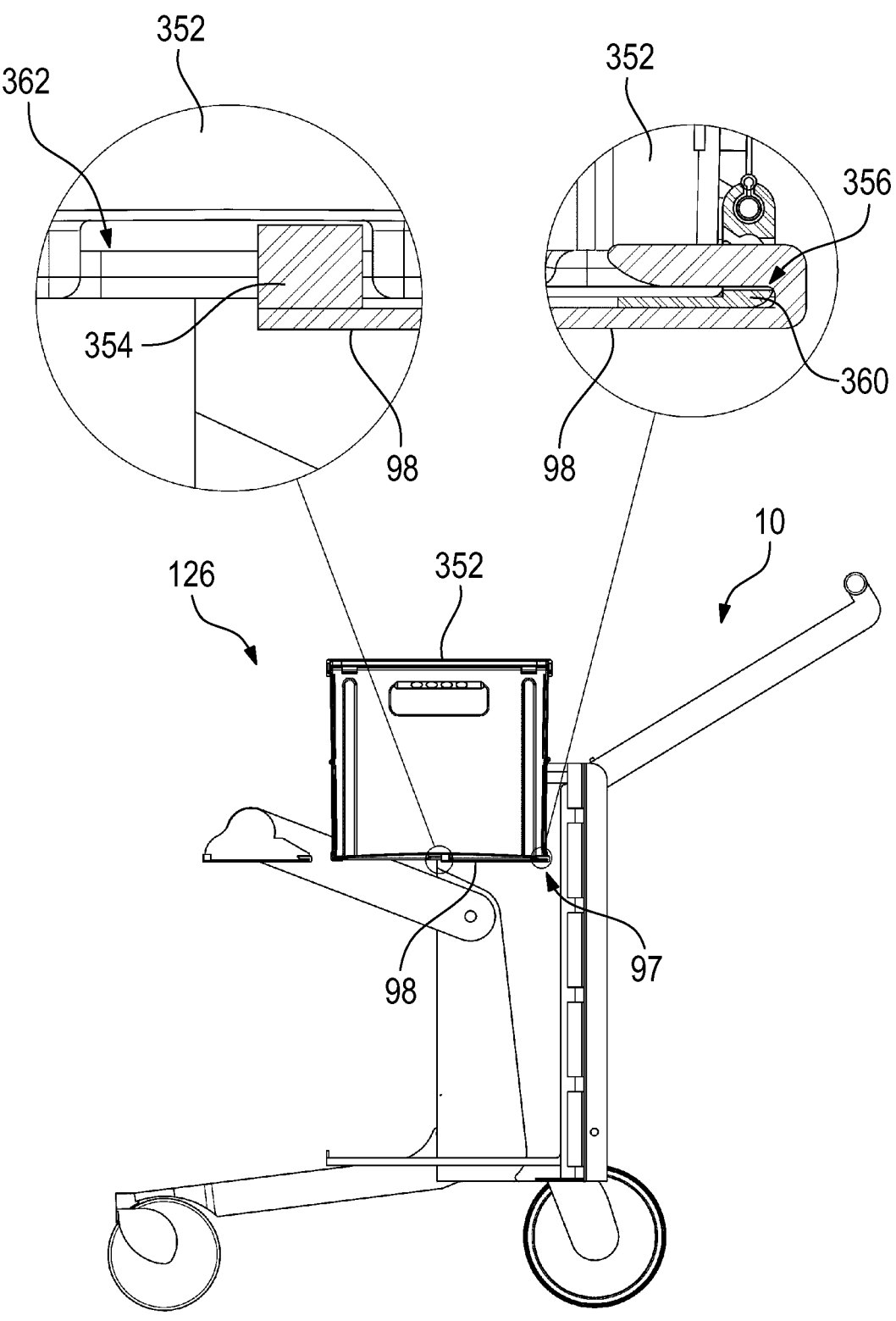
FIG. 70 is a side view of the transport cart from FIG. 69 with a transport box in the second receptacle after inserting the transport box into the second receptacle.

The transport box 352 is pushed toward the guide 356 until the protrusion 360 reaches the end of the guide 356, at which point the protrusion 360 engages the guide. During this process, the recess 362 is aligned with the web 354. Then, the transport box 352 is pivoted toward the support surface 358, with the recess 362 engaging the web 354. This is illustrated in FIG. 70.

Figure 71:
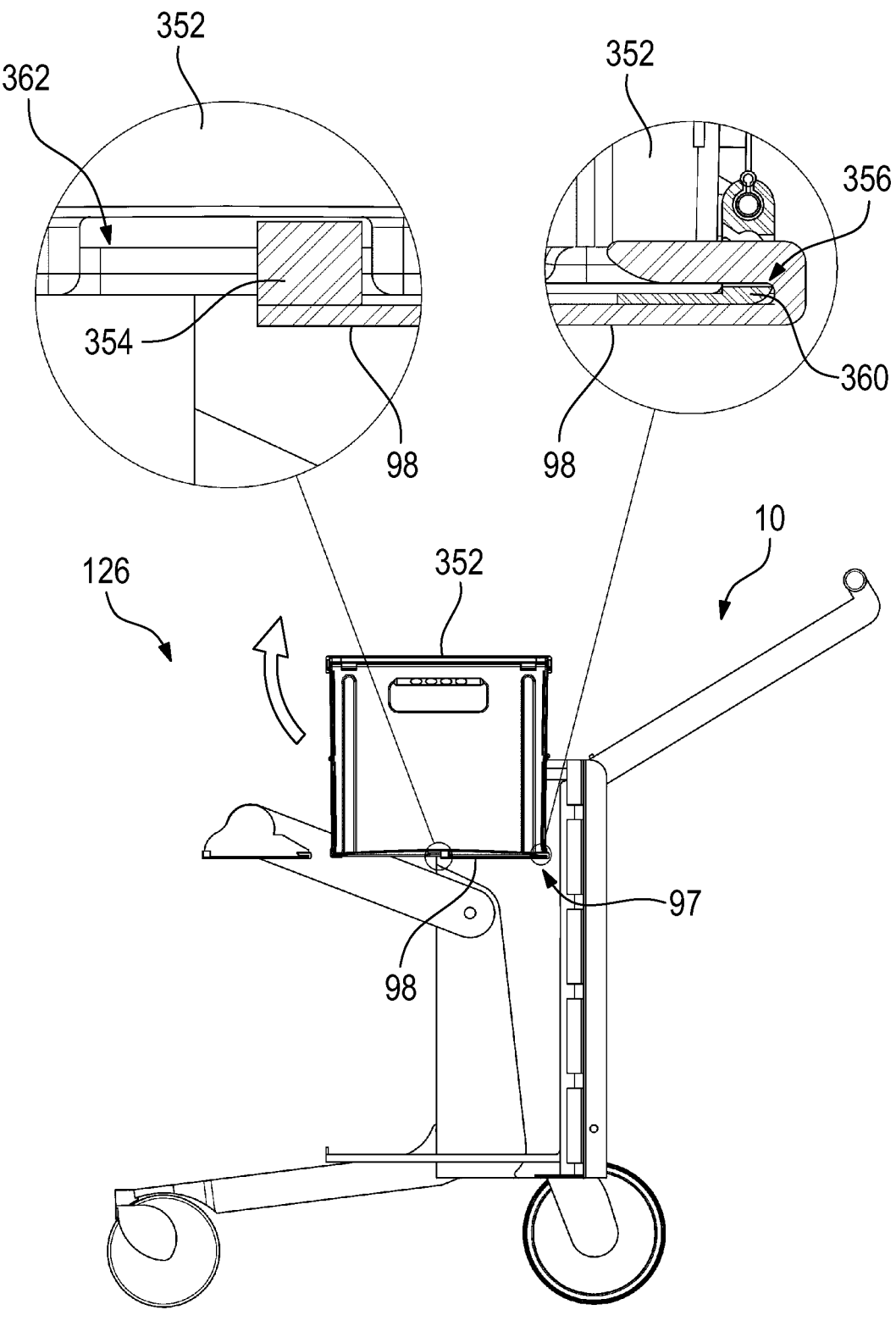
FIG. 71 is a side view of the transport cart of FIG. 1 in the second operating mode before removing a transport box from the second fixture.

To remove, the transport box 352 is first pivoted away from the support surface 358 so that the recess 362 is disengaged from the web 354. This is illustrated in FIG. 71.

Figure 72:
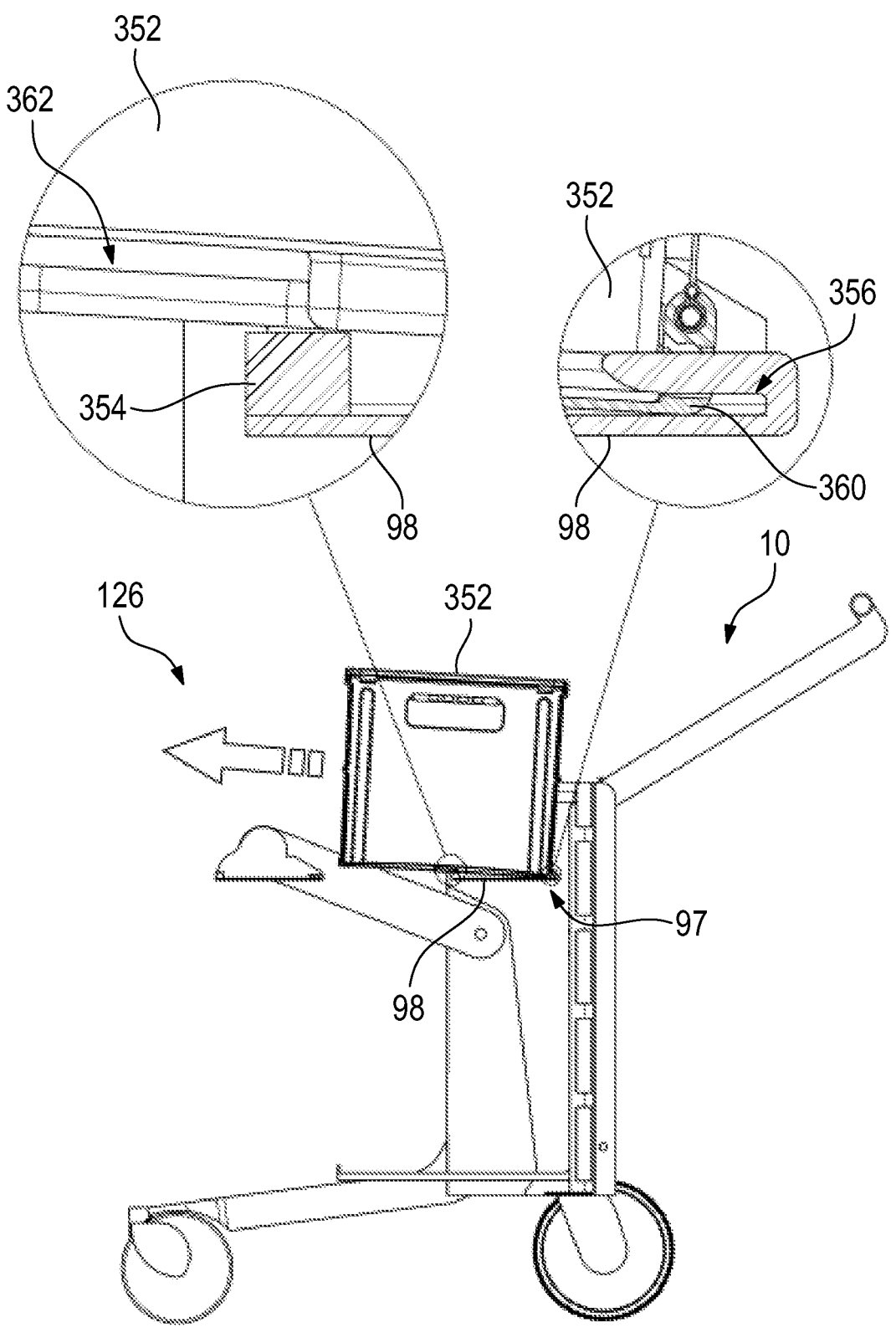
FIG. 72 is a side view of the transport cart from FIG. 71 when removing the transport box from the second fixture.
Figure 73:
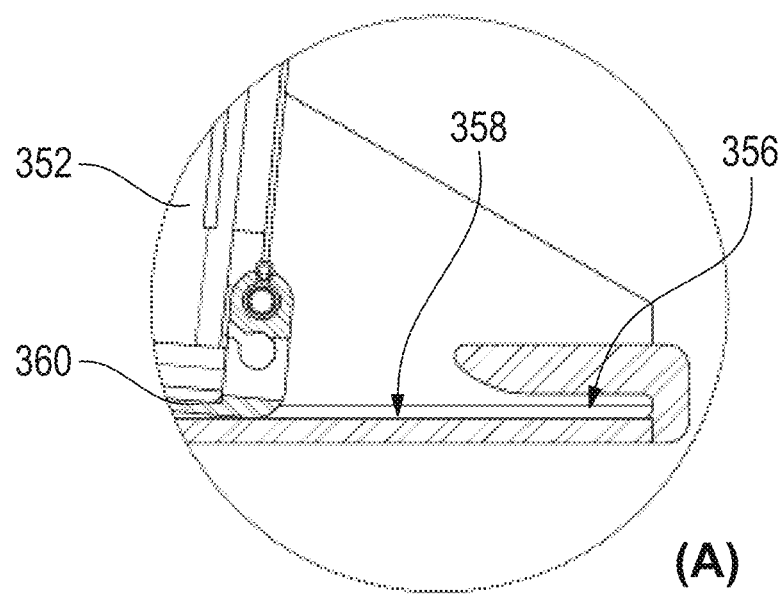
FIGS. 73A and 73B are a detailed views and side view of the transport cart from FIG. 1 in the second operating mode during insertion of a transport box into the first receptacle.
Figure 73:
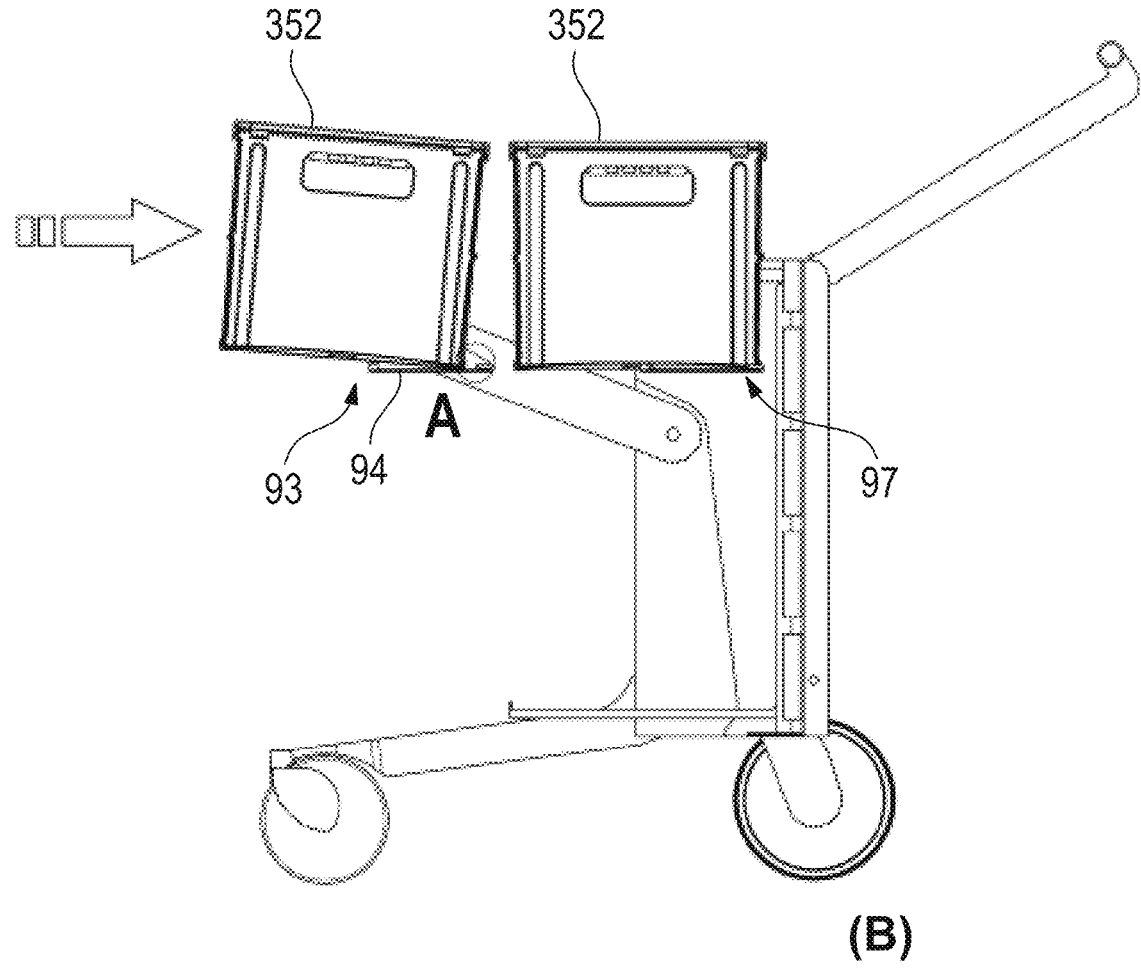
Figure 74:
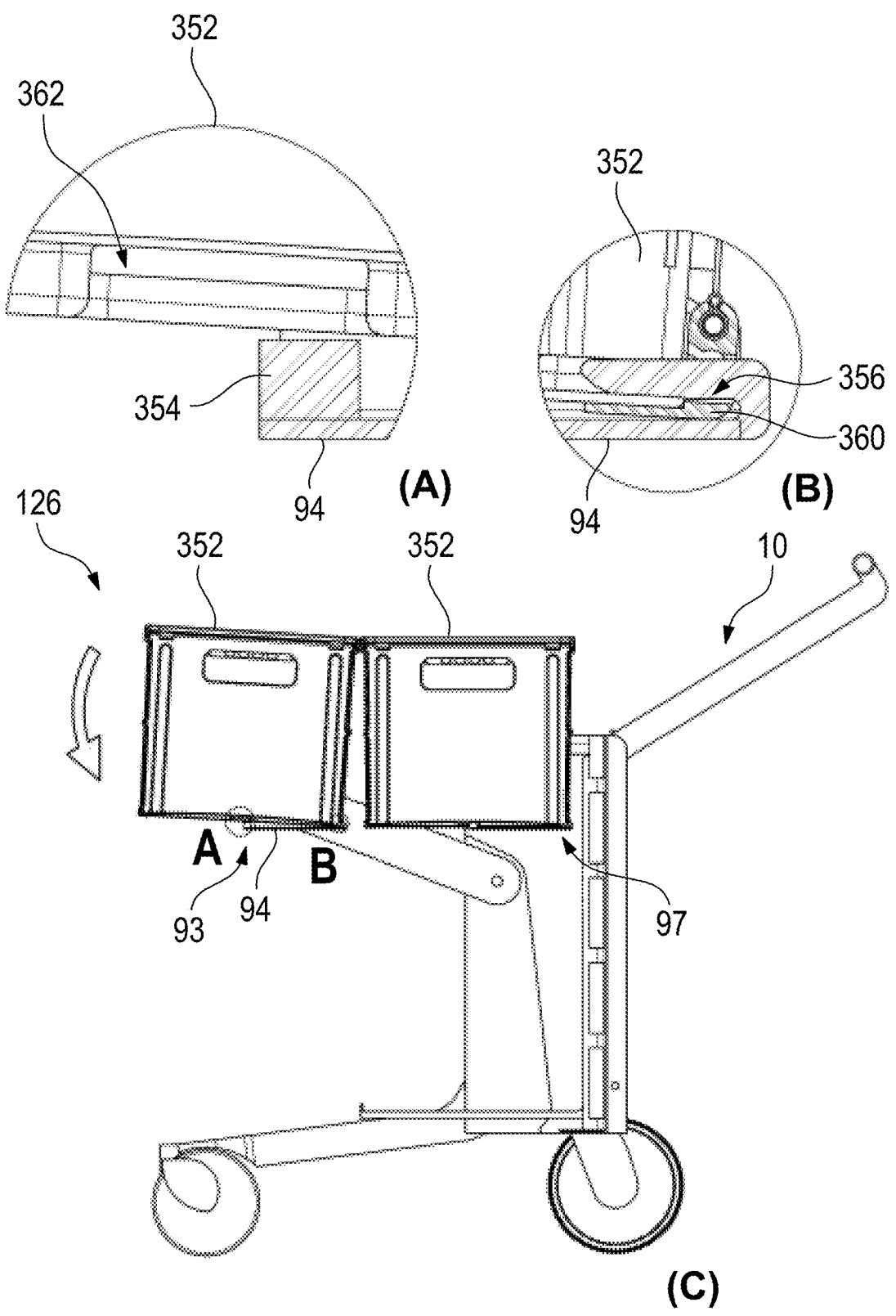
FIGS. 74A, 74B and 74C are detailed views and a side view of the transport cart of FIG. 73C during insertion of a transport box into the first receptacle.
Figure 75:
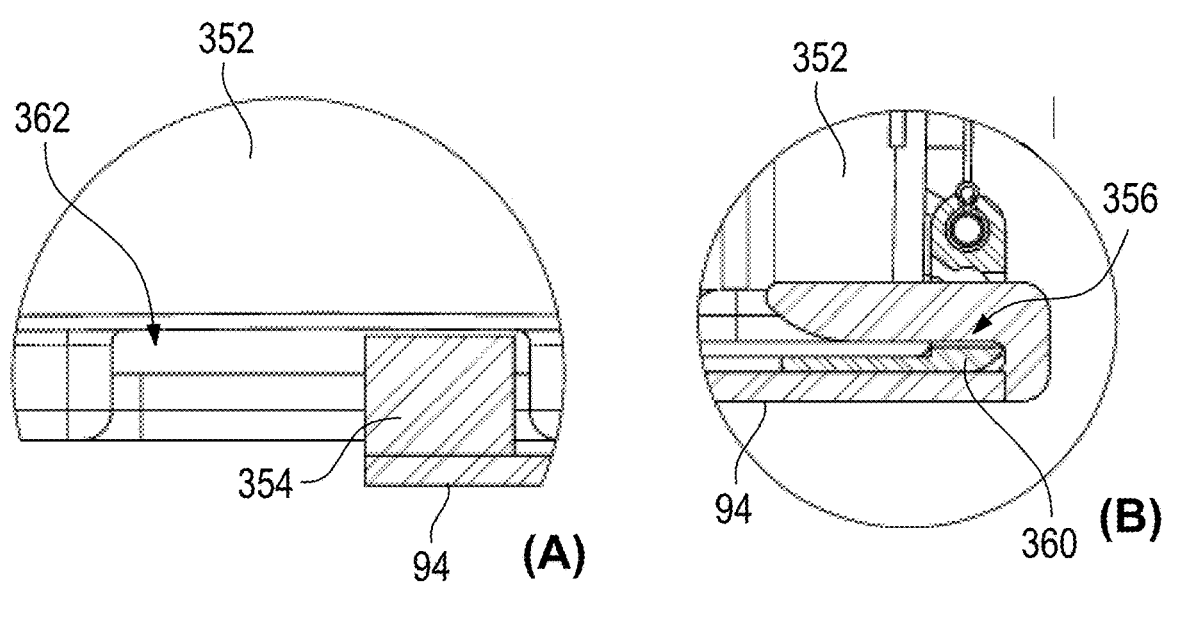
FIGS. 75A, 75B and 75C are detailed views and a side view of the transport cart of FIG. 73C with a transport box in the first receptacle after insertion of the transport box into the first receptacle.
Figure 75:
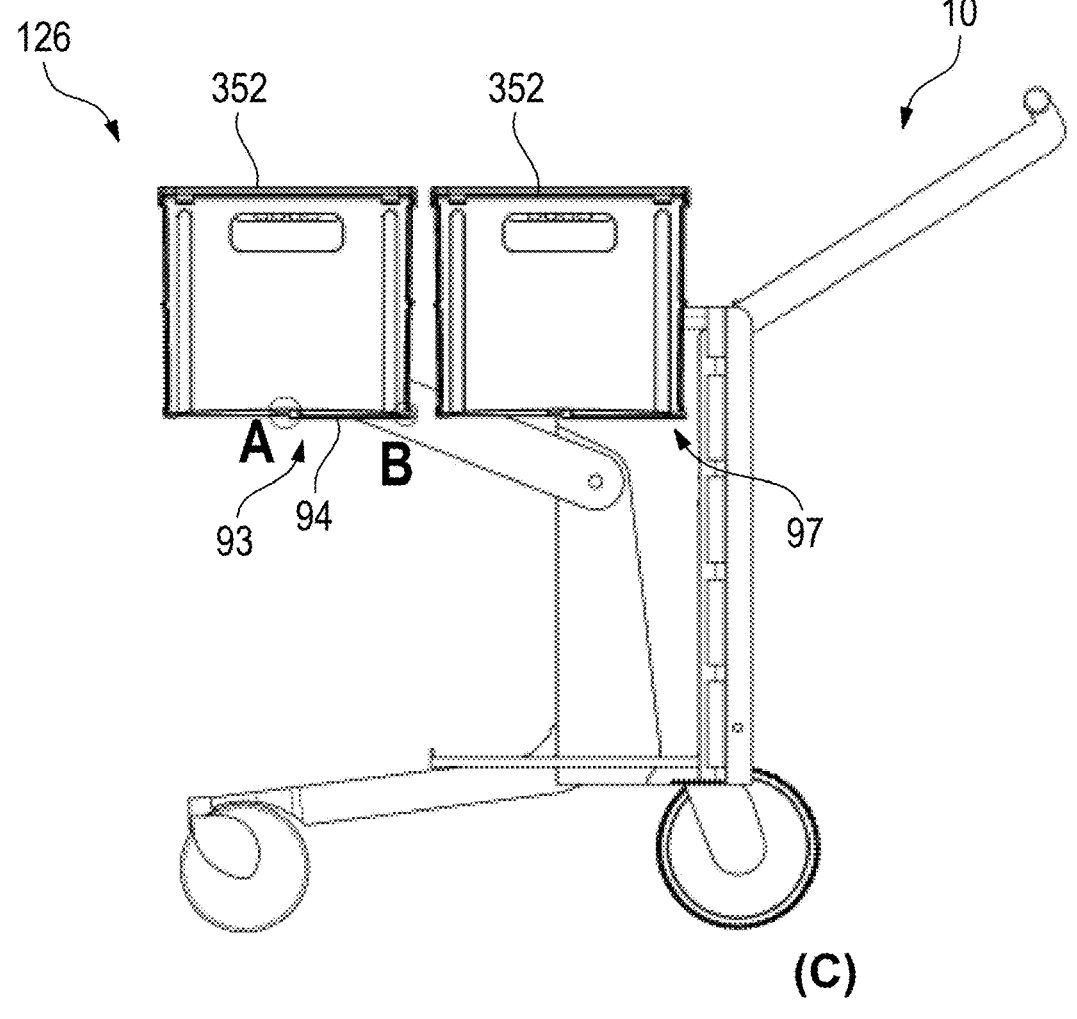
Figure 76:
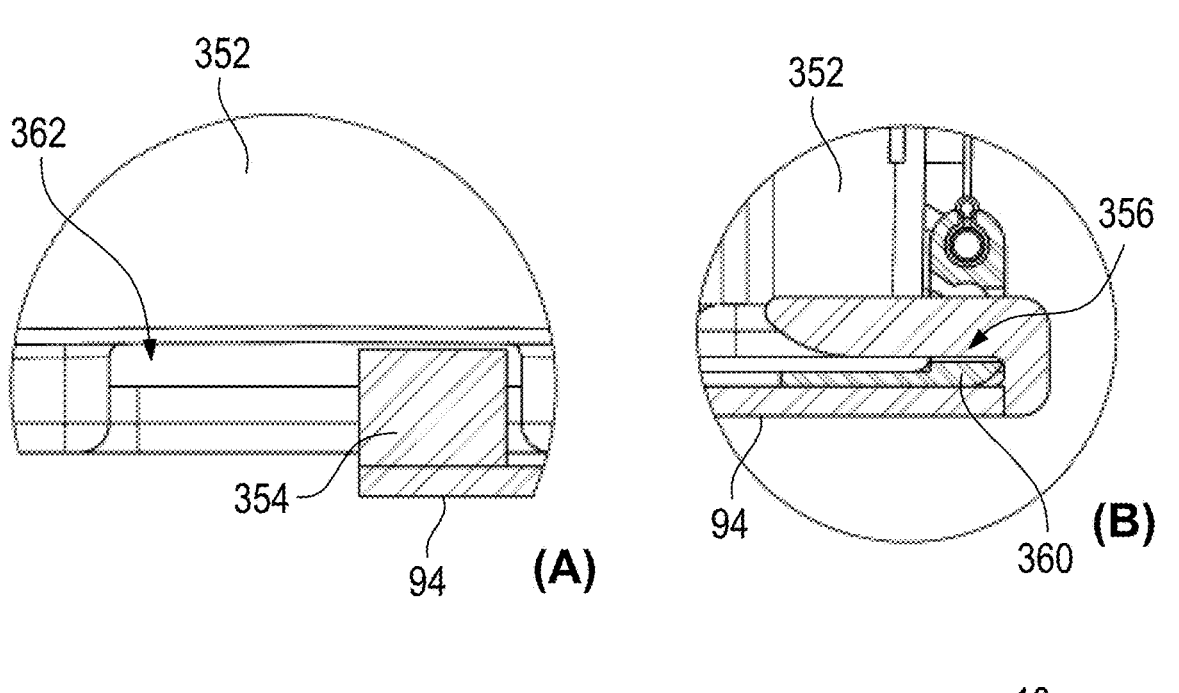
FIGS. 76A, 76B and 76C are detailed views and a side view of the transport cart of FIG. 1 in the first operating mode with a transport box in the first receptacle before the transport box is removed from the first receptacle.
Figure 76:
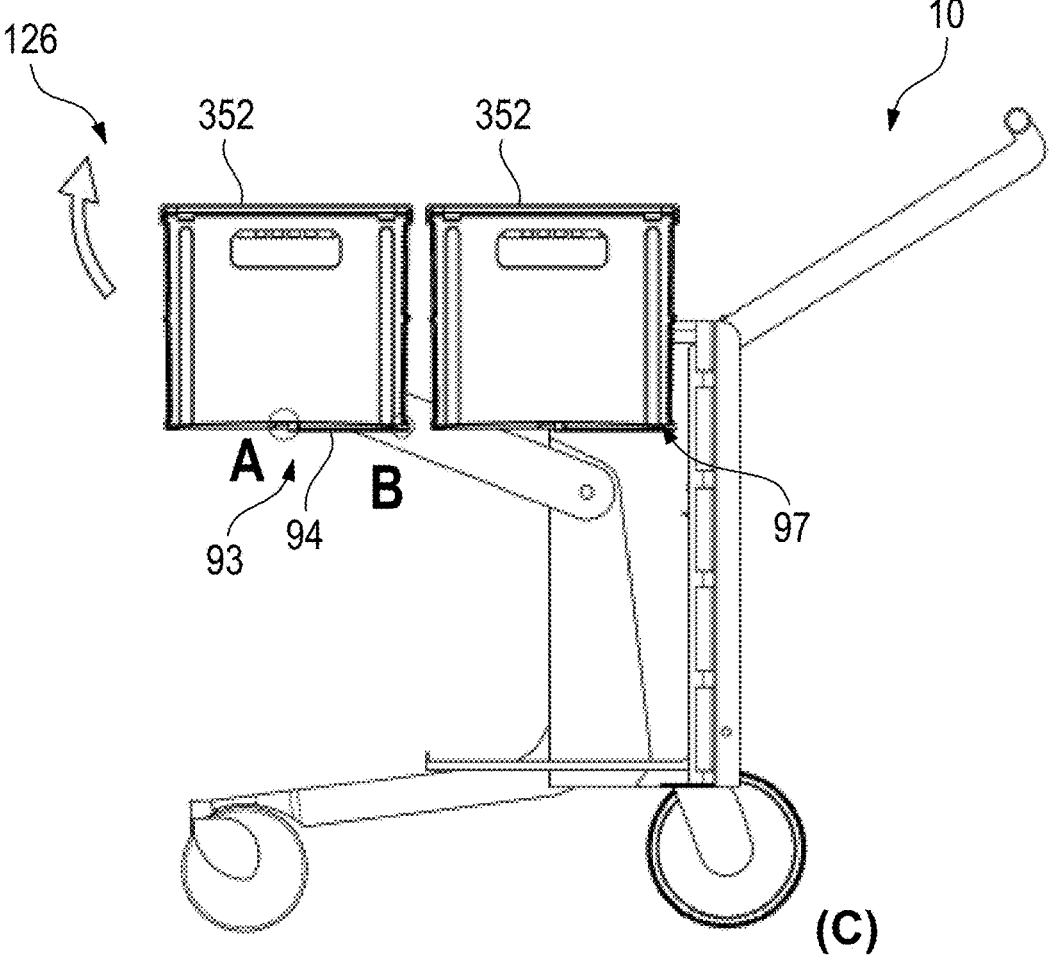
Figure 77:
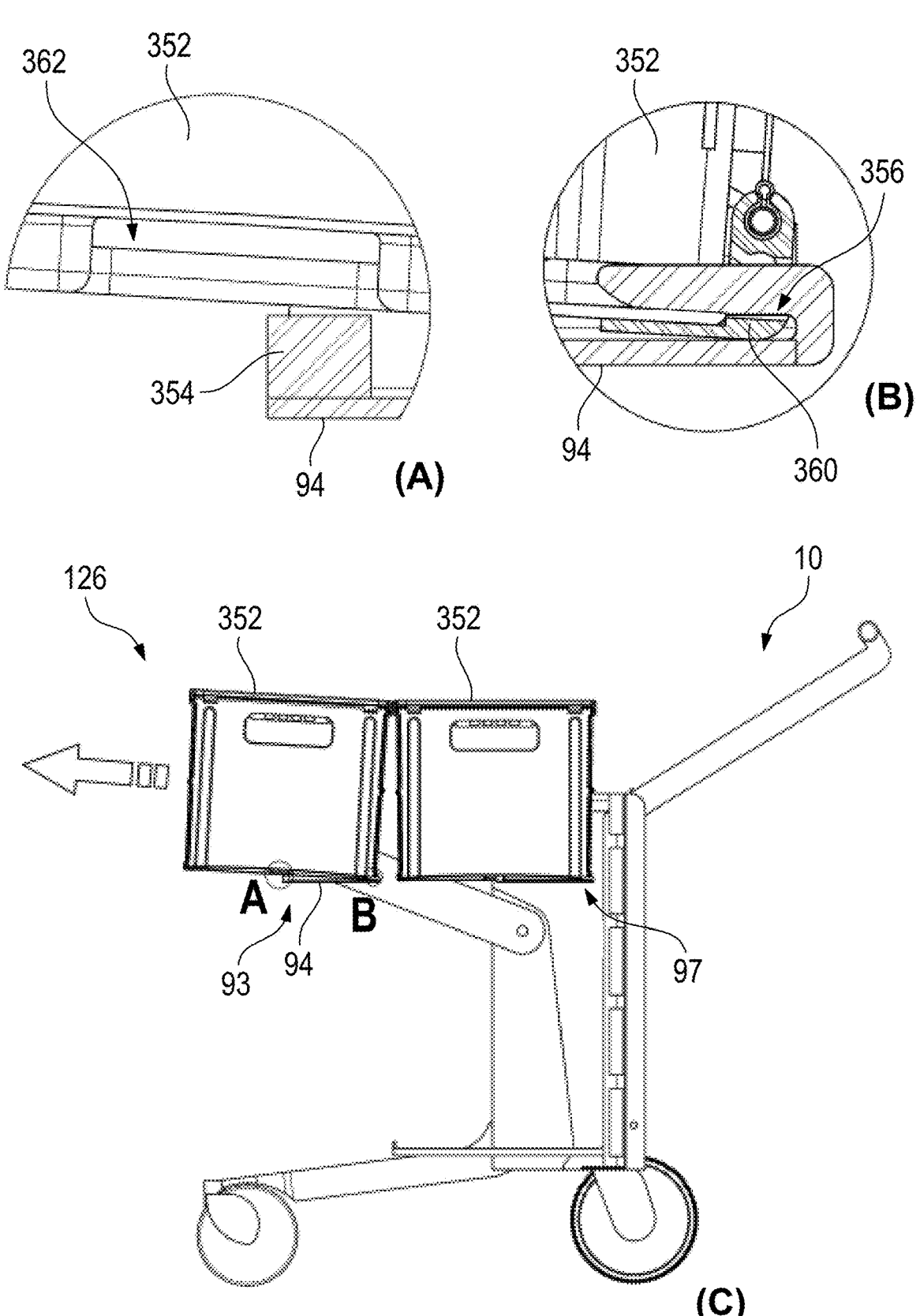
FIGS. 77A, 77B and 77C are detailed views and a side view of the transport cart from FIG. 76C when removing the transport box from the first fixture.
Figure 78:
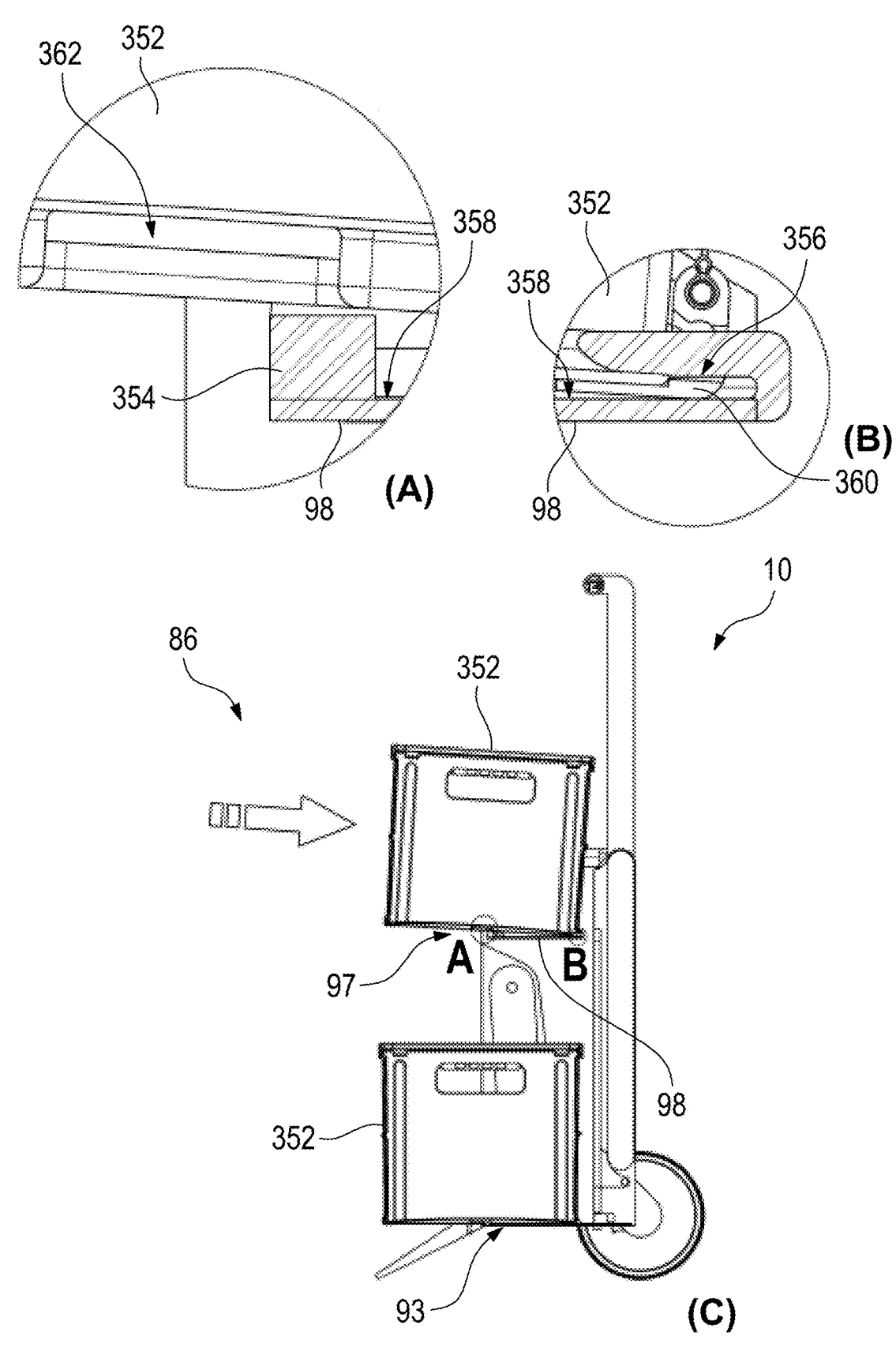
FIGS. 78A, 78B and 78C are detailed views and a side view of the transport cart from FIG. 1 in the first operating mode when inserting a transport box into the second fixture.
Figure 79:
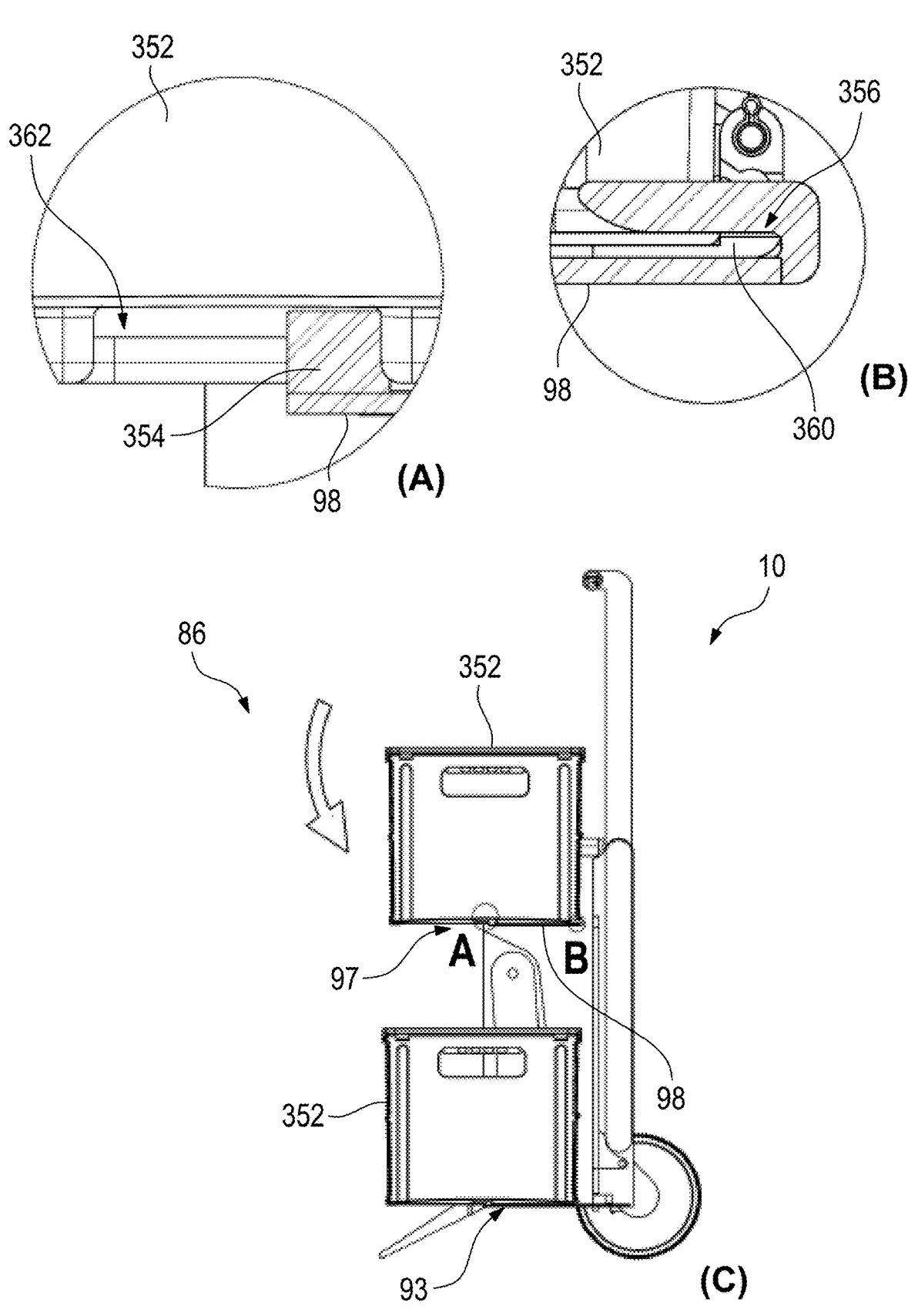
FIGS. 79A, 79B and 79C are detailed views and a side view of the transport cart from FIG. 78 with a transport box in the second receptacle after inserting the transport box into the second receptacle.
Figure 80:
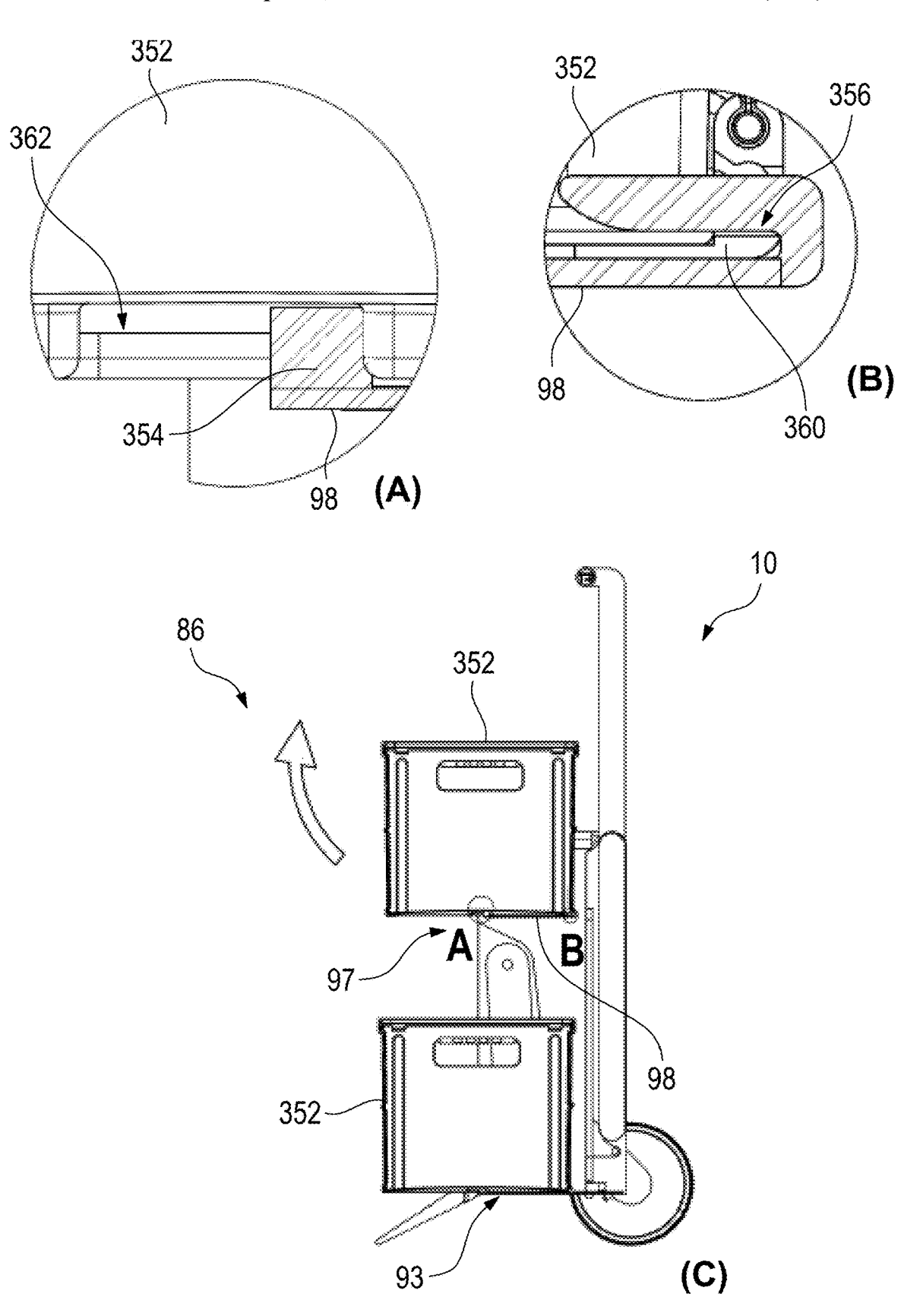
FIGS. 80A, 80B and 80C are detailed views and a side view of the transport cart of FIG. 1 in the first operating mode with a transport box in the second fixture before the transport box is removed from the second fixture.
Figure 81:
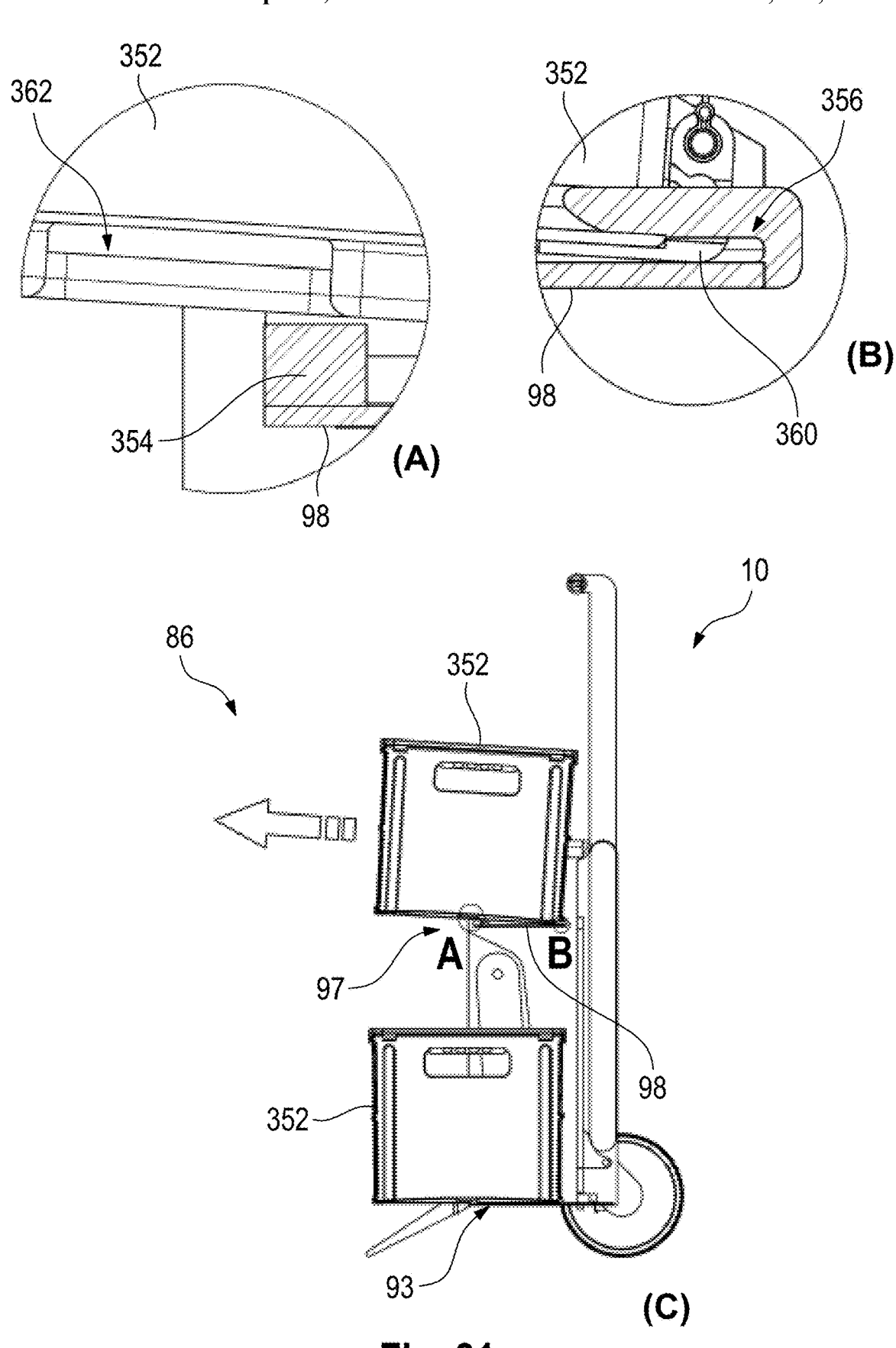
FIGS. 81A, 81B and 81C are detailed views and a side view of the transport cart from FIG. 80 when removing the transport box from the second fixture.

Then, the transport box 352 is pulled with the two corners where the protrusions 360 are located onto each of the support surfaces 358 such that the protrusion 360 is disengaged from the guide 356. This is illustrated in FIG. 72.

FIGS. 73A to 77C illustrate how a transport box 352 can be inserted into or removed from the first receptacle 93 when the transport cart 10 is arranged in the second operating mode 126 and another transport box 352 is arranged in the second receptacle. The insertion or removal is identical to the insertion of a transport box into the first receptacle 93 or the removal of a transport box from the first receptacle, as previously described with reference to FIGS. 64A to 68C.

FIGS. 78 to 81 show how a transport box 352 can be inserted into or removed from the second receptacle 97 when the transport cart 10 is arranged in the first operating mode 86 and another transport box 352 is arranged in the first receptacle 93. The insertion or removal is identical to the insertion of a transport box into the first receptacle 93 or the removal of a transport box from the first receptacle, as previously described with reference to FIGS. 69 to 72.

Figure 82:
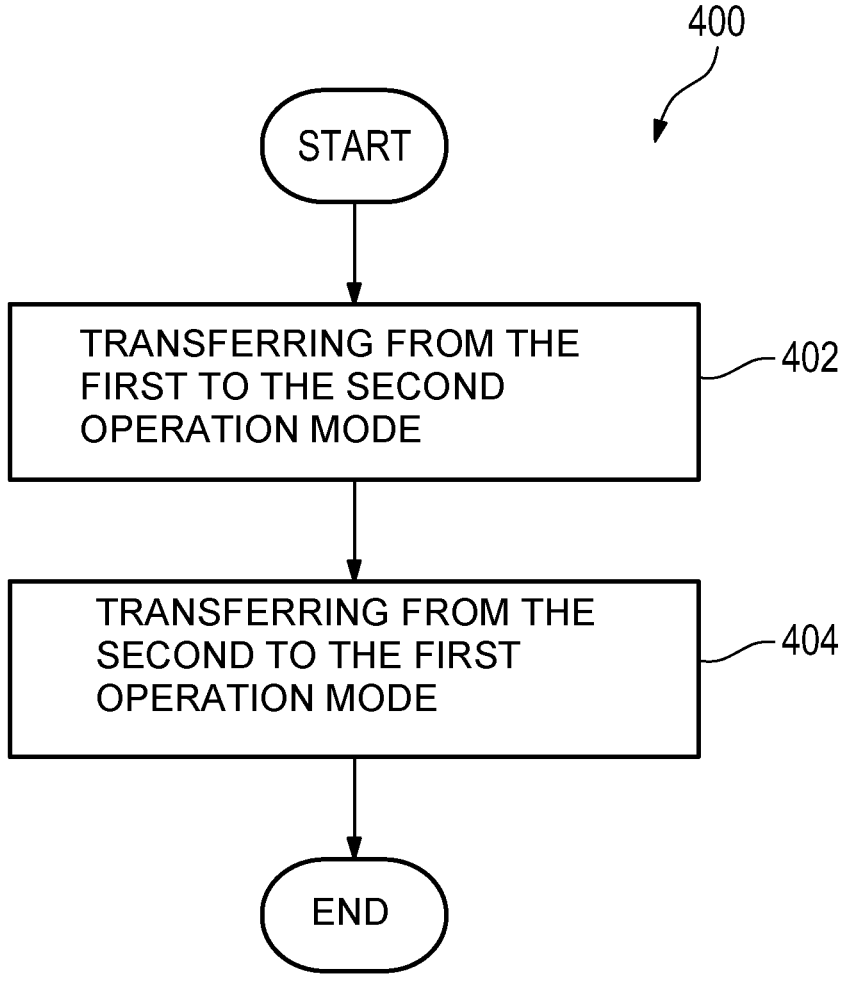
FIG. 82 is a schematic view of an embodiment of a method for transferring a transport cart between the first and second modes of operation.

FIG. 82 illustrates an embodiment of a method 400 for transferring a stealth transport cart 10 between a first mode of operation 86 and a second mode of operation 126. The stealth transport cart 10 may be configured according to the embodiments illustrated in FIGS. 1 to 81.

In a first step 402 of the method 400, the transport cart 10 is transferred from the first operating mode 86 to the second operating mode 126 by means of a first actuation in which an actuating element 197 of an actuating device 199 of the transport cart 10 is moved in a first direction of movement.

In a further step 404 of the method 400, the transport cart 10 is transferred from the second operating mode 126 to the first operating mode 86 by means of a second actuation in which the actuating element 197 is moved in the first direction of movement.

Figure 83:
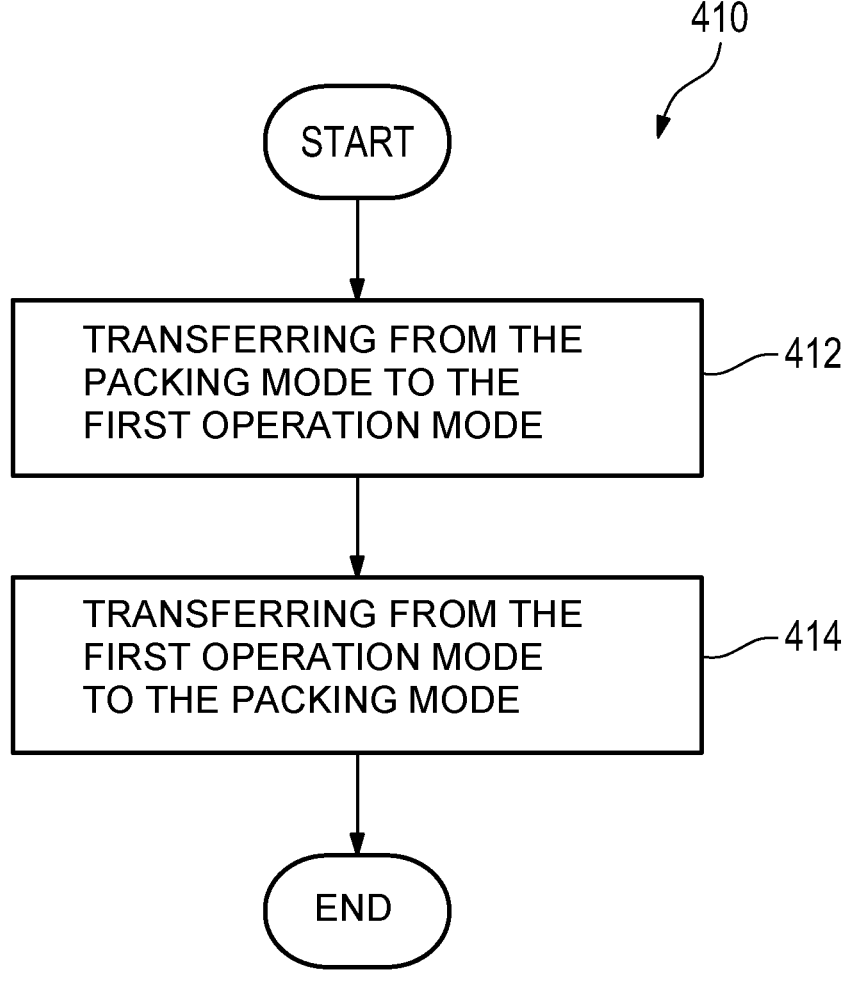
FIG. 83 is a schematic view of an embodiment of a method for transferring a transport cart between the packing mode and first operating mode.

FIG. 83 illustrates an embodiment of a method 410 for transferring a stealth transport cart 10 between a packing mode 12 and a first operating mode 86. The stealth transport cart 10 may be configured according to the embodiments illustrated in FIGS. 1 to 81.

In a first step 412 of the method 410, the transport cart 10 is transferred from the packing mode 12, in which each wheel 18 is disposed in the folded position 74 and each side assembly 16 is disposed in the folded position 76, to the first mode of operation 86, in which each wheel 18 is disposed in the unfolded position 78 and each side assembly 16 is disposed in the unfolded position 80, by moving the side assemblies 16 from the folded position 76 to the unfolded position 80, wherein movement of each side assembly 16 between the folded position 76 and the unfolded position 80 is coupled to movement of the corresponding wheel 18 between the folded position 74 and unfolded position 78.

In another step 414 of the method 410, the transport cart 10 is transferred from the first operating mode 86 to the packing mode 12 by means of moving the side assemblies 16 from the unfolded position 80 to the folded position 76.

Figure 84:
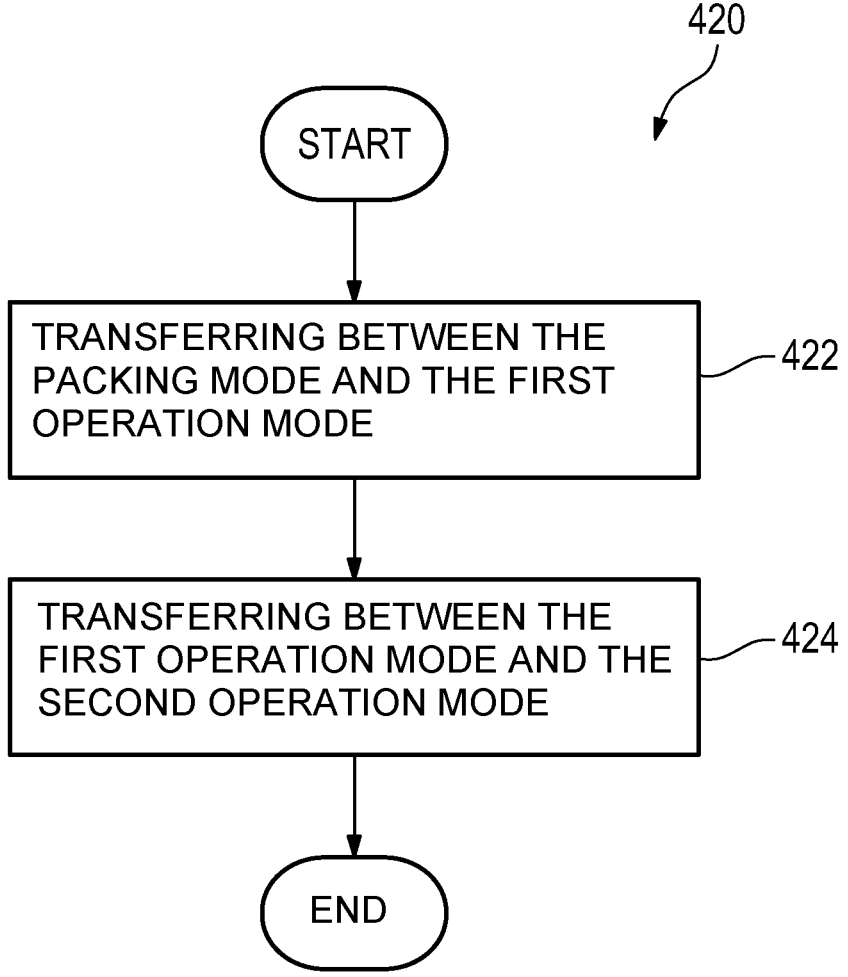
FIG. 84 is a schematic view of an embodiment of a method for transforming a transport cart.

FIG. 84 shows an embodiment of a method 420 for transforming a transport cart 10. The camouflage transport cart 10 may be formed according to the embodiments shown in FIGS. 1 to 81.

In a first step 422 of the method 420, the transport cart 10 is transferred between the packing mode 12 and an operating mode 86 in accordance with the method of FIG. 83.

In another step 424 of the method 420, the transport cart 10 is transitioned between the first mode of operation 86 and a second mode of operation 126 in accordance with the method of FIG. 82.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A transport cart having a base assembly, having two side assemblies which are arranged on the base assembly and are located opposite one another, each having one wheel arranged on one of the side assemblies, and each having at least one receptacle for a transport box, wherein the transport cart has an actuating device which is designed to transfer the transport cart between a first operating mode and a second operating mode, wherein the actuating device comprises an actuating element, wherein the transport cart further comprises a handle pivotally supported on the base assembly about a pivot axis, the handle is couplable to the actuating element such that a pivotal movement of the handle is transmitted to a movement of the actuating element parallel to a first direction of movement, wherein the handle is pivotally mounted to the base assembly via a coupling mechanism so that, when the coupling mechanism is in a locking state the handle is not pivotable relative to the base assembly, and when the coupling mechanism is in a coupling state the handle is pivotable relative to the base assembly, and the handle is coupled to the actuating element, wherein the transport cart comprises a first actuating member configured to selectively move the coupling mechanism to the locking state or the coupling state, and wherein the actuating device comprises a motion conversion device configured to transfer a motion of the actuating element in the first direction of movement to an oscillating motion parallel to a second direction of movement by which the transport cart is transferable between the first operating mode and the second operating mode.

2. The transport cart according to claim 1, wherein in the first operating mode the at least one receptacle is arranged in a transport position and in the second operating mode the at least one receptacle is arranged in a loading position, wherein the actuating device is configured to move the at least one receptacle between the transport position and the loading position.

3. The transport cart according to claim 2, wherein each receptacle comprises a respective receptacle member on each side assembly, each receptacle member being disposed on the respective side assembly via a first arm, each first arm being pivotally mounted on the respective side assembly about an axis such that the receptacle is pivotable between the transport position and the loading position.

4. The transport cart according to claim 1, wherein the transport cart further comprises a support wheel on each side assembly, each support wheel being arranged in a folded position in the first operating mode and in an unfolded position in the second operating mode, wherein the actuating device is configured to move each support wheel between the folded position and the unfolded position.

5. The transport cart according to claim 4, wherein each support wheel is disposed on the corresponding side assembly via a second arm, each second arm being pivotally mounted on the corresponding side assembly about an axis such that the corresponding support wheel is pivotable between the folded position and the unfolded position.

6. The transport cart according to claim 4, wherein, in the first operating mode the at least one receptacle is arranged in a transport position and, in the second operating mode the at least one receptacle is arranged in a loading position, the actuating device is configured to move the at least one receptacle between the transport position and the loading position, and a movement of the support wheels between the folded position and the unfolded position is coupled to a movement of the at least one receptacle between the transport position and the loading position.

7. The transport cart according to claim 4, wherein the movement of each support wheel is coupled to the movement of the actuating device via a toggle lever, wherein each toggle lever is arranged in the unfolded position of the corresponding support wheel such that the respective support wheel is held in the unfolded position.

8. The transport cart according to claim 1, wherein the actuating device is designed to transfer the transport cart from the first operating mode to the second operating mode during a first actuation in which the actuating element is moved in the first direction of movement, transfer the transport cart from the first operating mode to the second operating mode, and in a second actuation, in which the actuating element is likewise moved in the first direction of movement, transfer the transport cart from the second operating mode to the first operating mode.

9. The transport cart according to claim 1, wherein the motion conversion device is coupled to the actuating element via a first motion transmitting member and is coupled to the receptacle via a second motion transmitting member, wherein the motion conversion device is configured to transmit motion of the first motion transmitting member in the first direction of movement into oscillatory motion of the second motion transmitting member parallel to a second direction of movement.

10. The transport cart according to claim 9, wherein, when transferring the transport cart from the first operating mode to the second operating mode, the second motion transmitting member is moved in the second direction of movement, and wherein, when transferring the transport cart from the second operating mode to the first operating mode, the second motion transmitting member is moved opposite to the second direction of movement.

11. A transport cart having a base assembly, having two side assemblies which are arranged on the base assembly and are located opposite one another, each having one wheel arranged on one of the side assemblies, and each having at least one receptacle for a transport box, wherein the transport cart has an actuating device which is designed to transfer the transport cart between a first operating mode and a second operating mode, wherein the transport cart is transferable between a packing mode in which each wheel is disposed in a folded position and each side assembly is disposed in a folded position, and the first operating mode in which each wheel is disposed in an unfolded position and each side assembly is disposed in an unfolded position, and wherein movement of each side assembly between the folded position and the unfolded position is coupled to movement of the corresponding wheel between the folded position and the unfolded position, such that as each side assembly is moved between the folded position and the unfolded position, the corresponding wheel is moved between the folded position and the unfolded position.

12. The transport cart according to claim 11, wherein the transport cart further comprises a support on each side assembly, each support being disposed in a folded position in the packing mode and in an unfolded position in the first operating mode, wherein movement of each side assembly between the folded position and the unfolded position is coupled to movement of the corresponding support between the folded position and the unfolded position.

13. The transport cart according to claim 11, wherein the transport cart further comprises a locking device configured to lock each side assembly in the folded position and in the unfolded position, wherein the transport cart further comprises at least a second actuating member by which the locking of the side assemblies effected by the locking device can be released.

14. The transport cart according to claim 11, wherein the movement of each support and/or each wheel is coupled to the movement of the corresponding side assembly via a toggle lever, wherein each toggle lever is arranged in the unfolded position of the corresponding wheel or the corresponding support, in such a way that the respective wheel or the respective support is held in the unfolded position.

15. A transport cart having a base assembly, two opposing side assemblies disposed on the base assembly, and a wheel disposed on each of the side assemblies, the transport cart being operable between a packing mode, in which each wheel is arranged in a folded position and each side assembly is arranged in a folded position, and a first operating mode in which each wheel is arranged in an unfolded position and each side assembly is arranged in an unfolded position, wherein movement of each side assembly between the folded position and the unfolded position is coupled to movement of the corresponding wheel between the folded position and the unfolded position such that as each side assembly is moved between the folded position and the unfolded position, the corresponding wheel is moved between the folded position and the unfolded position.

16. The transport cart of claim 15, wherein the transport cart further comprises a support on each side assembly, each support being disposed in a folded position in the packing mode and in an unfolded position in the first operating mode, wherein movement of each side assembly between the folded position and the unfolded position is coupled to movement of the corresponding support between the folded position and the unfolded position.

17. The transport cart according to claim 15, wherein the transport cart further comprises a locking device configured to lock each side assembly in the folded position and in the unfolded position, wherein the transport cart further comprises at least a second actuating member by which the locking of the side assemblies effected by the locking device can be released.

18. The transport cart according to claim 16, wherein the movement of each support and/or each wheel is coupled to the movement of the corresponding side assembly via a toggle lever, wherein each toggle lever is arranged in the unfolded position of the corresponding wheel or the corresponding support, in such a way that the respective wheel or the respective support is held in the unfolded position.

19. The transport cart according to claim 15, further comprising at least one receptacle arranged between the side assemblies for a respective transport box.

20. A method of transferring a transport cart between a first operating mode and a second operating mode, the transport cart comprising a base assembly, two opposing side assemblies disposed on the base assembly, a wheel disposed on each of the side assemblies, and at least one receptacle disposed between each of the side assemblies for a transport box, the method comprising the steps of:

transferring the transport cart from the first operating mode to the second operating mode by a first actuation in which an actuating element of an actuating device of the transport cart is moved in a first direction of movement; and transferring the transport cart from the second operating mode to the first operating mode by a second actuation in which the actuating element is moved in the first direction of movement, wherein the transport cart further comprises a handle pivotally supported on the base assembly about a pivot axis, the handle is couplable to the actuating element such that a pivotal movement of the handle is transmitted to a movement of the actuating element parallel to the first direction of movement, wherein the handle is pivotally mounted to the base assembly via a coupling mechanism so that, when the coupling mechanism is in a locking state the handle is not pivotable relative to the base assembly, and when the coupling mechanism is in a coupling state the handle is pivotable relative to the base assembly, and the handle is coupled to the actuating element, wherein the transport cart comprises a first actuating member configured to selectively move the coupling mechanism to the locking state or the coupling state, and wherein the actuating device comprises a motion conversion device configured to transfer a motion of the actuating element in the first direction of movement to an oscillating motion parallel to a second direction of movement by which the transport cart is transferable between the first operating mode and the second operating mode.

21. A method of transferring a transport cart between a packing mode and a first operating mode, the transport cart comprising a base assembly, two opposing side assemblies disposed on the base assembly, a wheel disposed on each of the side assemblies, and at least one receptacle disposed between the side assemblies for a respective transport box, the method comprising the steps of:

transferring the transport cart from the packing mode, in which each wheel is in a folded position and each side assembly is in a folded position, to the first operating mode, in which each wheel is in an unfolded position and each side assembly is in an unfolded position by moving the side assemblies from the folded position to the unfolded position, wherein movement of each side assembly between the folded position and the unfolded position is coupled to movement of the corresponding wheel between the folded position and unfolded position;

transferring the transport cart from the first operating mode to the packing mode by moving the side assemblies from the unfolded position to the folded position.

22. A method of transforming a transport cart, the transport cart comprising a base assembly, two opposing side assemblies disposed on the base assembly, and a wheel disposed on each of the side assemblies, and at least one receptacle disposed between the side assemblies for a respective transport box, the method comprising the steps of:

transferring the transport cart between a packing mode and a first operating mode by transferring the transport cart from the packing mode, in which each wheel is in a folded position and each side assembly is in a folded position, to the first operating mode, in which each wheel is in an unfolded position and each side assembly is in an unfolded position by moving the side assemblies from the folded position to the unfolded position, wherein movement of each side assembly between the folded position and the unfolded position is coupled to movement of the corresponding wheel between the folded position and the unfolded position, and by transferring the transport cart from the first operating mode to the packing mode by moving the side assemblies from the unfolded position to the folded position; and transferring the transport cart between the first operating mode and a second operating mode by transferring the transport cart from the first operating mode to the second operating mode by a first actuation in which an actuating element of an actuating device of the transport cart is moved in a first direction of movement, and by transferring the transport cart from the second operating mode to the first operating mode by a second actuation in which the actuating element is moved in the first direction of movement.

\* \* \* \* \*